United States Patent
Kim et al.

(10) Patent No.: US 10,772,073 B2
(45) Date of Patent: Sep. 8, 2020

(54) SYNCHRONIZATION METHOD AND DEVICE FOR DEVICE-TO-DEVICE COMMUNICATION IN WIRELESS COMMUNICATION SYSTEM

(71) Applicant: Samsung Electronics Co., Ltd., Gyeonggi-do (KR)

(72) Inventors: Donghan Kim, Yongin-si (KR); Hyoungju Ji, Seoul (KR); Yongjun Kwak, Yongin-si (KR); Jinyoung Oh, Seoul (KR); Hyojin Lee, Suwon-si (KR); Sangmin Ro, Seoul (KR); Hoondong Noh, Suwon-si (KR); Seunghoon Choi, Suwon-si (KR); Youngbum Kim, Seoul (KR); Younsun Kim, Seongnam-si (KR); Juho Lee, Suwon-si (KR); Youngwoo Kwak, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 43 days.

(21) Appl. No.: 15/327,360

(22) PCT Filed: Jul. 17, 2015

(86) PCT No.: PCT/KR2015/007421
§ 371 (c)(1),
(2) Date: Jan. 18, 2017

(87) PCT Pub. No.: WO2016/010390
PCT Pub. Date: Jan. 21, 2016

(65) Prior Publication Data
US 2017/0150480 A1    May 25, 2017

Related U.S. Application Data

(60) Provisional application No. 62/026,552, filed on Jul. 18, 2014, provisional application No. 62/033,464, (Continued)

(51) Int. Cl.
H04W 72/02 (2009.01)
H04W 56/00 (2009.01)
(Continued)

(52) U.S. Cl.
CPC ............. *H04W 72/02* (2013.01); *H04L 67/12* (2013.01); *H04W 4/70* (2018.02); *H04W 8/005* (2013.01);
(Continued)

(58) Field of Classification Search
CPC ..... H04W 72/02; H04W 4/005; H04W 88/02; H04W 8/005; H04W 28/0215;
(Continued)

(56) References Cited

U.S. PATENT DOCUMENTS

2008/0274759 A1   11/2008  Chen et al.
2010/0272004 A1   10/2010  Maeda et al.
(Continued)

FOREIGN PATENT DOCUMENTS

EP    2824862 A2    1/2015
KR    20130049663 A    5/2013
(Continued)

OTHER PUBLICATIONS

Samsung, "Resource pool configuration for type-1 discovery," R1-142109,3GPP TSG RAN WG1 Meeting #77, Seoul, Korea, May 19-23, 2014, 6 pages.
(Continued)

*Primary Examiner* — Omar J Ghowrwal
*Assistant Examiner* — Kokou R Detse

(57) ABSTRACT

The present invention relates to a communication technology and system converging the 5G communication system for supporting a data rate higher than that of the 4G system with IoT technology. The present invention is applicable to intelligent services based on 5G communication and IoT
(Continued)

technologies (e.g., smart home, smart building, smart city, smart car or connected car, health care, digital education, retail, security, and safety services. In detail, the discovery signal transmission method of a terminal in a wireless communication system supporting Device to Device (D2D) communication includes receiving discovery resource pool information from a base station, selecting a resource for transmitting discovery signal based on the discovery resource pool information, determining whether the selected resource is overlapped with a resource configured for transmitting a D2D synchronization signal, and determining whether to transmit the discovery signal based on the determination result.

8 Claims, 84 Drawing Sheets

Related U.S. Application Data filed on Aug. 5, 2014, provisional application No. 62/073,163, filed on Oct. 31, 2014.

(51) Int. Cl.
| | | |
|---|---|---|
| *H04W 4/70* | (2018.01) | |
| *H04L 29/08* | (2006.01) | |
| *H04W 8/00* | (2009.01) | |
| *H04W 88/02* | (2009.01) | |
| *H04W 88/08* | (2009.01) | |

(52) U.S. Cl.
CPC .......... *H04W 56/002* (2013.01); *H04W 88/02* (2013.01); *H04W 88/08* (2013.01)

(58) Field of Classification Search
CPC ..... H04W 28/0289; H04W 4/06; H04W 4/70; H04L 67/12; H04L 12/1886
See application file for complete search history.

(56) References Cited

U.S. PATENT DOCUMENTS

| | | |
|---|---|---|
| 2012/0287828 A1 | 11/2012 | Chen et al. |
| 2013/0070660 A1 | 3/2013 | Xu |
| 2013/0170357 A1 | 7/2013 | Anchan et al. |
| 2013/0294320 A1 | 11/2013 | Jactat et al. |
| 2013/0308551 A1 | 11/2013 | Madan et al. |
| 2013/0343239 A1 | 12/2013 | Damnjanovic et al. |
| 2014/0029484 A1 | 1/2014 | Choi et al. |
| 2014/0094183 A1 | 4/2014 | Gao et al. |
| 2014/0099950 A1 | 4/2014 | Mildh et al. |
| 2014/0112158 A1 | 4/2014 | Tavildar et al. |
| 2014/0120934 A1 | 5/2014 | Kishiyama |
| 2014/0128067 A1 | 5/2014 | Lim et al. |
| 2014/0185539 A1 | 7/2014 | Seo et al. |
| 2014/0192697 A1 | 7/2014 | Anchan et al. |
| 2014/0233452 A1 | 8/2014 | Kim et al. |
| 2014/0241220 A1 | 8/2014 | Choi et al. |
| 2014/0269519 A1 | 9/2014 | Shan et al. |
| 2014/0286224 A1 | 9/2014 | Yu et al. |
| 2014/0369242 A1 | 12/2014 | Ng et al. |
| 2015/0124670 A1 | 5/2015 | Park |
| 2015/0124686 A1 | 5/2015 | Zhang et al. |
| 2015/0146588 A1 | 5/2015 | Park |
| 2015/0180676 A1 | 6/2015 | Bao et al. |
| 2015/0200752 A1 | 7/2015 | Yin et al. |
| 2015/0215903 A1* | 7/2015 | Zhao .................... H04W 72/04 370/329 |
| 2015/0365963 A1 | 12/2015 | Won et al. |
| 2016/0157081 A1* | 6/2016 | Kwak .................... H04W 48/08 370/329 |
| 2016/0164653 A1* | 6/2016 | Wang .................... H04L 5/0048 370/329 |
| 2016/0242065 A1* | 8/2016 | Fukuta .................... H04W 72/04 |
| 2016/0242152 A1* | 8/2016 | Yu .................... H04W 76/14 |
| 2016/0242158 A1 | 8/2016 | Takeda et al. |
| 2016/0269885 A1* | 9/2016 | Kim .................... H04W 76/14 |
| 2016/0323846 A1 | 11/2016 | Park et al. |
| 2016/0366576 A1* | 12/2016 | You .................... H04J 11/0069 |
| 2016/0374050 A1 | 12/2016 | Prasad et al. |
| 2017/0238149 A1 | 8/2017 | Xu et al. |
| 2017/0251341 A1 | 8/2017 | Frost et al. |

FOREIGN PATENT DOCUMENTS

| | | |
|---|---|---|
| KR | 20140108393 A | 9/2014 |
| KR | 20150048615 A | 5/2015 |
| WO | 13-002206 A1 | 1/2013 |
| WO | 13-002688 A1 | 1/2013 |
| WO | 2014107607 A1 | 7/2014 |

OTHER PUBLICATIONS

Ericsson, "On the Design of Discovery Bursts and Procedures," R1-140759, 3GPP TSG RAN WG1 Meeting #76, Prague, Czech Republic, Feb. 10-14, 2014, 8 pages.
Extended European Search Report, dated Oct. 17, 2017, regarding Application No. 15855172.1, 11 pages.
LG Electronics, "Considerations of HARQ-ACK and DCI for TDD-FDD CA", 3GPP TSG RANT WG1 Meeting #75, R1-135464, Nov. 2013, 7 pages.
LG Electronics, "UCI for TDD-FDD carrier aggregation", 3GPP TSG RANT WG1 Meeting #76, R1-140313, Feb. 2014, 4 pages.
Huawei; Group Call eMBMS Congestion Management; 3GPP TSG-RAN WG3 Meeting #85; R3-141636; Aug. 18-22, 2014; Dresden, Germany, 3 pages.
Nokia Networks; Analysis on Group Call eMBMS Congestion Management; 3gPP TSG-RAN WG3 Meeting #85; R3-141659; Aug. 18-22, 2014; Dresden, German.
Vodafone et al.; Potential Solutions for "Group Call eMBMS Congestion Management"; 3GPP TSG RAN3 Meeting #85; R3-141974; Aug. 18-22, 2014; Dresden, Germany; 4 pages.
LG Electronics et al.; CR on HARQ-ACK Transmission for TDD-FDD CA with eIMTA; 3GPP TSG-RAN WG1 Meeting #78bis; R1-144511; Oct. 6-10, 2014; Ljubljana, Slovenia; 4 pages.
Communication from Related Counterpart U.S. Appl. No. 14/927,957; Non-final Office Action dated Mar. 20, 2017, 29 pages.
Communication from Related Counterpart U.S. Appl. No. 14/865,861; Non-final Office Action dated Mar. 21, 2017; 19 pages.
USPTO, "Office Action Summary—non-final," U.S. Appl. No. 14/865,861, dated Apr. 5, 2018, 16 pages.
USPTO, "Office Action Summary—final," U.S. Appl. No. 14/865,861, dated Sep. 11, 2017, 18 pages.
Motorola Solutions, Background on RP-141035 Group Call eMBMS Congestion Management, R3-141836, 3GPP TSG-RAN WG3 #85, Dresden, Germany, Aug. 18-22, 2014, 2 pages.
RP-141035, "New Work Item: Group Call eMBMS congestion management," 3GPP TSG RAN Meeting #64, Sophia Antipolis, France, Jun. 10-13, 2014, 6 pages.
USPTO, Final Office Action for U.S. Appl. No. 14/865,861 dated Nov. 16, 2018, 14 pages.
USPTO, Non-final Office Action, U.S. Appl. No. 14/865,861, dated Jun. 11, 2019, 9 pages.
Non-final Office Action in connection with U.S. Appl. No. 14/865,861 dated Feb. 24, 2020, 13 pages.
3GPP TS 36.443 V12.2.0 (Mar. 2015), Technical Specification, 3rd Generation Partnership Project; Technical Specification Group Radio Access Network; Evolved Universal Terrestrial Radio Access Network (E-UTRAN); M2 Application Protocol (M2AP) (Release 12), Mar. 2015, 89 pages.

* cited by examiner

FIG. 20
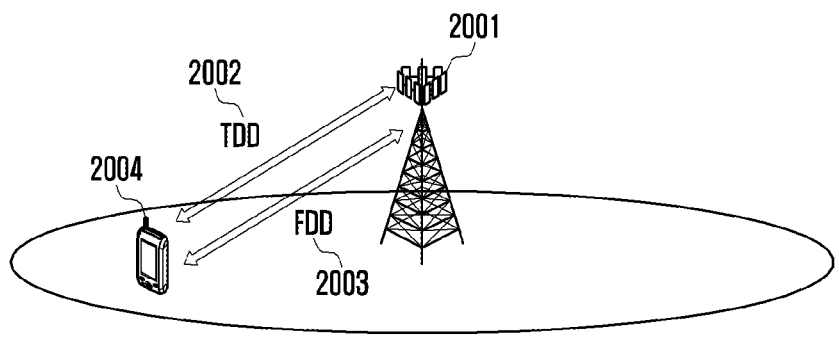
(a)
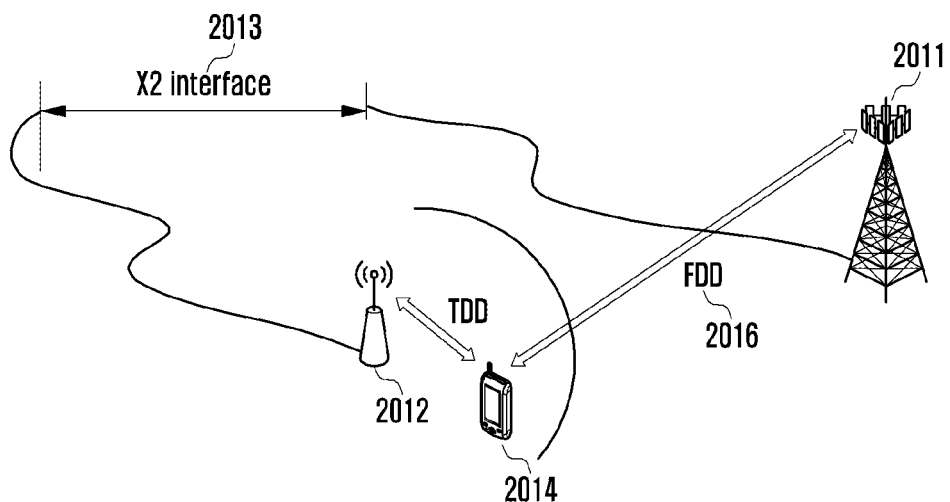
(b)

FIG. 22A

Table 10.1.2.2.1-5 : Transmission of Format 1b HARQ-ACK channel selection for $A = 4$

| HARQ-ACK[0] | HARQ-ACK[1] | HARQ-ACK[2] | HARQ-ACK[3] | $n^{(1)}_{PUCCH}$ | $b(0)\ b(1)$ |
|---|---|---|---|---|---|
| ACK | ACK | ACK | ACK | $n^{(1)}_{PUCCH,1}$ | 1, 1 |
| ACK | NACK/DTX | ACK | ACK | $n^{(1)}_{PUCCH,2}$ | 0, 1 |
| NACK/DTX | ACK | ACK | ACK | $n^{(1)}_{PUCCH,1}$ | 0, 1 |
| NACK/DTX | NACK/DTX | ACK | ACK | $n^{(1)}_{PUCCH,3}$ | 1, 1 |
| ACK | ACK | ACK | NACK/DTX | $n^{(1)}_{PUCCH,1}$ | 1, 0 |
| ACK | NACK/DTX | ACK | NACK/DTX | $n^{(1)}_{PUCCH,2}$ | 0, 0 |
| NACK/DTX | ACK | ACK | NACK/DTX | $n^{(1)}_{PUCCH,1}$ | 0, 0 |
| NACK/DTX | NACK/DTX | ACK | NACK/DTX | $n^{(1)}_{PUCCH,3}$ | 1, 0 |
| ACK | ACK | NACK/DTX | ACK | $n^{(1)}_{PUCCH,2}$ | 1, 1 |
| ACK | NACK/DTX | NACK/DTX | ACK | $n^{(1)}_{PUCCH,2}$ | 1, 0 |
| NACK/DTX | ACK | NACK/DTX | ACK | $n^{(1)}_{PUCCH,3}$ | 0, 1 |
| NACK/DTX | NACK/DTX | NACK/DTX | ACK | $n^{(1)}_{PUCCH,3}$ | 0, 0 |
| ACK | ACK | NACK/DTX | NACK/DTX | $n^{(1)}_{PUCCH,0}$ | 1, 1 |
| ACK | NACK/DTX | NACK/DTX | NACK/DTX | $n^{(1)}_{PUCCH,0}$ | 1, 0 |
| NACK/DTX | ACK | NACK/DTX | NACK/DTX | $n^{(1)}_{PUCCH,0}$ | 0, 1 |
| NACK/DTX | NACK | NACK/DTX | NACK/DTX | $n^{(1)}_{PUCCH,0}$ | 0, 0 |
| NACK | NACK/DTX | NACK/DTX | NACK/DTX | $n^{(1)}_{PUCCH,0}$ | 0, 0 |
| DTX | DTX | NACK/DTX | NACK/DTX | No Transmission | |

2201 points to row 2 (ACK, NACK/DTX, ACK, ACK)

 2202 — PUCCH on Pcell

 2203 — PUCCH on Scell

FIG. 22B

Table 10.1.3.2-3 : Transmission of Format 1b HARQ-ACK channel selection for $A = 4$

| HARQ-ACK(0), HARQ-ACK(1), HARQ-ACK(2), HARQ-ACK(3) | $n_{PUCCH}^{(1)}$ | $b(0) \, b(1)$ |
|---|---|---|
| ACK, ACK, ACK, ACK | $n_{PUCCH, 1}^{(1)}$ | 1, 1 |
| ACK, ACK, ACK, NACK/DTX | $n_{PUCCH, 2}^{(1)}$ | 1, 1 |
| ACK, ACK, NACK/DTX, ACK | $n_{PUCCH, 0}^{(1)}$ | 1, 0 |
| ACK, ACK, NACK/DTX, NACK/DTX | $n_{PUCCH, 1}^{(1)}$ | 1, 0 |
| ACK, NACK/DTX, ACK, ACK | $n_{PUCCH, 3}^{(1)}$ | 1, 1 |
| ACK, NACK/DTX, ACK, NACK/DTX | $n_{PUCCH, 2}^{(1)}$ | 1, 0 |
| ACK, NACK/DTX, NACK/DTX, ACK | $n_{PUCCH, 0}^{(1)}$ | 0, 1 |
| ACK, NACK/DTX, NACK/DTX, NACK/DTX | $n_{PUCCH, 0}^{(1)}$ | 1, 1 |
| NACK/DTX, ACK, ACK, ACK | $n_{PUCCH, 1}^{(1)}$ | 0, 0 |
| NACK/DTX, ACK, ACK, NACK/DTX | $n_{PUCCH, 2}^{(1)}$ | 0, 1 |
| NACK/DTX, ACK, NACK/DTX, ACK | $n_{PUCCH, 3}^{(1)}$ | 1, 0 |
| NACK/DTX, ACK, NACK/DTX, NACK/DTX | $n_{PUCCH, 1}^{(1)}$ | 0, 1 |
| NACK/DTX, NACK/DTX, ACK, ACK | $n_{PUCCH, 3}^{(1)}$ | 0, 1 |
| NACK/DTX, NACK/DTX, ACK, NACK/DTX | $n_{PUCCH, 2}^{(1)}$ | 0, 0 |
| NACK/DTX, NACK/DTX, NACK/DTX, ACK | $n_{PUCCH, 3}^{(1)}$ | 0, 0 |
| NACK, NACK/DTX, NACK/DTX, NACK/DTX | $n_{PUCCH, 0}^{(1)}$ | 0, 0 |
| DTX, NACK/DTX, NACK/DTX, NACK/DTX | No Transmission | |

2211 labels the third data row.

 PUCCH on Pcell

 PUCCH on Scell

FIG. 24A

Table 10.1.2.2.1-5 : Transmission of Format 1b HARQ-ACK channel selection for $A = 4$

| HARQ-ACK(0) | HARQ-ACK(1) | HARQ-ACK(2) | HARQ-ACK(3) | $n_{PUCCH}^{(1)}$ | $b(0)\,b(1)$ |
|---|---|---|---|---|---|
| ACK | ACK | ACK | ACK | $n_{PUCCH,1}^{(1)}$ | 1,1 |
| ACK | NACK/DTX | ACK | ACK | $n_{PUCCH,2}^{(1)}$ | 0,1 |
| NACK/DTX | ACK | ACK | ACK | $n_{PUCCH,1}^{(1)}$ | 0,1 |
| NACK/DTX | NACK/DTX | ACK | ACK | $n_{PUCCH,3}^{(1)}$ | 1,1 |
| ACK | ACK | ACK | NACK/DTX | $n_{PUCCH,1}^{(1)}$ | 1,0 |
| ACK | NACK/DTX | ACK | NACK/DTX | $n_{PUCCH,2}^{(1)}$ | 0,0 |
| NACK/DTX | ACK | ACK | NACK/DTX | $n_{PUCCH,1}^{(1)}$ | 0,0 |
| NACK/DTX | NACK/DTX | ACK | NACK/DTX | $n_{PUCCH,3}^{(1)}$ | 1,0 |
| ACK | ACK | NACK/DTX | ACK | $n_{PUCCH,2}^{(1)}$ | 1,1 |
| ACK | NACK/DTX | NACK/DTX | ACK | $n_{PUCCH,2}^{(1)}$ | 1,0 |
| NACK/DTX | ACK | NACK/DTX | ACK | $n_{PUCCH,3}^{(1)}$ | 0,1 |
| NACK/DTX | NACK/DTX | NACK/DTX | ACK | $n_{PUCCH,3}^{(1)}$ | 0,0 |
| ACK | ACK | NACK/DTX | NACK/DTX | $n_{PUCCH,0}^{(1)}$ | 1,1 |
| ACK | NACK/DTX | NACK/DTX | NACK/DTX | $n_{PUCCH,0}^{(1)}$ | 1,0 |
| NACK/DTX | ACK | NACK/DTX | NACK/DTX | $n_{PUCCH,0}^{(1)}$ | 0,1 |
| NACK/DTX | NACK | NACK/DTX | NACK/DTX | $n_{PUCCH,0}^{(1)}$ | 0,0 |
| NACK | NACK/DTX | NACK/DTX | NACK/DTX | $n_{PUCCH,0}^{(1)}$ | 0,0 |
| DTX | DTX | NACK/DTX | NACK/DTX | No Transmission | |

2401 — (second row)
2402 — PUCCH on Pcell
2403 — PUCCH on Scell

FIG. 24B

Table 10.1.3.2-3 : Transmission of Format 1b HARQ-ACK channel selection for $A = 4$

| HARQ-ACK(0), HARQ-ACK(1), HARQ-ACK(2), HARQ-ACK(3) | $n^{(1)}_{PUCCH}$ | $b(0) b(1)$ |
|---|---|---|
| ACK, ACK, ACK, ACK | $n^{(1)}_{PUCCH, 1}$ | 1, 1 |
| ACK, ACK, ACK, NACK/DTX | $n^{(1)}_{PUCCH, 2}$ | 1, 1 |
| ACK, ACK, NACK/DTX, ACK | $n^{(1)}_{PUCCH, 0}$ | 1, 0 |
| ACK, ACK, NACK/DTX, NACK/DTX | $n^{(1)}_{PUCCH, 1}$ | 1, 0 |
| ACK, NACK/DTX, ACK, ACK | $n^{(1)}_{PUCCH, 3}$ | 1, 1 |
| ACK, NACK/DTX, ACK, NACK/DTX | $n^{(1)}_{PUCCH, 2}$ | 1, 0 |
| ACK, NACK/DTX, NACK/DTX, ACK | $n^{(1)}_{PUCCH, 0}$ | 0, 1 |
| ACK, NACK/DTX, NACK/DTX, NACK/DTX | $n^{(1)}_{PUCCH, 0}$ | 1, 1 |
| NACK/DTX, ACK, ACK, ACK | $n^{(1)}_{PUCCH, 1}$ | 0, 0 |
| NACK/DTX, ACK, ACK, NACK/DTX | $n^{(1)}_{PUCCH, 2}$ | 0, 1 |
| NACK/DTX, ACK, NACK/DTX, ACK | $n^{(1)}_{PUCCH, 3}$ | 1, 0 |
| NACK/DTX, ACK, NACK/DTX, NACK/DTX | $n^{(1)}_{PUCCH, 1}$ | 0, 1 |
| NACK/DTX, NACK/DTX, ACK, ACK | $n^{(1)}_{PUCCH, 3}$ | 0, 1 |
| NACK/DTX, NACK/DTX, ACK, NACK/DTX | $n^{(1)}_{PUCCH, 2}$ | 0, 0 |
| NACK/DTX, NACK/DTX, NACK/DTX, ACK | $n^{(1)}_{PUCCH, 3}$ | 0, 0 |
| NACK, NACK/DTX, NACK/DTX, NACK/DTX | $n^{(1)}_{PUCCH, 0}$ | 0, 0 |
| DTX, NACK/DTX, NACK/DTX, NACK/DTX | No Transmission | |

2411 — (row: ACK, ACK, NACK/DTX, ACK)

2412 — PUCCH on Pcell
2413 — PUCCH on Scell

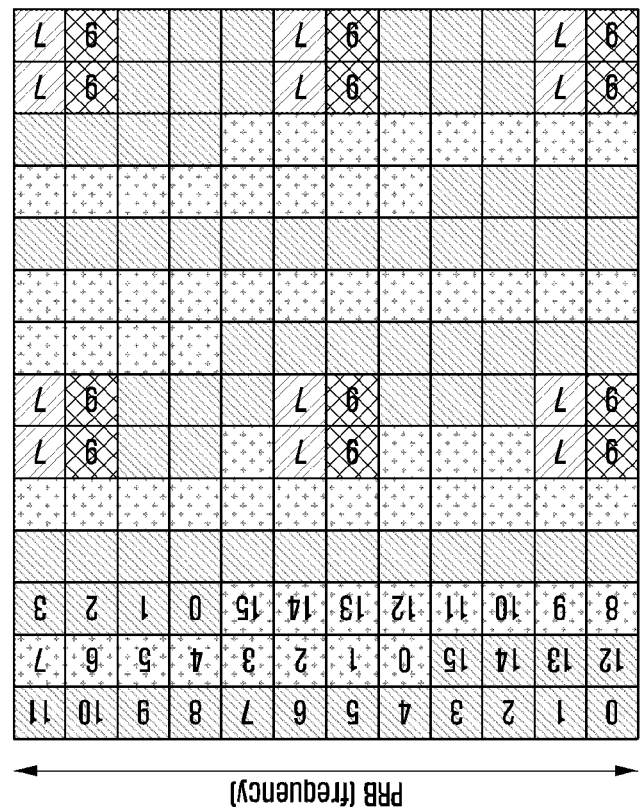
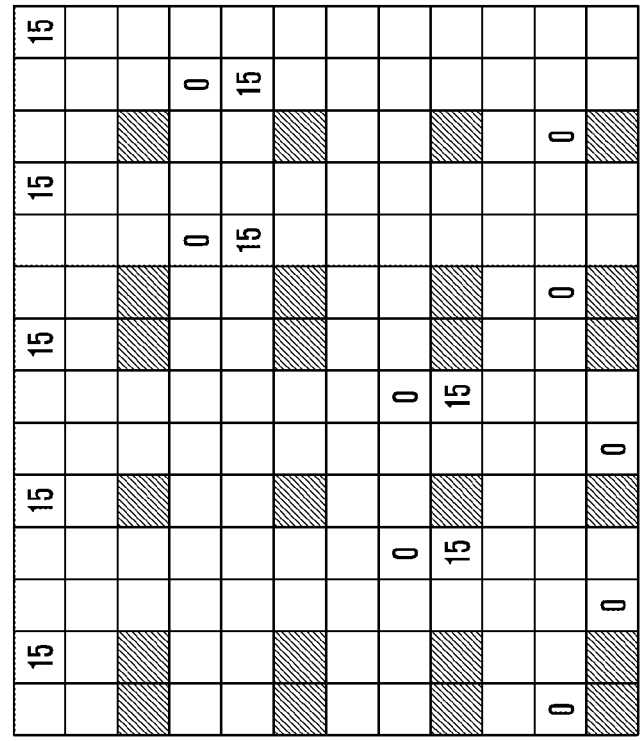
FIG. 34

FIG. 47
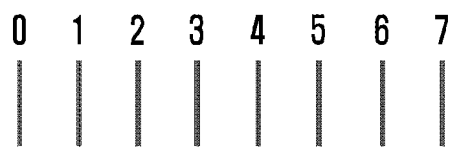
8 TX-METHOD 1: 1-DIMENSIONAL LINEAR ANTENNA: [[1X8 UPOL]]
8 TX-METHOD 2: 1-DIMENSIONAL CROSS ANTENNA: [[1X4 UPOL]]
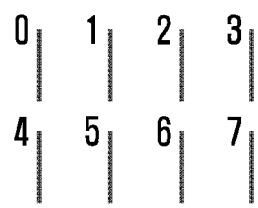
8 TX-METHOD 3: 2-DIMENSIONAL LINEAR ANTENNA: [[2X8 UPOL]]
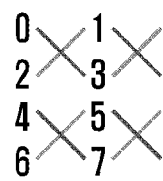
8 TX-METHOD 4: 2-DIMENSIONAL CROSS ANTENNA: [[2X2 UPOL]]

FIG. 50
16 TX-METHOD 1: 1-DIMENSIONAL LINEAR ANTENNA: [[1X16 UPOL]]
16 TX-METHOD 2: 1-DIMENSIONAL CROSS ANTENNA: [[1X8 UPOL]]
16 TX-METHOD 3: 2-DIMENSIONAL LINEAR ANTENNA: [[2X4 UPOL]]
16 TX-METHOD 4: 2-DIMENSIONAL CROSS ANTENNA: [[2X2 UPOL]]

FIG. 56

$$\mathbf{v}_{n,m} = \left[\underbrace{1}_{5610}, \underbrace{e^{j2\pi n/Q_1}}_{5620}, \underbrace{e^{j2\pi m/Q_2}}_{5630}, \underbrace{e^{j2\pi\left(\frac{n}{Q_1}+\frac{m}{Q_2}\right)}}_{5640}\right]$$

$$\left[\underbrace{1}_{5650}, e^{j2\pi n/Q_1}, e^{j2\pi m/Q_2}, e^{j2\pi\left(\frac{n}{Q_1}+\frac{m}{Q_2}\right)}\right]$$

$$\underbrace{e^{j\varphi}}_{5690}\left[1, \underbrace{e^{j2\pi n/Q_1}}_{5660}, \underbrace{e^{j2\pi m/Q_2}}_{5670}, \underbrace{e^{j2\pi\left(\frac{n}{Q_1}+\frac{m}{Q_2}\right)}}_{5680}\right]$$

FIG. 59
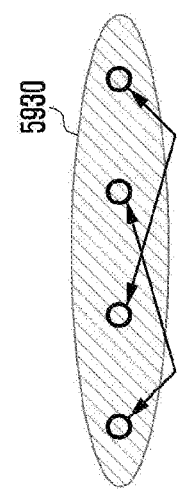
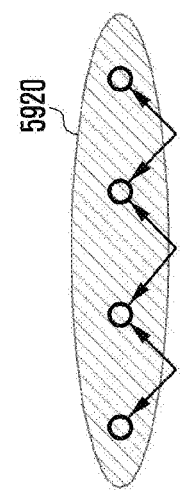
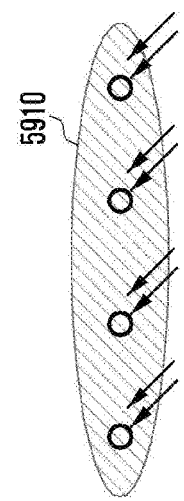

$$v_{n,m} = \left[1,\ e^{j2\pi n/Q_1},\ e^{j2\pi m/Q_2},\ e^{j2\pi \left(\frac{n}{Q_1}+\frac{m}{Q_2}\right)}\right]$$

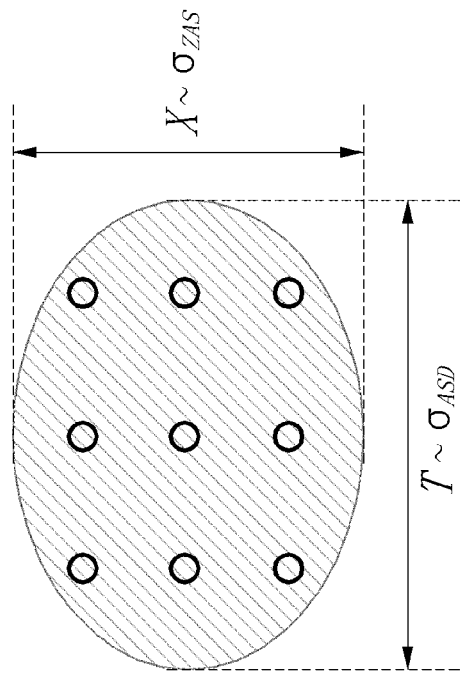
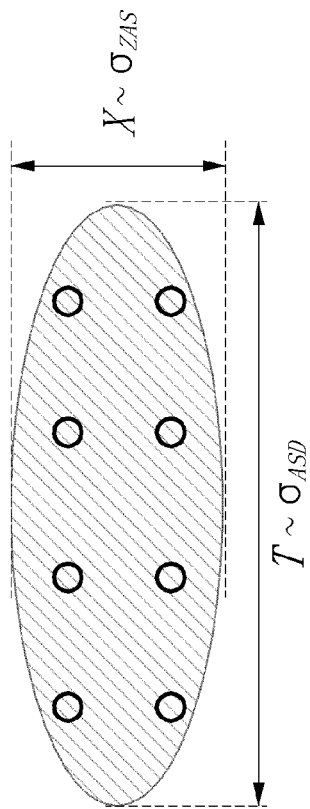
FIG. 69

SYNCHRONIZATION METHOD AND DEVICE FOR DEVICE-TO-DEVICE COMMUNICATION IN WIRELESS COMMUNICATION SYSTEM

CROSS-REFERENCE TO RELATED APPLICATIONS

The present application claims priority under 35 U.S.C. § 365 to International Patent Application No. PCT/KR2015/007421 filed Jul. 17, 2015, entitled "SYNCHRONIZATION METHOD AND DEVICE FOR DEVICE-TO-DEVICE COMMUNICATION IN WIRELESS COMMUNICATION SYSTEM", and, through U.S. Patent Application No. 62/026,552 filed Jul. 18, 2014, U.S. Patent Application No. 62/033,464 filed Aug. 5, 2014, and U.S. Patent Application No. 62/073,163 filed Oct. 31, 2014, each of which are incorporated herein by reference into the present disclosure as if fully set forth herein.

TECHNICAL FIELD

The present invention relates to a wireless communication system and, in particular, to a synchronization method and apparatus for D2D communication.

BACKGROUND

In order to meet the increasing wireless data traffic demand since the commercialization of 4G communication systems, the development focus has been on the 5$^{th}$ Generation (5G) or pre-5G communication system. For this reason, the 5G or pre-5G communication system is called beyond 4G network communication system or post Long Term Evolution (LTE) system. In order to accomplish high data rates, implementation of the 5G communication system on the millimeter Wave (mmWave) band (e.g., 60 GHz band) is being considered. In order to mitigate propagation loss and increase propagation distance, the 5G communication system is likely to accommodate various techniques such as beamforming, massive MIMO, Full Dimensional MIMO (FD-MIMO), array antenna, analog beamforming, and large scale antenna. Also, for throughput enhancement of the 5G communication system, research is being conducted on various techniques such as small cell, advanced small cell, cloud radio access network (cloud RAN), ultra-dense network, Device to Device Communication (D2D), wireless backhaul, moving network, cooperative communication, Coordinated Multi-Points (CoMP), and interference cancellation. Furthermore, the ongoing research includes the use of Hybrid FSK and QAM modulation and Sliding Window Superposition Coding (SWSC) as an Advanced Coding Modulation (ACM) scheme, Filter Bank Multi Carrier (FBMC), Non-Orthogonal Multiple Access (NOMA), and Sparse Code Multiple Access (SCMA).

Meanwhile, the Internet is evolving from a human-centric communication network in which information is generated and consumed by humans to an Internet of Things (IoT) in which distributed things or components exchange and process information. The combination of cloud server-based big data processing technology and the IoT begets the Internet of Everything technology. In order to secure the sensing technology, wired/wireless communication and network infrastructure, service interface technology, and security technology required for implementing the IoT, recent research has been focused on sensor network, Machine to Machine (M2M), and Machine Type Communication technologies. In the IoT environment, it is possible to provide an intelligent Internet Technology (IT) that is capable of collecting and analyzing data generated from connected things to create new values for human life. The IoT can be applied to various fields such as smart home, smart building, smart city, smart car or connected car, smart grid, health care, smart appliance, and smart medical service through legacy Information Technology (IT) technology and convergence of various industries.

Thus there are various attempts to apply the IoT to the 5G communication system. For example, the sensor network, Machine to Machine (M2M), and Machine Type Communication (MTC) technologies are implemented by means of the 5G communication technologies such as beamforming, MIMO, and array antenna. The application of the aforementioned cloud RAN as a big data processing technology is an example of convergence between the 5G and IoT technologies.

As described above, studies are being conducted to develop communication technologies in various fields to meet the increasing wireless data traffic demand. Examples of those technologies include Device to Device (D2D) communication system, carrier aggregation system for operating multiple cells, and massive antenna system for use of a plurality of antennas.

SUMMARY

The present invention has been conceived to meet the above requirements and aims to provide a synchronization method and apparatus that is capable of allowing for D2D communication and D2D discovery between eNBs that do not support synchronization.

Also, the present invention aims to provide a uplink(UL) control channel transmission method and apparatus for use in a carrier aggregation system.

Also, the present invention aims to provide a feedback method and apparatus that is capable of reporting channel state efficiently in a wireless communication system using a massive antenna.

In accordance with an aspect of the present invention, a discovery signal transmission method of a terminal in a wireless communication system supporting Device to Device (D2D) communication is provided. The discovery signal transmission method includes receiving discovery resource pool information from a base station, selecting a resource for transmitting a discovery signal based on the discovery resource pool information, determining whether the selected resource is overlapped with a resource configured for transmitting a D2D synchronization signal, and determining whether to transmit the discovery signal based on the determination result.

In accordance with another aspect of the present invention, a terminal for transmitting a discovery signal in a wireless communication system supporting Device to Device (D2D) communication is provided. The terminal includes a transceiver which transmits and receives signals to and from a base station or another terminal and a controller which controls receiving discovery resource pool information from a base station, selecting a resource for transmitting the discovery signal based on the discovery resource pool information, determining whether the selected resource is overlapped with a resource configured for transmitting a D2D synchronization signal, and determining whether to transmit the discovery signal based on the determination result.

BRIEF DESCRIPTION OF THE DRAWINGS

FIG. 20 shows diagrams illustrating a communication system to which the present invention is applied, FIG. 22 shows diagrams illustrating examples of determining PUCCH transmission cell through PUCCH format 1b with channel selection and transmitting PUCCH according to the first embodiment of the present invention, FIG. 24 shows diagrams illustrating examples of determining PUCCH transmission cell through PUCCH format 1b with channel selection and transmitting PUCCH according to the second embodiment of the present invention, FIG. 34 is a diagram illustrating channel measurement resource according to the fifth embodiment of the present invention, FIG. 47 is a diagram illustrating exemplary RI, PMI, and CQI transmissions of the terminal for two CSI-RS according to an embodiment of the present invention, FIG. 50 is a diagram illustrating a 16 Tx antenna arrangement method.

FIG. 56 is a diagram illustrating an FD MIMO antenna structure for the case of 8 Tx antennas and DFT beamforming vector therefor, FIG. 59 is a diagram illustrating exemplary beam selection in the selected beam group, FIG. 69 is a diagram illustrating exemplary beam groupings according to ASD and ZSD.

DETAILED DESCRIPTION

Figure 1:
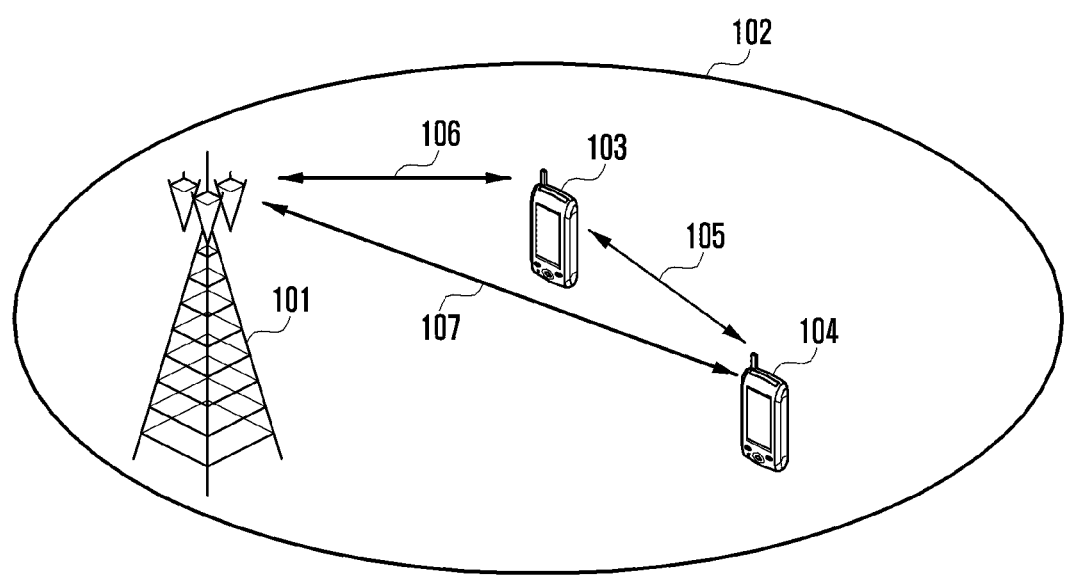
FIG. 1 is a diagram illustrating a D2D communication situation in a cellular system.

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

Although the embodiments of the present invention are directed to Advanced E-UTRA (or LTE-A) supporting carrier aggregation, it will be understood to those skilled in the art that the subject matter of the present invention can be applied to other communication systems having a similar technical background and channel format, with slight modification, without departing from the spirit and scope of the present invention. For example, the subject matter of the present invention can be applied to the multicarrier HSPA supporting carrier aggregation.

Detailed descriptions of well-known functions and structures incorporated herein may be omitted to avoid obscuring the subject matter of the present invention. This aims to omit unnecessary description so as to make clear the subject matter of the present invention.

For the same reason, some of elements are exaggerated, omitted, or simplified in the drawings; and, in practice, the elements may have sizes and/or shapes different from those shown in the drawings. The same reference numbers are used throughout the drawings to refer to the same or like parts.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments, or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to functions thereof.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and modules may be combined into fewer components and modules or further separated into additional components and modules. In addition, the components and modules may be implemented such that they execute one or more CPUs in a device or a secure multimedia card.

The First Embodiment

Meanwhile, with the diversification of the types of services using a wireless mobile communication system, there is a need of a new technology for supporting the newly introduced service more efficiently and, as a consequence, research and development on new methods and technologies are being conducted for use in the wireless mobile communication system.

Device to Device (hereinafter referred to as D2D) communication is a new technology that appeared as a solution for new services and it allows a UE to communicate directly with another UE located nearby. The D2D communication technology makes it possible for a UE to discover other UEs located nearby and communicated with another UE directly if necessary.

Direct D2D communication is advantageous in terms of radio resource efficiency because of low use of radio resource in comparison with the communication assisted by an eNB. Since the neighboring UE discovery function is supported, it is possible for a UE to send a necessary information to a target UE so as to support efficiently new services such as Social Networking Service (SNS). In the current Long Term Evolution-Advance (LTE-A) system, there is a need to support the D2D technology and technical discussion thereof is under way.

Meanwhile, in D2D communication technology, a plurality of terminals distributed in a broad area have to exchange information. For D2D communication (including D2D discovery), synchronization should be acquired between the terminals. In the case of in-coverage D2D communication, it is possible to acquire synchronization between the terminals using the synchronization signal transmitted by the base station in downlink.

That is, the respective terminals acquire synchronization using the synchronization signal of the base station to communicate with each other in accordance with the acquired synchronization. In such a case that the terminals acquire synchronization in accordance with the synchronization signal transmitted by one base station (or cell, hereinafter, the term 'base station' is used in the meaning including the concepts of base station and cell), it is assumed that the terminals are synchronized.

In the case that the two or more terminals are served by different base stations, it can be assumed that if the base stations are synchronized the terminals are synchronized too; but if the base stations are not synchronized, the terminals are not synchronized too. Particularly in the LTE system, which requires no mandatory synchronization among eNBs, it is difficult to perform inter-eNB D2D communication. The inter-eNB D2D communication may include D2D communication between UEs belonging to different eNBs. The present invention proposes a supplementary synchronization method for supporting D2D communication and D2D discovery between non-synchronized eNBs.

In the embodiments of the present invention to be described, the terms "eNB" and "cell" are used to have the same meaning. Also, the term "D2D communication" is used in the meaning including D2D discovery for discovering UEs and direct communication for exchanging information between UEs. For the purpose of convenience, the following embodiments are directed to the discovery operation, but the present invention is applicable to the direct communication as well as to the discovery operation.

FIG. 1 is a diagram illustrating D2D communication in a cellular system.

In FIG. 1, the eNB 101 serves the UEs 103 and 104 located in its cell 102. If an eNB serves a UE, this means that it provides a wireless service. The UE 103 performs cellular communication through the UE-eNB link 106, and the UE 104 performs cellular communication through the UE-eNB link 107. In the case that the UEs 103 and 104 support D2D communication, they may perform discovery operation or direct communication operation through the UE-UE link 105 without assistance of the eNB 101 as shown in FIG. 1.

In the LTE or LTE-A system, Frequency Division Duplex (FDD) may be used as a duplexing mode for uplink and downlink.

In the FDD, the downlink and uplink are distinguished in frequency. In the case of distinguishing the D2D communication resource from the legacy cellular communication resource in the FDD system, there is a tendency of preferring to use the uplink frequency resource for D2D communication between the uplink and downlink resources. This is because more types of signals are multiplexed onto the downlink frequency resource; thus, it is difficult to allocate resource for the purpose of D2D communication in comparison with the uplink frequency resource in the FDD system.

Also, in the FDD system considering only the legacy cellular UEs, since there is more downlink traffic than uplink traffic by nature of the communication service and the downlink overhead is heavier than the uplink overhead, in general the burden of using downlink frequency resource is greater than the burden of using the uplink frequency resource. Accordingly, if the downlink resource is allocated for D2D communication, this increases the burden of downlink resource utilization so as to make it difficult to balance the downlink and uplink frequency resource utilization. For this reason, it is very natural to use the uplink resource for D2D communication in the communication system operating in the FDD mode.

The above description has been directed to the advantages of using the uplink frequency resource as D2D resource, but it is noted that the above description does not conclude that the downlink frequency resource cannot be used as D2D resource.

In the case of using the uplink resource for D2D signal transmission, the legacy cellular communication resource and D2D communication resource may be multiplexed in an orthogonal scheme such as Time Division Multiplexing (TDM) or Frequency Division Multiplexing (FDM) or even a non-orthogonal scheme for reusing the same resource.

Since the D2D communication should be supported as far as possible in a way of not affecting the UEs in use of the legacy cellular communication, it is preferable to adopt the orthogonal scheme, especially, the TDM scheme. The reason for preferring the TDM scheme is that the TDM makes it possible to negate the necessity for the eNB to receive cellular signals in the D2D resource region and, also, the D2D transmission in the cellular resource region, whereby the D2D transmission causing no influence (no noise) to the cellular communication. Nevertheless, it is not impossible to transmit the legacy uplink channels, i.e. Physical Uplink Control Channel (PUCCH) and Physical Uplink Shared Channel (PUSCH), in the subframe carrying the D2D signal. Particularly, in order to support Hybrid Automatic Repeat Request (HARQ) for downlink transmission, it is necessary to frequency-multiplex the PUCCH transmission with the D2D transmission.

The in-coverage D2D operation should be supported between the UEs served by different eNBs as well as the UEs served by the same eNB.

Particularly, inter-eNB D2D discovery is inevitable by taking notice that the D2D discovery aims to discover as many as possible of the UEs within the reaching range of the discovery signal and that the reaching range of the discovery signal may be greater than the radius of the cell.

Figure 2:
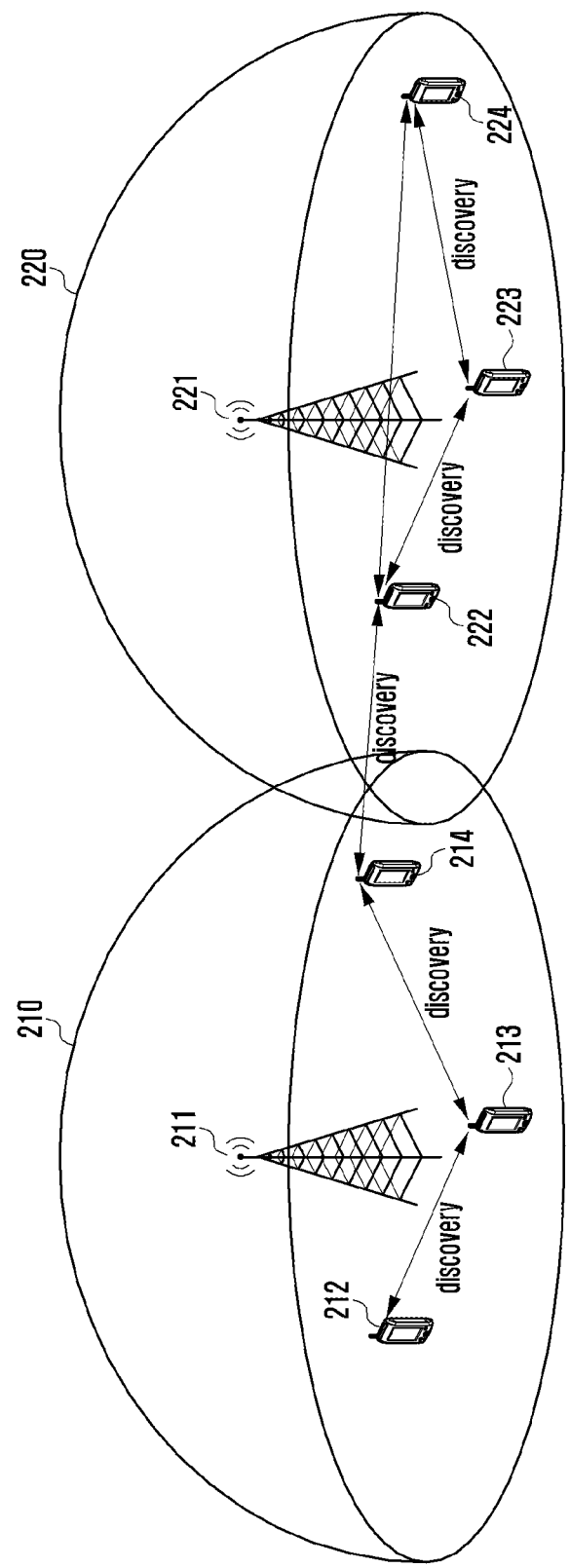
FIG. 2 is a diagram illustrating an inter-eNB D2D communication situation.

FIG. 2 shows the inter-eNB D2D discovery operation.

In FIG. 2, the area 210 is the coverage of the eNB 211, and the area 220 is the coverage of the eNB 221. Accordingly, the UEs 212, 213, and 214 are synchronized based on the synchronization signal of the eNB 211. Meanwhile, the UEs 222, 223, and 224 are synchronized based on the synchronization signal of the eNB 221.

The D2D discovery has to support the discovery operations among the UEs served by different eNBs (i.e. discovery operations of the UEs 212, 213, and 124 to the UEs 222, 223, and 224 or discovery operations of the UEs 222, 223, and 224 to the UEs 212, 213, and 124) as well as the discovery operations among the UEs served by the same eNB (i.e., among the UEs 212, 213, and 214 or among the UEs 222, 223, and 224).

Assuming that the eNBs 211 and 221 are synchronized with each other, the synchronization signals of the eNBs 211 and 221 are synchronized, i.e. transmitted simultaneously; thus, it is possible to analogize that the UEs 212, 213, and 214 served by the eNB 211 and the UEs 222, 223, and 224 served by the eNB 221 are synchronized.

However, if the eNBs 211 and 221 are not synchronized, it is possible to analogize that the UEs 212, 213, and 214 served by the eNB 211 and the UEs 222, 223, and 224 served by the eNB 221 are not synchronized. Accordingly, it is difficult for the UE 222 to receive the discovery signals transmitted by the UEs 212, 213, and 214 directly.

For D2D discovery and communication between the unsynchronized UEs, if the UEs transmit the synchronization signals, the UEs located in the neighboring cell may receive the synchronization signals to acquire synchronization and receive the discovery signals of the UEs located in the neighboring cell.

Figure 3:
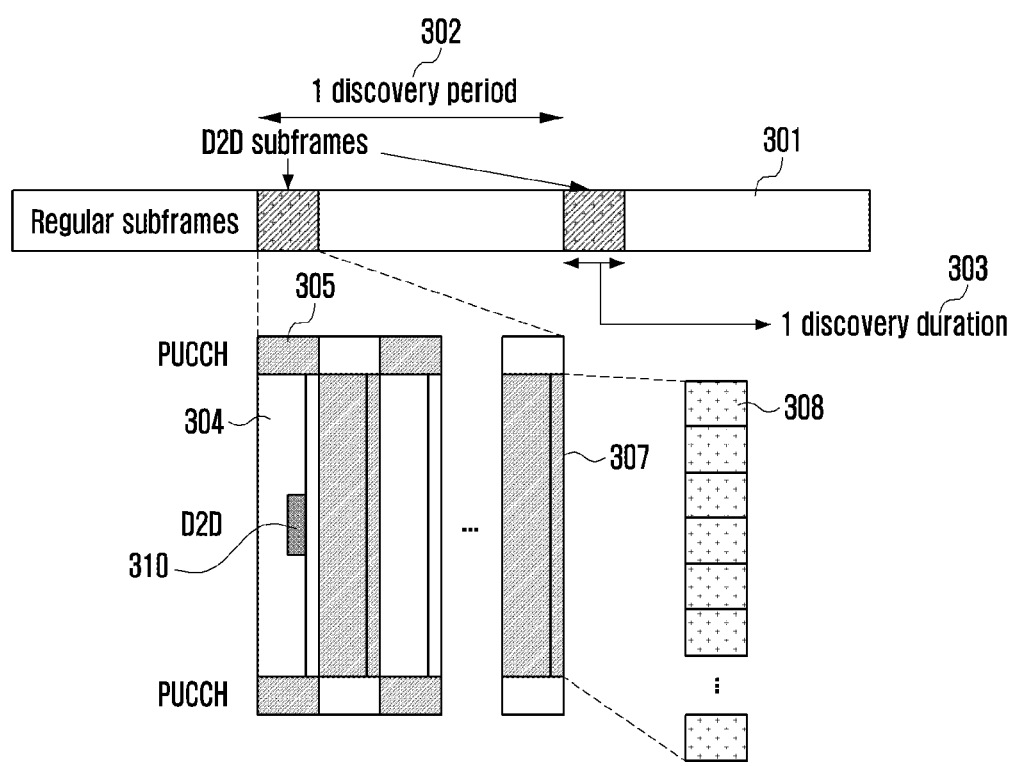
FIG. 3 is a diagram illustrating a situation of multiplexing D2D resource, legacy cellular resource, and D2DSS.

FIG. 3 shows an example of multiplexing the D2D signal.

In FIG. 3, the D2D signal is configured so as to be transmitted in the duration 303 at a discovery period 302. The non-D2D resource 301 may be used for transmitting PUSCH carrying the legacy cellular data transmission. The D2D discovery duration 303 may be comprised of a plurality of subframes that are consecutive or inconsecutive. At this time, the non-D2D subframe may be used for transmitting PUSCH carrying the legacy cellular data.

In FIG. 3, it is assumed that the D2D discovery duration consists of the consecutive subframes. The whole discovery signal resource may be referred to as discovery resource pool, discovery resource pool information, or discovery resource information. The discovery resource pool is comprised of a plurality of subframes, and each subframe is comprised of a plurality of individual discovery signal resources. Accordingly, the individual discovery signal resources are multiplexed on the time and frequency axes in the discovery resource pool.

The D2D UE transmits its discovery signal using one or more discovery resources in every discovery duration 303, and the discovery resource for the UE's transmission may be selected randomly, based on the received signal strength measured by the UE, i.e. the resource with the weakest received signal strength, or as allocated by the eNB.

In order to support downlink HARQ operation, resources for PUCCH transmission as denoted by reference numbers 305 and 306 may exist in the discovery resource pool. The last SC-FDMA symbol 307 of every subframe of the D2D resource carries no signal to secure the time for switching between transmission and reception, or between D2D and legacy PUSCH.

The UE receives the discovery resource pool information from the eNB. In this case, the UE may receive the discovery resource pool information through a System Information Block (SIB), Radio Resource Control (RRC) signaling, or a physical channel.

Accordingly, the UE performing the discovery service may select the discovery resource for transmission or check the whole discovery resource for receiving discovery signal based on the discovery resource pool information received from the eNB.

In the case of discovery resource for transmission, the UE acquires the reception synchronization based on the synchronization signal from the serving eNB and transmits its discovery signal in accordance with the reception synchronization. Likewise, the UE acquires reception synchronization based on the synchronization signal of the serving eNB and receives the discovery signal in the discovery pool in accordance with the reception synchronization.

In the case that the eNBs are synchronized, it is possible to receive the discovery signal of the D2D UEs served by the neighboring eNB as well as the discovery signal of the D2D UE served by the serving eNB in the discovery resource configured in compliance with the synchronization of the serving eNB, although the discovery resource pools of the serving and neighboring eNBs differ from each other.

However, in the case that the eNBs are not synchronized, it is possible to receive the discovery signal of the D2D UE served by the serving eNB; but it is not possible to receive the discovery signal of the D2D UE served by the neighboring eNB if the reception operation is performed on the basis of the synchronization of the serving eNB, even though the discovery resource pool information of the neighboring eNB is known, because of synchronization mismatch with the D2D UEs served by the neighboring eNB. Accordingly, there is a need of an extra synchronization operation for which all or some of the UEs served by the neighboring eNB transmit the synchronization signal (hereinafter, referred to as D2DSS) using a certain resource in the discovery resource pool.

In FIG. 3, reference number 310 denotes the D2DSS resource, and the D2DSS is transmitted at a position predetermined in the D2DSS discovery resource pool to locate the D2DSS position of the neighboring cell without extra signaling. FIG. 3 shows an exemplary case where the D2DSS is transmitted in the 6 Physical Resource Blocks (PRBs) at the center of the whole bandwidth in the first subframe of the discovery resource pool. The frequency resource position for the D2DSS transmission may change, and a plurality of D2DSSs may exist.

FIG. 3 is directed to the case where the D2DSS is transmitted at a predetermined position in the discovery resource pool, i.e. the 6 physical PRBs at the center of the whole bandwidth in the first subframe of the discovery resource pool. The number of SC-FDMA symbols for D2DSS is small; thus, it is not necessary to use the whole subframe. Furthermore, the D2DSS is fixed at a position in the subframe according to an available method as shown in FIG. 4.

Figure 4:
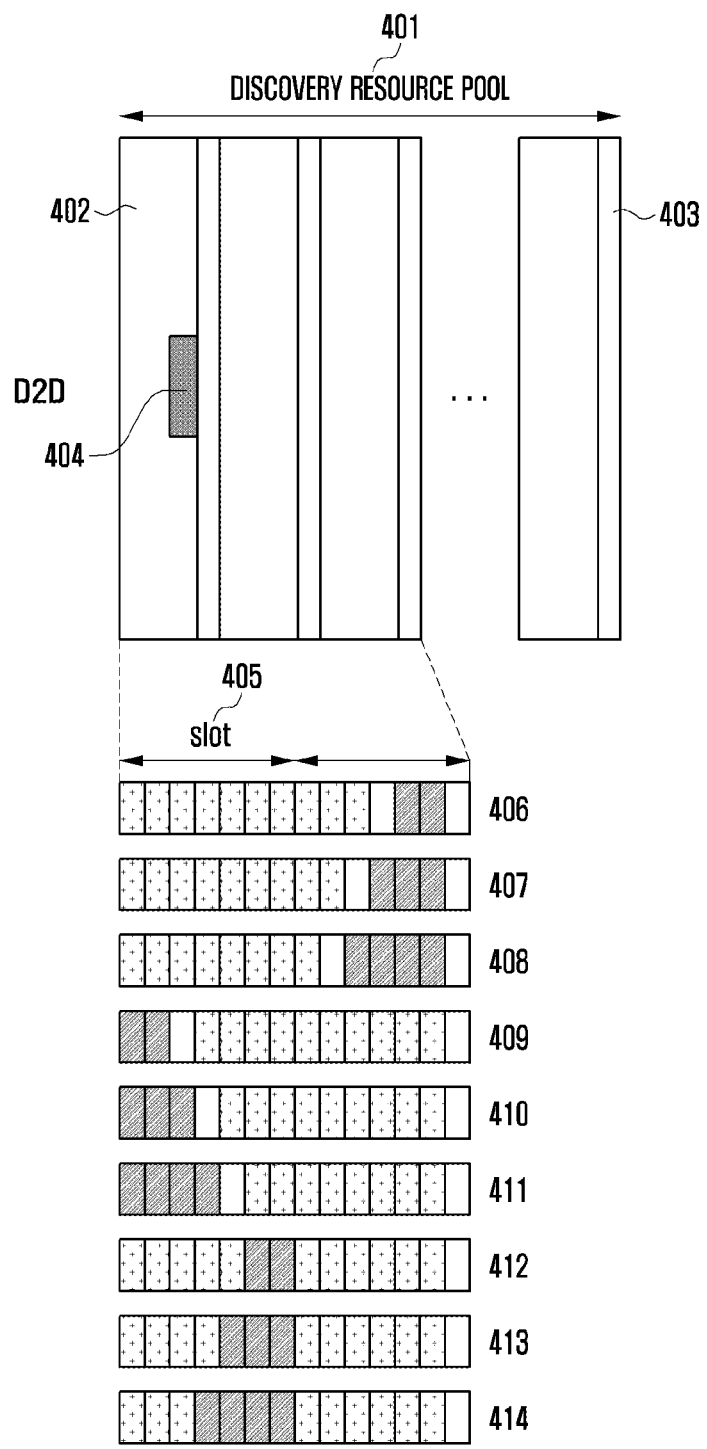
FIG. 4 is a diagram illustrating transmission of D2DSS.

FIG. 4 is a diagram illustrating exemplary D2DSS transmission positions in a subframe according to an embodiment of the present invention.

First, the D2DSS may be transmitted using 2 SC-FDNA symbols like the PSS/SSS of the current LTE system or 3, 4, or more SC-FDMA symbols. The D2DSS may be categorized into one of Primary D2DSS (PD2DSS) and a Secondary D2DSS (SD2DSS): PD2DSS using 1 or 2 SC-FDMA symbols and SD2DSS using 1 or 2 SC-FDMA. The PD2DSSS may be followed by the SD2DSS or vice versa. It is also possible to transmit the D2DSS at the last, first, or middle symbols in the subframe.

In FIG. 4, the reference numbers 406 to 414 denote the available positions and number of symbols for D2DSS as an example, but the number of positions and symbols of the D2DSS may be determined in different ways. It is also possible for one SC-FDMA symbol before or after the D2DSS to be empty without use.

In the following, descriptions are made of the methods for selecting a UE to transmit D2DSS in the eNB coverage according to preferred embodiments of the present invention. The eNB may determine whether to let D2DSS be transmitted in the currently used discovery pool in consideration of inter-eNB synchronization, cell size, etc. All or some of the UEs served by the eNB transmit the D2DSS at predetermined positions. The following embodiment is directed to the method of determining the UEs to transmit D2DSS.

Embodiment 1-1

This embodiment proposes a method for all D2D discovery UEs served by the eNB to transmit the D2DSSs at predetermined positions in the discovery resource pool configured by the eNB. If an eNB is configured with D2DSS, this may mean that the eNB configures D2DSS transmission of the UEs belonging to the eNB.

Figure 5:
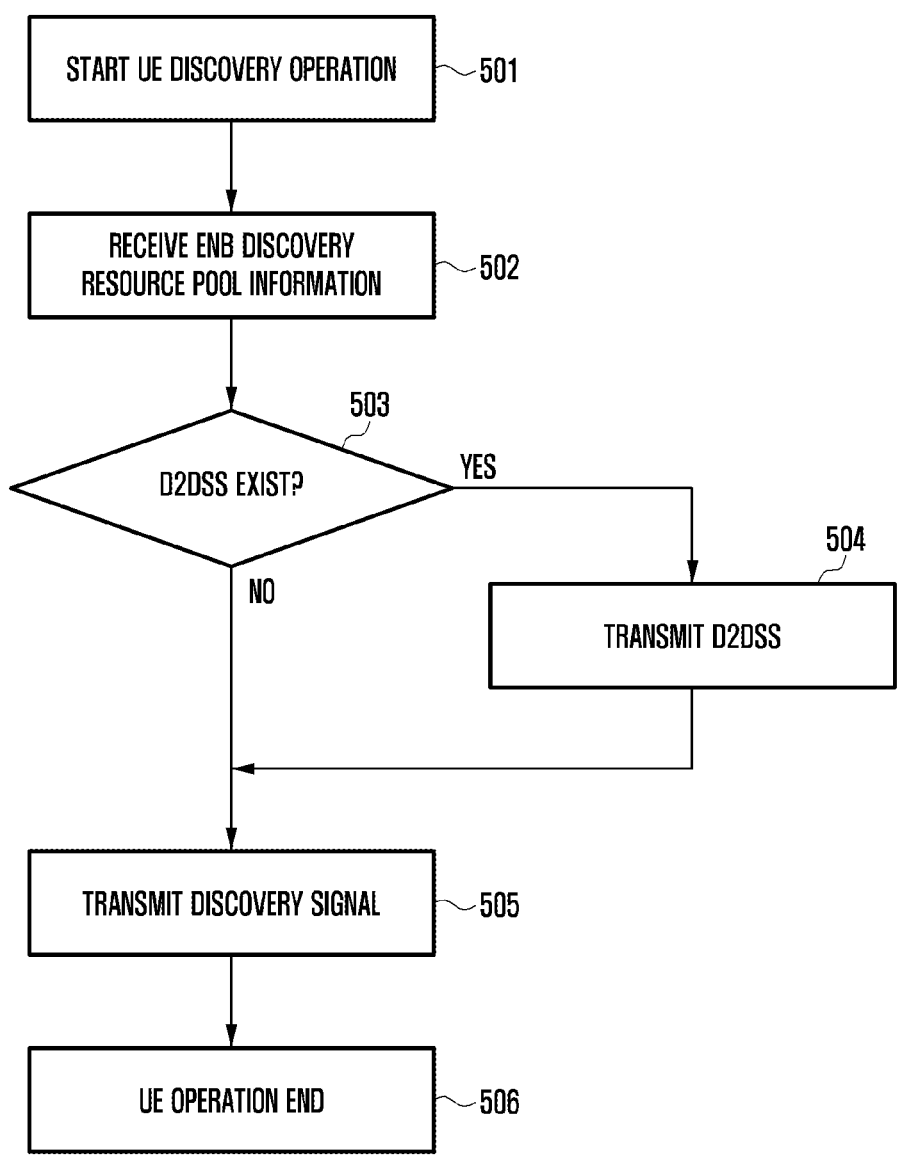
FIG. 5 is a flowchart illustrating a UE operation according to whether D2DSS is configured.

FIG. 5 is a flowchart illustrating a D2DSS transmission procedure of a UE.

The UE starts discovery operation at step 501 and receives the eNB discovery resource pool information to know whether the D2DSS is configured.

If it is determined that the D2DSS is configured at step 503, the UE transmits the D2DSS at a predetermined position in the discovery resource pool at step 504 and transmits its discovery signal at a position selected in the discovery resource pool at step 505. If it is determined that no D2DSS is configured at step 503, the UE transmit its discovery signal at the position selected in the discovery resource pool immediately at step 505.

In the present embodiment, since all of the UEs served by an eNB transmit the D2DSS, the UEs cannot transmit the discovery signal in the subframe carrying the D2DSS, i.e. the first subframe 410 of the discovery resource pool in FIG. 4.

Accordingly, the UEs located in the neighboring eNB coverage perform the reception operation to receive the discovery signals transmitted by the UEs located in the serving eNB coverage but not in the first subframe. That is, the first subframe 410 is used just for receiving D2DSS, and the discovery signal reception starts from the second subframe 420. In this case, the resource of the first subframe 410 of the discovery resource pool can be used for legacy cellular PUSCH transmission.

Embodiment 1-2

This embodiment proposes a method for some of the D2D discovery UEs located in the eNB coverage to transmit D2DSS at a predetermined position in the discovery resource pool configured by the eNB.

Figure 6:
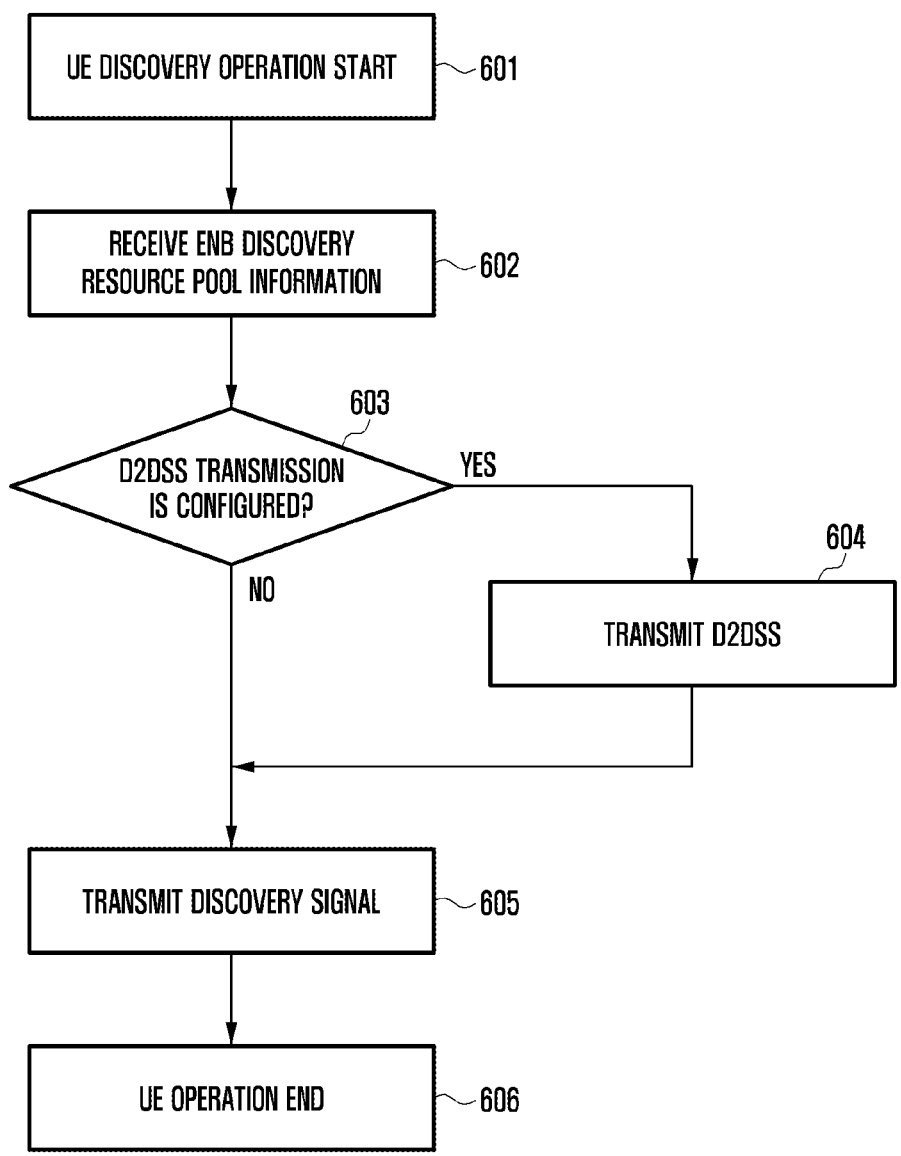
FIG. 6 is a flowchart illustrating a UE operation for D2DSS transmission.

FIG. 6 is a flowchart illustrating a D2DSS transmission procedure of a UE.

The UE starts discovery operation at step 601 and receives the eNB discovery resource pool information at step 602 to know whether the D2DSS is configured. If it is determined for the UE to transmit D2DSS at step 603, the UE transmits the D2DSS in the discovery resource pool at step 604 and then transmits its discovery signal at a position selected in the discovery resource pool at step 605. If it is not determined for the UE to transmit D2DSS at step 603, the UE transmits its discovery signal at the position selected in the discovery resource pool immediately at step 605.

Meanwhile, in this embodiment, whether the UE transmits D2DSS is determined as follows.

First, it may be considered that the eNB configures the UE which has to transmit D2DSS based on the UE status through separate signaling. The signaling may be RRC signaling, physical layer signaling, or the like.

Alternatively, it may be considered that the UE configures whether to transmit D2DSS based on the signal strength of the eNB. In this case, the signal strength of the eNB may be the strength of a reference signal (e.g. cell-specific reference signal (CRS)) (RSRP).

For example, the eNB notifies all in-coverage UEs of the RSRP threshold through signaling, and each UE compares the measured RSRP with the RSRP threshold and determines, if the RSRP is less than the threshold, that it is located at the eNB coverage boundary and configures D2DSS transmission. Otherwise if the RSRP is greater than the threshold, the UE determines that it is located at the center of the eNB coverage and thus may not configure D2DSS transmission.

In addition to the D2DSS transmission configuration based on the RSRP and RSRP threshold as described in embodiment 1-2, the UE may determine D2DSS transmission finally in consideration of the presence/absence of previous D2DSS. The UE determines whether a neighboring UE transmits a D2DSS and, if so and if the received signal strength is greater than a predetermined threshold, the UE does not configure D2DSS transmission although the RSRP is less than the threshold.

The UEs transmit D2DSS at different periods. That is, all of the UEs transmit the D2DSS at respective periods, and the UE-specific periods may be identical in length but different in transmission timing; thus, it is possible to configure such that at least one UE can transmit D2DSS in every D2DSS resource.

In the following, a description is made of the discovery signal transmission/reception method of a UE according to D2DSS transmission/reception in a predetermined embodiment of the present invention.

In the case that the D2DSS is configured to be transmitted in the first subframe of the whole discovery resource pool, the other region of the first subframe, i.e. region 410 of FIG. 4, can be used for discovery signal transmission. If the D2DSS is transmitted in the 6 PRBs at the center of the frequency band, the other PRBs may be used for discovery signal transmission.

In this embodiment, it is assumed that some of the D2D UEs located in the eNB coverage supporting D2D transmission transmit D2DSS. Also, it is assumed that the D2D UE selects discovery signal transmission resource randomly in the configured discovery resource pool. At this time, the D2D UE cannot transmit the discovery signal using the frequency resource of the subframe carrying the D2DSS. That is, it is impossible to frequency-multiplex the D2DSS and discovery signal in the same subframe.

The above description is directed to the case where the UE sends resource randomly in the whole discovery resource pool to transmit its discovery signal. As shown in FIG. 3, the whole resource pool multiplexes the PRBs and subframes having predetermined sizes on the frequency and time axes. Thus the UE selects a predetermined size of resource to transmit the discovery signal. In the case that the eNB does not configure D2DSS, the UE selects the resource for transmitting its discovery signal in the whole discovery resource pool; thus, it is possible to transmit the discovery signal in the first subframe of the discovery resource pool.

However, in the case that the eNB configures D2DSS and the UE has to transmit the D2DSS, if the UE selects the resource for transmitting its discovery signal in the whole discovery resource pool, it is possible to transmit the discovery signal in the first subframe of the discovery resource pool and, in this case, the UE has to transmit one of D2DSS or discovery signal. The UE operation to solve this problem according to a preferred embodiment is described hereinafter.

Embodiment 1-3

In this embodiment, the discovery resource selection method for transmitting the discovery signal of the UE is determined depending on whether the UE transmits D2DSS in the serving eNB coverage supporting D2DSS.

That is, if it is configured for the UE not to transmit D2DSS, the UE selects the legacy resource selection method to select one or more discovery resources among all discovery resources in the whole discovery resource pool or the first subframe in the discovery resource pool.

Otherwise, if it is configured for the UE to transmit D2DSS, the UE selects the discovery resource using a method different from the legacy resource selection method. That is, the UE selects one or more discovery resources in the region without exception of the subframe carrying the D2DSS in the whole discovery resource pool and, in this case, it does not occur that the UE transmits the frequency-multiplexed D2DSS and discovery signal simultaneously.

Figure 7A:
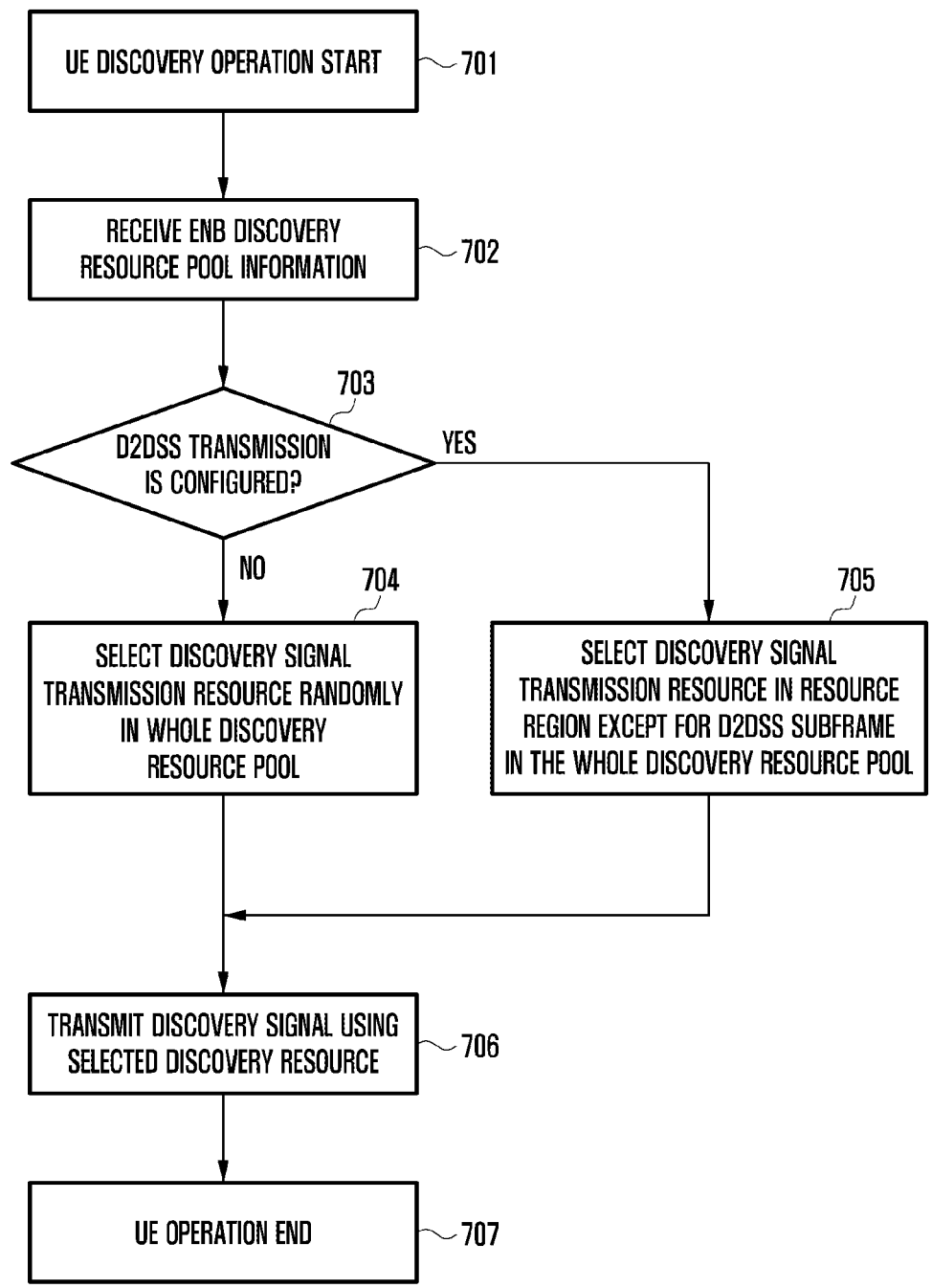
FIG. 7a is a flowchart illustrating a discovery signal transmission operation of a UE according to transmission of D2DSS.

A description is made of the UE operation with reference to FIG. 7. FIG. 7a is a flowchart illustrating a discovery signal transmission operation of a UE in association with D2DSS transmission.

In FIG. 7a, the UE starts the discovery operation at step 701 and receives the eNB discovery resource pool information at step 702.

The UE determines whether to transmit D2DSS at step 703 and, if it is not necessary to transmit D2DSS, selects the discovery transmission resource in the whole discovery resource pool at step 704. Otherwise if it is necessary to transmit D2DSS, the UE selects the discovery transmission resource in the resource region in the whole discovery resource pool with the exception of the subframe carrying the D2DSS at step 705. Next, the UE transmits its discovery signal using the selected discovery resource at step 706 and ends the discovery signal transmission operation at step 707.

Embodiment 1-4

This embodiment is directed to the case where the UE has to transmit D2DSS in the eNB coverage supporting D2DSS and, if the UE transmits its discovery signal in the first subframe of the discovery resource pool according to the resource selection rule, it transmits the D2DSS but not its discovery signal.

At this time, since the UE has not transmitted the discovery signal in the resource selected according to the resource selection rule, it selects the discovery resource in the next subframe or the remained resource to transmit the discovery signal. The UE may select the resource in the discovery resource pool of the next period to have a chance of transmitting its discovery signal.

Figure 7B:
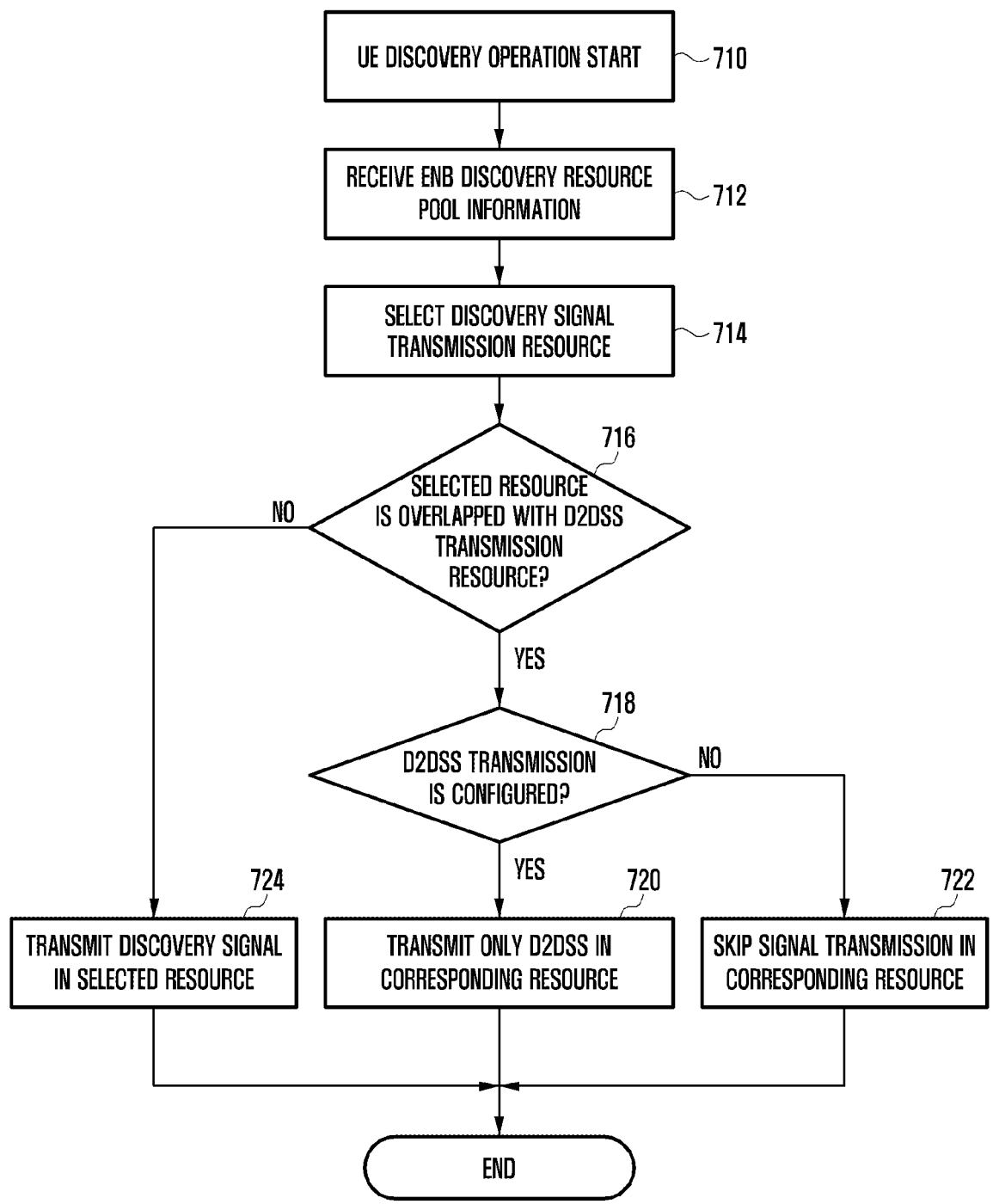
FIG. 7b is a flowchart illustrating a discovery signal transmission operation of a UE in association with D2DSS transmission according to an embodiment of the present invention.

A description is made of the UE operation with reference to FIG. 7b. FIG. 7b is a flowchart illustrating a discovery signal transmission operation of the UE in association with the D2DSS transmission according to an embodiment of the present invention.

In FIG. 7b, the UE starts the discovery operation at step 710 and receives an eNB discovery resource pool information at step 712.

Next, the UE may select discovery signal transmission resource in the discovery resource pool at step 714. The UE determines whether the resource selected for transmitting the discovery signal is overlapped with the resource for D2DSS transmission at step 716.

The determination step may be a step of determining whether the subframe selected for transmitting the discovery signal is identical with the subframe including the resource for D2DSS transmission. The determination step is not limited to the above described process and may be performed in various ways according to various embodiments of the present invention.

If the discovery signal transmission resource is overlapped with the D2DSS transmission resource, the UE determines whether to perform D2DSS transmission, i.e. whether it is configured to perform D2DSS transmission, at step 718. If it is configured to perform D2DSS transmission, the UE transmits the D2DSS in the selected resource with no discovery signal transmission at step 720. That is, the UE omits or skips discovery signal transmission.

Otherwise if it is not configured to perform D2DSS transmission at step 718, the UE transmit neither any D2DSS nor any discovery signal in the selected resource at step 722. That is, if it is not configured to perform D2DSS transmission even in the D2DSS transmission resource, the UE cannot transmit both the D2DSS and discovery signal. Accordingly, the UE may omit or skip discovery signal transmission in the selected resource.

Meanwhile, if the resource selected for transmitting the discovery signal is not overlapped with the resource for D2DSS transmission at step 716, the UE may transmit the discovery signal in the selected resource at step 724.

Whether the D2DSS transmission is configured to the UE may be determined in various ways.

As described above, the eNB may configure the UE not to perform D2DSS transmission based on the UE status through separate signaling. Examples of this signaling may include RRC signaling and physical layer signaling.

Alternatively, the UE may configure whether to perform D2DSS transmission based on the signal strength from the eNB. In this case, examples of the signal strength may include reference signal (cell-specific reference signal (CRS)) strength (RSRP).

For example, the eNB may notify all UEs within the cell of the RSRP threshold through signaling in order for each UE to compare the measured RSRP with the RSRP threshold and, if the measured RSRP is less than the threshold value, determine that it is located at a cell edge and configure D2DSS transmission. If the measured RSRP is greater than the threshold value, the UE determines that it is located at the cell center and thus does not configure D2DSS transmission.

Although it is determined whether the D2D transmission is configured at step 718 in FIG. 7b, the determination may be made at another step. For example, it may be possible to determine whether the corresponding UE is configured with D2DSS transmission after the receipt of the discovery resource pool information from the eNB as shown in FIG. 7a.

Embodiment 1-5

This embodiment is directed to the case where the UE transmits the discovery signal in the subframe configured for D2DSS transmission and the PRB configured for D2DSS transmission. In the resource region configured for D2D transmission, discovery signal transmission is not considered.

Figure 8:
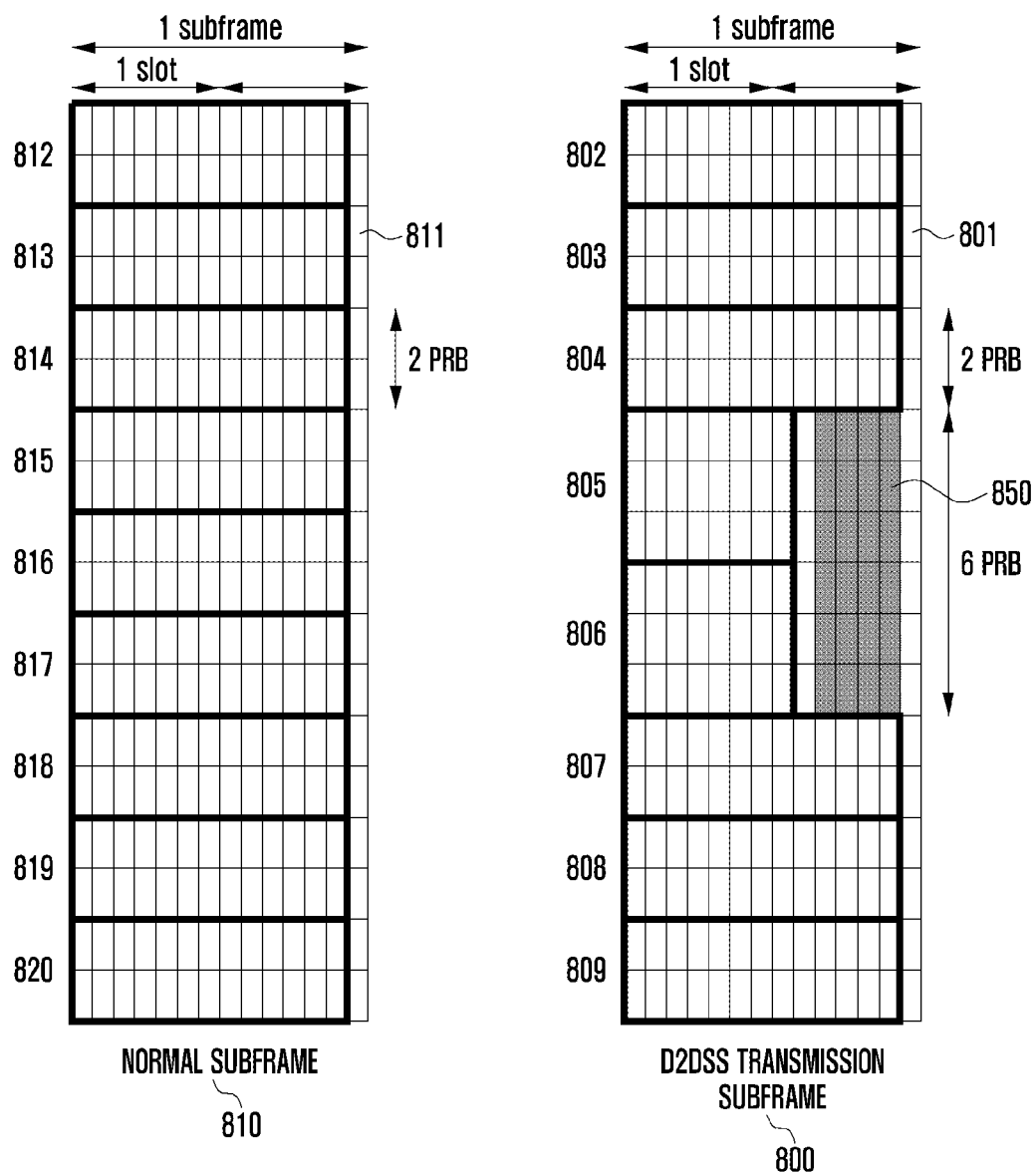
FIG. 8 is diagram illustrating discovery signal resource according to D2DSS configuration.

In the D2DSS transmission resource as shown in FIG. 8, however, some of the symbols are used in one subframe. Although FIG. 8 is directed to the case where 4 SC-FDMA symbols at the ending of a subframe are used for D2DSS transmission, the number and position of the SC-FDMA symbols for D2DSS transmission may change.

In FIG. 8, reference number 810 denotes a subframe located in the normal discovery resource pool without D2DSS transmission. Reference number 811 of FIG. 8 denotes the last symbol without transmission. In the normal subframe, the discovery resources are formed in the same PRB size over the band. That is, every two PRBs form a unit for transmitting a discovery signal as denoted by reference numbers 812 to 820 in FIG. 8, and the D2D UE selects one of the 2-PRB discovery resources for transmitting its discovery signal.

Meanwhile, reference number 801 of FIG. 8 denotes a subframe located at the beginning of the discovery resource pool for transmitting D2DSS. Likewise, the last symbol 801 may not be transmitted.

In the D2DSS subframe, the D2DSS is transmitted at the central 6 PRBs as denoted by reference number 850. In this case, if the non-D2DSS region in the central 6 PRBs, i.e. the symbols located at the beginning, is used for discovery signal transmission, two PRBs are not enough for D2DSS transmission.

Accordingly, this embodiment proposes a method of increasing the size of the frequency domain discovery signal transmission resource unit of the D2DSS subframe. That is, it is configured that, for non-D2DSS transmission, the same resource size as the normal subframe, i.e. 2 PRBs as denoted by reference numbers 802, 803, 804, 807, 808, and 809 in FIG. 8 is used; but for D2DSS transmission, an extended resource size, i.e. three PRBs (805 and 806 of FIG. 8) is used. The D2D UE selects one of the discovery resources of which each is made up of 2 or three PRBs as shown in FIG. 8 to transmit the discovery signal.

Figure 9:
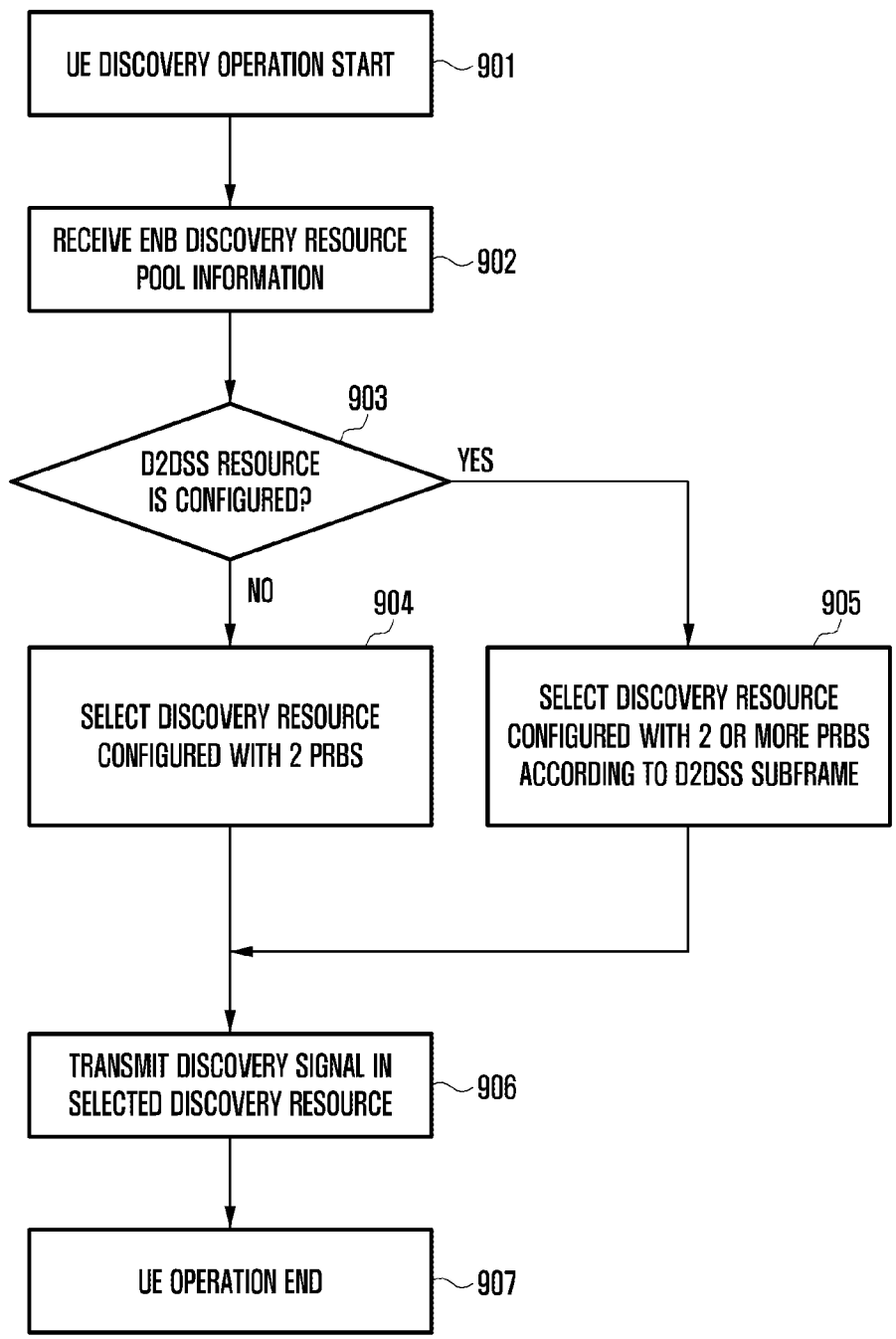
FIG. 9 is a flowchart illustrating discovery signal selection of the UE according to D2DSS transmission.

FIG. 9 is a flowchart illustrating a UE operation procedure according to an embodiment of the present invention.

As shown in FIG. 9, the UE starts discovery operation at step 901 and receives the eNB discovery resource pool information at step 902.

Next, the UE determines whether the eNB has configured the D2DSS resource at step 903 and, if the D2DSS resource is not configured, selects the discovery signal transmission resource of the original size made up of a predetermined number of PRBs, (e.g. 2 PRBs) at step 904.

Otherwise if the D2DSS resource is configured at step 903, the UE selects the discovery signal transmission resource made up of a number of PRBs (e.g. 3 PRBs) that is greater than that of the original size (e.g. 2 PRBs) in the whole discovery resource pool at step 905. Next, the UE transmits its discovery signal using the selected discovery resource at step 906 and ends the discovery signal transmission operation at step 907.

Second Embodiment

This embodiment is directed to a UE operation in the case where the D2D synchronization resources are overlapped in the D2D discovery pool.

Figure 10:
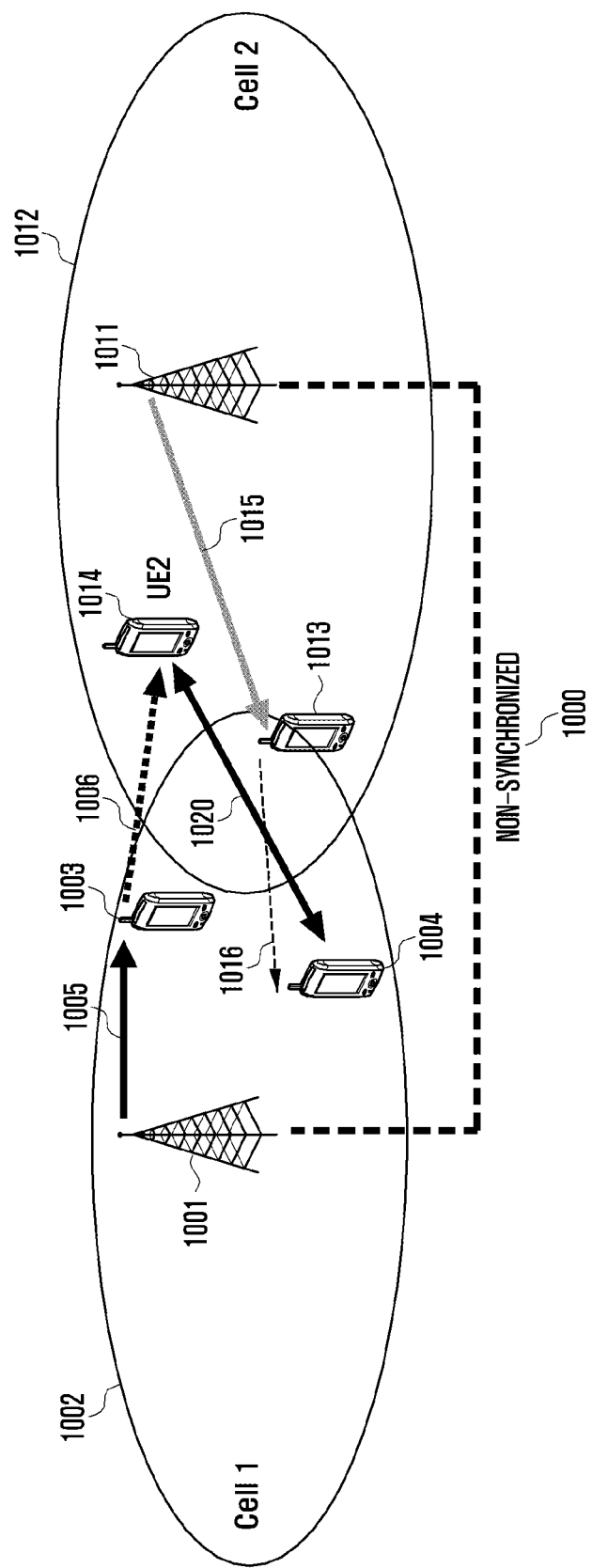
FIG. 10 is a diagram illustrating inter-cell D2D communication through inter-eNB signal transmission.

This embodiment is described with reference to FIGS. 10 to 17. FIG. 10 is a diagram illustrating a method for supporting inter-cell D2D communication through inter-eNB synchronization transmission.

FIG. 10 is directed to the operation of configuring the additional D2D synchronization signal and performing the D2D communication.

In FIG. 10, reference numbers 1001 and 1011 denote two neighboring eNBs that are not synchronized with each other. The eNB 1001 has the coverage 1002, and the eNB 1011 has the coverage 1012.

The UEs 1003 and 1004 are located in the coverage area 1002 so as to perform cellular communication with the eNB 1001 and thus may perform D2D transmission/reception in synchronization with the eNB 1001. Meanwhile, the UEs 1013 and 1014 are located in the coverage area 1012 so as to perform cellular communication with the eNB 1011 and thus may perform D2D transmission/reception in synchronization with the eNB 1011. At this time, since the UEs 1004 and 1014 are not synchronized with each other, they cannot perform D2D transmission/reception with each other.

In order to make it possible for them to communicate with each other, a method for all or some of the D2D UEs served by the respective eNBs to transmit a synchronization signal is presented. That is, the UE 1003 receives a synchronization signal 1005 from the eNB 1001 to acquire synchronization with the eNB 1001 and then transmits the D2D synchronization signal 1006 in synchronization with the synchronization signal 1005. Since the D2D synchronization signal 1006 may be received by the UE 1014 synchronized with the eNB 1011, the UE 1014 can acquire synchronization with the eNB 1001 too. Accordingly, the UE 1014 can receive the D2D signal 1020 transmitted by the UE 1005 in synchronization with the eNB 1001.

Meanwhile, the UE 1013 receives the synchronization signal 1015 from the eNB 1011 to acquire synchronization with the eNB 1011 and transmits the D2D synchronization signal 1016 in synchronization with the synchronization signal 1015. Since the D2D synchronization signal 1016 may be received by the UE 1003 synchronized with the eNB 1001, the UE 1004 can acquire synchronization with the eNB 1001. Accordingly, the UE 1004 can receive the D2D signal 1020 transmitted by the UE 1014 in synchronization with the eNB 1011.

The UEs transmitting the D2D synchronization signal for the D2D UEs located in the neighboring cell may include all D2D UEs served by the eNB or the UEs having a low RSRP of the eNB or a high pathloss between the eNB and the UEs, i.e. the UEs far from the eNB can transmit the D2D synchronization signal. The eNB may instruct the D2D UE to transmit the D2D synchronization signal. Of course, the UE of transmitting the D2D synchronization signal transmission may be determined based on other criteria.

Figure 11:
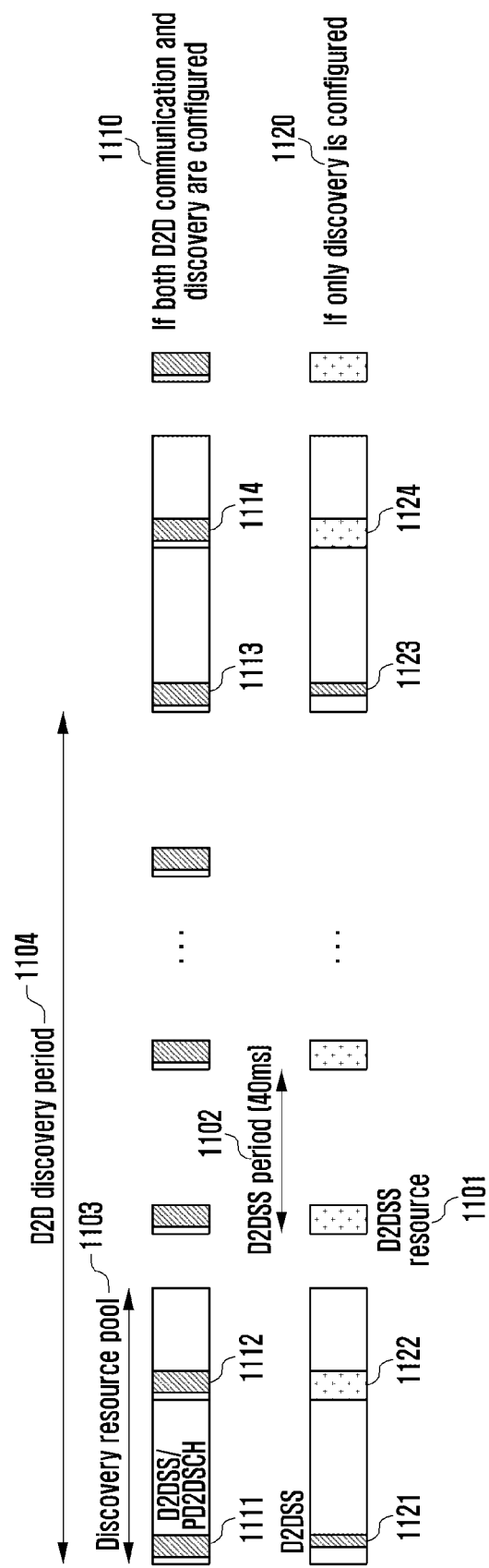
FIG. 11 is a diagram illustrating a D2D synchronization signal configuration method.

FIG. 11 is a diagram illustrating a method of transmitting a D2D synchronization signal for inter-eNB D2D communication.

Typically, the synchronization signal is transmitted periodically. Accordingly, the resource for D2D synchronization signal is configured periodically. In FIG. 11, reference number 1101 denotes a D2D synchronization signal which always includes D2DSS (D2D Synchronization Signal) identical with PSSS/SSSS (Primary Sidelink Synchronization Signal/Secondary Sidelink Synchronization Signal), and it may be transmitted along with PD2DSCH (Physical D2D Synchronization Channel) identical with PSBCH (Physical Sidelink Broadcast Channel) as the synchronization channel including arbitrary information for synchronization.

For D2D synchronization, there may be a case of requiring transmission of the D2DSS and the PD2DSCH and a case of requiring transmission of the D2DSS with PD2DSCH.

For example, if the current eNB supports the D2D Direct communication as denoted by reference number 1110 of FIG. 11, the D2DSS and PD2DSCH are configured simultaneously; thus, the UE which is supposed to transmit the synchronization signal for inter-eNB D2D operation has to transmit the D2DSS and PD2DSCH simultaneously.

Even when the current eNB supports both the D2D Direct communication and D2D discover, the D2DSS and PD2DSCH are configured simultaneously; thus, the UE which is supposed to transmit the synchronization signal for inter-eNB D2D operation has to transmit the D2DSS and PD2DSCH simultaneously.

Otherwise if the current eNB supports only the D2D discovery as denoted by reference number 1120 of FIG. 11 and does not support D2D direct communication, only the D2DSS is configured; thus, the UE which is supposed to transmit the synchronization signal for inter-eNB D2D operation has to transmit only the D2DSS.

The D2D synchronization resource as denoted by reference number 1101 is configured for a synchronization signal at a predetermined period (e.g. 40 ms as denoted by reference number 1102 of FIG. 11). If the D2D direct communication is configured, D2D transmission may occur frequently; thus, it is assumed that the D2D synchronization signal is transmitted continuously according to the period of the D2D synchronization signal.

Accordingly, if the D2D direct communication is configured as denoted by reference number 1111 of FIG. 11, the D2D synchronization signal (D2DSS) is transmitted along with the PD2DSCH using the period 1102 of the D2D synchronization resource over the whole configured D2D synchronization resource.

Otherwise if only the D2D discovery operation is configured at the eNB as denoted by reference number 1121 of FIG. 11, only the D2DSS is transmitted. At this time, the eNB allocates the resource for D2D discovery separately at an arbitrary period 1104 in the form of D2D discovery resource pool as denoted by reference number 1103. In this case, the D2D discovery may be configured to occur sparsely, i.e. at the very long period of unit of second or 10 seconds, as denoted by reference number 1104. Accordingly, if the eNB configures only the D2D discovery operation, there is no need of transmitting the D2D synchronization signal frequently, and the D2D synchronization signal is transmitted only at the beginning of the D2D discovery resource so as to save the resource for D2D synchronization.

The D2D synchronization signal is configured so as to be transmitted at the beginning of the D2D discovery resource pool as denoted by reference numbers 1121 and 1123 of FIG. 11 (or on the closest D2D synchronization resource) and is not configured to be transmitted on the other part of the D2D synchronization resource as denoted by reference numbers 1122 and 1124 of FIG. 11. Of course, if the eNB configured with only the D2D discovery operation transmits the D2D synchronization signal, only the D2DSS is transmitted without PD2DSCH.

As described above, the D2D UE may transmit the D2DSS or PD2DSCH for D2D synchronization, and the D2D synchronization may be transmitted at a very short period or relatively long period depending on the situation.

Figure 12:
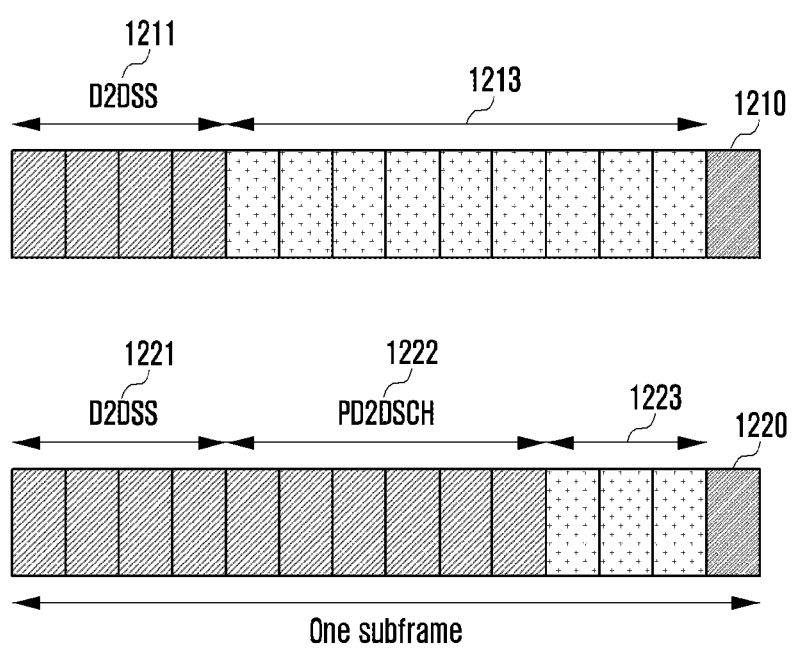
FIG. 12 is a diagram illustrating a structure of a D2D synchronization signal.

At this time, it is assumed that the D2DSS and PD2DSCH are multiplexed into one subframe in the time domain such that the part occupied by the D2D synchronization signal varies depending on whether the PD2DSCH is transmitted or not. FIG. 12 shows the time duration occupied by the D2D synchronization signal in a subframe.

FIG. 12 is a diagram illustrating a structure of the D2D synchronization signal.

In FIG. 12, the subframe structure 1210 has a part of the D2DSS. The D2DSS is transmitted in 4 symbols (SC-FDMA symbols or OFDM symbols): two symbols for PSSS and the other two symbols for SSSS.

Although FIG. 12 is directed to the case where the first 4 symbols are allocated for D2DSS in a subframe, the positions of the 4 symbols may change in such a way of being arranged consecutively, arranged as separated by 2, or arranged as separated by 1 (one by one). The D2DSS can be transmitted in any of all available combinations of the 4 symbols in one subframe.

A subframe consists of 14 symbols (or 12 symbols in the case of using the extended CP), and the last symbol of the subframe may be reserved for the D2D signal. Accordingly, except for the 4 symbols allocated for the D2DSS, at least 9 symbols (or 7 symbols in the case of using the extended CP) are not used for synchronization signal transmission as denoted by reference number 1213.

Meanwhile, in FIG. 12, the subframe structure 1220 is designed to transmit both the D2DSS and PD2DSCH. The D2DSS is transmitted in 4 symbols (SC-FDMA symbols or OFDM symbols), and the PD2DSCH is transmitted in other symbols. The number of symbols carrying the PD2DSCH is predetermined. By taking notice of the information amount to be transmitted, the PD2DSCH may occupy more symbols than the D2DSS (of course the number of symbols carrying PD2DSCH is equal to or less than the number of the symbols carrying the D2DSS); thus, the D2DSS and PD2DSCH may be transmitted as denoted by reference numbers 1221 and 1222, whereby the non-synchronization signal area 1223 in the case of transmitting both the D2DSS and PD2DSCH being less than the non-synchronization signal area 1213 in the case of transmitting only the D2DSS.

Accordingly, the D2D UE has to operate differently in the region without being used for D2D synchronization signal transmission in the D2D synchronization resource depending on the presence/absence of the PD2DSCH. In particular, there is a need of defining the UE operation for the case where the D2D discovery resource pool is allocated as denoted by reference number 1103 of FIG. 11, and the D2D synchronization resources are overlapped in the D2D discovery resource pool as denoted by reference numbers 1111, 1112, 1121, and 1122.

A description is made hereinafter of the UE operation in the case where the D2D discovery resource pool or another D2D transmission is overlapped with the D2D synchronization signal transmission. The D2D signal may be transmitted using the resource selected arbitrarily by the UE in the predetermined resource pool or the resource allocated by the eNB according to the configuration of the eNB. Particularly, the D2D discovery signal may be transmitted using the resource selected by the UE in the predetermined resource pool or the resource allocated by the eNB according to the configuration of the eNB.

Embodiment 2-1

This embodiment defines the UE operation of transmitting the D2D synchronization signal and D2D discovery signal in the case where the D2D synchronization resource and the D2D discovery resource pool are overlapped at the eNB configured with the D2D synchronization signal transmission.

The D2D UE may transmit the D2D synchronization signal for D2D communication with the neighboring cell as described above. At this time, the UEs transmitting the D2D synchronization signals may include all UEs served by the eNB (or all D2D UEs, the UEs configured by the eNB, the UEs of which the RSRP measured for the eNB based on the distance from the eNB is less than the RSRP threshold configured by the eNB based on the pathloss measured at the UE, or the UEs of which the measured pathloss is greater than a pathloss threshold configured by the eNB. According to a preferred embodiment, a UE which is located far from the eNB may transmit the D2D synchronization signal.

Accordingly, there may be the UEs that transmit the D2D synchronization signal and the UEs that do not transmit the D2D signal among the D2D UEs in a cell. The D2D synchronization signal transmitted by the D2D Tx UE may include only the D2DSS or both the D2DSS and PD2DSCH depending on whether the serving eNB supports the D2D direct communication.

That is, if the eNB supports only the D2D direct communication or both the D2D direct communication and D2D discovery, the D2D synchronization signal includes both the D2DSS and PD2DSCH. Otherwise if the D2D synchronization signal includes only the D2D discovery but not the D2D direct communication, the D2D synchronization signal includes only the D2DSS. In the case that the UE transmits the discovery signal in the same subframe as the D2D synchronization resource for transmitting the D2D synchronization signal (or another D2D channel, though the description is made on the basis of the discovery signal, it is assumed that this can be applied to all D2D channels), the UE cannot transmit all of the D2D synchronization signal and D2D discovery signal.

Accordingly, the UE has to select one of the two signals for transmission with priority, i.e. the UE has to transmit one of the D2D synchronization signal and the D2D discovery signal.

If it is determined to transmit the D2D synchronization signal with priority, the UE may operate differently depending on whether the D2D synchronization signal includes only the D2DSS or both the D2DSS and PD2DSCH. If it is necessary to transmit only the D2DSS signal as the D2D synchronization signal according to the configuration of the eNB, the UE transmits the D2DSS in the 4 symbols as denoted by reference number 1211 of FIG. 12. However, there are still 9 (or 7) symbols not used for D2D synchronization signal transmission as denoted by reference number 1213 of FIG. 12, the UE may transmit the D2D discovery signal using the symbols carrying no D2DSS in the subframe in which the D2D synchronization resource is configured.

Although basically the UE uses the whole subframe (the last symbol may be excluded) for transmitting the D2D discovery signal, the number of symbols for transmitting the D2D discovery signal decreases in the case that the D2DSS is transmitted; thus, channel puncturing or new rate matching is applied for transmission.

The channel puncturing is the method of mapping the coded information to the physical channel and transmitting the information mapped to the symbols carrying the D2DSS like the legacy D2D discovery signal transmission. That is, the channel puncturing is characterized by performing the encoding and rate matching in the same way as the legacy D2D discovery signal transmission and performing channel mapping at the part remained after excluding the D2DSS transmission part and transmits the D2DSS in the D2D transmission part.

However, if it is necessary to transmit both the D2DSS and PD2DSCH as the D2D synchronization signal according to the configuration of the eNB, the D2DSS and PD2DSCH are transmitted in more than 4 symbols as denoted by reference numbers 1221 and 1222 of FIG. 12. Accordingly, the number of symbols that are not used for transmitting the D2D synchronization signal is small as denoted by reference number 1223 of FIG. 12. In this case, transmitting the D2D discovery signal in the symbols that are not used for transmitting the D2D synchronization signal has no significant meaning.

Accordingly, in this embodiment, the UE gives up transmitting the D2D discovery signal even when the D2D discovery signal transmission is available in the same subframe in the case of transmitting both the D2DSS and PD2DSCH as the D2D synchronization signal.

Figure 13:
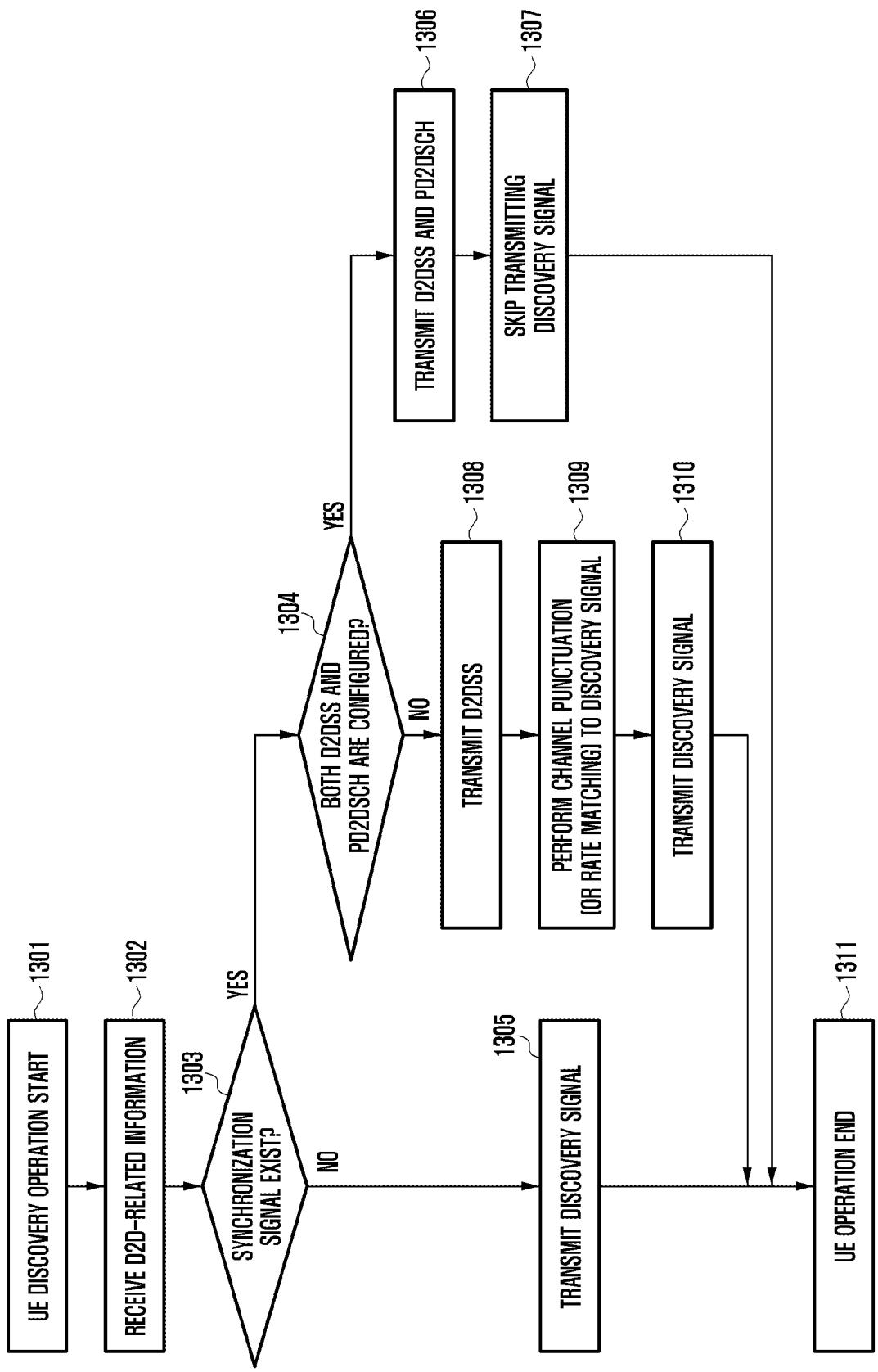
FIG. 13 is a diagram illustrating a UE operation according to embodiment 2-1.

The UE operation according to this embodiment is depicted in FIG. 13.

The UE starts operation at step 1301 and receives D2D information from the eNB at step 1302. In this case, the D2D information includes all configuration information for the UE to participate in the D2D communication such as D2D discovery signal transmission/reception resource pool information, D2D direct communication resource pool information, D2D synchronization signal transmission/reception resource pool information, and synchronization signal transmission condition information (e.g. RSRP threshold).

At step 1303, the UE determines whether any D2D synchronization signal resource is configured in the subframe that is supposed to carry the D2D discovery signal based on the D2D information received at step 1302.

If it is not necessary for the UE to transmit the D2D synchronization signal, the UE transmits the discovery signal using the whole subframe at step 1305.

Otherwise if it is necessary for the UE to transmit the D2D synchronization signal, the UE determines whether the D2D synchronization signal includes both the D2DSS and PD2DSCH or only the D2DSS at step 1304.

If it is determined that the D2D synchronization signal includes both the D2DSS and PD2DSCH at step 1304, the UE transmits the D2DSS and PD2DSCH at step 1306 and does not transmit the D2D discovery signal in the subframe including the D2D synchronization signal at step 1307.

If it is determined that the D2D synchronization signal includes only the D2DSS at step 1304, the UE transmits the D2DSS at step 1308, performs channel puncturing and rate matching on the symbols to which the D2DSS is mapped at step 1309, and transmits the discovery signal using only the symbols at which no D2DSS is mapped in the subframe at step 1310. The UE transmission operation ends at step 1311.

In this embodiment, if the UE has failed in transmitting the discovery signal because of the D2D synchronization, it can transmit the discovery signal using other resource in the same D2D discovery signal resource pool. It is also possible to consider a method of selecting the resource for transmitting the D2D discovery signal in the resource with the exception of the D2D synchronization signal resource in the D2D discovery signal resource pool other than configuring the D2D discovery signal transmission in the D2D synchronization signal resource from the beginning.

Embodiment 2-2

This embodiment defines the UE operation of transmitting the D2D discovery signal when the D2D synchronization signal is configured in the situation where the D2D synchronization resource and the D2D discovery resource pool are overlapped at the eNB configured with the D2D synchronization signal transmission.

The D2D UE may transmit the D2D synchronization signal for D2D communication with the neighboring cell as described above. At this time, the UEs transmitting the D2D synchronization signals may include all UEs served by the eNB (or all D2D UEs), the UEs configured by the eNB, the UEs of which the RSRP measured for the eNB based on the distance from the eNB is less than the RSRP threshold configured by the eNB based on the pathloss measured at the UE, or the UEs of which the measured pathloss is greater than a pathloss threshold configured by the eNB.

Accordingly, there may be the UEs that transmit the D2D synchronization signal and the UEs that do not transmit the D2D signal among the D2D UEs in a cell.

For the UEs that do not transmit the D2D synchronization signal, it may occur that the resource for discovery signal transmission and the resource for transmitting the D2D synchronization signal configured in the current cell are overlapped in the D2D discovery signal resource pool. If a UE transmits a D2D synchronization signal and if another UE transmits a D2D discovery signal using the same resource in the same cell, the D2D discovery signal may act as noise at a UE that receives the D2D synchronization signal in the neighboring cell, resulting in degradation of D2D synchronization performance. Accordingly, this embodiment proposes a method for the UE transmitting the D2D synchronization signal to transmit the D2D discovery signal too in the subframe configured to carry the D2D synchronization.

Figure 14:
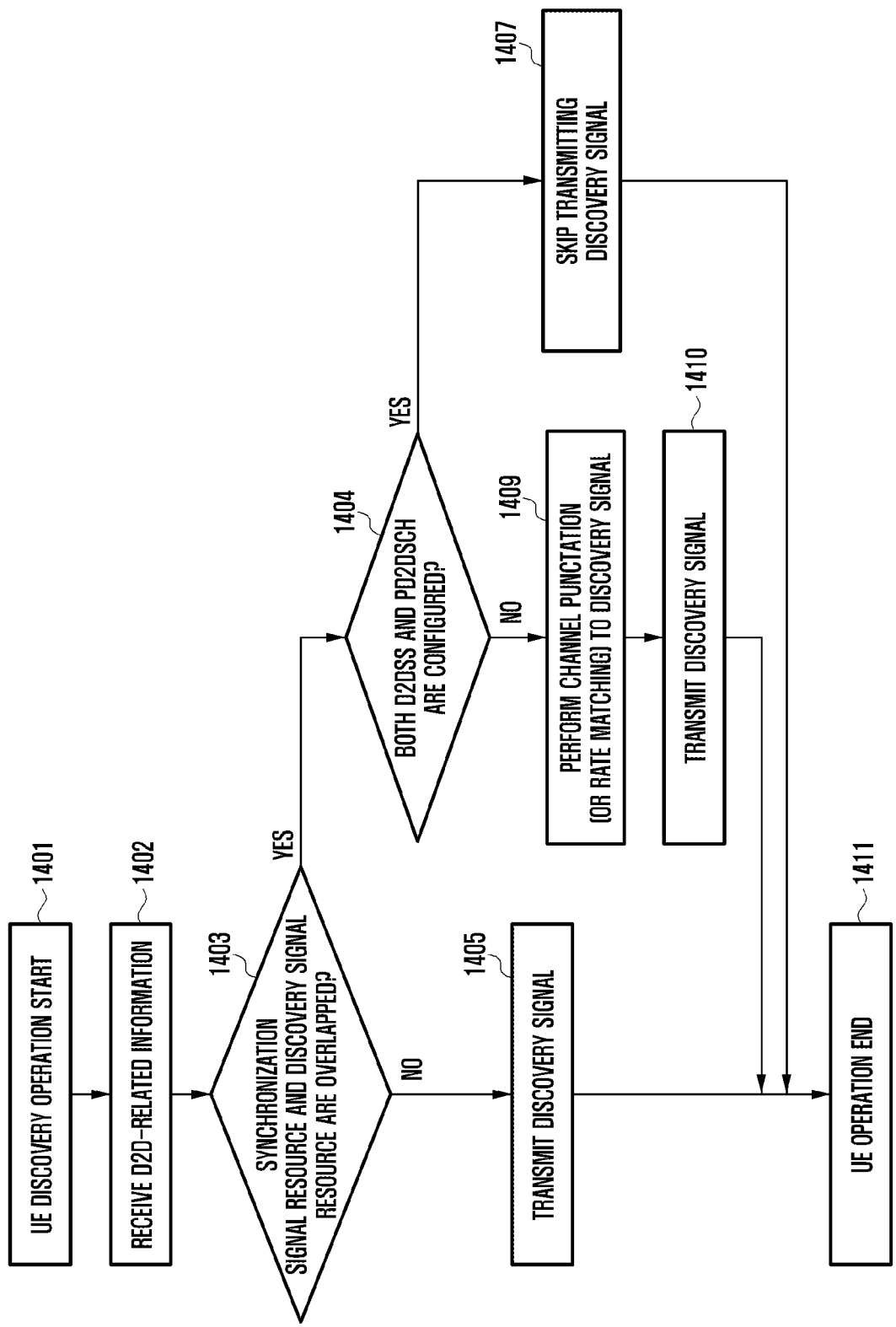
FIG. 14 is a diagram illustrating a UE operation according to embodiment 2-2.

The UE operation according to this embodiment is depicted in FIG. 14.

The UE starts operation at step 1401 and receives D2D information from the eNB at step 1402. The D2D information may include all configuration information for the UE to participate in the D2D communication such as D2D discovery signal transmission/reception resource pool information, D2D direct communication resource pool information, D2D synchronization signal transmission/reception resource pool information, and synchronization signal transmission condition information (e.g. RSRP threshold).

The UE recognizes that the UE does not transmit the D2D synchronization signal based on the D2D information received at step 1402. Also, the UE determines, at step 1403, whether it is necessary to transmit the D2D discovery signal in the resource configured to transmit the D2D synchronization signal, i.e. subframe configured to transmit the D2D synchronization signal, and frequency resource, i.e. the PRB, configured to transmit the D2D synchronization signal based on the D2D information received at step 1402.

If the resource for transmitting the D2D discovery signal is not overlapped with the resource configured for transmitting the D2D synchronization signal, the UE transmits the discovery signal using the whole subframe at step 1405. Otherwise if the resource for transmitting the D2D discovery signal is overlapped with the resource (time-frequency resource) configured for transmitting the D2D synchronization signal, the UE determines whether the D2D synchronization signal includes both the D2DSS and PD2DSCH or only the D2DSS at step 1404.

If it is determined that the D2D synchronization signal includes both the D2DSS and PD2DSCH at step 1404, the UE does not transmit the D2D discovery signal in the resource carrying the D2D synchronization signal at step 1407.

Otherwise if the D2D synchronization signal includes only the D2DSS, the UE transmits the D2D discovery signal in the subframe carrying the D2D synchronization signal at step 1408, performs channel puncturing and rate matching on the symbols to which the D2DSS is mapped at step 1409, and transmits the discovery signal using only the symbols at which no D2DSS is mapped in the subframe at step 1410. The UE transmission operation ends at step 1411.

This embodiment also proposes a method for the UE to skip the determination step 1404 and the discovery signal transmission step 1407 if the resource for transmitting the D2D discovery signal is overlapped with the resource (time-frequency resource) configured for transmitting the D2D synchronization signal at step 1403. That is, when the D2D discovery signal transmission resource is overlapped with the D2D synchronization signal transmission resource, the UE may not transmit the discovery signal in the corresponding resource.

In this embodiment, if the UE has failed in transmitting the discovery signal because of the D2D synchronization, it can transmit the discovery signal using other resources in the same D2D discovery signal resource pool. It is also possible to consider a method of selecting the resource for transmitting the D2D discovery signal in the resources with the exception of the D2D synchronization signal resource in the D2D discovery signal resource pool other than configuring from the beginning the D2D discovery signal transmission in the D2D synchronization signal resource.

Embodiment 2-3

This embodiment defines the UE operation of receiving the D2D discovery signal when the D2D synchronization signal is configured in the situation where the D2D synchronization resource and the D2D discovery resource pool are overlapped at the eNB configured with the D2D synchronization transmission.

Figure 15:
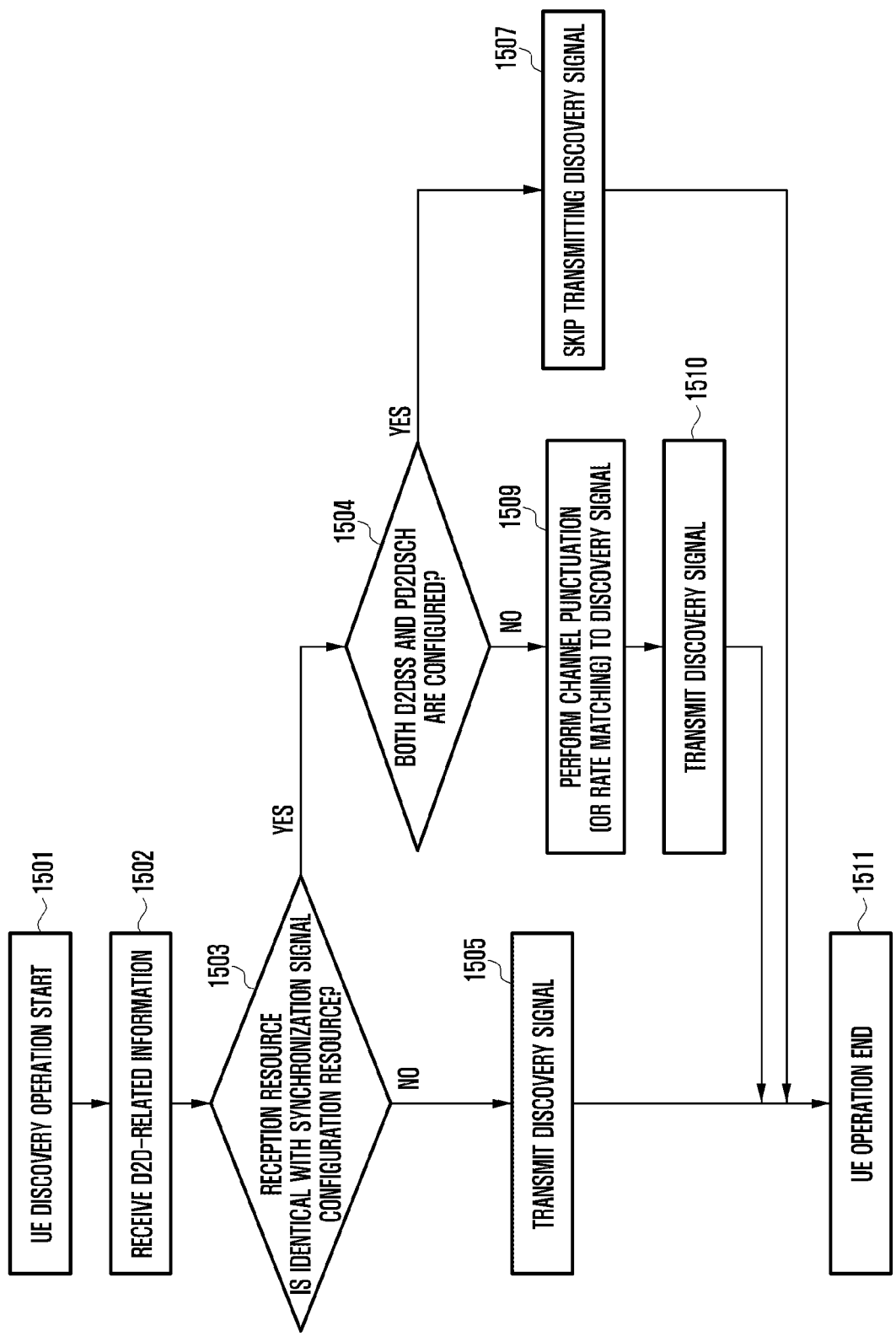
FIG. 15 is a diagram illustrating a UE operation according to embodiment 2-3.

The UE operation according to this embodiment is depicted in FIG. 15.

The UE starts operation at step 1501 and receives D2D information from the eNB at step 1502. The D2D information may include all configuration information for the UE to participate in the D2D communication such as D2D discovery signal transmission/reception resource pool information, D2D direct communication resource pool information, D2D synchronization signal transmission/reception resource pool information, and synchronization signal transmission condition information (e.g. RSRP threshold).

The UE determines, at step 1503, whether the current reception resource is the resource configured for the D2D synchronization signal, i.e. subframe configured to transmit the D2D synchronization signal, and frequency resource, i.e. the PRB, configured to transmit the D2D synchronization signal based on the D2D information received at step 1502.

If the current reception resource is not the resource configured to transmit the D2D synchronization signal, the UE receives the discovery signal using the whole subframe at step 1505. The reception operation includes channel reception and decoding operation for the D2D discovery signal.

Otherwise if the current reception resource is the resource configured to transmit the D2D synchronization signal, the UE determines whether the D2D synchronization signal includes both the D2DSS and PD2DSCH or only the D2DSS at step 1504.

If it is determined that the D2D synchronization signal includes both the D2DSS and PD2DSCH at step 1504, the UE does not attempt receiving the D2D discovery signal in the resource carrying the D2D synchronization signal at step 1507.

Otherwise if the D2D synchronization signal includes only the D2DSS, the UE receives the D2D discovery signal in the subframe carrying the D2D synchronization signal at step 1508, assumes that channel puncturing and rate matching have been applied to the symbols to which the D2DSS is mapped at step 1509, and receives the discovery signal transmitted using only the symbols at which no D2DSS is mapped in the subframe at step 1510. The UE transmission operation ends at step 1511.

This embodiment also proposes a method for the UE to skip the determination step 1504 and the discovery signal reception step 1507 if the resource for transmitting the D2D discovery signal is overlapped with the resource (time-frequency resource) configured for transmitting the D2D synchronization signal at step 1503. That is, when the D2D discovery signal transmission resource is overlapped with the D2D synchronization signal transmission resource, the UE may not transmit the discovery signal in the corresponding resource.

Embodiment 2-4

In the above description, the D2D synchronization signal is configured differently according to the D2D direct communication (or D2D broadcast communication) and the D2D discovery configurations.

An eNB may be configured to support one or both of the D2D direct communication and the D2D discovery.

The D2D configuration information is broadcast in an SIB from the eNB for all UEs in the eNB coverage. If the SIB is received, the UE can acquire the D2D configuration information from the SIB.

As described above, the D2D direct communication and D2D discovery can be configured independently, and it is necessary to include the corresponding information separately in the SIB. Accordingly, the eNB may include the D2D direct communication configuration information in the SIB-N and the D2D discovery configuration information in the SIB-N. For example, the D2D direct communication configuration information may be included in the SIB-18 while the D2D discovery configuration information is included in the SIB-19; however, M and N may be set to arbitrary values.

At this time, because the D2D synchronization resource is configured commonly, it is not necessary to include the synchronization resource configuration information in both the SIB-N carrying the D2D direct communication configuration information and SIB-M carrying the D2D discovery configuration information. In this embodiment, the eNB configured to support the D2D direct communication includes the synchronization resource configuration information in the SIB-N but not in the SIB-M even though the D2D discovery is configured. Meanwhile, the eNB configured to support the D2D discovery but not the D2D direct communication includes the synchronization resource configuration information in the SIB-M.

Likewise, the UE determines whether the eNB supports the D2D direct communication and/or the D2D discovery based on the information from the eNB and, if the D2D direct communication is supported, the UE acquires the D2D synchronization resource configuration information from the SIB-N; and otherwise, if only the D2D discovery is supported, the UE acquires the D2D resource configuration information from the SIB-M.

Figure 16:
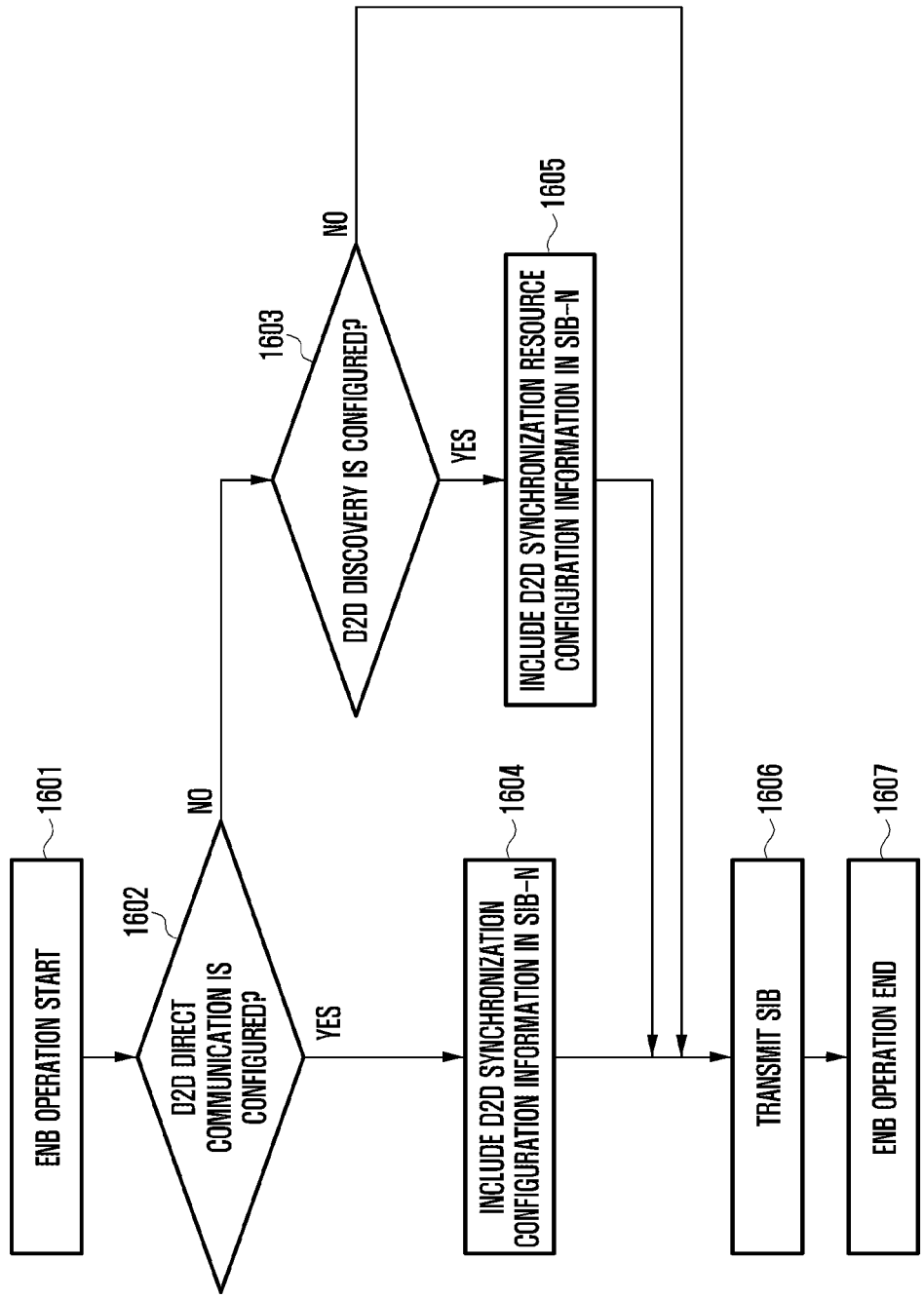
FIG. 16 is a diagram illustrating an eNB operation according to embodiment 2-4.

A description is made of the eNB operation according to this embodiment with reference to FIG. 16.

The eNB starts operation at step 1601 and determines whether it is configured to support the D2D direct communication at step 1602

If it is configured to support the D2D direct communication, the eNB may include the D2D synchronization resource configuration information in the SIB-N (i.e. SIB including the D2D direct communication configuration information) at step 1604.

Otherwise if it is not configured to support the D2D direct communication, the eNB determines whether the D2D discovery is configured at step 1603. If it is configured to support the D2D discovery at step 1603, the eNB may include the D2D synchronization resource configuration information in the SIB-M (i.e. SIB including the D2D direct communication configuration information) at step 1605. Otherwise if it is not configured to support the D2D discovery at step 1603, the eNB may not include the D2D synchronization resource configuration information in the SIB.

Through the above procedure, the eNB transmits the SIBs including SIB-M and SIB-N to the UEs at step 1606 and ends the eNB operation at step 1607.

Figure 17:
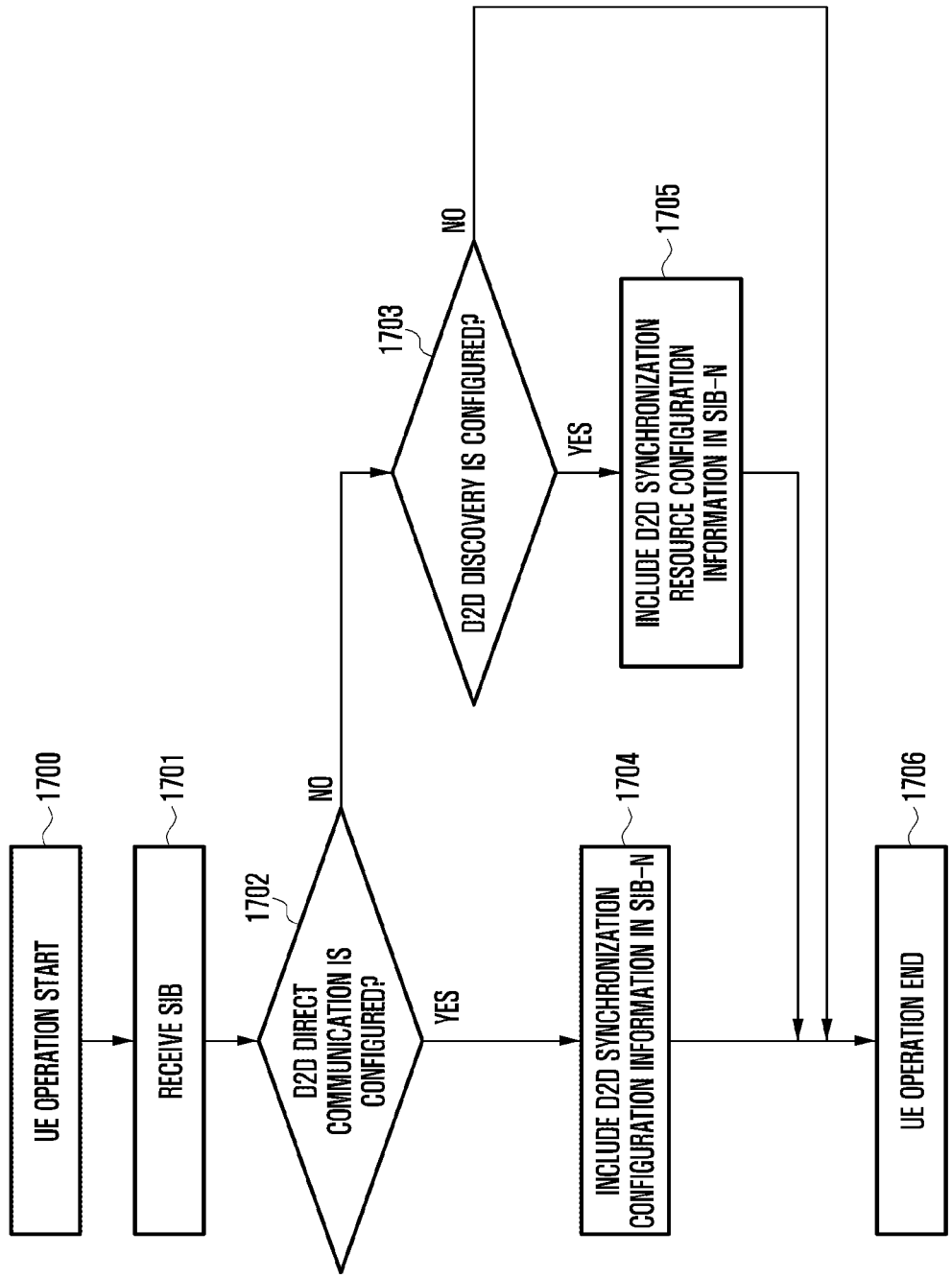
FIG. 17 is a diagram illustrating a UE operation according to embodiment 2-4.

FIG. 17 is a flowchart illustrating a UE operation procedure for this embodiment.

The UE starts operation at step 1700 and receives the SIB from the eNB serving the UE at step 1701.

Next, the UE determines whether the eNB is configured to support the D2D direct communication at step 1702.

If it is determined that the D2D direction communication is configured, the UE may acquire the D2D synchronization configuration information from the SIB-N (i.e. SIB including the D2D direct communication configuration information) at step 1704.

Otherwise if the eNB is not configured to support the D2D direct communication, the UE determines whether the eNB is configured to support the D2D discovery at step 1703. If the eNB is configured to support the D2D discovery at step 1703, the UE acquires the D2D synchronization resource configuration information from the SIB-N (i.e. the SIB including the D2D discovery configuration information) at step 1705; and otherwise, if the eNB is not configured to support the D2D discovery at step 1703, the UE determines that the D2D synchronization resource is not configured.

The UE operation ends at step 1706.

Figure 18:
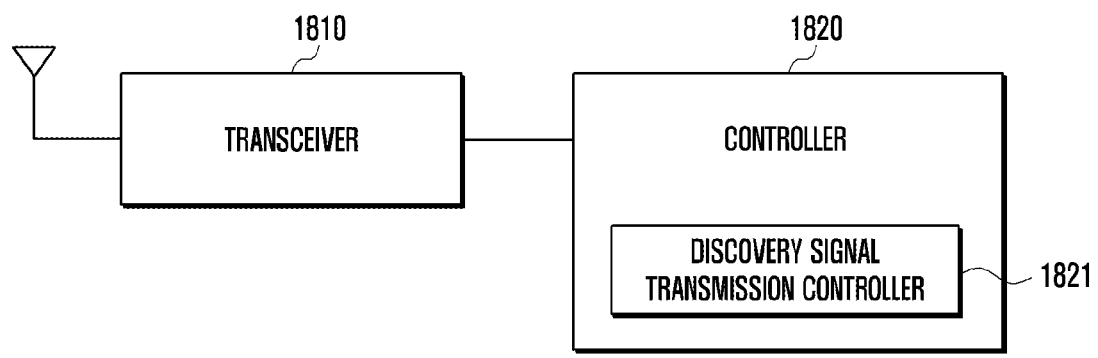
FIG. 18 is a block diagram illustrating a configuration of a UE according to an embodiment of the present invention.

FIG. 18 is a block diagram illustrating a configuration of the UE according to the first and second embodiments of the present invention.

As shown in FIG. 18, the UE according to an embodiment of the present invention includes a transceiver 1810 and a controller 1820.

The transceiver 1810 may transmit/receive signals to and from an eNB or another UE. According to another embodiment of the present invention, the transceiver 1810 may receive D2D communication configuration information from the eNB. The transceiver 1810 also may transmit a D2D synchronization signal or a discovery signal to another UE.

The control unit 1820 may control signal flows between function blocks in order for the UE to perform the operations according to an embodiment of the present invention. For this purpose, the controller 1820 may further include a discovery signal transmission controller 1821.

If discovery signal resource pool information is received from the eNB, the discovery signal transmission controller 1821 may select resource for transmitting the discovery signal based on the discovery resource pool information. The discovery signal transmission controller 1821 may determine whether the selected resource is overlapped with the D2D synchronization signal transmission resource and then determine whether to transmit the discovery signal based on the overlapping determination result.

In detail, if the selected resource is overlapped with the D2D synchronization signal transmission resource, the discovery signal transmission controller 1821 may control such that the discovery signal transmission not be performed in the selected resource. The discovery signal transmission controller 1821 also may control to transmit the discovery signal in the selected resource if the selected resource is not overlapped with the D2D synchronization signal transmission resource.

The discovery signal transmission controller 1821 may also determine whether the D2D synchronization signal transmission is configured to the UE and, if the D2D synchronization signal transmission is configured and if the selected resource is overlapped with the D2D synchronization signal transmission resource, control to transmit the D2D synchronization signal in the selected resource.

In this case, the discovery signal transmission controller 1821 determines whether any D2D synchronization signal transmission configuration signal is received from the eNB and determines whether the D2D synchronization signal transmission is configured to the UE based on receipt of this signal. The discovery signal transmission controller 1821 may also measure the strength of the signal transmitted by the eNB to determine whether to transmit the D2D synchronization signal based on the measured signal strength.

Although the description is directed to the case where the controller 1820 is provided with the discovery signal transmission controller 1821, which is responsible for performing a series of operations, the present invention is not limited thereto. For example, it may be possible to implement the UE such that the controller 1820 performs the functions of the discovery signal transmission controller 1821.

Figure 19:
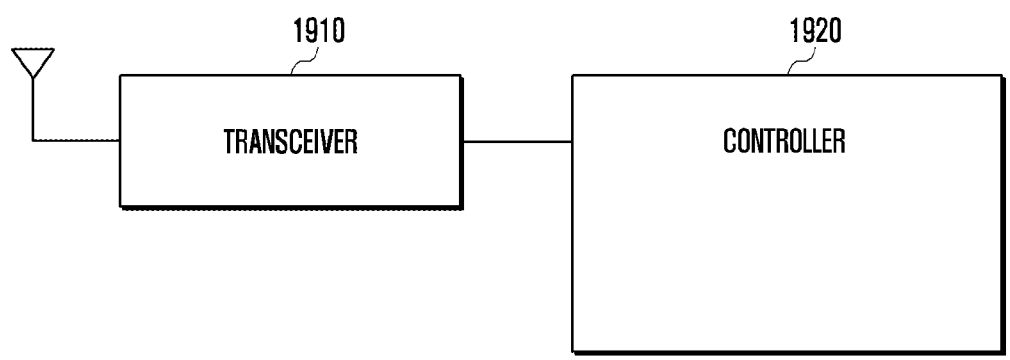
FIG. 19 is a block diagram illustrating a configuration of an eNB according to an embodiment of the present invention.
Figure 21A:
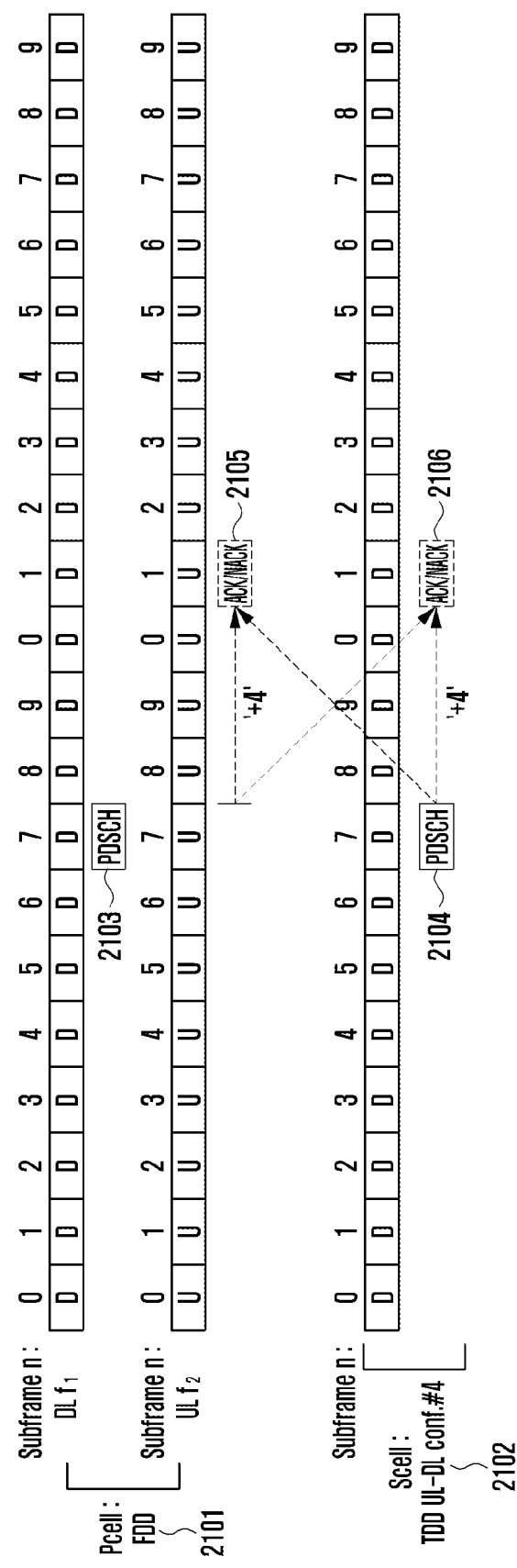
FIG. 21 shows diagrams illustrating PUCCH transmission cell determination according to the present invention.
Figure 21B:
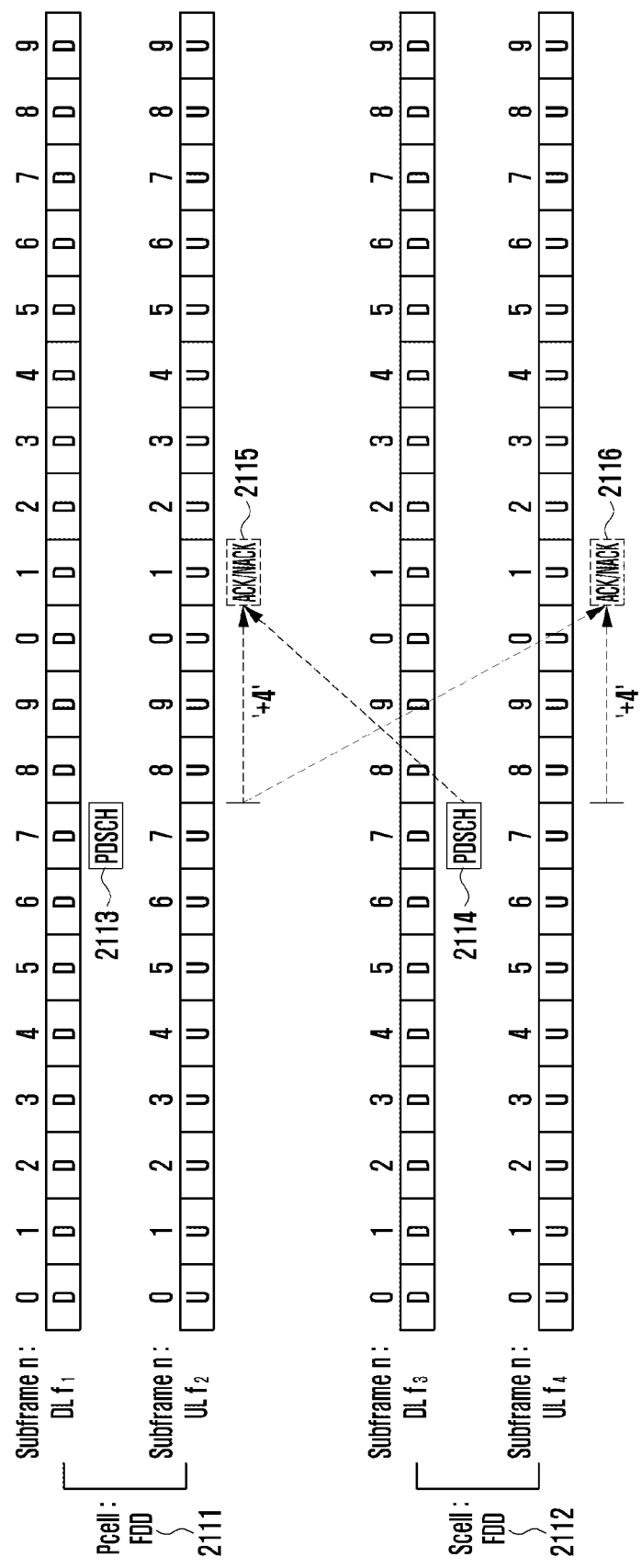
Figure 21C:
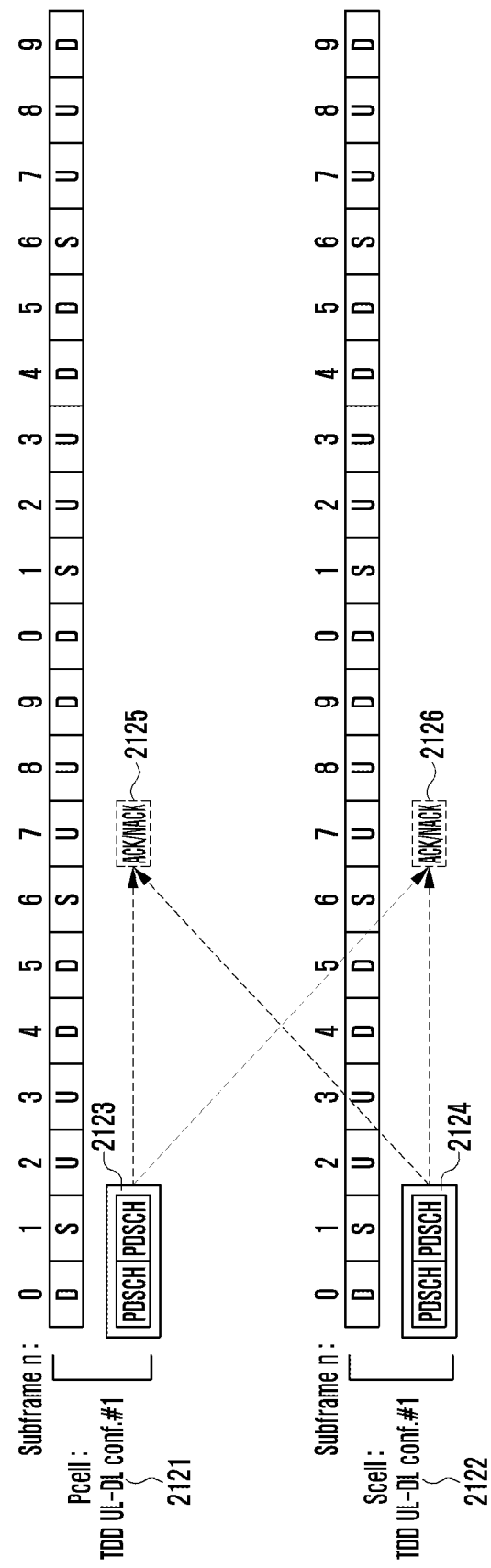
Figure 21D:
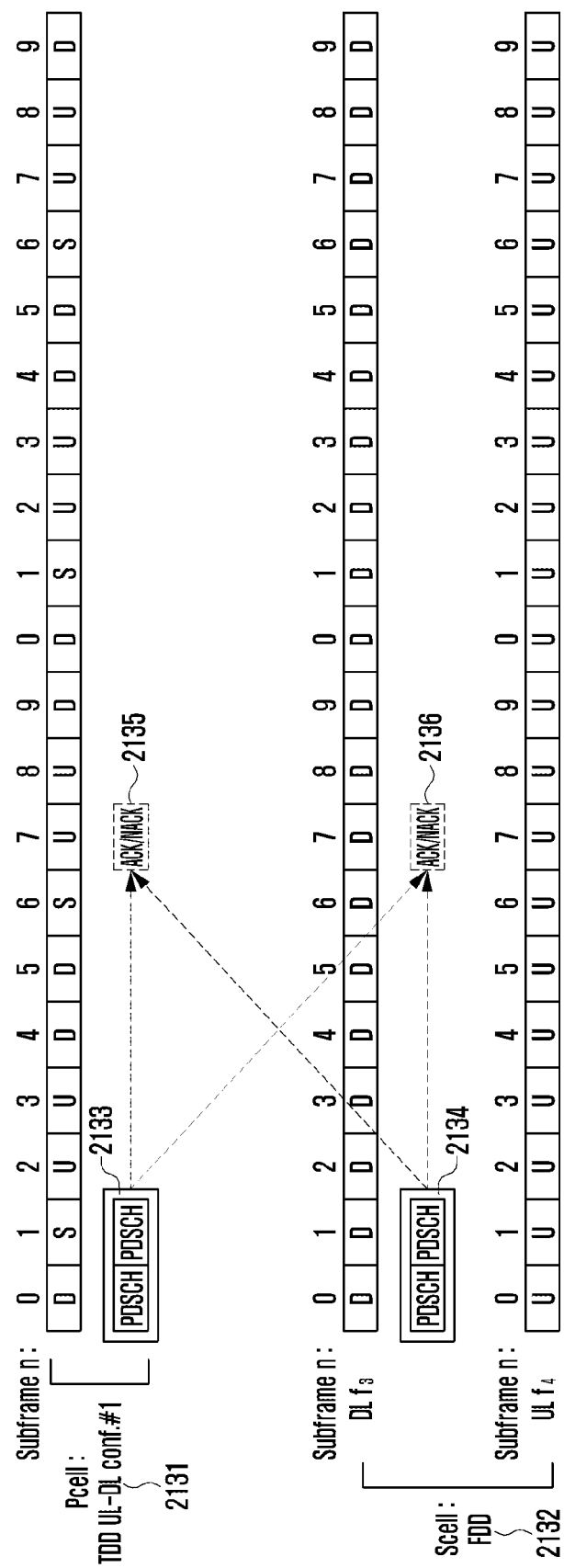

FIG. 19 is a block diagram illustrating a configuration of the eNB according to the first and second embodiments of the present invention.

As shown in FIG. 19, the eNB may include a transceiver 1910 and a controller 1920.

The transceiver 1910 may transmit/receive signals to and from a UE. In detail, the transceiver 1910 may transmit D2D communication configuration information to the UE. For example, the transceiver 1910 may transmit the discovery resource pool information to the UE.

The controller 1920 may control signal flows between the function blocks for the operations of the eNB.

For example, the controller 1920 may control the eNB 1920 to generate discovery resource pool information to the UE and transmit a D2D transmission configuration signaling message to the UE.

The Third Embodiment

The third embodiment is directed to a UL control channel transmission method and apparatus for use in a carrier aggregation system.

The $3^{rd}$ Generation Partnership Project (3GPP) Long Term Evolution-Advanced (LTE-A) is a technology designed to provide high speed packet-based communication of up to 1 Gbps. In LTE-A, the number of cells to which the UE connects increases while the feedback generated in the respective cells is transmitted through a Primary cell (PCell). In LTE Rel-10 (LIE-A), all of the cells serving the UE operate in the same duplex mode. That is, all of the serving cells operate Frequency Division Duplex (FDD) mode or Time Division Duplex (TDD) mode. The TDD may be a static TDD mode in which the UL-DL configuration is fixed or a dynamic TDD mode in which the UL-DL configuration changes according to the system information, higher layer signaling, or downlink common control channel.

In the case of adding a frequency band in the state that a cell under the control of an eNB operates in the FDD mode, it is easy to apply the TDD mode because the FDD requires two frequency bands for downlink (DL) and uplink (UL) respectively.

Thus, in LTE Rel-12, the duplex mode of the cells added to the UE may be FDD or TDD. At this time, if the UE has the capability of increasing the cells even in uplink, it is possible to transmit feedback through multiple uplink channels.

In the case that the cells are operating in different duplex modes, because the uplink frames exist partly if the PCell operates in the TDD mode, it may be advantageous to transmit feedback through an SCell operating in the FDD mode in terms of reducing feedback timings and distributing the feedback traffic to multiple cells to protect against feedback concentration to the PCell.

There is therefore a need of a method of transmitting the uplink control channel through the serving cells as well as the PCell in view of the resource and timings.

The present invention has been conceived to accomplish the above necessity and proposes a method and apparatus for transmitting physical uplink control channel in a carrier aggregation system.

The present invention provides a method and apparatus for transmitting feedback in uplink through the PCell and SCells that are capable of reducing resource waste in scheduling downlink data in the cells, the method including configuring, at the eNB, a control channel format for transmitting the feedback corresponding to the downlink data to the UE and configuring resource for transmitting the control channel format to the UE based on the configured control channel format.

Typically, the OFDM transmission scheme is a kind of Multi-Carrier Modulation scheme of parallelizing a symbol stream input in series and modulating the parallelized signals into multiple carriers, i.e. a plurality of subcarrier channels, for transmission.

In the OFDM scheme, the modulation signal is mapped to 2-dimensional resource partitioning in frequency and time. The time axis resource is split into OFDM symbols orthogonally. The frequency axis resource is split into subcarriers orthogonally. In the OFDM scheme, the smallest resource unit is defined by an OFDM symbol on the time axis and a subcarrier on the frequency axis and called Resource Element (RE). Since the REs maintain their orthogonality over the frequency selective channel, the receiver can receive the signals mapped to different REs without interference with each other.

A physical channel is the channel of the physical layer which carries the modulation symbols acquired by modulating one or more coded bit streams. In an Orthogonal Frequency Division Multiple Access (OFDMA) system, a plurality of physical channels are transmitted depending on the aims of the information streams to be transmitted and the receiver. The transmitter and receiver negotiate the REs for transmitting a physical channel, and the rule of the negotiation is called mapping.

In the OFDM communication system, the downlink bandwidth is made up of a plurality of Resource Blocks (RBs), and a PRB is composed of 12 subcarriers on the frequency axis and 14 or 12 OFDM symbols on the time axis. Here, the PRB is the basic unit of resource allocation.

Reference Signals (RSs) are transmitted by an eNB for channel estimation at the UE and, in the LTE communication system, include Common Reference Signal (CRS) and DeModulation Reference Signal (DMRS) as one of dedicated reference signals.

The CRS is the reference signal transmitted across the whole downlink band and received by all UEs for channel estimation, feedback information configuration, or control and data channel modulation. The DMRS is the reference signal which is also transmitted across the whole downlink band and received by a specific UE for data channel modulation and channel estimation, but unlike the CRS it is not feedback information configuration. Accordingly, the DMRS is transmitted on the PRB resource in which the UE is scheduled.

On the time axis, a subframe consists of two slots having a length of 0.5 msec, i.e. the first and second slots. The Physical Downlink Control Channel (PDCCH) and enhanced Physical Downlink Control Channel (PDCCH) are transmitted in the control channel region and data channel region respectively, which are split on the time axis. This aims to receive and modulate the control channel with priority. The PDCCH regions are positioned over the whole downlink band, and a control channel is split into small units of control channel so as to be distributed across the whole downlink band.

The uplink channels include a control channel (PUCCH) and a data channel (PUSCH), and the acknowledgement channel corresponding to the downlink data channel and other feedback information are transmitted through the control channel if there is no data channel and otherwise, if there is any data channel, through the data channel.

FIG. 20 is a diagram illustrating a communication system to which the present invention is applied.

Referring to FIG. 20, FIG. 20a shows a case where an eNB 2001 has a TDD cell 2002 and an FDD cell 2003 in the network. Such a communication system may be referred to as intra-eNB carrier aggregation or intra-eNB cell aggregation system. In FIG. 20a the UE 2004 may communicate data with the eNB through the TDD cell 2002 and FDD cell 2003.

In this case, the uplink transmission is performed through the PCell or SCell. That is, if the TDD cell 2002 is the PCell, the uplink transmission is performed through the TDD cell 2002 or FDD cell 2003; and if the FDD cell 2003 is the PCell, the uplink transmission is performed through the FDD cell 2003 or the TDD cell 2002.

Although the description is directed to the case where the cells operate in the same duplex mode, the operation is applicable to the case where the cells operate in different duplex mode.

FIG. 20b shows a case where a macro eNB 2011 having large coverage and a pico eNB 2012 for increasing data rate coexist in the network. Such a communication system may be referred to as inter-cell carrier aggregation or inter-eNB cell aggregation system. In this case, the macro and pico eNBs 2011 and 2012 operate in the FDD and TDD modes 2016 and 2015, respectively, for data communication with the UE 2014.

In the case that the macro and pico eNBs 2011 and 2012 have an ideal backhaul, the uplink transmission can be performed through the macro eNB 2011 or the pico eNB 2012 if the macro eNB is the PCell. At this time, fast inter-eNB X2 communication 2013 is available. In the case that the macro and pico eNBs 2011 and 2012 have no ideal backhaul, the uplink transmission may be performed to the macro and pico eNBs respectively. Although the description has been directed to the case where the cells operate in different duplex modes, the operation is applicable to the case where the cells operate in the same duplex mode.

Although the method proposed in the present invention is mainly directed to the system of FIG. 20a, it can be applied to the system of FIG. 20b.

Meanwhile, the UE which is capable of performing uplink transmission through two or more uplink carriers reports its capability to the macro or pico (or small) eNB. The UE may transmit PUCCH through two or more uplink carriers without explicit instruction of the macro or pico eNB. The PUCCH transmission may be performed on the two or more uplink carriers after the macro or pico eNB instructs to perform PUCCH transmission through two or more uplink carriers through higher layer signaling.

FIG. 21 shows diagrams illustrating PUCCH transmission cell determination according to an embodiment of the present invention.

The (E)PDCCH for scheduling PDSCH transmission of the PCell as shown in FIG. 21 is always transmitted through the PCell (self-scheduling), and the self-scheduling is configured to the UE for receiving PDSCH of the PCell through higher layer signaling. The (E)PDCCH for scheduling PDSCH transmission of the SCell may be transmitted through the PCell or the SCell. In the case of the self-scheduling for the SCell, the (E)PDCCH for scheduling the PDSCH of the SCell is transmitted through the SCell, and the self-scheduling is configured to the UE for receiving the PDSCH of the SCell through higher layer signaling. In the case of the cross-carrier scheduling for the SCell, the (E)PDCCH for scheduling the PDSCH of the SCell is transmitted through the PCell, and the cross-carrier scheduling is configured to the UE for receiving the PDSCH of the SCell through higher layer signaling.

In FIG. 21, it is assumed that the HARQ-ACK/NACK (hereinafter, referred to as HARQ-ACK) transmission timing is determined as shown in the respective drawings of FIG. 21 when PDSCH is transmitted through the PCell and SCell.

Here, the description is directed to the method of determining the PUSCH transmission cell (i.e. cell in which the PUCCH including HARQ-ACK information is transmitted) between the PCell and SCell according to the HARQ-ACK information when the uplink control channels for downlink data of the PCell and SCell are transmitted as shown in the embodiments of the respective drawings of FIG. 21.

FIG. 20a is a diagram illustrating a situation in which the cells operating in different duplex modes coexist.

In FIG. 20a, the PCell operates in the FDD mode 2101 with a downlink frequency of $f_1$ and an uplink frequency $f_2$. The SCell operates in the TDD mode 2102 with the downlink and uplink subframes determined according to the TDD UL-DL configuration #4.

If the PDSCH 2103 is transmitted at subframe #7 of the PCell 2101 and the PDSCH 2104 is transmitted at subframe #7 of the SCell 2102, the HARQ-ACKs corresponding to the PDSCHs 2103 and 2104 are multiplexed onto the PUCCH so as to be transmitted through the PCell or the SCell at subframe #1 as denoted by reference number 2105 or 2106.

At this time, whether to transmit the PUCCH through the PCell or the SCell may be determined by the cell which has determined the n(1)_PUCCH, i as the transmission resource to be determined when transmitting the PUCCH format 1b with channel selection or through the HARQ-ACK information or higher layer signaling according to an embodiment of the present invention.

The PUCCH transmission cell determination method is described hereinafter in detail with reference to FIG. 22 or FIG. 24.

FIG. 21 is a diagram illustrating a situation in which the cells are operating in the same duplex mode.

In FIG. 20b, the PCell operates in the FDD mode 2111 with a downlink frequency of $f_1$ and an uplink frequency of $f_2$. The SCell operates in the FDD mode 2112 with a downlink frequency of $f_3$ and an uplink frequency of $f_4$.

If the PDSCH 2113 is transmitted at subframe #7 of the PCell 2111 and the PDSCH 2114 is transmitted at subframe #7 of the SCell 2112, the HARQ-ACKs corresponding to the PDSCHs 2113 and 2114 are multiplexed onto the PUCCH so as to be transmitted through the PCell or the SCell at subframe #1 as denoted by reference number 2115 or 2116.

At this time, whether to transmit the PUCCH through the PCell or the SCell may be determined by the cell which has determined the n(1)_PUCCH,i as the transmission resource to be determined when transmitting the PUCCH format 1b with channel selection or through the HARQ-ACK informations or higher layer signaling according to an embodiment of the present invention.

The PUCCH transmission cell determination method is described in detail with reference to FIG. 22 or FIG. 24.

FIG. 20c is a diagram illustrating a situation in which the cells are operating in the same duplex mode.

In FIG. 20c, the PCell operates in the TDD mode 2121 with the downlink and uplink subframes determined according to the TDD UL-DL configuration #1. The SCell operates in the TDD mode 2122 with the downlink and uplink subframes determined according to the TDD UL-DL configuration #1.

If the PDSCH 2123 is transmitted at subframes #0 and #1 of the PCell 2121 and the PDSCH 2124 is transmitted at subframes #0 and #1 of the SCell 2122, the HARQ-ACKs corresponding to the PDSCHs 2123 and 2124 are multiplexed onto the PUCCH so as to be transmitted through the PCell or the SCell at subframe #7 as denoted by reference number 2125 or 2126.

At this time, whether to transmit the PUCCH through the PCell or the SCell may be determined by the cell which has determined the n(1)_PUCCH,i as the transmission resource to be determined when transmitting the PUCCH format 1b with channel selection or through the HARQ-ACK information or higher layer signaling according to an embodiment of the present invention.

The PUCCH transmission cell determination method is described in detail with reference to FIG. 22 or FIG. 24.

FIG. 20d is a diagram illustrating a situation in which the cells operating in different duplex modes coexist.

In FIG. 20d, the PCell operates in the TDD mode 2131 with the downlink and uplink subframes determined according to the TDD UL-DL configuration #1. The SCell operates in the FDD mode 2132 with a downlink frequency of $f_3$ and an uplink frequency $f_4$.

If the PDSCH 2133 is transmitted at subframes #0 and #1 of the PCell 2131 and the PDSCH 2134 is transmitted at subframes #0 and #1 of the SCell 2132, the HARQ-ACKs corresponding to the PDSCHs 2133 and 2134 are multiplexed onto the PUCCH so as to be transmitted through the PCell or the SCell at subframe #7 as denoted by reference number 2135 or 2136.

At this time, whether to transmit the PUCCH through the PCell or the SCell may be determined by the cell which has determined the n(1)_PUCCH,i as the transmission resource to be determined when transmitting the PUCCH format 1b with channel selection or through the HARQ-ACK information or higher layer signaling according to an embodiment of the present invention.

The PUCCH transmission cell determination method is described hereinafter in detail with reference to FIG. 22 or FIG. 24.

FIG. 22 is a diagram illustrating examples of determining PUCCH transmission cell using the configuration of the PUCCH format 1b with channel selection and transmitting the PUCCH according to the first embodiment of the present invention.

A description is made of FIG. 22a.

Suppose that the PCell 2201 (or 2211) is configured with a transmission mode for transmitting two codewords and the SCell 2202 (or 2212) is also configured with a transmission mode for transmitting two codewords in FIGS. 20a and 20b.

Also, suppose that it is configured to transmit PUCCH to the UE in the PUCCH format 1b with channel selection.

The PDSCH 2103 (or 2113) of the PCell and the PDCCH 2104 (or 2114) of the SCell are scheduled in the subframe #7 for transmission, and the HARQ-ACKs corresponding thereto are transmitted after 4 subframes, i.e. at the uplink subframe #1. At this time, the PUCCH transmission cell is determined as follows according to an embodiment of the present invention. The cell for use in transmitting PUCCH is determined based on the cell of which PDCCH is used to determine the resource for transmitting the PUCCH.

That is, PUCCH transmission cell determination method determines the cell in which the PDCCH determining the value of n(1)_PUCCH,i is transmitted as the PUCCH transmission cell. In more detail, n(1)_PUCCH,0 and n(1)_PUCCH,1 are determined based on the PDCCH of the PCell and n(1)_PUCCH,2 and n(1)_PUCCH,3 are determined based on the PDCCH of the SCell in FIG. 22a.

In FIG. 22a, the HARQ-ACKs corresponding to the 4 codewords are decoded by the UE to determine whether they carry ACK or NACK and then mapped to HARQ-ACK(0), HARQ-ACK(1), HARQ-ACK(2), and HARQ-ACK(3) in sequence to determine n(1)_PUCCH_i by referencing the table of FIG. 22a. At this time, the PUCCH is transmitted in the cell of which the PDCCH is used for determining the n(1)_PUCCH,i.

For example, if the decoding result of the UE shows ACK and NACK/DTX in correspondence to the two codewords transmitted through the PCell 201 (or 211) and ACK and ACK in correspondence to the two codewords transmitted through the SCell 202 (or 212), the UE performs HARQ-ACK transmission using the second row 2201 of the table. That is, 0 and 1 are mapped to the b(0)b(1) of n(1)_PUCCH,2 resource for PUCCH transmission. At this time, since n(1)_PUCCH,2 is determined based on the PDCCH of the SCell, the PUCCH should be transmitted through the SCell according to an embodiment of the present invention.

The eNB decodes the b(0)b(1)=0,1 on the n(1)_PUCCH,2 resource of the SCell so as to know that the UE has transmitted ACK, NACK/DTX, ACK, and ACK corresponding to the four codewords of the PCell and SCell.

FIG. 22a shows whether the PUCCH is transmitted through the PCell as denoted by reference number 2202 or the SCell as denoted by reference number 2203 depending on whether the n(1)_PUCCH,i is determined based on the PDCCH of the PCell or the PDCCH of the SCell.

Next, a description is made of FIG. 22b.

Suppose that the PCell 2121 (or 2131) is configured with a transmission mode for transmitting two codewords and the SCell 2122 (or 2132) is also configured with a transmission mode for transmitting two codewords in FIGS. 20c and 20d.

Also, suppose that it is configured to transmit PUCCH to the UE using the PUCCH format 1b with channel selection.

The PDSCH 2123 (or 2133) and the PDCCH 2124 (or 2134) are scheduled to be transmitted in the PCell and SCell respectively, and the HARQ-ACKs corresponding thereto are transmitted at the uplink subframe #7 in FIGS. 20c and 20d. At this time, the PUCCH transmission cell is determined as follows according to an embodiment of the present invention.

That is, the PUCCH transmission cell determination method determines the cell in which the PDCCH determining the value of n(1)_PUCCH,i is transmitted as the PUCCH transmission cell. In more detail, n(1)_PUCCH,0 and n(1)_PUCCH,1 are determined based on the PDCCH of the PCell and n(1)_PUCCH,2 and n(1)_PUCCH,3 are determined based on the PDCCH of the SCell in FIG. 22b.

In FIG. 22b, the HARQ-ACKs corresponding to the 4 codewords are decoded by the UE to determine whether they carry ACK or NACK and then mapped to HARQ-ACK(0), HARQ-ACK(1), HARQ-ACK(2), and HARQ-ACK(3) in the first and second subframes of the PCell and the first and second subframes of the SCell in sequence to determine n(1)_PUCCH_i by referencing the table of FIG. 22b.

At this time, the UE transmits the PUCCH in the cell of which the PDCCH is used for determining the n(1)_PUCCH,i according to an embodiment of the present invention.

For example, if the decoding result of the UE shows ACK and ACK in correspondence to the two codewords transmitted through the PCell 221 (or 231) and NACK/DTX and ACK in correspondence to the two codewords transmitted through the SCell 222 (or 232), the UE performs HARQ-ACK transmission using the third row 2211 of the table. That is, 1 and 0 are mapped to the b(0)b(1) of n(1)_PUCCH,0 resource for PUCCH transmission. At this time, since n(1)_PUCCH,0 is determined based on the PDCCH of the PCell, the PUCCH should be transmitted through the PCell.

The eNB decodes the b(0)b(1)=1,0 on the n(1)_PUCCH,0 resource of the PCell so as to know that the UE has transmitted ACK, ACK, NACK/DTX, and ACK corresponding to the four codewords of the PCell and SCell.

FIG. 22b shows whether the PUCCH is transmitted through the PCell as denoted by reference number 2212 or the SCell as denoted by reference number 2213 depending on whether the n(1)_PUCCH,i is determined based on the PDCCH of the PCell or the PDCCH of the SCell.

In the case of applying embodiment 3-1 of FIGS. 22a and 22b, it is shown that the PUCCH is transmitted through only one cell at an instant (subframe).

Since even the UE capable of transmitting PUCCH on two or more uplink carriers transmits the PUCCH through one cell at an instant, it is possible to reduce the PUCCH transmission power. In the viewpoint of the system, it is not necessary to configure double the PUCCH transmission resource for transmitting the PUCCHs of the PCell and SCell, and rather it is possible to transmit PUCCHs though the PCell and SCell in a distributed manner using the resource required for transmitting the PUCCHs through only the PCell.

Figure 23:
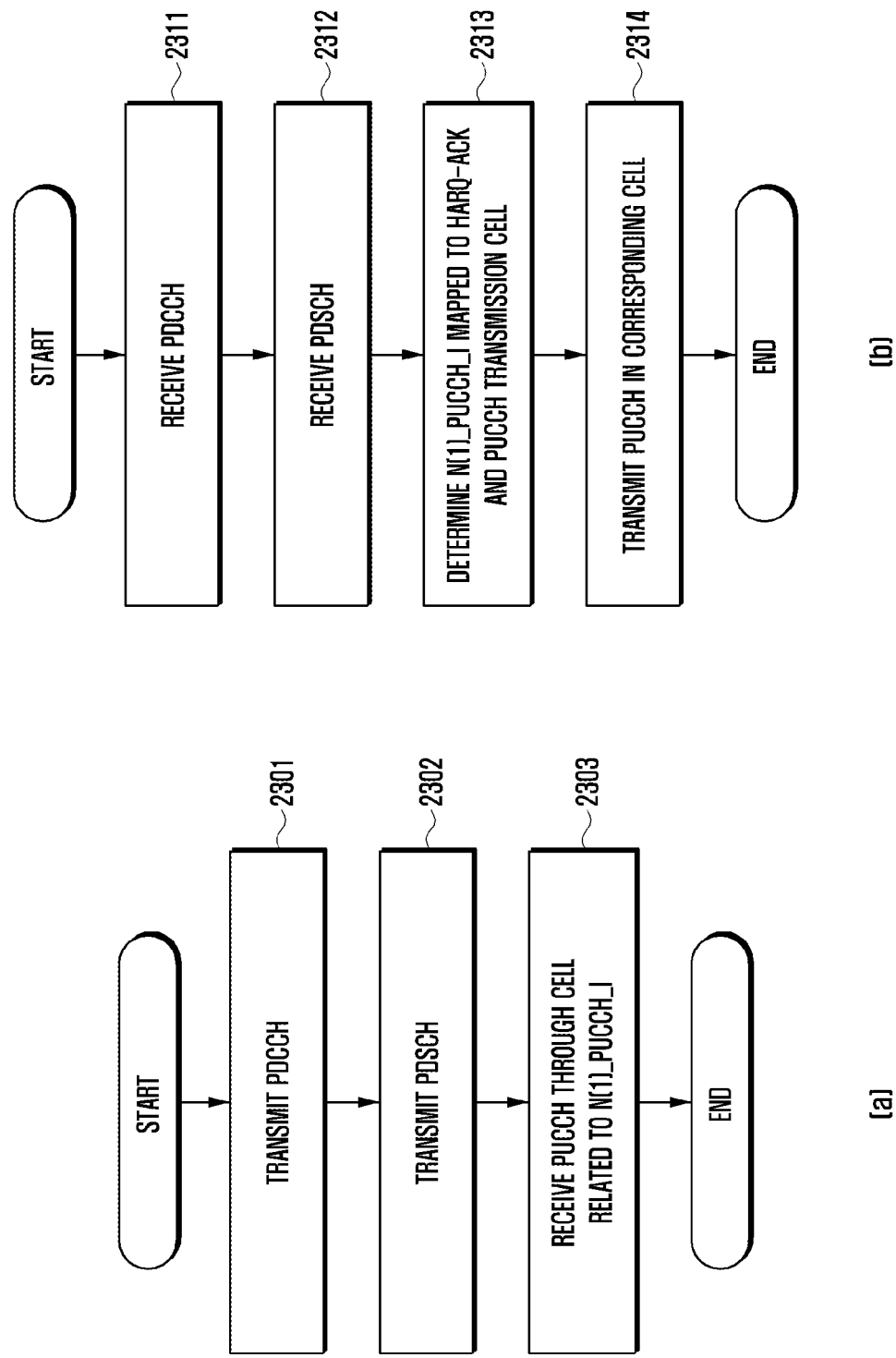
FIG. 23 shows flowcharts illustrating eNB and UE operations according to the first embodiment of the present invention.

FIG. 23 shows diagrams illustrating the eNB and UE operations according to embodiment 3-1 of the present invention.

In the eNB operation, the eNB transmits PDCCH to a UE at step 2301. The n(1)_PUCCH_i is determined based on PUCCH format 1b with channel selection from the PDCCH, and the PUCCH transmission cell is determined from the cell in which the PDCCH determining n(1)_PUCCH_i has been transmitted according to embodiment 3-1 of the present invention.

Next, the eNB transmits the PDSCH as scheduled by the PDCCH at step 2302.

Next, the eNB decodes the PUCCH received through the cell associated with n(1)_PUCCH_i into HARQ-ACK at step 2303. That is, the eNB may receive PUCCH from the cell which has transmitted PDCCH for use in determining n(1)_PUCCH_i.

In the UE operation, the UE receives PDCCH from the eNB at step 2311. The n(1)_PUCCH_i is determined by the PUCCH format 1b with channel selection from the PDCCH, and the PUCCH transmission cell is determined from the cell in which the PDCCH determining the n(1)_PUCCH_i has been transmitted according to the first embodiment of the present invention.

Next, the UE receives the PDSCH as indicated by the PDCCH at step 2312.

Next, the UE decodes the PDSCH to select HARQ-ACK based on the decoding result and determines n(1)_PUCCH_i mapped to the HARQ-ACK and PUCCH transmission cell associated with the n(1)_PUCCH_i at step 2313.

At step 2314, the PUCCH is transmitted through the PUCCH transmission cell determined at step 2313.

FIG. 24 shows examples of determining a PUCCH transmission cell using the PUCCH format 1b with channel selection and transmitting the PUCCH according to embodiment 3-2 of the present invention.

First, a description is made of FIG. 24a

Suppose that the PCell 2101 (or 2111) is configured with a transmission mode for transmitting two codewords and the SCell 2102 (or 2112) is also configured with a transmission mode for transmitting two codewords in FIGS. 20a and 20b.

Also, suppose that it is configured to transmit PUCCH to the UE in the PUCCH format 1b with channel selection.

The PDSCH 2103 (or 2113) of the PCell and the PDCCH 2104 (or 2114) of the SCell are scheduled in the subframe #7 for transmission, and the HARQ-ACKs corresponding thereto are transmitted after 4 subframes, i.e. at the uplink subframe #1. At this time, the PUCCH transmission cell is determined as follows according to an embodiment of the present invention.

That is, the PUCCH transmission cell determination method determines the cell in which the PDCCH determining the value of n(1)_PUCCH,i is transmitted as the PUCCH transmission cell. In more detail, n(1)_PUCCH,0 and n(1)_PUCCH,1 are determined based on the PDCCH of the PCell and n(1)_PUCCH,2 and n(1)_PUCCH,3 are determined based on the PDCCH of the SCell in FIG. 24a.

However, the eNB may configure the UE to transmit PUCCH through the PCell in the case that n(1)_PUCCH,0 is selected and through the SCell in the case that n(1)_PUCCH,2 or n(1)_PUCCH,3 is selected, through higher layer signaling.

For example, the eNB configured the UE to transmit PUCCH through the PCell only for n(1)_PUCCH,0 by transmitting a 4-bit information "0111" (or "1000") through higher layer signaling.

In FIG. 24, the HARQ-ACKs corresponding to the 4 codewords are decoded by the UE to determine whether they carry ACK or NACK and then mapped to HARQ-ACK(0), HARQ-ACK(1), HARQ-ACK(2), and HARQ-ACK(3) in sequence to determine n(1)_PUCCH_i by referencing the table of FIG. 24. At this time, the PUCCH is transmitted in the cell which is indicated by the n(1)_PUCCH,I to transmit PUCCH according to an embodiment of the present invention.

For example, if the decoding result of the UE shows ACK and NACK/DTX in correspondence to the two codewords transmitted through the PCell 2101 (or 2111) and ACK and ACK in correspondence to the two codewords transmitted through the SCell 2102 (or 2112), the UE performs HARQ-ACK transmission using the second row 2401 of the table. That is, 0 and 1 are mapped to the b(0)b(1) of n(1)_PUCCH,2 resource for PUCCH transmission. At this time, since n(1)_PUCCH,2 is configured to transmit PUCCH in the PCell through higher layer signaling, the PUCCH should be transmitted in the SCell.

The eNB decodes the b(0)b(1)=0,1 on the n(1)_PUCCH,2 resource of the SCell so as to know that the UE has transmitted ACK, NACK/DTX, ACK, and ACK corresponding to the four codewords of the PCell and SCell.

FIG. 24a shows whether the PUCCH is transmitted through the PCell as denoted by reference number 2402 or the SCell as denoted by reference number 2403 according to the n(1)_PUCCH,i configured through higher layer signaling.

Next, a description is made of FIG. 24b

Suppose that the PCell 2121 (or 2131) is configured with a transmission mode for transmitting one codeword and the SCell 2122 (or 2122) is also configured with a transmission mode for transmitting one codeword in FIGS. 20c and 20d. Also, suppose that it is configured to transmit PUCCH to the UE using the PUCCH format 1b with channel selection.

The PDSCH 2123 (or 2133) and the PDCCH 2124 (or 2134) are scheduled to be transmitted in the PCell and SCell respectively, and the HARQ-ACKs corresponding thereto are transmitted at the uplink subframe #7 in FIGS. 20c and 20d. At this time, the PUCCH transmission cell is determined as follows according to an embodiment of the present invention.

Although the value of n(1)_PUCCH,I is determined based on the PDCCH, the PUCCH transmission cell associated with n(1)_PUCCH,I is determined through higher layer signaling.

In more detail, n(1)_PUCCH,0 and n(1)_PUCCH,1 are determined based on the PDCCH of the PCell and n(1)_PUCCH,2 and n(1)_PUCCH,3 are determined based on the PDCCH of the SCell in FIG. 24b.

However, the eNB may configure the UE through higher layer signaling to transmit the PUCCH through the PCell in the case that n(1)_PUCCH,0 is selected and through the SCell in the case that n(1)_PUCCH,1, n(1)_PUCCH,2, or n(1)_PUCCH,3 is selected.

For example, it may be configured to transmit PUCCH through the PCell only for n(1)_PUCCH,0 by transmitting a 4-bit information "0111" (or "1000") through higher layer signaling.

In FIG. 24b, the HARQ-ACKs corresponding to the 4 subframes are decoded by the UE to determine whether they carry ACK or NACK and then mapped to HARQ-ACK(0), HARQ-ACK(1), HARQ-ACK(2), and HARQ-ACK(3) in the order of the first and second subframes of the PCell and the first and second subframes of the SCell to determine n(1)_PUCCH_i in the table of FIG. 24b. At this time, the PUCCH is transmitted in the cell which is indicated by the n(1)_PUCCH,i configured to transmit PUCCH through higher layer signaling according to an embodiment of the present invention.

For example, if the decoding result of the UE shows ACK and ACK in correspondence to the two subframes transmitted through the PCell 221 (or 231) and NACK/DTX and ACK in correspondence to the two subframes transmitted through the SCell 222 (or 232), the UE performs HARQ-ACK transmission using the third row 2411 of the table. That is, 0 and 1 are mapped to the b(0)b(1) of n(1)_PUCCH,0 resource for PUCCH transmission. At this time, since n(1)_PUCCH,0 is configured to transmit PUCCH in the PCell through higher layer signaling, the PUCCH should be transmitted in the SCell.

The eNB decodes the b(0)b(1)=1,0 on the n(1)_PUCCH,0 resource of the PCell so as to know that the UE has transmitted ACK, ACK, NACK/DTX, and ACK corresponding to the four subframes of the PCell and SCell.

FIG. 24b shows whether the PUCCH is transmitted through the PCell as denoted by reference number 2412 or the SCell as denoted by reference number 2413 according to the n(1)_PUCCH,i configured through higher layer signaling.

In the case of applying embodiment 3-2 of FIGS. 24a and 24b, it is shown that the PUCCH is transmitted through only one cell at an instant (subframe).

Since even the UE capable of transmitting PUCCH on two or more uplink carriers transmits the PUCCH through one cell at an instant, it is possible to reduce the PUCCH transmission power. In the viewpoint of the system, it is not necessary to configure double the PUCCH transmission resource for transmitting the PUCCHs of the PCell and SCell, and rather it is possible to transmit PUCCHs though the PCell and SCell in a distributed manner using the resource required for transmitting the PUCCHs through only the PCell.

Figure 25:
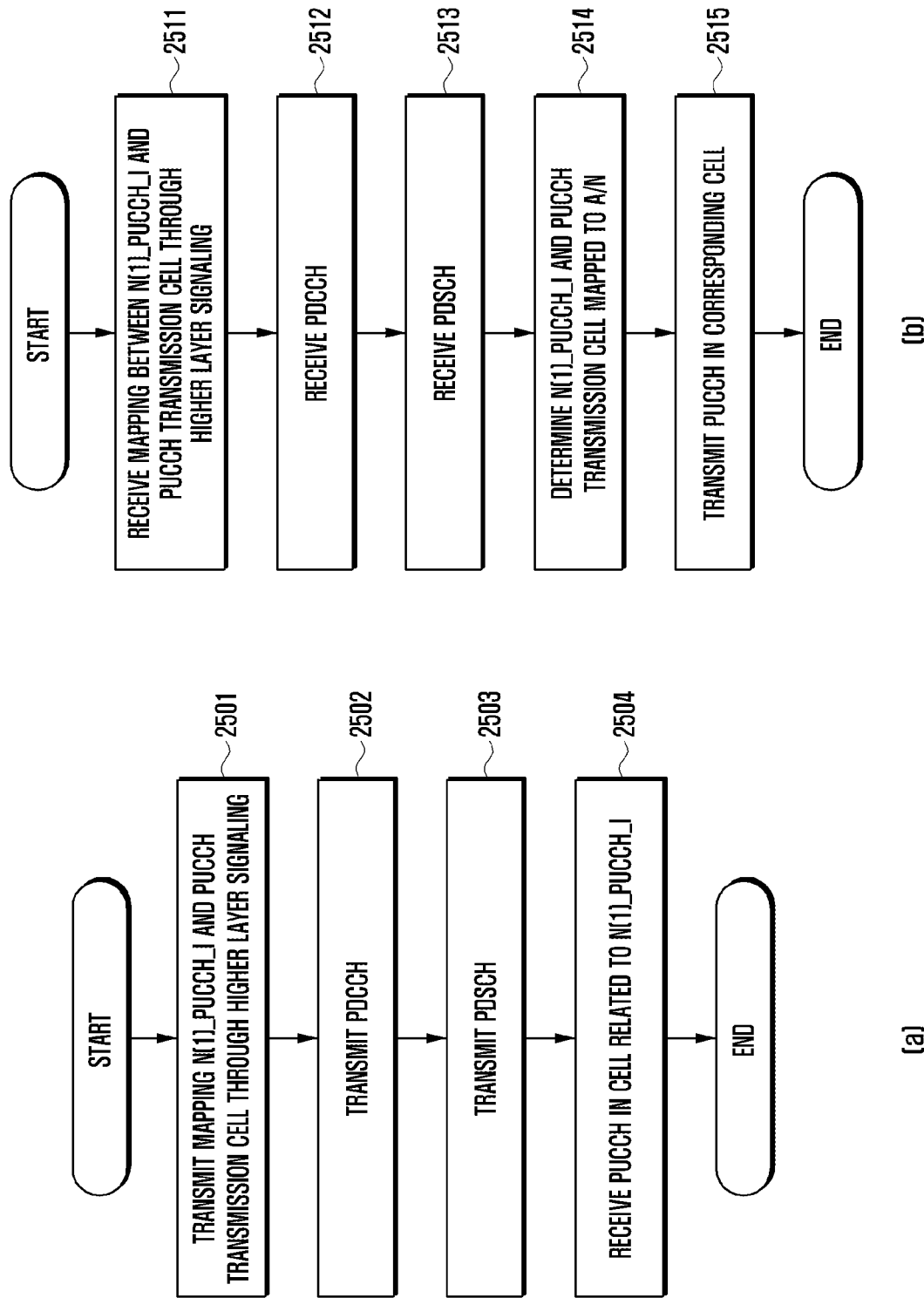
FIG. 25 shows flowcharts illustrating eNB and UE operations according to the second embodiment of the present invention.

FIG. 25 shows diagrams illustrating the eNB and UE operations according to the second embodiment of the present invention.

In the eNB operation, the eNB transmits mapping between n(1)_PUCCH_i and PUCCH transmission cell to the UE through higher layer signaling at step 2501. In the case of transmitting only the n(1)_PUCCH_0 of PUCCH through the PCell as an example of embodiment 3-2 of the present invention in FIG. 24, the 4-bit information of "0111" (or "1000") may be transmitted through higher layer signaling.

Next, the eNB transmits PDCCH to the UE at step 2502. The n(1)_PUCCH_i is determined in the PUCCH format 1b with channel selection from the PDCCH.

Next, the eNB transmits PDSCH as scheduled by PDCCH at step 2503.

Next, the eNB decodes the PUCCH received through the cell associated with n(1)_PUCCH_i (e.g. the cell indicated through higher layer signaling) into HARQ-ACK at step 2504.

In the UE operation, the UE receives the mapping between the n(1)_PUCCH_i and the PUCCH transmission cell from the eNB through higher layer signaling at step 2511. In the case of transmitting only the n(1)_PUCCH_0 of PUCCH through the PCell as an example of embodiment 3-2 of the present invention in FIG. 24, the 4-bit information of "0111" (or "1000") may be transmitted through higher layer signaling.

Next, the UE receives the PDCCH from the eNB at step 2512. The n(1)_PUCCH_i is determined in the PUCCH format 1b with channel selection from the PDCCH.

Next, the UE receives PDSCH as indicated by the PDCCH at step 2513.

Next, the UE decodes PDSCH and selects the HARQ-ACK based on the decoding result to determine the n(1)_PUCCH_i mapped to the HARQ-ACK and then determines the PUCCH transmission cell associated with the n(1)_PUCCH_i at step 2514. At step 2515, the UE transmits the PUCCH through the PUCCH transmission cell determined at step 2514.

Figure 26:
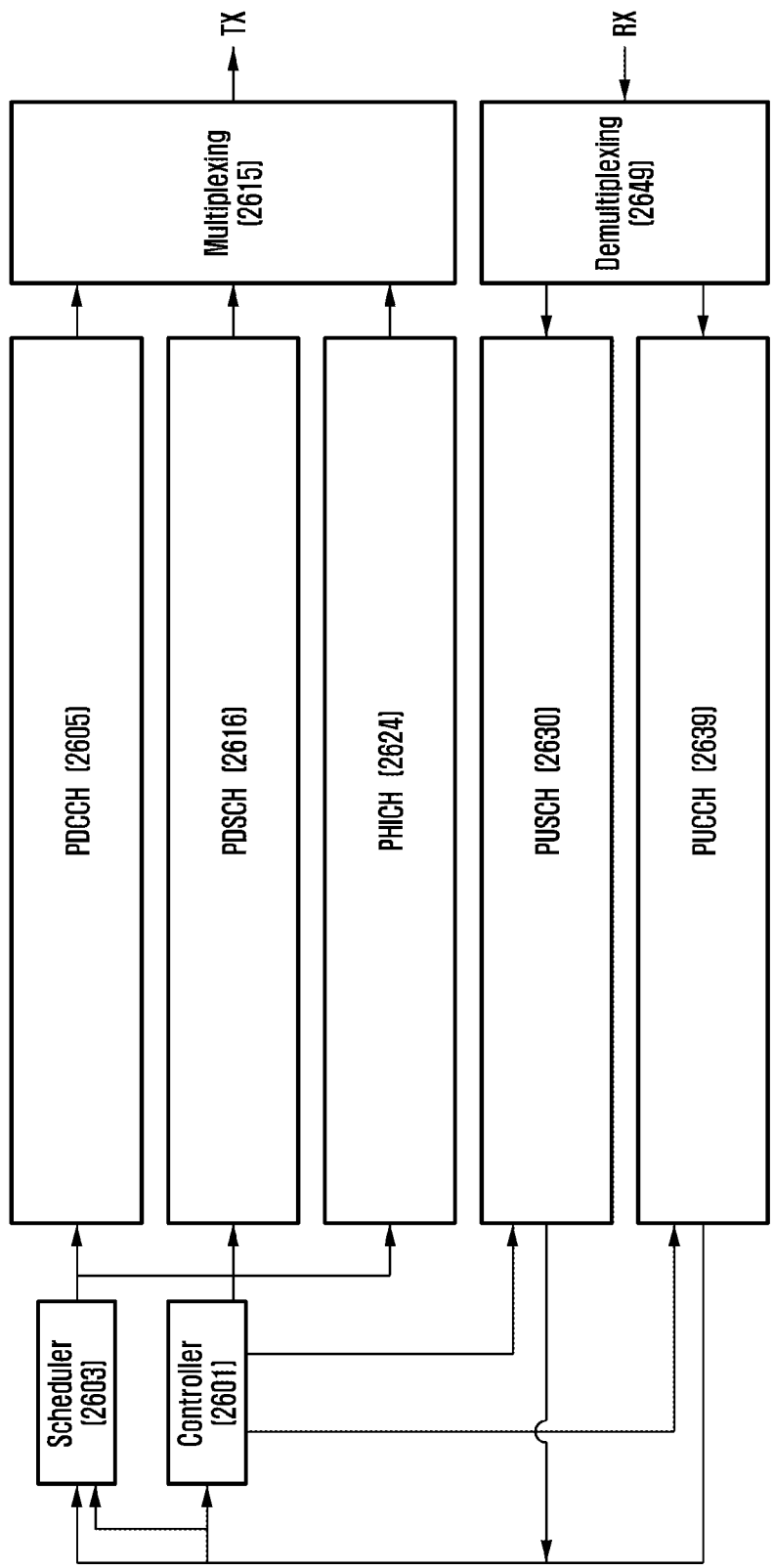
FIG. 26 is a diagram illustrating an eNB apparatus according to an embodiment of the present invention.

FIG. 26 is a diagram illustrating the eNB apparatus according to an embodiment of the present invention.

Referring to FIG. 26, the eNB apparatus includes a transmitter having a PDCCH block 2605, a PDSCH block 2616, a PHICH block 2624, and a multiplexer 2615; a receiver having a PUSCH block 2630, a PUCCH block 2639, and a demultiplexer 2649; a controller 2601 for controlling DL/UL HARQ transmission/reception timings and the PUCCH transmission cell; and a scheduler 2603.

Here, it is assumed that the DL/UL HARQ-ACK transmission/reception timings include the timing of transmitting PUCCH corresponding to the PDSCH and the eNB operation for PUCCH transmission determination according to the present invention. Although there are a plurality of transmitters and receivers for transmission/reception through multiple cells, the description is made under the assumption that there is one transmitter and one receiver for explanation convenience.

The controller 2601 which controls DL/UL HARQ-ACK transmission/reception and determines the PUCCH transmission cell adjusts the timing relationships among the physical channels for the use to be scheduled based on the data amount to be transmitted to the UE and the resource amount available in the system and notifies the adjustment result to the scheduler 2603, PDCCH block 2605, PDSCH block 2616, PHICH block 2624, PUSCH block 2630, and PUCCH block 2639.

The DL/UL HARQ-ACK transmission/reception timing and PUCCH transmission cell are determined according to the method described in the above embodiments. The PDCCH block 2605 configures the control information under the control of the scheduler 2603, and the control information is multiplexed with other signals at the multiplexer 2615.

The PDSCH block 2616 generates data under the control of the scheduler 2603, and the data are multiplexed with other signals at the multiplexer 2615.

The PHICH block 2624 generates HARQ ACK/NACK corresponding to the PUSCH received from the UE under the control of the scheduler 2603. The HARQ ACK/NACK is multiplexed with other signals at the multiplexer 2615.

The multiplexed signals are processed into an OFDM signal so as to be transmitted to the UE.

The PUSCH block 2630 of the receiver acquires PUSCH data from the received signal. It notifies the scheduler 2603 of the presence/absence of error in the decoding result of the PUSCH data to adjust the downlink HARQ ACK/NACK generation and sends the information on the presence/absence of error in the decoding result to the controller 2601 which controls the DL/UL HARQ-ACK transmission/reception timing so as to adjust the DL HARQ ACK/NACK transmission timing.

The PUCCH block 2639 acquires uplink ACK/NACK or CQI from the signal transmitted by the UE in the PUCCH transmission cell according to the DL/UL HARQ-ACK transmission/reception timing. The acquired uplink ACK/NACK or CQI is sent to the scheduler 2603 for use in determining whether to retransmit PDSCH and Modulation and Coding Scheme (MCS). The acquired uplink ACK/NACK is sent to the controller 2601 for use in adjusting the PDSCH transmission timing.

Although the above description is directed to an exemplary case where the eNB is comprised of a plurality of blocks responsible of different functions, the configuration of the eNB is not restricted thereto. For example, the controller 2601 may perform the functions on behalf of the respective blocks.

In this case, the controller 2601 may control to receive PUCCH from the cell which has transmitted PDCCH for use in determining n(1)_PUCCH_i according to an embodiment of the present invention. In a case of mapping the n(1)_PUCCH_i to the PUCCH transmission cell for transmission to the UE or transmitting only n(1)_PUCCH_0 to the PCell through PUCCH according to another embodiment of the present invention, the controller 2601 may control to transmit the bit information of "0111" (or "1000") through higher layer signaling. Next, the controller 2601 may control to receive the PUCCH from the cell based on the higher layer signal transmitted to the UE.

Figure 27:
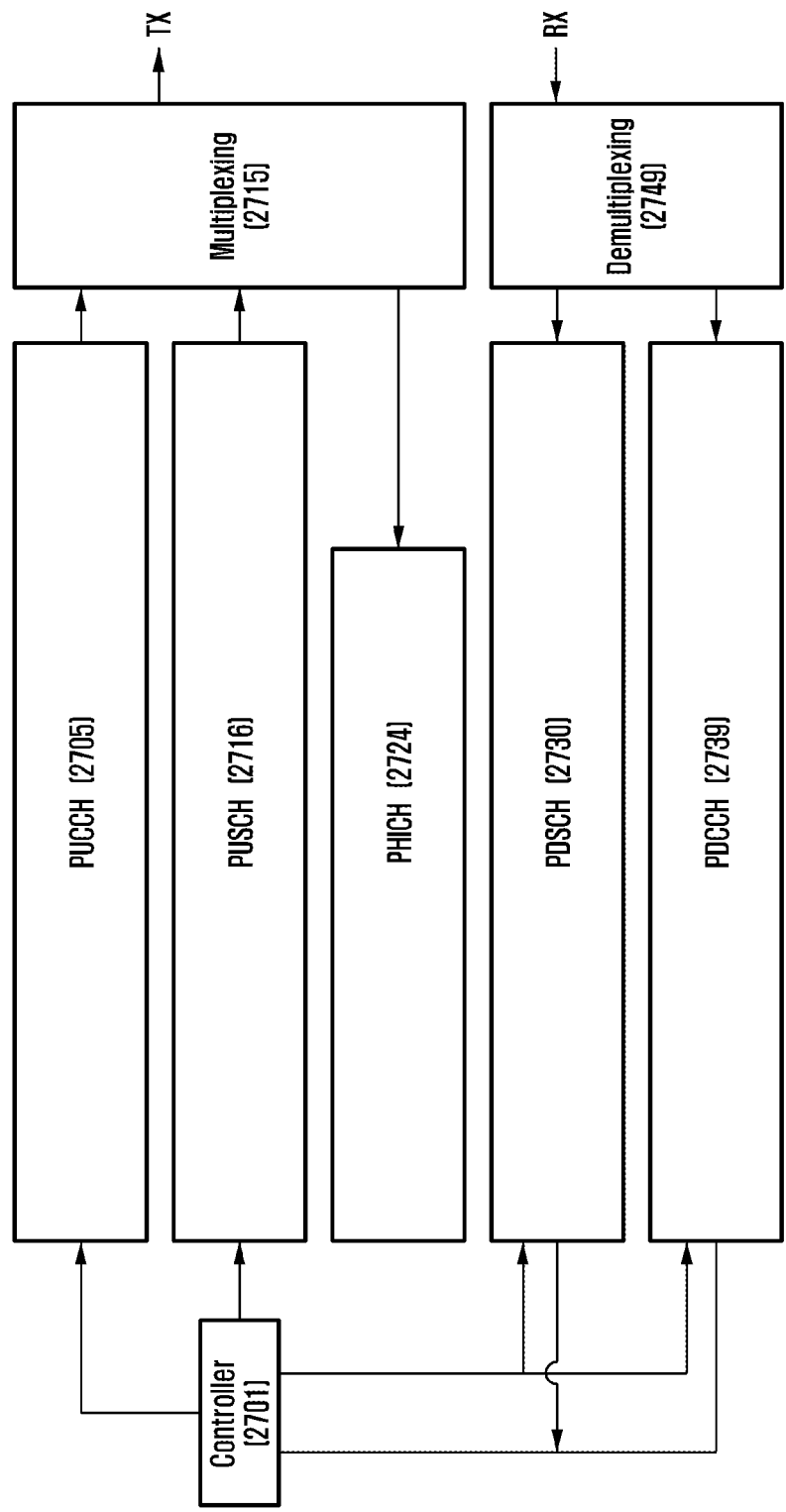
FIG. 27 is a diagram illustrating a UE apparatus according to an embodiment of the present invention.

FIG. 27 is a diagram illustrating the UE apparatus according to an embodiment of the present invention.

Referring to FIG. 27, the UE includes a transmitter having a PUCCH block 2705, a PUSCH block 2716, and a multiplexer 2715; a receiver having a PHICH block 2724, a PDSCH block 2730, a PDCCH block 2739, and a demultiplexer 2749; and a controller 2701 for determining the PUCCH transmission cell by receiving downlink data from the two eNBs according to the present invention. Although there are a plurality of transmitters and receivers (excluding the PUCCH block) for communication with the two eNBs through a plurality of cells, the description is made under the assumption that there are is transmitter and one receiver for explanation convenience.

The controller 2701 which determines the PUCCH transmission cell and whether to perform PUCCH transmission according to the present invention notifies the PUCCH block 2705, PDSCH block 2730, and PDCCH block 2739 of the eNB and the cell for receiving PDCCH in self-scheduling or cross carrier scheduling based on the DCI received from the eNB. The PUCCH transmission cell is determined according to the method described in the embodiments of the present invention.

The PUCCH block 2705 configures HARQ ACK/NACK or CQI into Uplink Control Information (UCI) under the control of the controller 2701 which controls storing downlink data in the soft buffer, and the HARQ ACK/NACK or CQI is multiplexed with other signals at the multiplexer 2715 and then transmitted through the PUCCH transmission cell determined according to the present invention.

The PUSCH block 2716 extracts data to be transmitted, and the extracted data are multiplexed with other signals at the multiplexer 2715.

The multiplexed signals are processed into the Single Carrier Frequency Division Multiple Access (SC-FDMA) signal so as to be transmitted to the eNB.

The PHICH block 2724 of the receiver separates the PHICH signal from the signal transmitted by the eNB according to the DL/UL HARQ-ACK transmission/reception timing by means of the demultiplexer 2749 and then acquires HARQ ACK/NACK corresponding to the PUSCH.

The PDSCH block 2730 separates the PDSCH signal from the signal transmitted by the eNB through the demultiplexer 2749, acquires PDSCH data, and notifies the PUCCH block 2705 of the presence/absence of error in the decoding result to generate uplink HARQ ACK/NACK and sends the presence/absence of error in the decoding result to the controller 2701 to adjust the timing for transmitting uplink HARQ ACK/NACK.

The PDCCH block 2739 separates the PDCCH signal through the demultiplexer 2749 and performs DCI format decoding to acquire DCI from the decoded signal.

Although the above description is directed to an exemplary case where the UE is comprised of a plurality of blocks responsible of different functions, the configuration of the UE is not restricted thereto. For example, the controller 2701 may perform the functions on behalf of the respective blocks.

In this case, the controller 2701 may control to transmit PUCCH through the cell which transmits PDCCH for use in determining n(1)_PUCCH_i according to an embodiment of the present invention. The controller 2701 may also control to receive the information on the mapping between n(1)_PUCCH_i and PUCCH transmission cell through higher layer signaling according to another embodiment of the present invention. In this case, if the eNB is configured to transmit only n(1)_PUCCH_0 through the PCell, the bit information in the form of "0111" ("1000") may be received through higher layer signaling. Next, the controller 2701 may control to transmit PUCCH through the cell determined through higher layer signaling.

According to the above embodiment of the present invention, it may be possible to transmit the uplink feedback of the PCell and SCell while reducing resource waste.

Fourth Embodiment

A description is made of the massive antenna channel measurement method and apparatus according to an embodiment of the present invention.

The fourth embodiment of the present invention relates to a normal radio mobile communication system and, in particular, to a channel status information transmission/reception method for a UE to measure radio channel quality and report measurement result to an eNB in a wireless mobile communication system based on a multiple access scheme using multi-carrier such as Orthogonal Frequency Division Multiple Access (OFDMA). Also, the present invention relates to a system in which an eNB communicates with a UE using one or more antennas.

Particularly, the fourth embodiment of the present invention relates to a method for configuring resources for use by the UE in measuring antenna channels and transmitting the configuration information to the UE in order for the UE to measure and report measurement result in a wireless communication system using a few dozen or more antennas.

Figure 28:
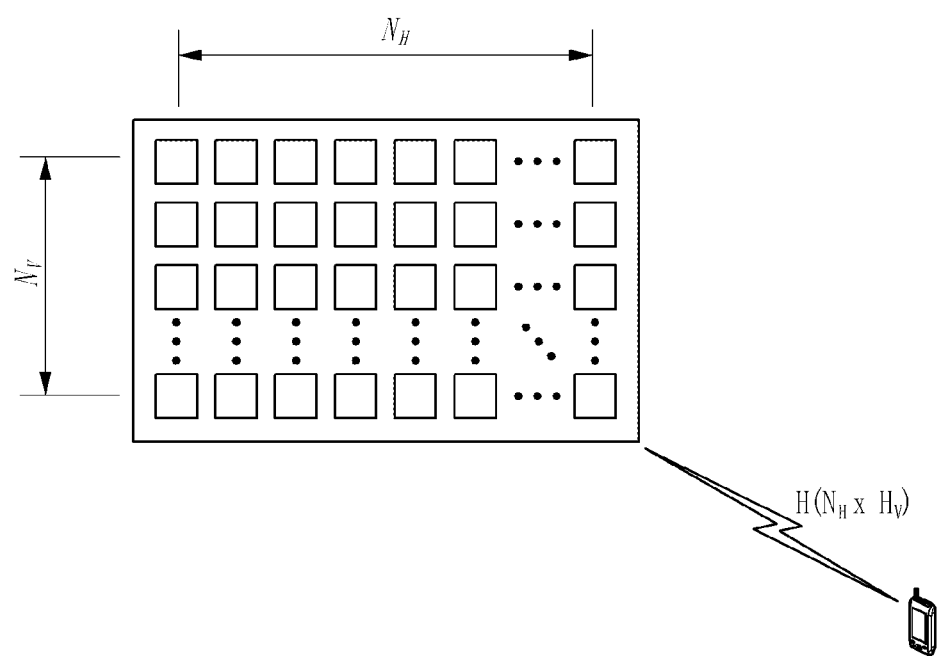
FIG. 28 is a diagram illustrating a massive antenna system of the present invention.

FIG. 28 is a diagram illustrating a communication system to which the fourth embodiment of the present invention is applied.

In FIG. 28, the eNB transmission apparatus transmits a radio signal using a few dozen or more transmit antennas. The plurality of antennas are arranged at a regular interval as illustrated in FIG. 28. The interval may correspond to a multiple of half the wavelength of the radio signal. Typically in the case of maintaining the distance of a multiple of half the wavelength of the radio signal, the signals transmitted by the respective transmit antennas are influenced by the radio channels with low correlation. As the distance between the transmit antennas increases, the correlation between the signals becomes weak.

The eNB transmission apparatus with massive antennas is implemented such that the antennas are arranged 2-dimensionally as illustrated in FIG. 28 to prevent the apparatus size from increasing significantly. In this case, the eNB transmits a signal using the $N_H$ antennas arranged on the horizontal axis and $N_V$ antennas arranged on the vertical axis, and the UE has to measure the channels corresponding to the antennas.

In FIG. 28, a few dozen or more transmit antennas arranged on the eNB transmission apparatus are used to transmit signals to one or more UEs. The signals are precoded so as to be transmitted to a plurality of UEs simultaneously by means of the multiple transmit antennas. At this time, a UE may receive one or more information streams.

Typically, the number of information streams which a UE receives is determined based on the number of receive antenna of the UE and channel condition.

In order to implement an MIMO system effectively, the UE has to measure the channel condition and transmit channel status information based thereon to the eNB. The eNB determines the UEs for downlink transmissions, data rates for the downlink transmissions, and precoding to be applied to the downlink transmissions based on the received channel status information.

In the case of a Full Dimension-MIMO_(FD-MIMO) system, if the channel status information transmission/reception method of the legacy LTE/LTE-A system is applied thereto, a large amount of control information has to be transmitted in uplink, resulting in uplink overhead problem.

The mobile communication system is constrained in resources such as time, frequency, and power. Thus, as the resource allocated for the reference signal increases, the resource allocated for the traffic channel (data traffic channel) transmission decreases, resulting in reduction of absolute data transmission amount. Although this improves the channel measurement and estimation performance, the reduction of absolute data transmission amount is likely to degrade the entire system throughput.

There is therefore a need of allocating the reference signal resource and traffic channel transmission resource appropriately to optimize the entire system throughput.

Figure 29:
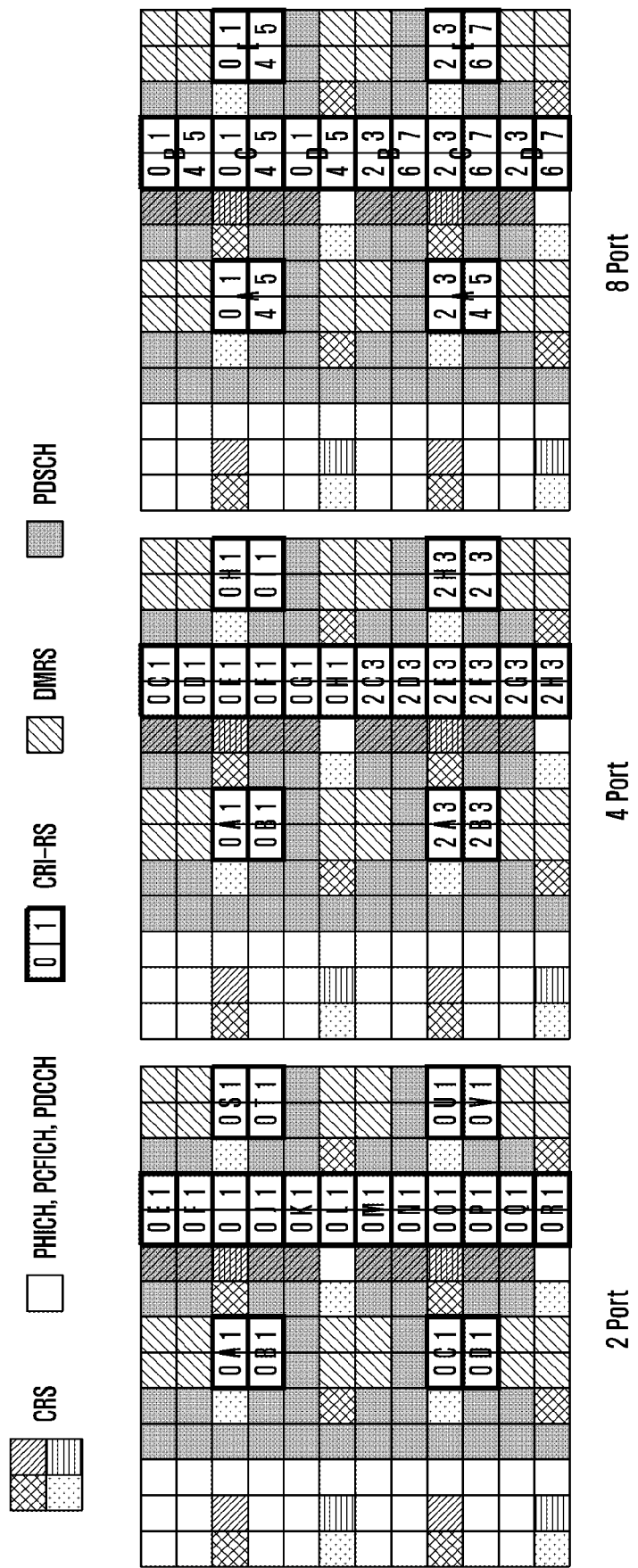
FIG. 29 is a diagram illustrating a small size antenna channel measurement resource in the present invention.

FIG. 29 is a diagram illustrating a radio resource of one subframe and one RB as a smallest unit for downlink scheduling in the LTE/LTE-A system.

The radio resource depicted in FIG. 29 consists of one subframe on the time axis (horizontal axis in the drawing) and one RB on the frequency axis (vertical axis in the drawing). The radio resource is composed of 12 subcarriers in frequency domain and 14 OFDM symbols in time domain, resulting in 168 unique time-frequency positions. In LTE/LTE-A, each time-frequency position of FIG. 29 is called Resource Element (RE).

As illustrated in FIG. 29, the radio resource can be configured to transmit different types of signals as follows.

CRS (Cell Specific RS): Reference signal transmitted periodically for all UEs within a cell and used commonly by a plurality of UEs.

DMRS (Demodulation Reference Signal): Reference signal for a specific UE transmitted only when the data for the corresponding UE is present. The DMRS may be composed of up to 8 DMRS ports. In LTE/LTE-A, ports 7 to 14 are DMRS ports which maintain orthogonality through CDM or FDM to avoid interference to each other.

DSCH (Physical Downlink Shared Channel): Data channel transmitted in downlink which the eNB uses to transmit data to the UE and mapped to REs not used for reference signal transmission in data region of FIG. 29

CSI-RS (Channel Status Information Reference Signal): Reference signal transmitted to the UEs within a cell and used for channel state measurement. Multiple CSI-RSs can be transmitted within a cell.

Other control channels (PHICH, PCFICH, PDCCH): Channels for providing control information necessary for the UE to receive PDSCH and transmitting HARQ ACK/NACK corresponding to uplink data transmission.

In addition to the above signals, muting may be configured in order for the UEs within the corresponding cells to receive the CSI-RSs transmitted by different eNBs in the LTE-A system. The muting can be mapped to the positions designated for CSI-RS, and in general the UE receives the traffic signal skipping the corresponding radio resource. In the LTE-A system, muting is referred to as zero power CSI-RS (ZP CSI-RS). The muting by nature is mapped to the CSI-RS position without transmit power allocation.

In FIG. 29, the CSI-RS can be transmitted at some of the positions marked by A, B, C, D, E, F, G, H, I, and J according to the number of antennas transmitting CSI-RS. Also, the zero power CSI-RS (muting) can be mapped to some of the positions A, B, C, D, E, F, G, H, I, and J. The CSI-RS can be mapped to 2, 4, or 8 REs according to the number of the antenna ports for transmission. For two antenna ports, half of a specific pattern is used for CSI-RS transmission; for four antenna ports, one entire specific pattern is used for CSI-RS transmission; and for eight antenna ports, two patterns are used for CSI-RS transmission. Meanwhile, muting is always performed by pattern. That is, although the muting may be applied to plural patterns, if the muting positions mismatch CSI-RS positions, it cannot be applied to one pattern partially. However, if the CSI-RS positions match the zero power CSI-RS (muting) positions, the muting can be applied to a part of one pattern.

In the case of transmitting the CSI-RS for two antenna ports, the antenna port-specific signals are mapped to two REs consecutive on the time axis and distinguished from each other by an orthogonal code. In the case of transmitting the CSI-RS for four antenna ports, two REs are added for transmitting the antenna port-specific signals in the same way as the case of transmitting the CSI-RS for two antenna ports. Likewise, the CSI-RS for eight antenna ports are transmitted in the same way.

In a cellular system, the eNB has to transmit the reference signal to the UE for downlink channel state measurement. In the case of the 3GPP LTE-A system, the UE measures the channel state between the eNB and itself using the CSI-RS transmitted by the eNB. The channel state is measured in consideration of a few factors including downlink interference. The downlink interference includes the interference caused by the antennas of neighbor eNBs and thermal noise that are important in determining the downlink channel condition. In an exemplary case where the eNB with one transmit antenna transmits the reference signal to the UE with one receive antenna, the UE has to determine energy per symbol that can be received in downlink and interference amount that may be received for the duration of receiving the corresponding symbol to determine energy per symbol to interference density ratio (Es/Io). The Es/Io is converted to data rate or a value corresponding thereto and reported to the eNB in the form of Channel Quality Indicator (CQI) for use at the eNB in determining the downlink data rate for the UE.

In the case of the LTE-A system, the UE transmits downlink channel state information to the eNB for use in downlink scheduling. That is, the UE measures the reference signal transmitted by the eNB and transmits the measurement result to the eNB in the form of feedback information. In the LTE/LTE-A system, the UE transmits three feedback informations as follows.

Rank Indicator (RI): The number of spatial layers which can be supported by the UE under current channel conditions.

Precoder Matrix Indicator (PMI): The precoding matrix suitable for the UE under current channel condition Channel Quality Indicator (CQI): The maximum data rate available at the UE under current channel conditions. The CQI may be substituted by maximum error correction code rate and modulation scheme, data efficiency per frequency or SINR which can be used similarly instead of the maximum data rate.

The RI, PMI, and CQI are associated among each other in defining meaning. For example, the precoding matrix supported in LTE/LTE-A is configured differently per rank. Accordingly, the PMI value is interpreted differently depending on whether the RI is set to 1 or 2. In addition, when determining CQI, the UE assumes that the PMI and RI which the UE has reported are applied by the eNB. For example, if the UE reports RI_X, PMI_Y, and CQI_Z, this means that the UE is capable of receiving the signal at the data rate corresponding to CQI_Z when the rank RI_X and the precoding matrix PMI_Y are applied. In this way, the UE calculates CQI with which the optimal performance is achieved in real transmission under the assumption of the transmission mode to be selected by the eNB.

The eNB with the massive antennas has to configure the resource for measurement of 8 or more antenna channels at the UE and, although there are up to 48 available REs as illustrated in FIG. 29, one cell can actually use up to 8 REs. Accordingly, in order to inform the channel measurement resource of the eNB which uses 64 antennas or more than 100 antennas, it is necessary to secure additional resource.

A description is made hereinafter of the method for determining information related to PRB for transmitting the CSI-RS (e.g. number of PRBs) based on the antenna port information (e.g. number of antenna ports).

For example, the number of PRBs for transmitting the CSI-RS may increase in proportion to the number of antenna ports. In this case, the eNB may configure the number of antenna ports to the UE through higher layer signaling or physical layer signaling.

It should be noted that the aforementioned characteristics are applicable to part or all of the embodiments to be described hereinafter.

Embodiment 4-1

First, the proposed embodiment 4-1 is directed to a method of transmitting up to 8 antenna channel measurement reference signals per PRB, 8 reference signals being cyclic in the PRB.

Figure 30:
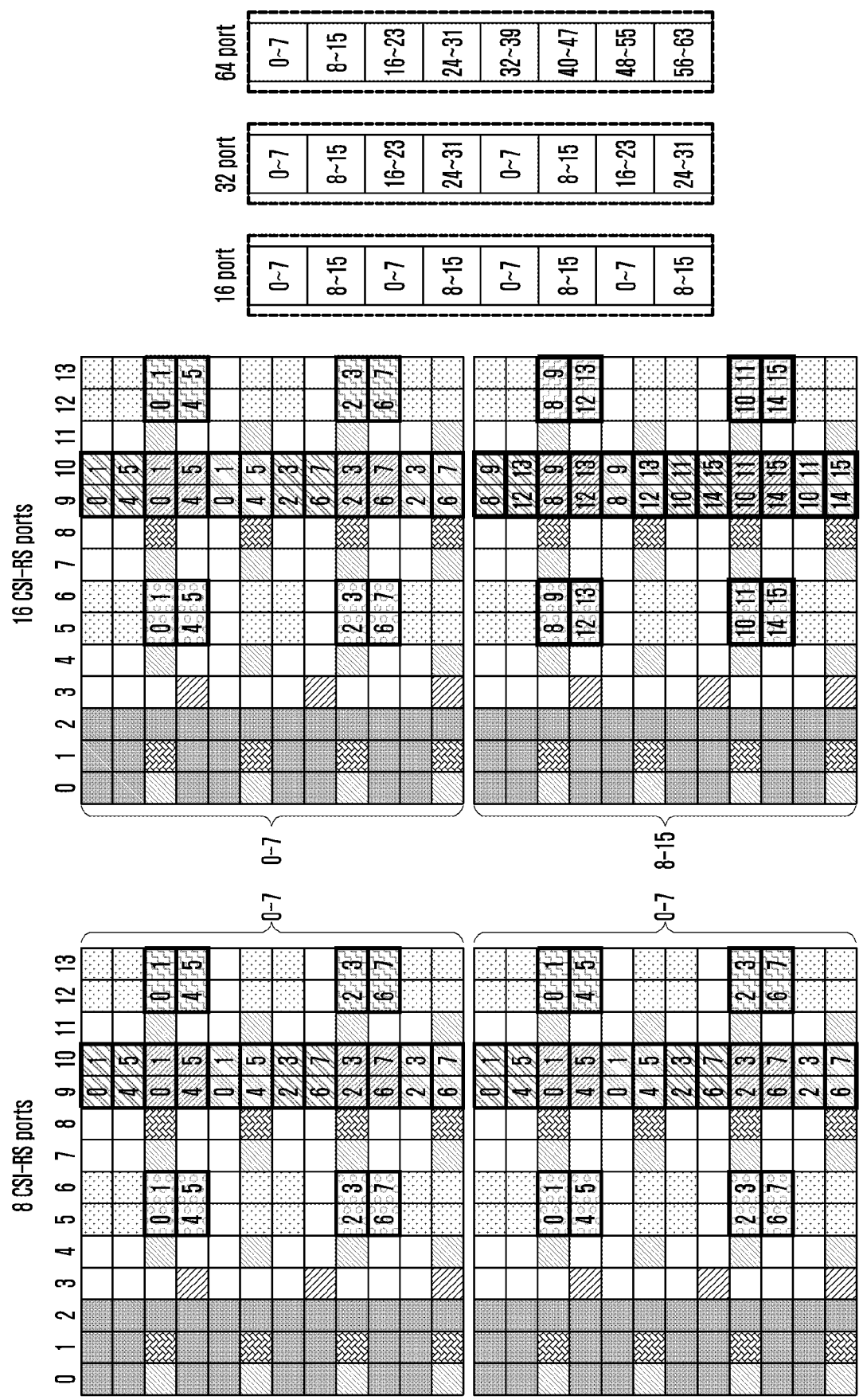
FIG. 30 is a diagram illustrating channel measurement resource according to the first embodiment of the present invention.

Embodiment 4-1 is described with reference to FIG. 30. FIG. 30 is a diagram illustrating channel measurement resources according to embodiment 4-1 of the present invention.

As shown in FIG. 30, in an exemplary case of transmitting 8 channel measurement reference signals, it may be possible to transmit 8 channel measurement reference signals at every PRB.

Meanwhile, in the case of transmitting 16 channel measurement reference signals, it can be considered to transmit channel measurement reference signals 0 to 7 in the first PRG and channel measurement reference signals 8 to 15 in the second PRB. That is, the first group of channel measurement reference signals is transmitted in the first PRB, and the second group of channel measurement reference signals is transmitted in the second PRB.

Here, the first and second PRBs may have successive indices. The first and second PRBs may also have discrete indices.

In the case of transmitting 32 or 64 channel measurement reference signals, the CSI-RSs may cyclically be shifted in at least one PRB as shown in FIG. 30.

The proposed method is advantageous in terms of transmitting a large number of channel measurement reference signals without extra overhead on the legacy CSI-RS resource.

Since the transmission ports of all antennas are arranged in the same symbol duration, the same channel estimation signal power amplification is possible for all the antenna ports, and this makes it possible to increase the channel estimation accuracy for the UE.

In comparison with the legacy system using 8 antenna ports, the proposed method has shortcomings in that the frequency density of the CSI-RS transmitted over the whole downlink bandwidth is reduced. Also, a specific antenna port may be transmitted on a specific frequency band. In order to compensate for this problem, the eNB may cycle the PRB for transmitting the 0 to $7^{th}$ CSI-RSs in the subframe carrying the CSI-RS.

At this time, the CSI-RS may be configured as follows. Tables 1 and 2 show the methods of indicating the CSI-RS resource configuration. The resource configurations for ports 16, 32, and 64 may be done identically.

TABLE 1

CSI-RS resource configuration method according to first eNB (normal CP)

| CSI reference signal configuration | CSI-RS port 16, 32, 64 | |
|---|---|---|
| | (k', l') | $n_s$ mod 2 |
| Frame structure type 1 and 2 | 0 | (9, 5) | 0 |
| | 1 | (11, 2) | 1 |
| | 2 | (9, 2) | 1 |
| | 3 | (7, 2) | 1 |
| | 4 | (9, 5) | 1 |

TABLE 2

CSI-RS resource configuration method according to first embodiment (extended CP)

| CSI reference signal configuration | CSI-RS port 16, 32, 64 | |
|---|---|---|
| | (k', l') | $n_s$ mod 2 |
| Frame structure type 1 and 2 | 0 | (11, 4) | 0 |
| | 1 | (9, 4) | 0 |
| | 2 | (10, 4) | 1 |
| | 3 | (9, 4) | 1 |
| Frame structure type 2 only | 16 | (11, 1) | 1 |
| | 17 | (10, 1) | 1 |
| | 18 | (9, 1) | 1 |

Here, if the number of antenna ports of the eNB is N, N'=N/8 is defined. Here, p denotes the port index, the $0^{th}$ antenna port is expressed as 15, and the port index increases as the antenna index increases. At this time, the symbol a of the 16 port CSI-RS which is transmitted at the $k^{th}$ frequency RE and the $l^{th}$ time symbol can be defined as in equation (1).

$$a_{k,l}^{(p)} = w_{l''} \cdot r_{l,n_s}(m') \qquad [\text{Equation 1}]$$

where, $k = k' + 12N'm +$ $\begin{cases} -0 & \text{for } p \in \{15, 16, , 23, 24\}, \text{ normal cyclic prefix} \\ -6 & \text{for } p \in \{17, 18, 25, 26\}, \text{ normal cyclic prefix} \\ -1 & \text{for } p \in \{19, 20, 27, 28\}, \text{ normal cyclic prefix} \\ -7 & \text{for } p \in \{21, 22, 29, 30\}, \text{ normal cyclic prefix} \\ -0 & \text{for } p \in \{15, 16, 23, 24\}, \text{ extended cyclic prefix} \\ -3 & \text{for } p \in \{17, 18, 25, 26\}, \text{ extended cyclic prefix} \\ -6 & \text{for } p \in \{19, 20, 27, 28\}, \text{ extended cyclic prefix} \\ -9 & \text{for } p \in \{21, 22, 29, 30\}, \text{ extended cyclic prefix} \end{cases}$ $l = l' + \begin{cases} l'' & CSI \text{ reference signal configurations 0-19,} \\ & \text{normal cyclic prefix} \\ 2l'' & CSI \text{ reference signal configurations 20-31,} \\ & \text{normal cyclic prefix} \\ l'' & CSI \text{ reference signal configurations 0-27,} \\ & \text{extended cyclic prefix} \end{cases}$ $w_{l''} = \begin{cases} 1 & p \in \{15, 17, 19, 21, 23, 25, 27, 29\} \\ (-1)^{l''} & p \in \{16, 18, 20, 22, 24, 26, 28, 30\} \end{cases}$ $l'' = 0, 1$ $m = 0, 1, \ldots, N_{RB}^{DL} - 1$ -continued $$m' = m + \left\lfloor \frac{N_{RB}^{max,DL} - N_{RB}^{DL}}{2} \right\rfloor.$$

Embodiment 4-2

The proposed embodiment 4-2 is directed to a method of transmitting 8 antenna measurement reference signals cyclically in consecutive PRBs. The proposed method is to transmit the channel measurement reference signal based on the number of antennas of the eNB or an arbitrary integer. In detail, the proposed method is characterized by transmitting the reference signals over N/8 PRBs in unit of 4 channel measurement reference signals for the eNB having a total of N antennas.

Figure 31:
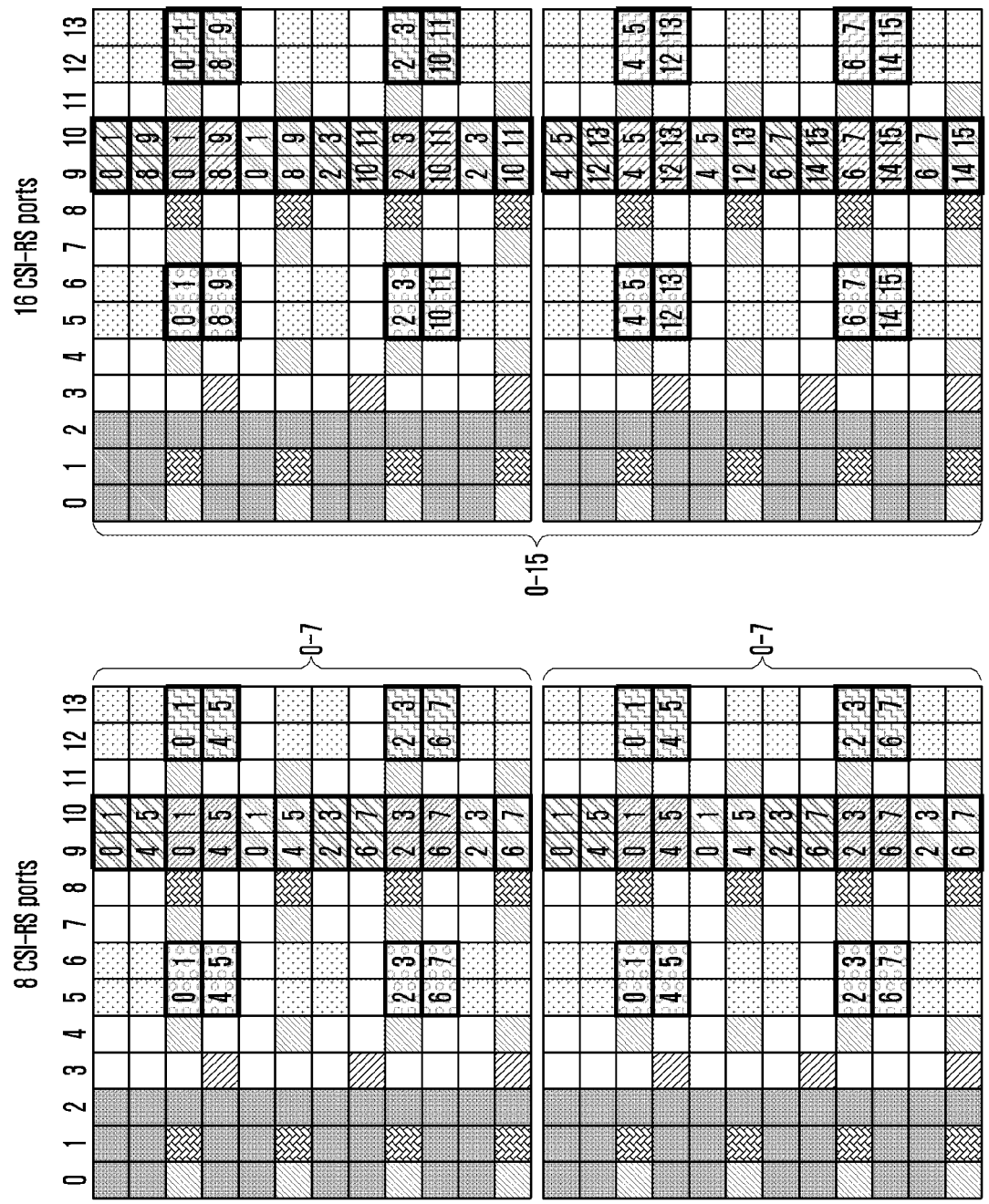
FIG. 31 is a diagram illustrating channel measurement resource according to the second embodiment of the present invention.

Embodiment 4-2 is described with reference to FIG. 31. FIG. 31 is a diagram illustrating the channel measurement resource configured according to embodiment 4-2 of the present invention.

For example, if N is 16, the 0~3$^{rd}$ reference signals are transmitted in the first PRB and the 4~7$^{th}$ reference signals in the second PRB over 16/8=2 PRBs and then the 8~11$^{st}$ reference signals in the first PRB and the rest in the second PRB.

Alternatively, if N is 32, the 0~3$^{rd}$ reference signals are transmitted in the first PRB, the 4~7$^{th}$ reference signals in the second PRB, the 8~11$^{th}$ reference signals in the third PRB, the 12~15$^{th}$ reference signals in the fourth PRB over 32/8=4 PRBs, and then the 16~19$^{th}$ reference signals in the first PRB cyclically.

If the number of antenna ports of the eNB is N, N'=N/8 is defined. Here, p denotes the port index, the 0$^{th}$ antenna port is expressed as 15, and the port index increases as the antenna index increases. At this time, the symbol a of the 16 port CSI-RS which is transmitted at the k$^{th}$ frequency RE and the l$^{th}$ time symbol can be defined as in equation (2).

$$a_{k,l}^{(p)} = w_{l''} \cdot r_{l,n_s}(m') \qquad \text{[Equation 2]}$$

where, $k = k' + 12N'm + $ $$\begin{cases} -0 & \text{for } p \in \{15, 16, , 23, 24\}, \text{ normal cyclic prefix} \\ -6 & \text{for } p \in \{19, 20, 27, 28\}, \text{ normal cyclic prefix} \\ -1 & \text{for } p \in \{17, 18, 25, 26\}, \text{ normal cyclic prefix} \\ -7 & \text{for } p \in \{21, 22, 29, 30\}, \text{ normal cyclic prefix} \\ -0 & \text{for } p \in \{15, 16, 23, 24\}, \text{ extended cyclic prefix} \\ -3 & \text{for } p \in \{19, 20, 27, 28\}, \text{ extended cyclic prefix} \\ -6 & \text{for } p \in \{17, 18, 19, 20\}, \text{ extended cyclic prefix} \\ -9 & \text{for } p \in \{21, 22, 29, 30\}, \text{ extended cyclic prefix} \end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21, 23, 25, 27, 29\} \\ (-1)^{l''} & p \in \{16, 18, 20, 22, 24, 26, 28, 30\} \end{cases}$$

-continued $l'' = 0, 1$ $m = 0, 1, \ldots, N_{RB}^{DL} - 1$ $$m' = m + \left\lfloor \frac{N_{RB}^{max,DL} - N_{RB}^{DL}}{2} \right\rfloor.$$

Embodiment 4-3

The proposed embodiment 4-3 is directed to a method of transmitting up to 8 antenna channel measurement reference signals cyclically in the first time region and up to 8 antenna channel measurement reference signals cyclically in the second timer region of one PRB, the antenna ports being arranged in the ascending order in the first time region and in the descending order in the second time region.

Figure 32:
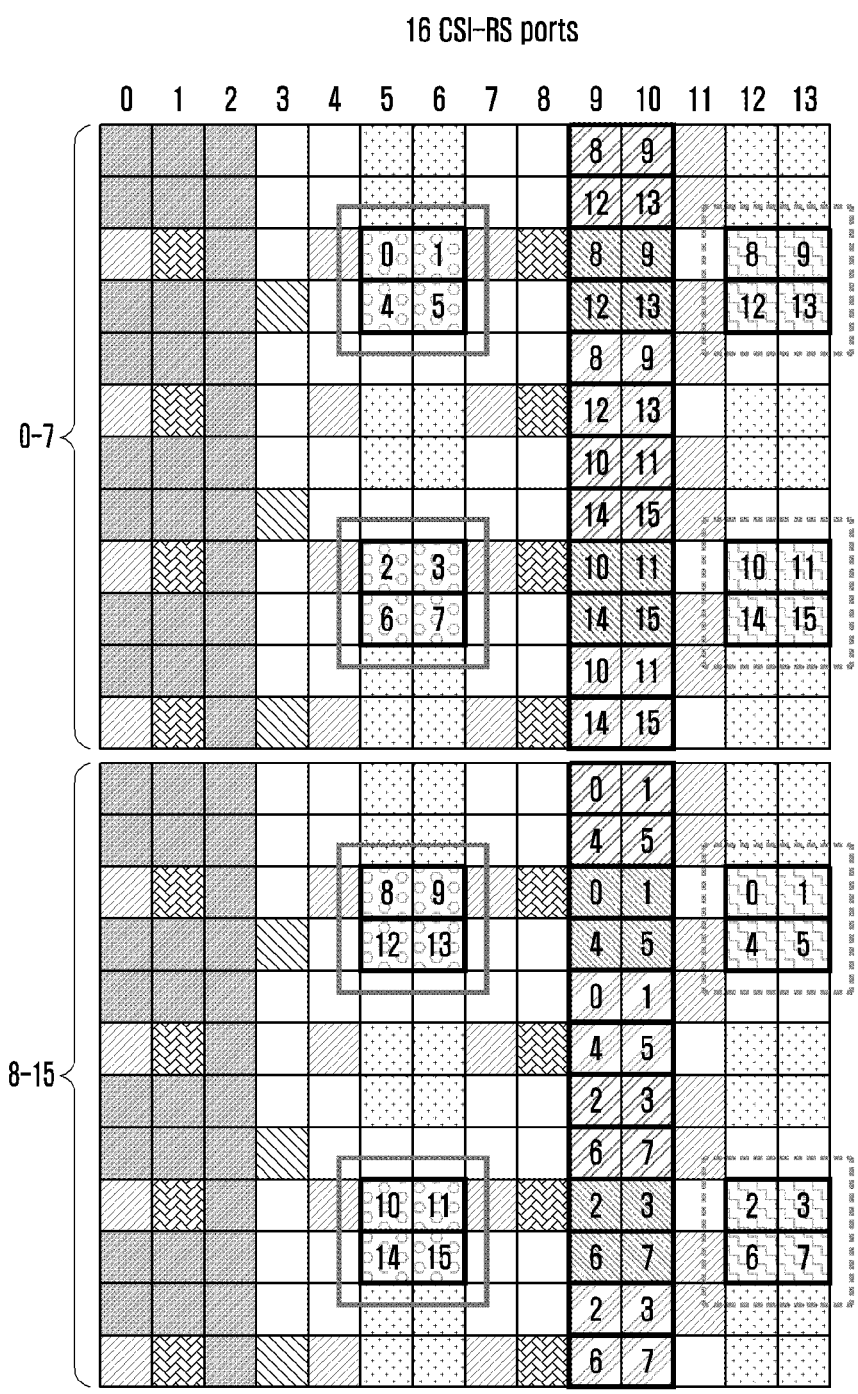
FIG. 32 is a diagram illustrating channel measurement resource according to the third embodiment of the present invention.

Embodiment 4-3 is described with reference to FIG. 32. FIG. 32 is a diagram illustrating channel measurement resources according to embodiment 4-3 of the present invention.

Referring to FIG. 32, if N is 16, the 0~7$^{th}$ reference signals are transmitted in the first time symbol of the first PRB and the 8~15$^{th}$ reference signals in the first time symbol of the second PRB. Also, the 8~15$^{th}$ reference signals are transmitted in the second time symbol of the first PRB and the 0~7$^{th}$ reference signals in the second PRB over the 16/8=2 PRBs.

The proposed method is directed to a method of guaranteeing at least one RE for channel measurement of one antenna in at least one PRB along with the effect of amplifying the transmit power as in embodiments 4-1 and 4-2.

Also, the proposed method is advantageous in terms of allowing time varying channel in one PRB by inversing the indices of the antenna ports transmitted in the first and second symbols (i.e. in ascending order and descending order).

Here, if the number of antenna ports of the eNB is N, N'=N/8 is defined. Here, p denotes the port index, the 0$^{th}$ antenna port is expressed as 15, and the port index increases as the antenna index increases. At this time, the symbol a of the 16 port CSI-RS which is transmitted at the k$^{th}$ frequency RE and the l$^{th}$ time symbol as the first time duration can be defined as in equation (3).

$$a_{k,l}^{(p)} = w_{l''} \cdot r_{l,n_s}(m') \qquad \text{[Equation 3]}$$

where, $k = k' + 12N'm + $ $$\begin{cases} -0 & \text{for } p \in \{15, 16, , 23, 24\}, \text{ normal cyclic prefix} \\ -6 & \text{for } p \in \{17, 18, 25, 26\}, \text{ normal cyclic prefix} \\ -1 & \text{for } p \in \{19, 20, 27, 28\}, \text{ normal cyclic prefix} \\ -7 & \text{for } p \in \{21, 22, 29, 30\}, \text{ normal cyclic prefix} \\ -0 & \text{for } p \in \{15, 16, 23, 24\}, \text{ extended cyclic prefix} \\ -3 & \text{for } p \in \{17, 18, 25, 26\}, \text{ extended cyclic prefix} \\ -6 & \text{for } p \in \{19, 20, 27, 28\}, \text{ extended cyclic prefix} \\ -9 & \text{for } p \in \{21, 22, 29, 30\}, \text{ extended cyclic prefix} \end{cases}$$

-continued $$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21, 23, 25, 27, 29\} \\ (-1)^{l''} & p \in \{16, 18, 20, 22, 24, 26, 28, 30\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor.$$

The symbol a of the 16 port CSI-RS which is transmitted at the $k^{th}$ frequency RE and the $l^{th}$ time symbol as the second time duration can be defined as in equation (4).

$$a_{k,l}^{(p)} = w_{l''} \cdot r_{l,n_s}(m') \quad [\text{Equation 4}]$$

where, $$k = k' + 12N'm +$$

$$\begin{cases} -0 & \text{for } p \in \{19, 20, 27, 28\}, \text{ normal cyclic prefix} \\ -6 & \text{for } p \in \{21, 22, 29, 30\}, \text{ normal cyclic prefix} \\ -1 & \text{for } p \in \{15, 16, , 23, 24\}, \text{ normal cyclic prefix} \\ -7 & \text{for } p \in \{17, 18, 25, 26\}, \text{ normal cyclic prefix} \\ -0 & \text{for } p \in \{19, 20, 27, 28\}, \text{ extended cyclic prefix} \\ -3 & \text{for } p \in \{17, 18, 25, 26\}, \text{ extended cyclic prefix} \\ -6 & \text{for } p \in \{21, 22, 29, 30\}, \text{ extended cyclic prefix} \\ -9 & \text{for } p \in \{15, 16, 23, 24\}, \text{ extended cyclic prefix} \end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21, 23, 25, 27, 29\} \\ (-1)^{l''} & p \in \{16, 18, 20, 22, 24, 26, 28, 30\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor.$$

Embodiment 4-4

The proposed embodiment 4-4 is described with reference to FIG. 33.

Figure 33A:
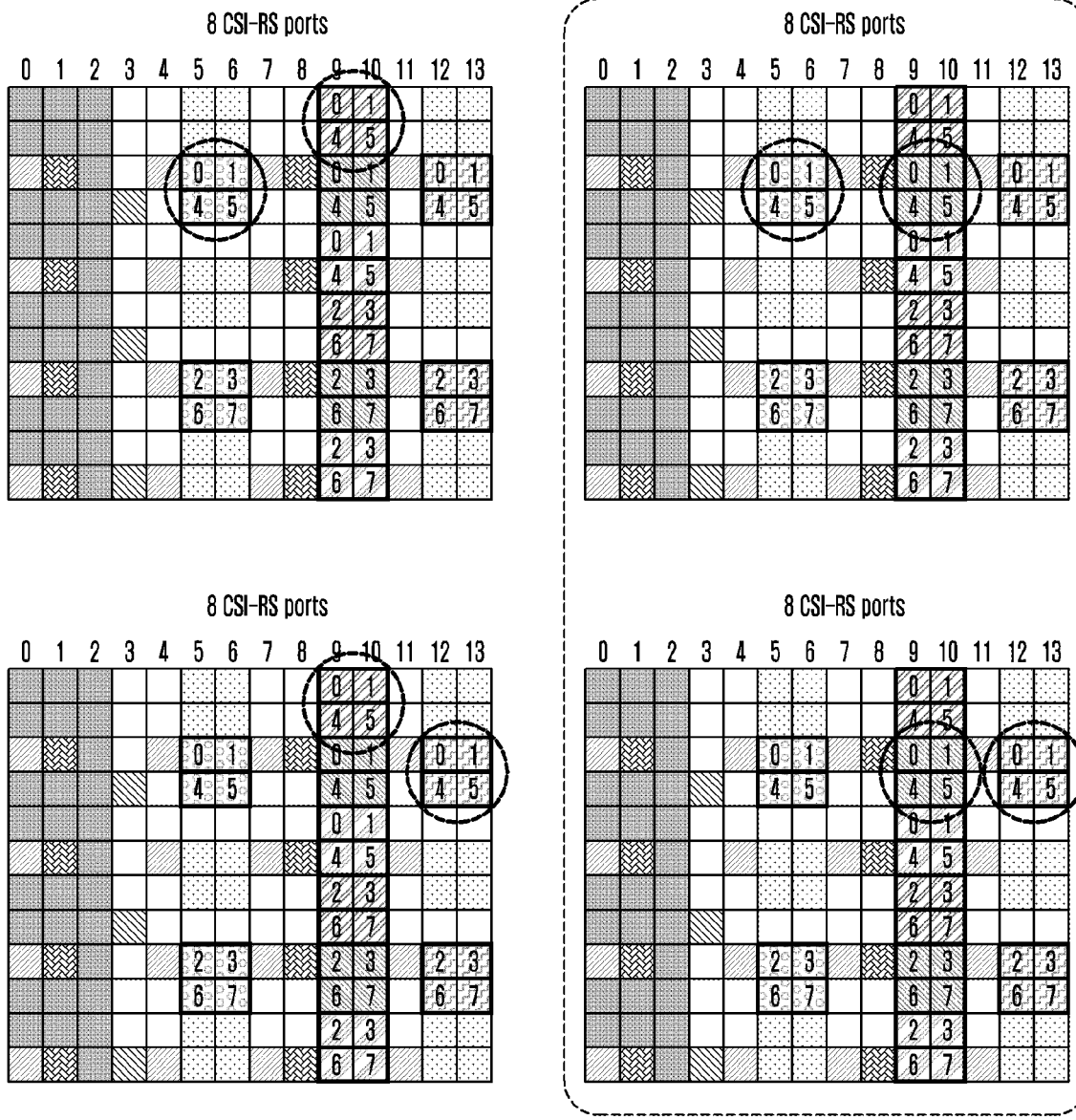
FIG. 33 is a diagram illustrating channel measurement resource according to the fourth embodiment of the present invention.
Figure 33B:
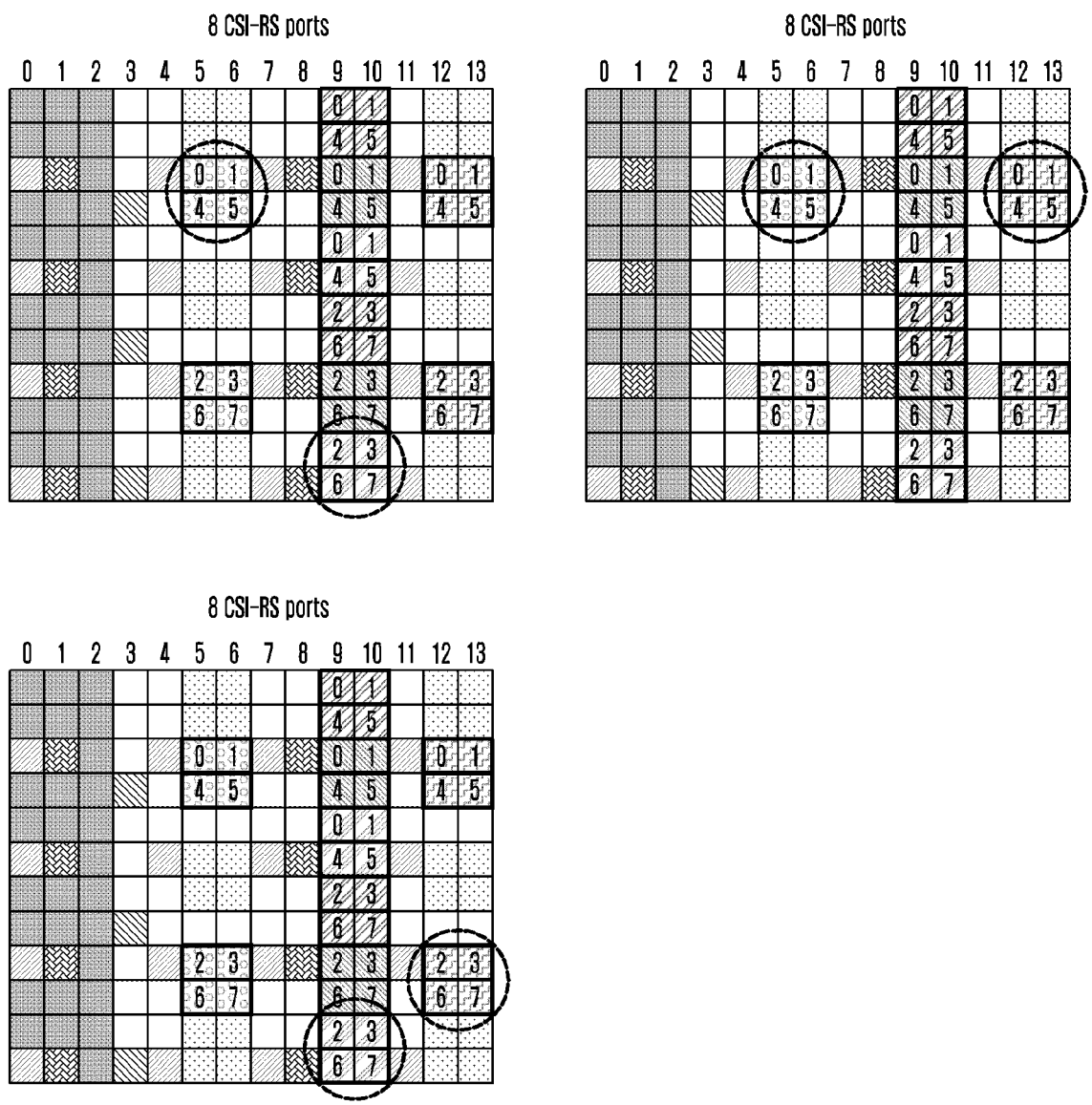

FIG. 33 is a diagram illustrating the channel measurement resources according to embodiment 4-4 of the present invention.

The proposed embodiment 4-4 is directed to a method of configuring two 8-port channel resources different in time in one PRB and multiplexing the selected channel resource with codes for transmission. The proposed method is characterized in that the system with N antennas selects two CSI-RS resources for 8 ports which are different in time symbol within one PRB and performs CDM on the antenna ports 0, 1, 8, and 9 with the orthogonal sequence of length 4.

Accordingly, one port is transmitted over 4 time symbols so as to amplify the transit power twice by increasing double the transmit time instead of amplifying the antenna transmit power as in the first to third embodiments. The antenna ports 2, 3, 10, and 11 are CDM'ed into other frequency resource for transmission.

Although the proposed method has a shortcoming in that the reception performance decreases because of the difference between the channels of REs for CDM in the time varying channel environment or frequency varying channel environment, in the case of transmitting the signal with a large number of antennas the target UE is likely to be a fixed terminal and this means that the channel changes little in one PRB; thus, it is possible to estimate the channel of the CDM'ed resource.

Embodiment 4-5

The proposed embodiment 4-5 is described with reference to FIG. 34. FIG. 34 is a diagram illustrating the channel measurement resource according to embodiment 4-5 of the present invention.

The proposed embodiment 4-5 is directed to a method of selecting a certain PRB across the whole bandwidth to configure the channel measurement resource. In detail, embodiment 4-5 is characterized by arranging DMRS or CRS first in the configured PRB, configuring antenna ports in sequence for the REs of each frequency, with the exception thereof, until the REs of the whole PRB are exhausted according to the total number of antennas.

At this time, the resource mapping starts from the $0^{th}$ symbol and, if any overlapped control channel signals occur, the corresponding RE is ruled out for channel measurement resource. It may also be possible to indicate the start symbol through higher layer signaling.

The part (a) of FIG. 34 shows an example of a method of allocating CRS resource first and configuring CSI-RS, and part (b) of FIG. 34 shows an example of a method of allocating DMRS resource first and configuring CSI-RS.

In this case, the CSI-RS is transmitted on some configured PRBs other than all PRBs of the downlink bandwidth unlike embodiments 4-1 to 4-4.

Since the density of CSI-RS in one PRB is high, this method guarantees the entire channel resource performance. Since the multiplexing is performed per PRB, although the number of antennas is equal to or greater than 100, the proposed method facilitates multiplexing with the data channel of the legacy UE, i.e. the UE capable of receiving up to 8 antenna channels, so as not to affect the performance of the legacy UE.

Figure 35:
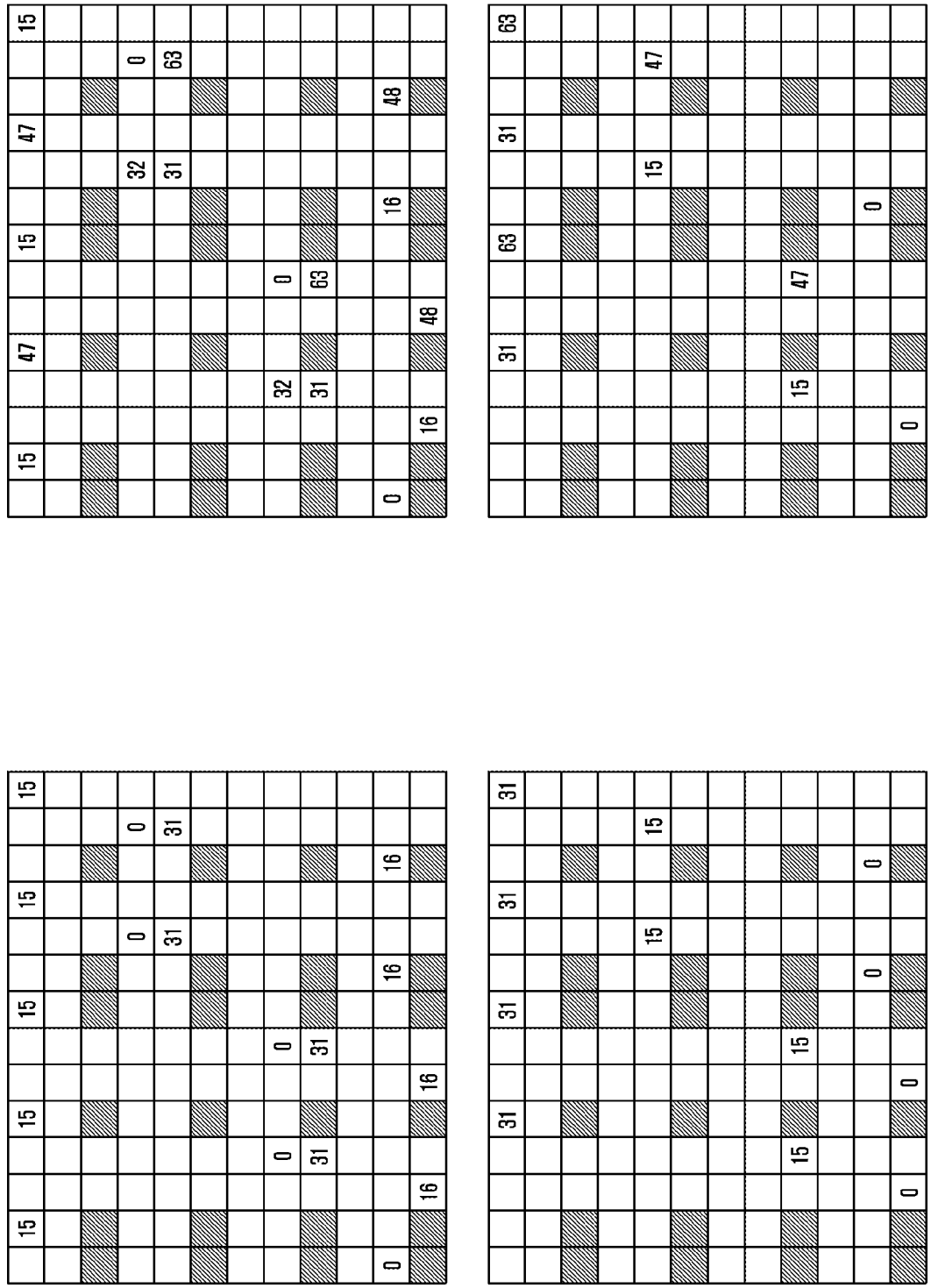
FIG. 35 is a diagram illustrating channel measurement resources in the fourth to sixth embodiments of the present invention.

Part (a) of FIG. 35 shows a method of configuring a PRB for CSI-RS in a system with total 32 antennas.

Part (b) of FIG. 35 shows a method of configuring a PRB for CSI-RS in a system with total 64 antennas.

Part (c) of FIG. 35 shows an exemplary case for 32 ports in which the CSI-RS transmission starts from the second time symbol.

Part (d) of FIG. 35 shows an exemplary case for 64 ports in which the CSI-RS transmission starts from the second symbol.

Figure 36:
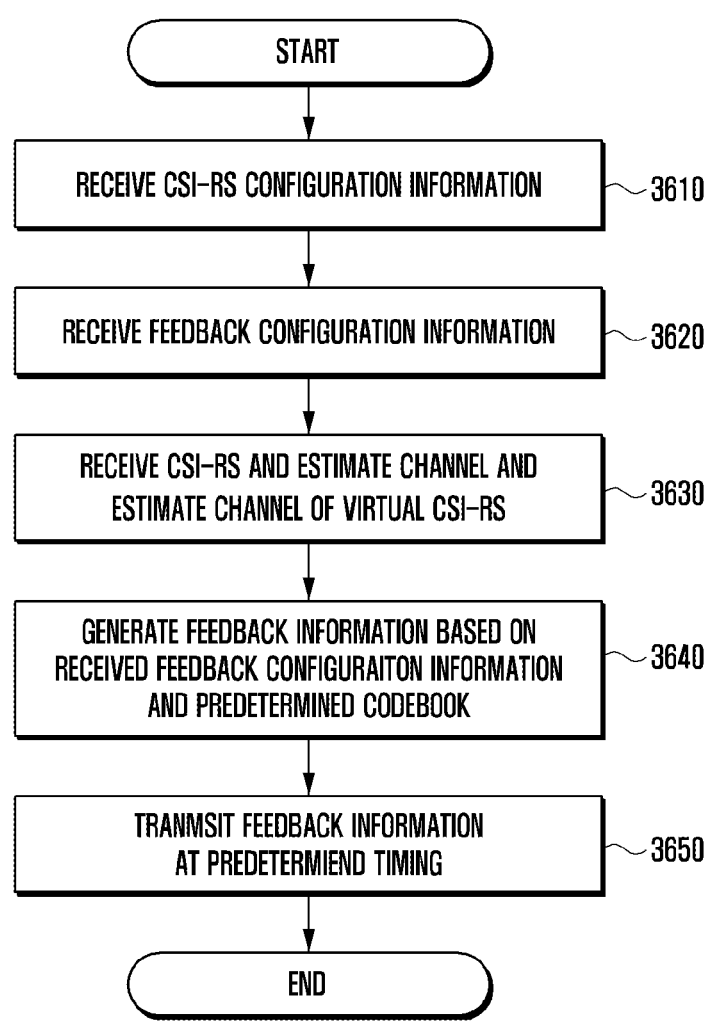
FIG. 36 is a diagram illustrating an eNB order in the present invention.

FIG. 36 is a flowchart illustrating the operation order of the UE according to an embodiment of the present invention.

Referring to FIG. 36, the UE receives CSI-RS configuration information at step 3610. The above configuration may include CSI-RS configuration information according to at least one of the above embodiments.

The UE may check at least one of the numbers of respective CSI-RS ports, CSI-RS transmission timing and resource position, and transmit power information based on the received configuration information.

Afterward, the UE generates the feedback configuration information based on at least one CSI-RS at step 3620.

If the CSI-RS is received, the UE estimates channels between the eNB antennas and the receive antennas of the UE at step 3630.

Next, the UE generates the feedback information including rank, PMI, and CQI using the received feedback configuration and defined codebook based on the estimated channel and virtual channel added between the CSI-RSs at step 3640.

Afterward, the UE transmits the feedback information to the eNB at the feedback timing predetermined according to the feedback configuration of the eNB at step 3650 to terminate the channel feedback configuration and report procedure considering the 2-dimensional arrangement.

Figure 37:
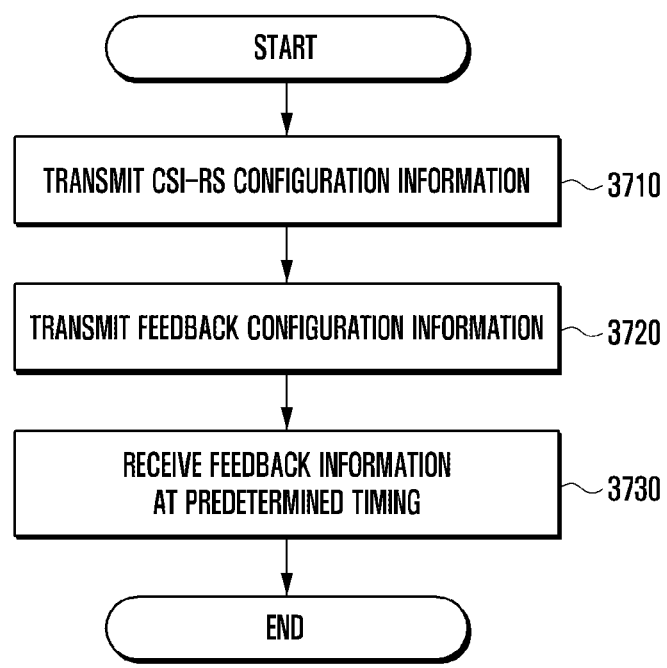
FIG. 37 is a diagram illustrating a UE order in the present invention.

FIG. 37 is a flowchart illustrating the operation order of the eNB according to an embodiment of the present invention.

Referring to FIG. 37, the eNB checks the CSI-RS transmission configuration according to at least one of the above embodiments of the present invention. Then the eNB generates CSI-RS configuration information based thereon.

Next, the eNB transmits to the UE the CSI-RS configuration information for channel measurement at step 3710. The configuration information may include at least one of the number of CSI-RS ports, CSI-RS transmission timing and position, and transmit power information.

Next, the eNB transmits to the UE the feedback configuration information generated based on the at least one CSI-RSs at step 3720. The eNB transmits the feedback configuration information to the UE. The UE estimates the channel per antenna port and, based thereon, the extra channel for the virtual resource.

The UE makes a feedback decision and generates and transmits PMI, RI, and CQI to the eNB. The eNB receives the feedback information from the UE at a predetermined timing and determines the channel condition between the UE and eNB based on the feedback information at step 3730.

Figure 38:
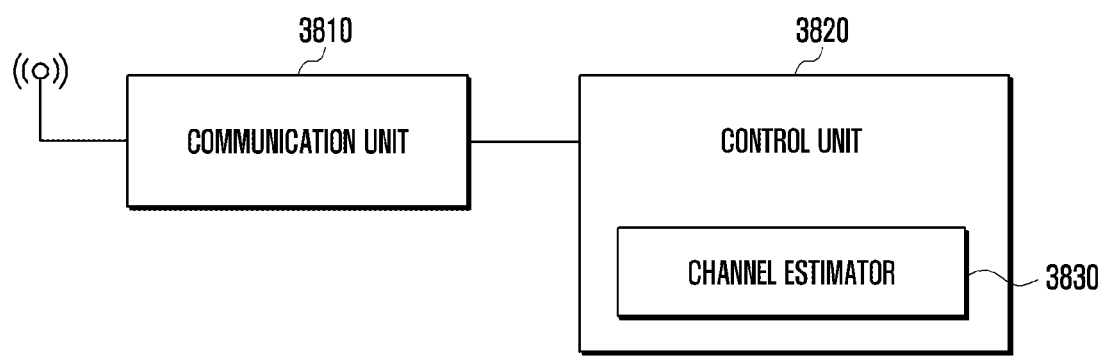
FIG. 38 is a diagram illustrating an eNB apparatus in the present invention.

FIG. 38 is a block diagram illustrating a configuration of the UE according to an embodiment of the present invention.

Referring to FIG. 38, the UE includes a communication unit 3810 and a control unit 3820. The communication unit 3810 is responsible for the function of transmitting and receiving data to and from the outside (e.g. eNB). Here, the communication unit 3810 transmits the feedback information to the eNB under the control of the control unit 3820.

The control unit 3820 controls the states and operations of the components of the UE.

In detail, the control unit 3820 generates feedback information based on the allocation information from the eNB. The control unit 3820 also controls the communication unit 3810 to perform feedback of the channel information to the eNB based on the timing information provided by the eNB. For this purpose, the control unit 3820 may include a channel estimator 3830.

The channel estimator 3830 determines the feedback information to be generated based on the CSI-RS and feedback configuration information received from the eNB and estimates channels with the received CSI-RS based on the feedback configuration information.

Although FIG. 38 is directed to an exemplary case where the UE is composed of the communication unit 3810 and the control unit 3820, the present invention is not limited thereto and the UE may further include various components depending on the functionalities it supports. For example, the UE may further include a display unit for displaying the current status of the UE, an input unit for receiving a user input for function execution, and a storage unit for storing data generated at the UE.

Although it is depicted that the channel estimator 3830 is included in the control unit 3820, the configuration is not limited thereto. The control unit 3820 may control the communication unit 3810 to receive the configuration information for at least one reference signal resource from the eNB. The control unit 3820 may control the communication unit 3810 to receive the feedback configuration information for measuring at least one reference signal and generating feedback information based on the measurement report.

The control unit 3820 may also measure at least one reference signal received by means of the communication unit 3810 and generate feedback information based on the feedback configuration information. The control unit 3820 may control the communication unit 3810 to transmit the generated feedback information to the eNB at the feedback timing determined based on the feedback configuration information.

The control unit 3820 may receive the Channel Status Indication-Reference Signal (CSI-RS) from the eNB, generate feedback information based on the received CSI-RS, and transmit the generated feedback information to the eNB. At this time, the control unit 3820 may select a precoding matrix per antenna port group of the eNB and an additional precoding matrix based on the relationship between the antenna port groups.

The control unit 3820 may also receive CSI-RS from the eNB, generate feedback information based on the received CSI-RS, and transmit the generated feedback information to the eNB. At this time, the control unit 3820 may select a precoding matrix for all antenna groups of the eNB. The control unit 3820 may also receive the feedback configuration information from the eNB, receive the CSI-RS from the eNB, generate the feedback information based on the received feedback configuration information and CSI-RS, and transmit the generated feedback information to the eNB.

At this time, the control unit 3820 may receive additional feedback configuration information generated based on the feedback configuration information corresponding to the respective antenna port groups of the eNB and the relationship between the antenna port groups.

Figure 39:
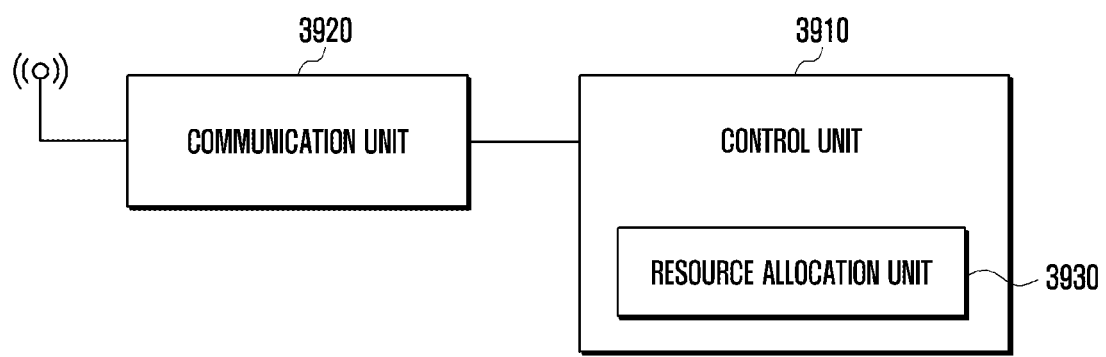
FIG. 39 is a diagram illustrating a UE apparatus in the present invention.

FIG. 39 is a block diagram illustrating a configuration of the eNB according to an embodiment of the present invention.

Referring to FIG. 39, the eNB includes a control unit 3910 and a communication unit 3920.

The control unit 3910 controls the states and operations of all the components of the eNB. In detail, the control unit 3910 allocates CSI-RS resource for channel estimation and feedback resource and timing to the UE.

For this purpose, the control unit 3910 may further include a resource allocator 3930. The control unit 3910 also configures feedback information and timing to avoid collision of the feedbacks from multiple UEs and receives and analyzes the feedback information at the corresponding timings.

The communication unit 3920 is responsible for the function of transmitting/receiving data, reference signal, and feedback information. Here, the communication unit 3920 transmits the CSI-RS to the UE on the resource allocated under the control of the control unit 3910 and receives feedback on the channel information from the UE.

Although it is depicted that the resource allocator 3930 is included in the control unit 3910, the configuration is not limited thereto.

The control unit 3910 may control the communication unit 3920 to transmit configuration information for at least one respective reference signal to the UE or generate at least one reference signal. The control unit 3910 may also control the communication unit 3920 to transmit to the UE the feedback configuration information for generating feedback information based on the measurement result.

The control unit 3910 may also control the communication unit 3920 to transmit the at least one reference signal to the UE and receive the feedback information transmitted by the UE at the feedback timing determined based on the feedback configuration information.

The control unit 3910 may also transmit feedback information and CSI-RS to the UE and receive the feedback information generated based on the feedback configuration information and the CSI-RS from the UE. At this time, the control unit 3910 may transmit additional feedback configuration information generated based on the feedback configuration information corresponding to the antenna port groups of the eNB and relationship between the antenna groups. The control unit 3910 may also transmit the CSI-RS beamformed based on the feedback information to the UE and receive the feedback information generated based on the CSI-RS.

According to an embodiment of the present invention, it is possible to prevent the eNB having a large number of transmit antennas configured in the 2-dimensional antenna array structure from allocating excessive feedback resource for CSI-RS transmission and prevent the UE from increasing channel estimation complexity of and to allow the UE to measure all channels of a plurality of transmit antennas effectively and transmit the feedback information generated based thereon to the eNB.

Fifth Embodiment

The fifth embodiment of the present invention is directed to a feedback transmission/reception method and apparatus for use in a mobile communication system with a plurality array antennas.

The fifth embodiment of the present invention relates to a wireless mobile communication system and, in particular, to a method for a terminal to measure channel quality and to transmit channel state information for reporting the measurement result to the base station in a wireless mobile communication system operating based on a multiple access scheme using multi-carrier such as Orthogonal Frequency Division Multiple Access (OFDMA).

In detail, the fifth embodiment of the present invention relates to feedback transmission/reception method, terminal, and base station thereof in a mobile communication system, and the method includes receiving at least one reference signal configuration information and feedback configuration information for generating and reporting feedback information based on the at least one reference signal from a base station, receiving the at least one reference signal from the base station, measuring the at least one received reference signal, generating feedback information based on the measurement result according to the feedback configuration information, and transmitting the generated feedback information to the base station.

Existing 3G evolved mobile communication standards such as LTE, UMB, and IEEE 802.16m based on the multicarrier multiple access scheme are characterized by various techniques including Multiple Input Multiple Output (MIMO), beamforming, Adaptive Modulation and Coding (AMC), channel sensitive scheduling, etc. for improving transmission efficiency. Such techniques are capable of concentrating transmission power with multiple antennas or adjusting transmission data amount depending on the channel quality and transmitting data to the user with good channel quality selectively, resulting in improvement of transmission efficiency and increase of system throughput.

Because most of these techniques operate based on the channel state information between an evolved Node B (eNB) (or Base Station (BS)) and a User Equipment (UE) (or Mobile Station (MS)), the eNB or UE has to measure the channel state between the eNB and UE based on Channel State Indication Reference Signal (CSI-RS). The eNB is a transmitter in downlink and a receiver in uplink and capable of managing a plurality cells for communication. A mobile communication system is made up of a plurality of eNBs distributed geographically, and each eNB manages a plurality of cells to provide the UEs with communication service.

Existing 3G and 4G mobile communication systems represented by LTE/LTE-A adopt MIMO technique using a plurality of transmission/receive antennas to increase data rate and system throughput. Using a MIMO scheme, it is possible to transmit a plurality of information streams separated spatially. This technique of transmitting the plural information streams is referred to as spatial multiplexing. Typically, the number of information streams to be spatially multiplexed is determined depending on the numbers of antennas of the transmitter and receiver. The number of information streams that can be spatially multiplexed is referred to as rank of the corresponding transmission. The LTE/LTE-A Release 11 supports 8×8 MIMO spatial multiplexing and up to rank 8.

The Full Dimension MIMO (FD-MIMO) system equipped with the technology proposed in this embodiment of the present invention is capable of utilizing 32 or more transmit antennas as compared with the legacy LTE/LTE-A MIMO technology supporting up to 8 antennas.

Figure 40:
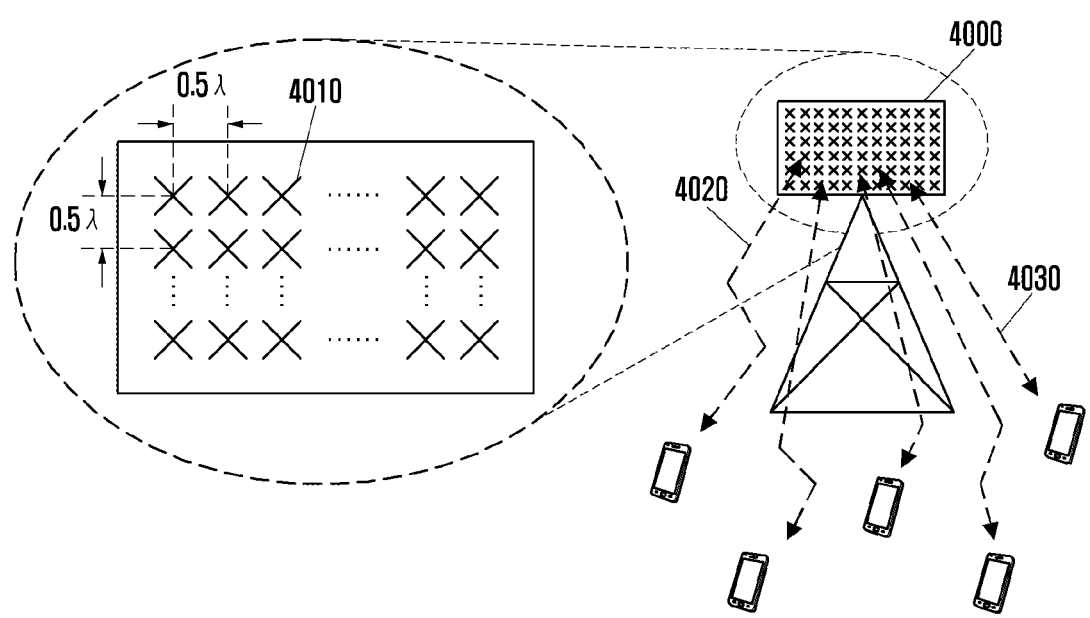
FIG. 40 is a diagram illustrating a FD-MIMO system.

FIG. 40 is a diagram illustrating a FD-MIMO system according to an embodiment of the present invention.

In FIG. 40, the base station transmitter 4000 transmits radio signals through 8 or more transmit antennas. The transmit antennas 4010 are arranged at minimum distance from each other. The minimum distance may be a half of the wavelength. Typically, in the case that the transmit antennas are arranged at the distance of the half of the wavelength of the radio signal, the signals transmitted by the respective transmit antennas are influenced by a radio channel with low correlation. Assuming the radio signal band of 2 GHz, this distance is 7.5 cm and shortened as the band becomes higher than 2 GHz.

In FIG. 40, 8 or more transmit antennas arranged at the base station are used to transmit signals to one or more terminals as denoted by reference number 4020. In order to transmit signals to a plurality of terminals simultaneously, an appropriated precoding is applied to a plurality of transmission/receive antennas. At this time, a terminal may receive one or more information streams. Typically, the number of the information streams that a terminal can receive is determined based on the number of receive antennas of the terminal and channel condition.

In order to implement the FD-MIMO system efficiently, the terminal has to measure the channel condition and interference size accurately and transmit the channel state information to the base station efficiently. If the channel state information is received, the base station determines the terminals for downlink transmission, downlink data rate, and precoding to be applied.

In the case of FD-MIMO system using a large number of transmit antennas, if the channel state information transmission method of the legacy LTE/LTE-A system, which is designed in consideration of only 8 one-dimensionally arranged transmit antennas, is applied without modification, the control information amount to be transmitted in uplink increases significantly, resulting in uplink overhead.

Figure 41:
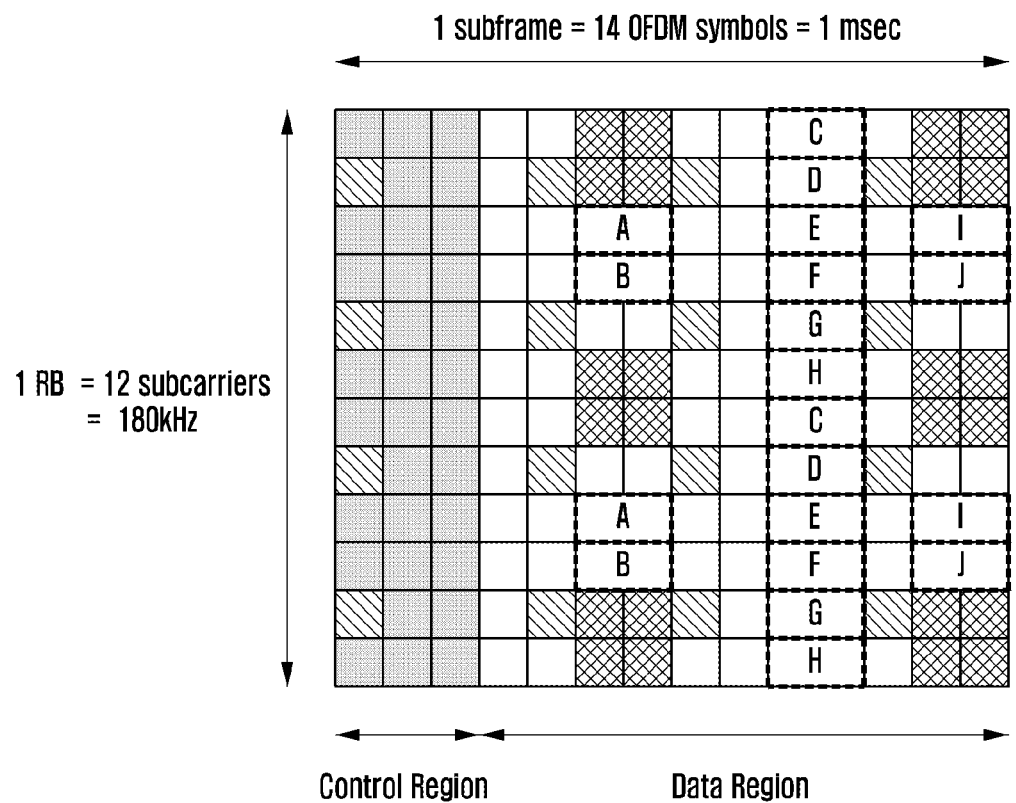
FIG. 41 is a diagram illustrating radio resource corresponding to 1 subframe and 1 Resource Block (RB) as the smallest downlink scheduling unit in the LTE/LTE-A system.

FIG. 41 is a diagram illustrating radio resource corresponding to 1 subframe and 1 RB as the smallest downlink scheduling unit in the LIL/LTE-A system.

As illustrated in FIG. 41, the radio resource is comprised of one subframe in the time domain and one RB in the frequency domain. The radio resource consists of 12 sub-carriers in the frequency domain and 14 OFDM symbols in the time domain, i.e. 168 unique frequency-time positions. In LTE/LTE-A, each frequency-time position is referred to as RE.

The radio resource structured as shown in FIG. 41 can be used for transmitting plural different types of signals as follows.

1. CRS (Cell-specific Reference Signal): Reference signal transmitted periodically for all UEs located within a cell and used commonly by a plurality of UEs.

2. DMRS (Demodulation Reference Signal): Reference signal transmitted to a specific UE for use in channel estimation only when the data for the UE is present. DMRS may be comprised of a total 8 DMRS ports. In LTE/LTE-A, ports 7 to 14 correspond to DMRS ports which maintain orthogonality through CDM or FDM to avoid interference to each other.

3. PDSCH (Physical Downlink Shared Channel): Downlink data channel which the eNB uses to transmit data to the UE, and which is transmitted using REs by which the reference signal is not transmitted in data region of FIG. 41.

4. CSI-RS (Channel Status Information Reference Signal): Reference signal transmitted to the UEs within a cell and used for channel state measurement. Multiple CSI-RSs can be transmitted within a cell. In the LTE-A system, one CSI-RS may correspond to one, two, four, or eight antenna ports.

5. Other control channels (PHICH, PCFICH, and PDCCH): Channels for providing control information necessary for the UE to receive PDSCH and transmitting HARQ ACK/NACK corresponding to uplink data.

In addition to the above signals, zero power CSI-RS can be configured in order for the UEs within the corresponding cells to receive the CSI-RSs transmitted by different eNBs in the LTE-A system. The zero power CSI-RS (muting) can be mapped to the positions designated for CSI-RS, and in general the UE receives the traffic signal skipping the corresponding radio resource. In the LTE-A system, the zero power CSI-RS is referred to as muting. The zero power CSI-RS (muting) by nature is mapped to the CSI-RS position without transmission power allocation.

In FIG. 41, the CSI-RS can be transmitted at some of the positions marked by A, B, C, D, E, F, G, H, I, and J according to the number of antennas transmitting CSI-RS. Also, the zero power CSI-RS (muting) can be mapped to some of the positions A, B, C, D, E, F, G, H, I, and J. The CSI-RS can be mapped to 2, 4, or 8 REs according to the number of the antenna ports for transmission. For two antenna ports, a half of a specific pattern is used for CSI-RS transmission; for four antenna ports, one entire specific pattern is used for CSI-RS transmission; and for eight antenna ports, two patterns are used for CSI-RS transmission. Meanwhile, muting is always performed by pattern. That is, although the muting may be applied to plural patterns, if the muting positions mismatch CSI-RS positions, it cannot be applied to one pattern partially.

In the case of transmitting CSI-RSs of two antenna ports, the CSI-RSs are mapped to two consecutive REs in the time domain and distinguished from each other using orthogonal codes. In the case of transmitting CSI-RSs of four antenna ports, the CSI-RSs are mapped in the same way of mapping the two more CSI-RSs to two more consecutive REs. This is applied to the case of transmitting CSI-RSs of eight antenna ports.

In a cellular system, the reference signal has to be transmitted for downlink channel state measurement. In the case of the 3GPP LTE-A system, the UE measures the channel state with the eNB using the CSI-RS transmitted by the eNB. The channel state is measured in consideration of a few factors including downlink interference. The downlink interference includes the interference caused by the antennas of neighboring eNBs and thermal noise that are important in determining the downlink channel condition. For example, in the case that the eNB with one transmit antenna transmits the reference signal to the UE with one receive antenna, the UE has to determine energy per symbol that can be received in downlink and interference amount that may be received for the duration of receiving the corresponding symbol to calculate Es/Io from the received reference signal. The calculated Es/Io is reported to the eNB such that the eNB determines the downlink data rate for the UE.

In the LTE-A system, the UE feeds back the information on the downlink channel state for use in downlink scheduling of the eNB. That is, the UE measures the reference signal transmitted by the eNB in downlink and feeds back the information estimated from the reference signal to the eNB in the format defined in the LTE/LTE-A standard. In LTE/LTE-A, the UE feedback information includes the following three indicators:

Rank Indicator (RI): Number of spatial layers that can be supported by the current channel experienced at the UE.

Precoder Matrix Indicator (PMI): Precoding matrix recommended by the current channel experienced at the UE.

Channel Quality Indicator (CQI): Maximum possible data rate at which the UE can receive signal in the current channel state. CQI may be replaced with maximum error correction code rate and modulation scheme, or per-frequency data efficiency or the SINR which can be used in similar way to the maximum data rate.

The RI, PMI, and CQI are associated among each other in defining meaning. For example, the precoding matrix supported in LTE/LTE-A is configured differently per rank. Accordingly, the PMI value "X" is interpreted differently for the cases of RI set to 1 and RI set to 2. Also, when determining CQI, the UE assumes that the PMI and RI that it has reported are applied by the eNB. That is, if the UE reports RI_X, PMI_Y, and CQI_Z, this means that the UE is capable of receiving the signal at the data rate corresponding to CQI_Z when the rank RI_X and the precoding matrix PMI_Y are applied. In this way, the UE calculates CQI with which the optimal performance is achieved in real transmission under the assumption of the transmission mode to be selected by the eNB.

In LTE/LTE-A, the UE is configured with one of the following four feedback or reporting modes depending on the information to be included therein:

1. Reporting Mode 1-0: RI, wideband CQI (wCQI)
2. Reporting Mode 1-1: RI, wCQI, wideband PMI (wPMI)
3. Reporting Mode 2-0: RI, wCQI, subband CQI (sCQI)
4. Reporting Mode 2-1: RI, wCQI, wPMI, sCQI, sPMI The feedback timing in the 4 respective feedback modes is determined based on $N_{pd}$, $N_{OFFSET,CQI}$, $M_{RI}$ and $N_{OFFSET,RI}$ transmitted through higher layer signaling. In Mode 1-0, the wCQI transmission period is $N_{pd}$, and the feedback timing is determined based on the subframe offset value of $N_{OFFSET,CQI}$. The RI transmission period is $N_{pd} \cdot M_{RI}$, and subframe offset is $N_{OFFSET,CQI} + N_{OFFSET,RI}$.

Figure 42:
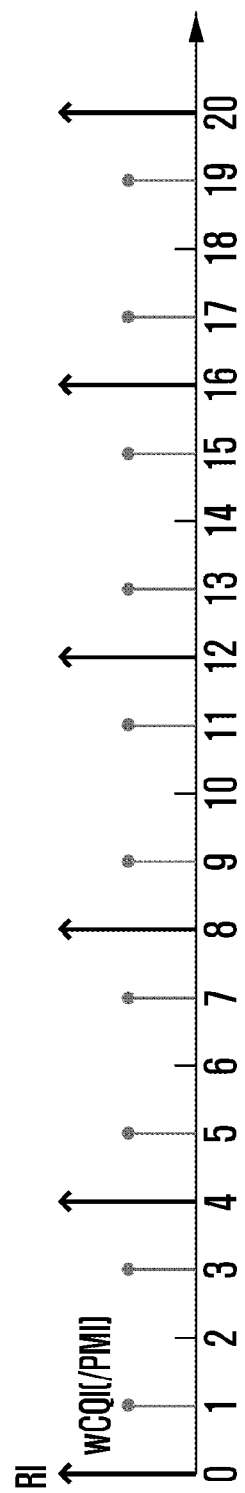
FIGS. 42 to 45 are diagrams illustrating feedback timings in the LTE/LTE-A system.

FIG. 42 is a diagram illustrating feedback timings of RI and wCQI in the case of $N_{pd}=2$, $M^{RI}=2$, $N_{OFFSET,CQI}=1$, and $N_{OFFSET,RI}=-1$. In FIG. 42, each of the timings is indicated by subframe index.

The feedback mode 1-1 has the same timings as the feedback mode 1-0 with the exception of transmitting wCQI and PMI at the wCQI transmission timing in 1-antenna port, 2-antenna port, and some 4-antenna port situations.

In the feedback mode 2-0, the sCQI feedback period is $N_{pd}$ with offset $N_{OFFSET,CQI}$. The wCQI feedback period is $H \cdot N_{pd}$ with offset $N_{OFFSET,CQI}$ equal to the sCQI offset. Here, $H = J \cdot K + 1$ where K is transmitted through higher layer signaling and J is determined according to the system bandwidth. For example, J is determined as 3 in the 10 MHz system. This means that wCQI is transmitted at every H sCQI transmissions in replacement of sCQI. The RI period is $M_{RI} \cdot H \cdot N_{pd}$ subframe and offset is $N_{OFFSET,CQI} + N_{OFFSET,RI}$.

Figure 43:
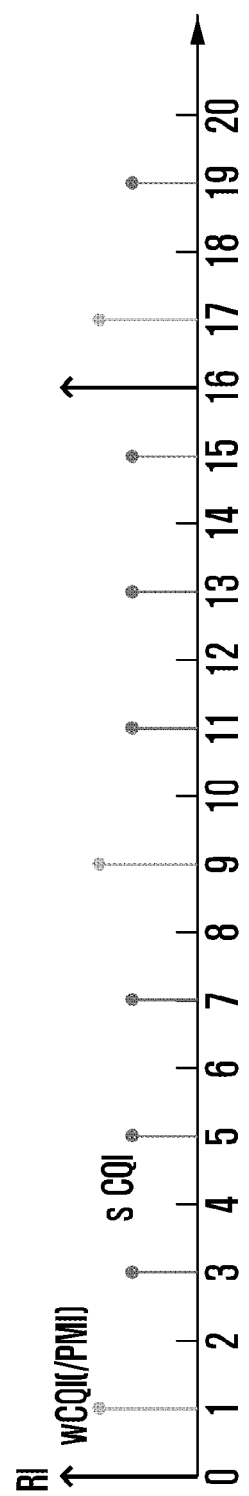

FIG. 43 is a diagram illustrating feedback timings of RI, sCQI, and wCQI in the case of $N_{pd}=2$, $M_{RI}=2$, J=3 (10 MHz), K=1, $N_{OFFSET,CQI}=1$, and $N_{OFFSET,RI}=-1$. The feedback mode 2-1 is identical with the feedback mode 2-0 in feedback timings with the exception that PMI is transmitted together at the wCQI transmission timings.

Unlike the feedback timing for the case of 1, 2, or 4 CSI-RS antenna ports as described above, two PMIs have to be transmitted for the UE allocated for some of 4 CSI-RS antenna ports or 8 CSI-RS antenna ports. For 8 CSI-RS antenna ports, the feedback mode 1-1 is divided into two sub-modes; and, in the first sub-mode, the first PMI is transmitted along with RI and the second PMI along with wCQI. Here, the wCQI and second PMI feedback period and offset are defined as $N_{pd}$ and $N_{OFFSET,CQI}$ and the RI and first PMI feedback period and offset are defined as $M_{RI} \cdot N_{pd}$ and $N_{OFFSET,CQI} + N_{OFFSET,RI}$, respectively. If the UE reports both the first and second PMIs ($i_1$) and ($i_2$) to the eNB, the UE and eNB regard the precoding matrix $W(i_1, i_2)$ corresponding to the first and second PMI combinations in the codebook of the precoding matrices shared between the UE and the eNB as the UE-preferred precoding matrix. In another interpretation, assuming that the precoding matrix indicated by the first PMI is W1 and the precoding matrix indicated by the second PMI is W2, the UE and eNB share the information indicating that the UE-preferred precoding matrix is determined as the product of the two matrices, i.e. W1W2.

In the case that the feedback mode for 8 antenna ports is the feedback mode 2-1, the precoding type indicator (PTI) is added to the feedback information. At this time, the PTI and RI are fed back at the period of $M_{RI} \cdot H \cdot N_{pd}$ subframes with the offset $N_{OFFSET,CQI} + N_{OFFSET,RI}$.

In detail, for PTI=0, the first and second PMIs and wCQI are transmitted. At this time, the wCQI and second PMI are transmitted at the same timing at a period $N_{pd}$ with an offset of $N_{OFFSET,CQI}$. Meanwhile, the first PMI is transmitted at a period of $H' \cdot N_{pd}$ with an offset of $N_{OFFSET,CQI}$. Here, H' is transmitted through higher layer signaling.

Meanwhile, if PTI is 1, the wCQI and second PMI are transmitted at the same timing, and sCQI is transmitted additionally. In this case, the first PMI is not transmitted and, if PTI is 0, it is reported after the second PMI and CQI are calculated under the assumption of the first PMI reported lastly. The PTI and RI are transmitted at same period with the same offset as the case of PTI=0. The sCQI is transmitted at a period of $N_{pd}$ with an offset of $N_{OFFSET,CQI}$. Also, the wCQI and second PMI are transmitted at a period of $H \cdot N_{pd}$ with an offset of $N_{OFFSET,CQI}$ and H is set to the same value as the case of 2 CSI-RS antenna ports.

Figure 44:
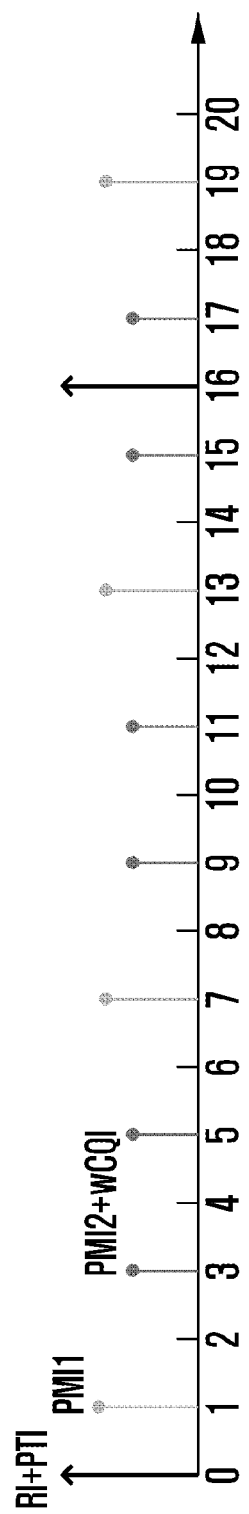
Figure 45:
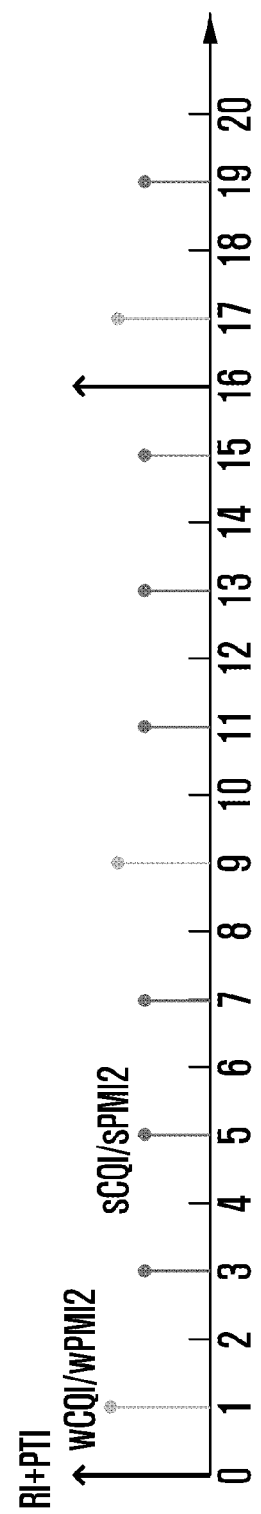

FIGS. 44 and 45 are diagrams illustrating feedback timings for PTI=0 and PTI=1 with $N_{pd}=2$, $M_{RI}=2$, J=3 (10 MHz), K=1, H'=3, $N_{OFFSET,CQI}=1$, and $N_{OFFSET,RI}=-1$.

The LTE/LTE-A supports aperiodic feedback as well as periodic feedback of the UE. If it is necessary to acquire aperiodic feedback information of a specific UE, the eNB sets an aperiodic feedback indicator included in Downlink Control Information (DCI) for scheduling downlink data of the corresponding UE to a value indicating aperiodic feedback. If the aperiodic feedback indicator is received at the $n^{th}$ subframe, the corresponding UE transmits uplink data including the aperiodic feedback information at $(n+k)^{th}$ subframe. Here, k is a parameter defined in the 3GPP LTE Release 11 and it is set to 4 for Frequency Division Duplexing (FDD) and one of the values shown in table 3 for Time Division Duplexing (TDD).

TABLE 3 k for subframe number n in TDD UL/DL configuration

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

In the case that the aperiodic feedback is configured, the feedback information includes RI, PMI, and CQI like the periodic feedback, but the RI and PMI may not be fed back depending on the feedback configuration. The CQI may include both the wCQI and sCQI or only the wCQI.

As described above, the UE has to measure the channel quality and interference size accurately and report the channel state information based on the measurement result efficiently in order to implement the FD-MIMO system effectively. If the channel state information is received, the eNB determines the UEs for downlink transmission thereto, data rate for the downlink transmission, and precoding to be applied to the downlink transmission based on the channel state information.

However, the channel state information transmission/reception method designed, for the LTE/LTE-A system, in consideration of up to 8 one-dimensional array antennas is not appropriate to apply to the FD-MIMO system operating with a large number of transmit antennas and considering 2-dimensional antenna arrangement without modification and causes uplink overhead problem due to the necessity of additional control information to accomplish the equal throughput.

The present invention has been conceived to solve the above problems and aims to provide a method and apparatus for a UE to measure the reference signals to generate channel state information and transmit the channel state information for effective data transmission/reception in the FD-MIMO operation based on the LTE-A system.

Also, the present invention provides a method and apparatus for receiving the channel state information transmitted by the UE after the eNB configures main parameters for channel state information generation/report to the UE and transmits the corresponding reference signal.

Exemplary embodiments of the present invention are described with reference to the accompanying drawings in detail. Detailed descriptions of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

Although the description is directed to the OFDM-based radio communication system, particularly the 3GPP EUTRA, it will be understood by those skilled in the art that the present invention can be applied even to other communication systems having the similar technical background and channel format, with a slight modification, without departing from the spirit and scope of the present invention.

The present embodiment proposes methods of configuring codebook and feedback and generating/reporting the feedback for rank 1 situation designed in consideration of 1-dimensionally or 2-dimensionally arranged linear array (Upol) or cross array (Xpol) antennas in the FD-MIMO system.

Here, the linear antenna array (Upol) is characterized in that all antennas are arranged linearly in the same direction, while the cross antenna array (Xpol) is characterized in that the two antenna groups are arranged at the angles of +45 and −45 degrees to the X axis in the positive direction.

The rank-1 codebook and feedback design appropriate for a MIMO system can be obtained through contemplation on how the instant channel value from the transmitter with multiple antennas to the receiver with one antenna is formed.

Figure 46:
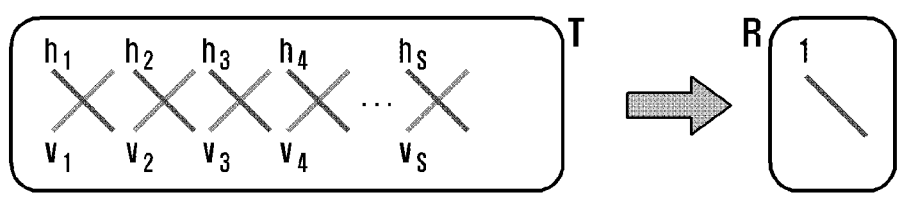
FIG. 46 is a diagram illustrating CSI-RS transmission for FD-MIMO according to an embodiment of the present invention.

A description is made of the channel value formed from the transmitter having 2S antennas arranged in an Xpol configuration to the receiver with one antenna with reference to FIG. 46.

In FIG. 46, assuming that S antennas $h_1, h_2, \ldots, S$ are arranged in a −45 degree direction with respect to the positive x-axis at an interval of d, it is well-known that the channel value formed from each Tx antenna to the Rx antenna for the $n^{th}$ path which is measured at specific time t is represented by equation 5.

$$[h_{h_1,1} \quad h_{h_2,1} \quad \ldots \quad h_{h_S,1}]_n(t) = \quad [\text{Equation 5}]$$
$$\sqrt{\rho_n} \sum_{m=1}^{M} \exp(j\Phi_{nm}^{(h,h)})\exp(jk\|v\|\cos(\theta_{n,m,AoA} - \theta_v)t) \times$$
$$[1 \quad e^{(jkd\sin(\theta_{n,m,AoD}))} \quad \ldots \quad e^{(jk(S-1)d\sin(\theta_{n,m,AoD}))}]$$

In equation 5, $h_{h_s,1}$ denotes the channel value from the Tx antenna $h_s$ to the Rx antenna 1, and $\Phi_{nm}^{(h,h)}$ denotes phase shift according to the antenna polarity.

In equation 5, k denotes the wave number and has a value of $2\pi/\lambda$, n denotes the cluster index, and m denotes the index of a ray in the $n^{th}$ channel cluster. In equation 5, $\theta_{n,m,AoD}$ denotes the Azimuth of Departure (AoD) of the $m^{th}$ ray in the $n^{th}$ channel cluster, and $\theta_{n,m,AoA}$ denotes the Azimuth of Arrival (AoA) of the re ray in the $n^{th}$ channel cluster. In equation 5, it is assumed that the UE has the velocity vector of v. Here, $\theta_v$ denotes the direction information of v.

Meanwhile, assuming in FIG. 46 that S antennas $v_1, v_2, \ldots, v_S$ are arranged in a +45 degree direction with respect to the positive x-axis, it is well-known that the channel value from each Tx antenna to the Rx antenna for the $n^{th}$ path which is measured at specific time t is represented by equation 6.

$$[h_{v_1,1} \quad h_{v_2,1} \quad \ldots \quad h_{v_S,1}]_n(t) = \quad [\text{Equation 6}]$$
$$\sqrt{\rho_n} \sum_{m=1}^{M} \sqrt{\gamma_{n1}} \exp(j\Phi_{nm}^{(v,h)})\exp(jk\|v\|\cos(\theta_{n,m,AoA} - \theta_v)t) \times$$
$$[1 \quad e^{(jkd\sin(\theta_{n,m,AoD}))} \quad \ldots \quad e^{(jk(S-1)d\sin(\theta_{n,m,AoD}))}]$$

In equation 26, $h_{v_s,1}$ denotes the channel value from the Tx antenna $v_S$ to the Rx antenna, and $\Phi_{nm}^{(v,h)}$ denotes the phase shift according to the antenna polarity.

By taking notice of the channel values of equations 5 and 6, in the Upol configuration of S antennas arranged linearly in the same direction at the interval of d, the rank-1 precoding vector maximizing the received signal strength of the UE is the vector of equation 3 which can be formed by combining the per-antenna channel values complementarily to each other.

$$[1, e^{j[k\sin(\theta_{n,m,AoD})]d}, e^{j[k\sin(\theta_{n,m,AoD})]2d}, \ldots, e^{j[k\sin(\theta_{n,m,AoD})](S-1)d}]^H. \quad [\text{Equation 7}]$$

Comparing equation 5 and equation 6, in the case that the two antenna groups of which each is comprised of S antennas are arranged at the angles of +45 and −45 degrees with respect to the positive X-axis in the Xpol configuration as shown in FIG. 46, the rank-1 precoding vector maximizing the received signal strength of the UE is expressed as equation 8.

$$\begin{bmatrix} [1, e^{j[k\sin(\theta_{n,m,AoD})]d}, e^{j[k\sin(\theta_{n,m,AoD})]2d}, \ldots, e^{j[k\sin(\theta_{n,m,AoD})](S-1)d}] \\ e^{j\phi}[1, e^{j[k\sin(\theta_{n,m,AoD})]d}, e^{j[k\sin(\theta_{n,m,AoD})]2d}, \ldots, e^{j[k\sin(\theta_{n,m,AoD})](S-1)d}] \end{bmatrix}^H \quad [\text{Equation 8}]$$

Here, $e^{j\phi}$ denotes a parameter of compensating for the phase difference between $\Phi_{nm}^{(h,h)}$ and $\Phi_{n,m}^{(v,h)}$ which allows the channel values for the two antenna groups with different polarities to have different phases and shows the characteristic that the Xpol configuration is comprised of two Upol configurations having different polarities.

The embodiments of the present invention to be described hereinafter are directed to the codebook design, feedback configuration, and feedback generating/reporting method of the UE for the Tx antenna configuration of the given FD-MIMO system using the characteristic of the optimized rank-1 precoding vector for the above-described Upol or Xpol antenna array.

Embodiment 5-1: Codebook Design and Feedback Configuration and Generation/Report Method in an 8 Tx Antenna Situation For the eNB with a plurality of Tx antennas such as FD-MIMO, the one-dimensional antenna arrangement may cause waste of space; thus, it is preferable to consider a 2-dimensional antenna arrangement. FIG. 47 shows four methods of arranging 8 antennas 1-dimensionally or 2-dimensionally.

The first embodiment of the present invention is directed to the codebook design, feedback configuration, and feedback information generation/report method considering various antenna arrangement methods in the case that the eNB operating in the FD-MIMO mode has a total of 8 antennas as shown in FIG. 47.

The 8Tx-mode 1 and 8Tx-mode 2 are characterized by 1-dimensional antenna arrangement but sorted into linear antenna array and cross antenna array according to the polarity of the antenna array. As described above, the Upol configuration is characterized in that all of the antennas are arranged in the same direction linearly, while the Xpol configuration is characterized in that the two antenna groups each with 4 antennas are arranged at the angles of +45 and −45 degrees respective to the positive x axis.

The 8Tx-mode 3 and 8Tx-mode 4 are characterized by the 2-dimensional antenna arrangement in the Upol and Xpol configurations respectively.

A description is made hereinafter of the rank-1 codebook design method for the four antenna arrangement methods illustrated in FIG. 47.

From the format of the optimal precoding vector expressed by equation 7, it is easy to analogize that a set of $Q_1$ vectors with exponential values increasing at a regular interval as equation 5 can be used for rank-1 codebook in the case of the Upol configuration in which the antennas are arranged linearly at a predetermined interval like the 8Tx-mode 1.

$$C_{8Tx-method1} = \{[1, q^n, q^{2n}, \ldots, q^{7n}]^T | n=0,1,\ldots,Q_1-1\}, \quad \text{[Equation 9]}$$

where $q=e^{j2\pi/Q_1}$.

That is, the codebook design as shown in equation 9 is conceived for the UE to report an index n corresponding to the value closest to $kd\sin(\theta_{n,m,AoD})\mod 2\pi$ included in equation 3, which is found among $0, 2\pi/Q_1, 2\cdot 2\pi/Q_1, \ldots, (Q_1-1)\cdot 2\pi/Q_1$ obtained by dividing the values from 0 to $2\pi$ by $Q_1$.

Similarly, from the format of the optimal precoding vectors, as shown in equation 8, for Xpol configuration in which the antennas are arranged linearly, the rank-1 codebook design for 8 Tx-mode 2 may be formed as shown in equation 10.

$$C_{8Tx-method2} = \left\{ \begin{array}{l} [1, q^n, q^{2n}, q^{3n}], e^{j\phi}[1, q^n, q^{2n}, q^{3n}]^T | \\ n=0,1,\ldots,Q_1-1, \phi \in \left\{ \begin{array}{l} 0, 2\pi/Q_2, 2\cdot 2\pi/Q_2, \\ \ldots, (Q_2-1)\cdot 2\pi/Q_2 \end{array} \right\} \end{array} \right\}, \quad \text{[Equation 10]}$$

where $q=e^{j2\pi/Q_1}$.

That is, the codebook design expressed by equation 10 is conceived for the UE to report $\Phi$ compensating for the phase difference between two antenna groups having different polarities by the index n corresponding to the value closest to $kd\sin(\theta_{n,m,AoD})\mod 2\pi$ included in equation 3 among $0, 2\pi/Q_1, 2\cdot 2\pi/Q_1, \ldots, (Q_1-1)\cdot 2\pi/Q_1$ obtained by dividing the values from 0 to $2\pi$ by $Q_1$ and Xpol configuration, $\Phi$ being found from the complex alphabets having $Q_2$ elements.

Comparing equation 9 and equation 10, it is easy to know that the codebook of equation 10 which is designed for Xpol is the concept including the codebook of equation 9. That is, if $e^{j\Phi}$ is always configured as $q^{4n}(=e^{j4n\cdot 2\pi/Q_1})$ in equation 10, the codebook of equation 6 is equivalent to equation 9.

Accordingly, the set of equation 10 can be used typically as a combined codebook for both the situations of 8Tx-mode 1 and 8Tx-mode 2 in which the antennas are arranged 1-dimensionally.

As an efficient method for the UE to report the index n (which may be replaced with various terms such as first information, first indicator, and first PMI) and phase difference $\Phi$ (which may be replaced with various terms such as second information, second indicator, and second PMI) for the combined codebook for linear antenna arrangement as shown in equation 6 to the eNB, a two-step precoding matrix report method may be considered.

That is, it is possible for the UE to report the indices indicating candidates of n value available in equation 6 as the first information and then report actually UE-preferred n value at the specific timing and frequency position among the candidates of n value that are indicated as the first information and $\Phi$ compensating for the phase difference between the antenna groups as the second information.

This method makes it possible to use the resource consumed for reporting the UE-preferred precoding matrix more efficiently by reporting separately the UE-preferred precoding matrix using a parameter which does not change frequently for a long time or in the wide frequency band and a parameter which changes frequently for a short time or in the narrow frequency band.

A description is made in detail hereinafter of the first step of reporting the indices indicating the candidates of n that are available in the two-step precoding matrix report method.

For the codebook corresponding to equation 10, the UE and the eNB share a method of grouping the values of n in the range from 0 to $(Q_1-1)$ into L groups of N elements each in sequence at an interval of G. Then the UE generates/reports group indices of the values of n available for the channel measured at specific timing and frequency resource to inform the eNB of the candidates of n.

For example, if $Q_1=32$, $G=1$, $N=4$, and $L=16$, then the values of n may be grouped into 16 groups as follows:

$$B_0=[0,1,2,3], B_1=[2,3,4,5], \ldots, B_{i_1}=[2i_1, 2i_1+1, 2i_1+2, 2i_1+3], \ldots, B_{15}=[30,31,0,1].$$

In this example, if the UE generates/reports $i_1=1$ as the candidate of preferred value of n, this means that the UE prefers one of the vectors to which n=2, 3, 4, or 5 is applied in the codebook corresponding to equation 10 between the UE and the eNB until the next $i_1$ report timing.

In another embodiment, if $Q_1=32$, $G=8$, $N=4$, and $L=16$, then the values of n may be grouped as follows:

$$B_0=[0,8,16,24], B_1=[1,9,17,25], \ldots, B_{i_1}=[i_1, i_1+8, i_1+16, i_1+24], \ldots, B_{15}=[15,23,31,7].$$

In an exemplary case that the size of each group is 2, if $Q_1=32$, $G=1$, $N=2$, and $L=16$ or if $Q_1=32$, $G=16$, $N=2$, and $L=16$, then the values of n may be grouped respectively as follows:

$$B_0=[0,1], B_1=[2,3], \ldots, B_{i_1}=[2i_1, 2i_1+1], \ldots, B_{15}=[30,31], 또는$$

$$B_0=[0,16], B_1=[1,17], \ldots, B_{i_1}=[i_1, i_1+16], \ldots, B_{15}=[15,31].$$

Also, in another exemplary case that the total number of precoding vectors are 16, if $Q_1=16$, $G=1$, $N=2$, and $L=8$ or if $Q_1=16$, $G=8$, $N=2$, and $L=8$, then the values of n may be grouped respectively as follows:

$$B_0=[0,1], B_1=[2,3], \ldots, B_{i_1}=[2i_1, 2i_1+1], \ldots, B_7=[15,16], \text{ or}$$

$$B_0=[0,8], B_1=[1,9], \ldots, B_{i_1}=[i_1, i_1+8], \ldots, B_{15}=[7,15].$$

That is, the method of configuring a group of the values of n which correspond to the index $i_1$ indicating the candidates of n in the two-step precoding matrix report method may be implemented variously depending on how to configure the number of n $Q_1$, the interval of values of n in a group G, the size of each group N, and the total number of groups L.

The parameters $Q_1$, G, N, and L for configuring the groups of the values n may be predetermined as specific values between the eNB and UE or notified from the eNB to the UE through higher layer signaling in the state of providing Radio Resource Control (RRC) information. The eNB may configure the above information through various types of signals such as downlink control information as well as uplink signal.

As described in the two-step precoding matrix report method, after determining the first index indicating the candidates of n, the UE determines an index indicating the UE-preferred value of n at a specific timing and frequency among the values of n determined by the first index and Φ compensating for the phase difference between the antenna groups simultaneously so as to indicate a specific precoding vector preferred in the codebook of equation 10 at the second step.

In an exemplary case that the size N of the group of the values of n which is determined by the first index is 4, the second index may be comprised of 4 bits, 2 bits for selecting one of four candidates of n and 2 bits for selecting the preferred value of Φ if the alphabet size $Q_2$ of Φ available additionally is 4. That is, the second index $i_2$ may be selected in the range from 0 to 15 to indicate one of the candidates of n and one of available values of Φ.

In summary, if a preferred precoding vector is selected in the codebook of equation 10 in the cases of 8Tx-mode 1 and 8Tx-mode 2, the UE is capable of selecting indices $i_1$, and $i_2$ using the two-step precoding matrix report method with the parameters n and Φ of the selected precoding vector. Then the UE may report the preferred vector to the eNB at the corresponding timing through periodic or aperiodic feedback.

For reference, the case of the configuration with $Q_1=32$, $G=1$, $N=2$, $L=16$, and $Q_2=4$ in the above described codebook design and precoding matrix report method is identical with the method used between the UE and the eNB in the current LTE-A 8Tx situation.

A description is made hereinafter of the codebook design and precoding matrix report method for 8Tx-mode 3 and 8Tx-mode 4 of FIG. 8 that show the 8 antennas arranged 2-dimensionally in Upol and Xpol configurations respectively.

From the format of the optimal precoding vector expressed by equation 7, it is easy to analogize that a set of $Q_3 \times Q_4$ vectors with exponential values increasing at a regular interval in the horizontal and vertical direction as equation 11 can be used for rank-1 codebook in the case of the Upol configuration in which the antennas are arranged 2-dimensionally as shown in the 8Tx-mode 3 in the horizontal and vertical directions at a regular interval.

$$C_{8Tx-method3} = \qquad \qquad \text{[Equation 11]}$$

$$\left\{ \begin{array}{l} [1, q^n, q^{2n}, q^{3n}], p^m[1, q^n, q^{2n}, q^{3n}]^T \mid \\ n = 0, 1, \ldots, Q_3-1, m = 0, 1, \ldots, Q_4-1 \end{array} \right\},$$

where $q = e^{j2\pi/Q_3}$, $p = e^{j2\pi/Q_4}$.

That is, the codebook design as shown in equation 11 is conceived for the UE to find the index n closest to kd $\sin(\theta_{n,m,AOD})$mod $2\pi$ in the horizontal direction, which is included in equation 7 among 0, $2\pi/Q_3$, $2\cdot 2\pi/Q_3$, ..., $(Q_3-1)\cdot 2\pi/Q_3$ obtained by dividing the values from 0 to $2\pi$ by $Q_3$ for the antennas arranged in four columns in the horizontal direction, and the index m closest to kd $\sin(\theta_{n,m,AOD})$mod $2\pi$ in the vertical direction, which is included in equation 7 among 0, $2\pi/Q_4$, $2\cdot 2\pi/Q_4$, ..., $(Q_4-1)\cdot 2\pi/Q_4$ obtained by dividing the values from 0 to $2\pi$ by $Q_4$ for the antennas arranged in two rows in the vertical direction in the same manner, and then report the n and m.

Similarly, from the format of the optimal precoding vectors, as shown in equation 8, for the Xpol antenna configuration in which the antennas are arranged 1-dimensionally, it is possible to analogize that the next set $C_{8Tx-method4}$ can be used as the rank-1 codebook in consideration of the phase difference between two antenna groups having different polarities so as to have exponential values increasing at a regular interval in the horizontal and vertical direction for the polarity of one direction as shown in equation 12a in the case that the antennas are arranged 2-dimensionally in the horizontal and vertical direction at a regular interval as shown in the 8Tx-mode 4 in the Xpol configuration:

$$C_{8Tx-method4} = \qquad \qquad \text{[Equation 12a]}$$

$$\left\{ \begin{array}{l} [[1, q^n], e^{j\phi}[1, q^n]], p^m[[1, q^n], e^{j\phi}[1, q^n]]^T \mid \\ n = 0, 1, \ldots, Q_3-1, m = 0, 1, \ldots, Q_4-1, \\ \phi \in \{0, 2\pi/Q_5, 2\cdot 2\pi/Q_5, \ldots, (Q_5-1)\cdot 2\pi/Q_5\} \end{array} \right\}$$

where $q = e^{j2\pi/Q_3}$, $p = e^{j2\pi/Q_4}$.

That is, the codebook design as shown in equation 12a is conceived for the UE to find the index n closest to kd $\sin(\theta_{n,m,AOD})$mod $2\pi$ in the horizontal direction, which is included in equation 7 among 0, $2\pi/Q_3$, $2\cdot 2\pi/Q_3$, ..., ($Q_3-1$)·$2\pi/Q_3$ obtained by dividing the values from 0 to $2\pi$ by $Q_3$ for the antennas arranged in four columns in the horizontal direction; the index m closest to kd sin($\theta_{n,m,AOD}$) mod $2\pi$ in the vertical direction, which is included in equation 7 among 0, $2\pi/Q_4$, $2\cdot 2\pi/Q_4$, ..., ($Q_4-1$)·$2\pi/Q_4$ obtained by dividing the values from 0 to $2\pi$ by $Q_4$ for the antennas arranged in two rows in the vertical direction; and $\Phi$ value for compensating for the phase difference between the two antenna groups having different polarities in the Xpol configuration; and then report n, m, and $\Phi$.

Comparing equation 11 and equation 12a, it is easy to know that the codebook of equation 12a, which is designed for the Xpol configuration, is the concept including the codebook of equation 10 like the relationship of equations 9 and 10 for the 1-dimensional antenna arrangement.

That is, if $e^{j\Phi}$ is always configured as $q^{4n}(=e^{j4n\cdot 2\pi/Q_1})$ in equation 12a, the codebook of equation 12a is equivalent to equation 11.

Accordingly, the set of equation 8 can be used typically as a combined codebook for both the situation of 8Tx-mode 3 and 8Tx-mode 4 in which the antennas are arranged 2-dimensinally.

In equation 12a, the code book is designed in consideration of the phase difference between the antennas in one direction, i.e. vertical or horizontal direction, the phase difference between to two antenna groups different in polarity, and the phase difference between the antennas in the other direction. Meanwhile, it is obvious that the phase difference to be considered may change depending on the antenna port indexing scheme of the eNB. For example, it may also be possible to induce a codebook like equation 12b in consideration of the phase difference between the antennas in one direction, the phase difference between the antennas in the other direction, and the phase difference between to two antenna groups different in polarity.

$$C'_{8Tx-method4} = \quad [\text{Equation 12b}]$$
$$\begin{cases} [[1, q^n], p^m[1, q^n], e^{j\phi}[[1, q^n], p^m[1, q^n]]]^T \mid \\ n = 0, 1, \ldots, Q_3 - 1, m = 0, 1, \ldots, Q_4 - 1, \\ \phi \in \left\{0, \frac{2\pi}{Q_5}, 2\frac{2\pi}{Q_5}, \ldots, (Q_5-1)\frac{2\pi}{Q_5}\right\} \end{cases}$$

As an efficient method for the UE to report n in the horizontal direction, m in the vertical direction, and phase difference $\Phi$ in the combined codebook for 2-dimensional antenna arrangement as shown in equation 12a or 12b, a two-step precoding matrix report method may be considered, like the case of the 1-dimensional antenna arrangement. Descriptions are made of the method for reporting vertical and horizontal direction information and phase difference information in a two-step according to two embodiments.

<Two-Step Report Method 1: Horizontal and Vertical Direction Index Candidates Report→Final Decision on Horizontal/Vertical Direction Indices and Compensation for Phase Difference>

The first two-step precoding matrix report method is used to report indices of candidates corresponding to the values of n and m that are available in the horizontal and vertical directions respectively in equation 12 and then report as the second information the second information which indicates all of the accurate UE-preferred values of n and m at specific timing and frequency position among the candidates of n and m that are indicated by the first information and a value of $\Phi$ for compensating the phase difference between the antenna groups at a time.

This method makes it possible to use the resource consumed for reporting the UE-preferred precoding matrix more efficiently by reporting separately the UE-preferred precoding matrix using a parameter which does not change frequently for a long time or in the wide frequency band and a parameter which changes frequently for a short time or in the narrow frequency band.

A description is made in detail hereinafter of the first step of reporting the indices indicating the candidates of n and m that are available in the first two-step precoding matrix report method.

For the codebook corresponding to equation 12, the UE and the eNB share a method of grouping the values of n in the range from 0 to ($Q_3-1$) into $L_N$ groups of N elements each in sequence at an interval of $G_N$. Also, the UE and the eNB share a method of grouping the values of m in the range from 0 to ($Q_4-1$) into $L_M$ groups of M elements each in sequence at an interval of $G_M$. Then the UE generates/reports group indices of the values of n and m available for the channel measured at specific timing and frequency resource to inform the eNB of the candidates of n and m.

For example, if $Q_3=32$, $G_N=1$, N=4, $L_N=16$, $Q_4=32$, $G_M=1$, M=2, and $L_M=16$, then the values of n and m may be grouped into 16 groups respectively as follows:

Groups of values of n:

$$B_0=[0,1,2,3], B_1=[2,3,4,5], \ldots, B_{i_1^{(n)}}=[2i_1^{(n)}, 2i_1^{(n)}+1, 2i_1^{(n)}+2, 2i_1^{(n)}+3], \ldots, B_{15}=[30,31,0,1]$$

Groups of values of m:

$$B_0=[0,1], B_1=[2,3], \ldots, B_{i_1^{(m)}}=[2i_1^{(m)}, 2i_1^{(m)}+1], \ldots, B_{15}=[30,31]$$

In this example, if the UE generates/reports $i_1^{(n)}=1$ as the candidates of preferred value of n and $i_1^{(m)}=2$ as the candidates of preferred value of m, this means that the UE prefers one of the vectors to which n=2, 3, 4, or 5 and m=4 or 5 are applied in the codebook corresponding to equation 12 between the UE and the eNB until the next $i_1^{(n)}$ and $i_1^{(m)}$ report timing.

In another embodiment, if $Q_3=32$, $G_N=8$, N=4, $L_N=16$, $Q_4=16$, $G_M=1$, M=1, and $L_M=16$, then the values of n and m may be grouped respectively as follows:

Group of values of n:

$$B_0=[0,8,16,24], B_1=[1,9,17,25], \ldots, B_{i_1^{(n)}}=[i_1^{(n)}, i_1^{(n)}+8, i_1^{(n)}+16, i_1^{(n)}+24], \ldots, B_{15}=[15,23,31,7]$$

Group of values of m:

$$B_0=[0], B_1=[2], \ldots, B_{i_1^{(m)}}=[i_1^{(m)}], \ldots, B_{15}=[15]$$

That is, in the first two-step precoding matrix report method, the first step of grouping the values of n and m corresponding to the indices $i_1^{(n)}$ and $i_1^{(m)}$ indicating the candidates of n and m may be implemented in various ways depending on how to configure the number of values of n,m, $Q_3, Q_4$, the intra-group interval $G_N$, $G_M$, the size of each group N, M, and the total number of groups $L_N$, $L_M$.

The value n grouping method and value m grouping method may be configured identically or differently depending on the channel characteristics in the horizontal and vertical directions.

The parameters $Q_3, Q_4$, $G_N, G_M$, N,M, and $L_N, L_M$ for configuring the groups of the values n and m may be predetermined as specific values between the eNB and UE or notified from the eNB to the UE through higher layer signaling in the state of providing Radio Resource Control (RRC) information. Also, the eNB may configure the above information through various types of signals such as UL control information as well as the higher layer signal.

For reference, the total number of bits for reporting the indices $i_1^{(n)}$ and $i_1^{(m)}$ is log $2(L_N)$+log $2(L_N)$. The indices $i_1^{(n)}$ and $i_1^{(m)}$ may be reported at different timings or encoded together to be reported at the same timing. The index report timing and method are described later in detail.

In the first two-step precoding matrix report method, after determining the first indices $i_1^{(n)}$ and $i_1^{(m)}$ indicating the candidates of n and m, the UE determines at the second step an index indicating the UE-preferred values of n and m at specific timing and frequency among the values of n and m determined by the first indices $i_1^{(n)}$ and $i_1^{(m)}$ and $\Phi$ compensating for the phase difference between the antenna groups simultaneously so as to indicate a specific precoding vector preferred in the codebook of equation 12.

In an exemplary case where the sizes N and M of the groups of the values of n and m which are determined by the first indices are 4 and 2, the second index may be comprised of 5 bits, 2+1 bits for selecting a (n, m) pair of four candidate values of n and 2 candidate values of m and 2 bits for selecting the preferred value of $\Phi$ if the alphabet size $Q_5$ of $\Phi$ available additionally is 4.

That is, the second index $i_2$ may be selected in the range from 0 to 15 to indicate a pair of (n, m) of the candidates of n and m and one of available values of $\Phi$.

In another exemplary case where the sizes N and M of the groups of the values of n and m which are determined by the first indices are 4 and 1, the second index $i_2$ may be comprised of 4 bits, 2 bits for selecting one of candidate values of n and 2 bits for selecting the preferred value of $\Phi$ if the alphabet size $Q_5$ of $\Phi$ available additionally is 4, because there is no need of any additional bit for selecting one of candidate values of m.

In summary, if a preferred precoding vector is selected in the codebook of equation 12 in the cases of 8Tx-mode 3 and 8Tx-mode 4, the UE is capable of selecting indices $i_1^{(n)}$, $i_1^{(m)}$, and $i_2$ using the first two-step precoding matrix report method with the parameters n, m, and $\Phi$ of the selected precoding vector and reporting the preferred vector to the eNB at the corresponding timing through periodic or aperiodic feedback.

<Two-Step Report Method 2: Horizontal Direction Index Candidates Report→Final Decision on Vertical Index and Compensation of Vertical Direction Index and Phase Difference>

The second two-step precoding matrix report method is used to report an index $i_1^{(n)}$ indicating candidates as in the 8Tx-mode 1 and 8Tx-mode 2 for the case where the values of n are arranged 1-dimensionally in a direction (e.g. horizontal direction) in equation 12 and the first information; and then report an index indicating all of the accurate UE-preferred value of n at specific timing and frequency position among the candidates of n that are indicated by the first information in equation 12, a value of $p^m$ to be used, and a value of $\Phi$ for compensating the phase difference at a time as the second information.

As described above, the first step of the second two-step precoding matrix report method for reporting the index indicating the candidates of available value of n is performed in the same way as the 8Tx-mode 1 and 8Tx-mode 2.

In the second two-step precoding matrix report method, the UE determines an index indicating all of the preferred value of n at specific timing and frequency resource among the candidates of n that are determined by the first index, a value of $p^m$, and a value $\Phi$ for compensating for phase difference between the antenna groups at a time to indicate a specific precoding vector preferred in the codebook of equation 12.

In an exemplary case that the group size N of the values of n which are determined by the first index is 4, the second index may be comprised of total 2+X+2 bits, 2 bits for selecting a specific value of n, X bits for indicating a complex value corresponding to the value of $p^m$ for the precoding vector preferred in equation 12, and 2 bits for selecting a specific value of $\Phi$ if the alphabet size $Q_5$ of $\Phi$ available additionally is 4.

Here, the X bits for indicating the complex value corresponding to the value of $p^m$ for the precoding vector preferred in equation 12 is determined as $X=\log_2(Q_6)$ if $p^m$ is selected from a set $\{1, e^{j2\pi/Q_6}, e^{j2\cdot 2\pi/Q_6}, \ldots, e^{j(Q_6-1)\cdot 2\pi/Q_6}\}$ with the size of $Q_6$. That is, if $Q_6=4$, the second index $i_2$ is comprised of total 6 bits.

In summary, if a preferred precoding vector is selected in the codebook of equation 12 in the cases of 8Tx-mode 3 and 8Tx-mode 4, the UE is capable of selecting indices $i_1^{(n)}$ and $i_2$ using the second two-step precoding matrix report method with the parameters n, $p^m$, and $\Phi$ as the parameters of the selected precoding vector and then reporting the preferred precoding vector to the eNB at the corresponding timing through periodic or aperiodic feedback.

Figure 48:
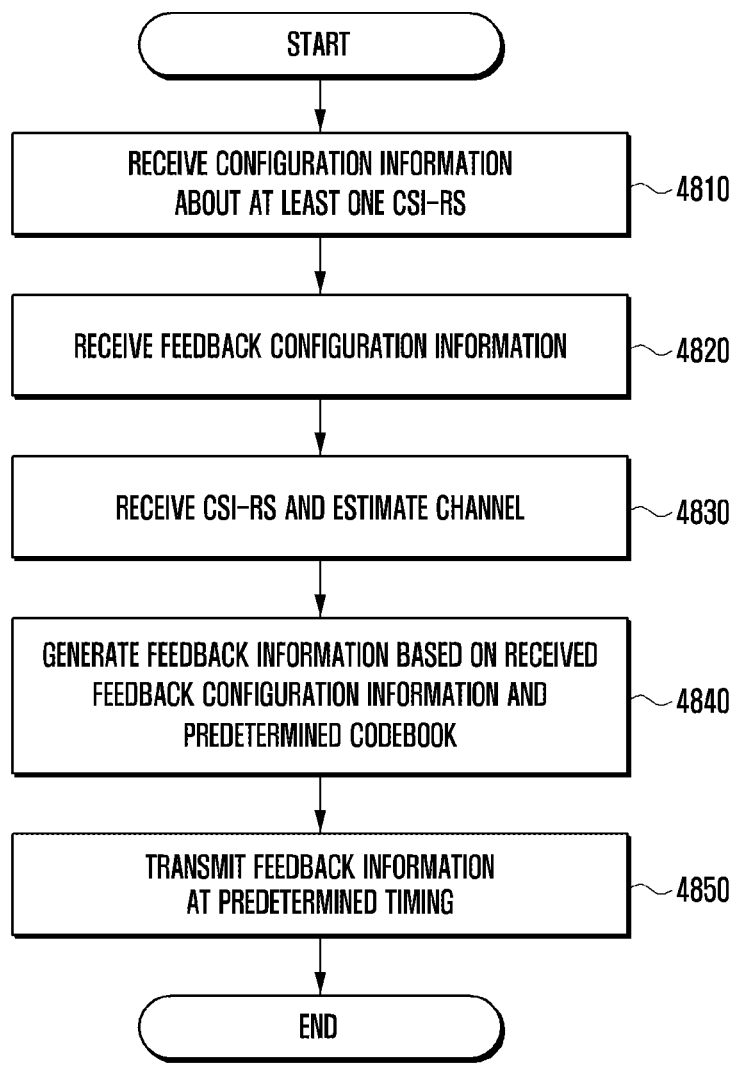
FIG. 48 is a flowchart illustrating the operation order of the terminal according to an embodiment of the present invention.

FIG. 48 is a flowchart illustrating feedback information generation/report operation order of a UE according to an embodiment of the present invention.

Referring to FIG. 48, the UE receives configuration information of at least one CSI-RS for channel estimation at step 4810. The UE checks all or some of the number of CSI-RS ports, timings and resource positions of the respective CSI-RSs, sequence information, and transmit power information based on the received configuration information.

In embodiment 5-1 of the present invention, the UE, because the codebook design and feedback configuration and generation/report method in the 8-Tx antenna situation is considered, has to estimate the channels of up to 8 antenna ports. Here, the CSI-RSs corresponding to 8 antenna ports may be configured as one 8-port CSI-RS or 2 4-port CSI-RSs to indicate the channels from 8 antenna ports of the eNB to the UE. If the CSI-RSs corresponding to the 8 antenna ports have to be configured as one 8-port CSI-RS, the UE may receive additional information on whether the 8 antenna ports are arranged 1-dimensionally like the 8Tx-mode 1 and 8Tx-Mode 2 or 2-dimensionally like 8Tx-mode 3 and 8Tx-Mode 4.

Unlike this, if the 8 antenna ports can be represented by one 8-port CSI-RS or two 4-port CSI-RSs, the UE regards the one 8-port CSI-RS representing the 8 antenna ports as 1-dimensional antenna arrangement so as to operate based on the codebook corresponding to the 8Tx-mode 1 and 8Tx-Mode 2 and the 2 4-port CSI-RSs representing the 8 antenna ports as 2-dimensional antenna arrangement so as to operate based on the codebook corresponding to the 8Tx-mode 3 and 8Tx-Mode 4, without extra information indicating whether it is 1-dimensional or 2-dimensional.

Afterward, the UE checks the feedback configuration information based on one or two CSI-RSs at step 4820. Here, the one or two CSI-RS-based feedback configurations according to embodiment 5-1 of the present invention may be formatted as the whole or part of the RRC information as shown in tables 4 and 5.

TABLE 4

Feedback Configuration

Channel measurement resource: CSI-RS-1 (8 ports)
codebook information
Reporting (feedback) mode
Reporting (feedback) timing information
Etc . . .

TABLE 5

Feedback Configuration

Channel measurement resource 1: CSI-RS-1 (4 ports)
Channel measurement resource 2: CSI-RS-2 (4 ports)
codebook information
Reporting (feedback) mode
Reporting (feedback) timing information
Etc . . .

Referring to table 4, the feedback configuration is related to one 8-port CSI-RS (CSI-RS-1) and may further include the information on which codebook to use or the parameters to be configured in the codebook through RRC signaling. Here, the information on which codebook to use is the information of configuring a codebook depending on whether the 8 antenna ports are arranged 1-dimensionally or 2-dimensionally if the CSI-RSs corresponding to the 8 antenna ports should be configured as one 8-port CSI-RS in the case of using different codebooks as described above.

As described above, if the 8 antenna ports can be represented by one 8-port CSI-RS or two 4-port CSI-RSs, the UE can check the codebook to use according to the configuration of the number of CSI-RSs and the number of ports without extra information indicating the codebook to use. That is, if the feedback for 8 antennas is configured with one 8-port CSI-RS, the UE generates/reports the feedback using the corresponding codebook under the assumption that the antennas are arranged 1-dimensionally as in the 8Tx-mode 1 and 8Tx-mode 2. The feedback configuration may further include feedback mode/timing information and additionally the interference measurement resource configuration.

Table 5 shows the case where the feedback configuration corresponds to two 4-port CSI-RSs (CSI-RS-1, CSI-RS-2). In this case, the UE may check that the feedback configuration includes the two 4-port CSI-RS and the 4 port antennas are arranged in 2 rows (or 2 columns) as in the 8Tx-mode 3 and 8Tx-mode 4 and thus generate/report the feedback using the corresponding 8-port antenna arrangement method.

In the feedback configuration of table 5, the UE may recognize that the first channel measurement resource is allocated for antennas 0 to 3 among the 8 antennas and the second channel measurement resource for antennas 4 to 8 or that, in another method, the resources are allocated for odd-numbered antennas and even-numbered antennas respectively. Also, the feedback configuration of table 5 may include the additional codebook parameter information and feedback mode/timing information and even more interference measurement resource configuration information.

At step 4830, the UE receives the CSI-RS using the information checked at steps 910 and 920.

After estimating channels of the 8 antennas arranged 1-dimensionally or 2-dimensionally at step 4830, the UE generates the feedback information of RI, PMI ($i_1^{(n)}$), $i_1^{(m)}$, and $i_2$, or $i_1^{(n)}$ and $i_2$), and CQI using the received feedback configuration and the defined codebook at step 4840.

Next, the UE transmits the feedback informations to the eNB at the corresponding feedback timings according to the feedback configuration at step 4850 and ends the channel feedback generation and report procedure.

At step 4850, the RI, PMI ($i_1^{(n)}$, $i_1^{(m)}$, and $i_2$, or $i_1^{(n)}$ and $i_2$), and CQI may be reported at the timings according to the periodic/aperiodic feedback method defined in the legacy LTE/LTE-A standard.

In the case of the aperiodic feedback, if an aperiodic feedback indicator is received at the $n^{th}$ subframe, the UE transmits the aperiodic feedback information in the uplink data at the $(n+k)^{th}$ subframe. Here, k is a parameter defined in the 3GPP LTE Release 11 standard, and it is set to 4 for Frequency Division Duplexing (FDD) and to one of the values shown in table 1 for Time Division Duplexing (TDD). At this time, the feedback information may include all or some of RI, PMI ($i_1^{(n)}$, $i_1^{(m)}$, and $i_2$, or $i_1^{(n)}$ and $i_2$), wCQI, and sCQI. According to an embodiment of the present invention, the aperiodic feedback indicator may be received through downlink control information.

In the case of the periodic feedback, the UE may determine the feedback timings based on the configured periodic feedback mode and the timing configuration information such as $N_{pd}$, $N_{OFFSET,CQI}$, $M_{RI}$, and $N_{OFFSET,RI}$. In the case of the periodic feedback mode 1-0 or 2-0, there is no change made in the present invention because the RI/PMI is not reported.

In the case of the periodic feedback mode 1-1 or 2-1, it is possible to report the two PMIs at the same timings as the legacy LTE/LTE-A 8Tx situation because in the codebook-related feedback corresponding to the 8Tx-mode 1 and 8Tx-mode 2 and the codebook corresponding to the 8Tx-mode 3 and 8Tx-mode 4 and in the second two-step precoding matrix report method only the two indices for PMI are reported.

Meanwhile, in the situation of using the codebook for the 8Tx-mode 3 and 8Tx-mode 4 and the first two-step precoding matrix report method, the indices $i_1^{(n)}$, $i_1^{(m)}$, and $i_2$ are reported for PMI and additional modification is required in the legacy LTE/LTE-A 8Tx feedback method.

That is, in the corresponding situation, it is necessary to report RI, wCQI, and wideband PMI ($i_1^{(n)}$, $i_1^{(m)}$, and $i_2$) for the case of the feedback mode 1-1; and RI, wCQI, sCQI, wideband PMI ($i_1^{(n)}$, $i_1^{(m)}$, and $i_2$), and subband PMI ($i_2$) for the case of the feedback mode 201.

In the situation of using the codebook for the 8Tx-mode 3 and 8Tx-mode 4 and reporting three PMIs $i_1^{(n)}$, $i_1^{(m)}$, and $i_2$, the PMIs may be transmitted in three sub-modes of the feedback mode 1-1 as follows:

Reporting Mode 1-1, Submode 1

In the first sub-mode, the RI is transmitted along with $i_1^{(n)}$ and $i_1^{(m)}$, and wCQI and $i_2$ are transmitted simultaneously at another timing. Here, the feedback period and offset of wCQI and $i_2$ are $N_{Pd}$ and $N_{OFFSET,CQI}$, and the feedback period and offset of RI and $i_1^{(n)}$ and $i_1^{(m)}$ are $M_{RI} \cdot N_{pd}$ and $N_{OFFSET,CQI} + N_{OFFSET,RI}$. If all of the three PMIs ($i_1^{(n)}$, $i_1^{(m)}$ and $i_2$) are reported from the UE to the eNB, the UE and eNB determine the precoding matrix W($i_1^{(n)}$, $i_1^{(m)}$, $i_2$) corresponding to the combination of $i_1^{(n)}$, $i_1^{(m)}$, and $i_2$, in the codebook for 8Tx-mode 3 and 8Tx-mode 4 which is shared by the UE and eNB as the UE-preferred precoding matrix.

Reporting Mode 1-1, Submode 2

In the second sub-mode, the RI is transmitted separately and the wCQI and the PMIs ($i_1^{(n)}$, $i_1^{(m)}$ and, $i_2$) are transmitted simultaneously at another timing. Here, the feedback period and offset of the wCQI, $i_1^{(n)}$, $i_1^{(m)}$, and $i_2$ are $N_{pd}$ and $N_{OFFSET,CQI}$, and the feedback period and offset of the RI are $M_{RI} \cdot N_{pd}$ and $N_{OFFSET,CQI} + N_{OFFSET,RI}$.

Reporting Mode 1-1, Submode 3

In the third sub-mode, the RI is transmitted along with $i_1^{(m)}$, and the wCQI, $i_1^{(n)}$, and $i_2$ are transmitted simultaneously at another timing. Here, the feedback period and offset of the wCQI, $i_i^{(n)}$ and $i_2$ are $N_{pd}$ and $N_{OFFSET,CQI}$, and the feedback period and offset of the RI and $i_i^{(m)}$ are $M_{RI} \cdot N_{pd}$ and $N_{OFFSET,CQI} + N_{OFFSET,RI}$. Here, although the description is directed to the case where the $i_1^{(m)}$ is transmitted along with RI and the $i_1^{(n)}$ is transmitted along with the wCQI/$i_2$ under the assumption that m corresponding to the vertical precoding varies slowly in comparison with n corresponding to the horizontal precoding, it is also possible that the RI is transmitted along with $i_1^{(n)}$, and the wCQI and $i_1^{(m)}$ and $i_2$ areis transmitted simultaneously at another timing depending on the antenna arrangement situation or environment.

In the case of using the codebook for the 8Tx-mode 3 and 8Tx-mode 4 and feedback mode 2-1 in the situation of reporting the three PMIs $i_1^{(n)}$, $i_1^{(m)}$, and $i_2$), the PMI may be transmitted in one of three methods as follows:

Reporting Mode 2-1, Alternative 1

In the feedback mode 2-1 for 8 CSI-RS antenna ports, a precoding type indicator (PTI) is added to the feedback information. At this time, the PTI is fed back along with the RI at the feedback period of $M_{RI} \cdot H \cdot N_{pd}$ subframes with the offset of $N_{OFFSET,CQI} + N_{OFFSET,RI}$.

In detail, in the first method of the feedback mode 2-1, if the PTI is 0, all of the three PMIs ($i_1^{(n)}$, $i_1^{(m)}$, and $i_2$) and wCQI are fed back. At this time, the wCQI, $i_1^{(n)}$, and $i_2$ are transmitted simultaneously at the period of $N_{pd}$ with the offset of $N_{OFFSET,CQI}$. The reporting period of $i_1^{(m)}$ is $H \cdot N_{pd}$, and the offset is $N_{OFFSET,CQI}$. Here, H' is transmitted through higher layer signaling.

Otherwise if the PTI is 1, the wCQI is transmitted along with the wideband $i_2$, and the sCQI is fed back along with the subband $i_2$ at another timing. At this time, $i_1^{(n)}$ and $i_1^{(m)}$ are not transmitted, and $i_2$ and CQI are calculated under the assumption of $i_1^{(n)}$ and $i_1^{(m)}$ reported lastly in the case the PTI is 0 and reported. The period and offset of the PTI and RI are identical with those in the case that the PTI is 0. The period of sCQI is $N_{pd}$ subframes, and the offset is $N_{OFFSET,CQI}$. The wCQI and $i_2$ are fed back at the period of $H \cdot N_{pd}$ with the offset of $N_{OFFSET,CQI}$ and H is defined as in the case of LTE-A 8Tx.

Reporting Mode 2-1, Alternative 2

In the feedback mode 2-1 for 8 CSI-RS antenna ports, the Precoding Type Indicator (PTI) is added to the feedback information. At this time, the PTI is fed back along with the RI at the period of $M_{RI} \cdot H \cdot N_{pd}$ subframes with the offset of $N_{OFFSET,CQI} + N_{OFFSET,RI}$.

In detail, in the second method of the feedback mode 2-1, if the PTI is 0, all of the three PMIs ($i_1^{(n)}$, $i_1^{(m)}$, and $i_2$) and wCQI are fed back. At this time, the wCQI and $i_2$ are transmitted simultaneously at the period of $N_{pd}$ with the offset of $N_{OFFSET,CQI}$. The $i_1^{(n)}$ and $i_1^{(m)}$ are reported simultaneously at the period of $H' \cdot N_{pd}$ with the offset of $N_{OFFSET,CQI}$. Here, H' is transmitted through higher layer signaling.

Otherwise if the PTI is 1, the wCQI is transmitted along with the wideband $i_2$, and the sCQI is fed back along with the subband $i_2$ at another timing. At this time, $i_1^{(n)}$ and $i_1^{(m)}$ are not transmitted, and $i_2$ and CQI are calculated under the assumption of $i_1^{(n)}$ and $i_1^{(m)}$ are reported lastly in the case that the PTI is 0 and reported. The period and offset of the PTI and RI are identical with those in the case that the PTI is 0. The period of sCQI is $N_{pd}$ subframes, and the offset is $N_{OFFSET,CQI}$. The wCQI and $i_2$ are fed back at the period of $H \cdot N_{pd}$ with the offset of $N_{OFFSET,CQI}$, and H is defined as in the case of LTE-A 8Tx.

Reporting Mode 2-1, Alternative 3

In the feedback mode 2-1 for 8 CSI-RS antenna ports, the Precoding Type Indicator (PTI) is added to the feedback information. At this time, the PTI and RI are fed back simultaneously at the period of $M_{RI} \cdot H \cdot N_{pd}$ subframes with the offset of $N_{OFFSET,CQI} + N_{OFFSET,RI}$.

In detail, in the third method of the feedback mode 2-1, the PTI may have one of four values unlike the above cases. If the PTI is 0, all of the three PMIs ($i_1^{(n)}$, $i_1^{(m)}$ and $i_2$) and wCQI are fed back. At this time, the wCQI and $i_2$ are transmitted simultaneously at the period of $N_{pd}$ with the offset of $N_{OFFSET,CQI}$. The $i_1^{(n)}$ and $i_1^{(m)}$ are reported simultaneously at the period of $H' \cdot N_{pd}$ with the offset of $N_{OFFSET,CQI}$. Here, H' is transmitted through higher layer signaling.

If the PTI is 1, the PMIs $i_1^{(m)}$ and $i_2$ and wCQI are fed back. At this time, the wCQI and $i_2$ are transmitted simultaneously at the period of $N_{pd}$ with the offset of $N_{OFFSET,CQI}$. The $i_1^{(m)}$ is reported separately at the period of $H' \cdot N_{pd}$ with the offset of $N_{OFFSET,CQI}$. Here, H' is transmitted through higher layer signaling. If the PTI is 1, the $i_1^{(m)}$ is not transmitted, and the updated situation of the $i_1^{(n)}$, $i_2$, and CQI is reported under the assumption of $i_1^{(m)}$ is reported lastly in the case that the PTI is 0 or 2.

If the PTI is 2, the PMIs $i_1^{(m)}$ and $i_2$ and wCQI are fed back. At this time, the wCQI and $i_2$ are transmitted simultaneously at the period of $N_{pd}$ with the offset of $N_{OFFSET,CQI}$. The $i_1^{(m)}$ is reported separately at the period of $H' \cdot N_{pd}$ with the offset of $N_{OFFSET,CQI}$. Here, H' is transmitted through higher layer signaling. If the PTI is 1, the $i_1^{(n)}$ is not transmitted, and the updated situation of the $i_1^{(m)}$, $i_2$, and CQI is reported under the assumption of $i_1^{(m)}$ is reported lastly in the case that the PTI is 0 or 1.

If the PTI is 1 or 2, this is the case of supporting the situation that requires the update of one of the $i_1^{(n)}$ and $i_1^{(m)}$; and, in the above description, although the update 2 of $i_1^{(n)}$ in the case that PTI is 1 is substitute for the update situation of $i_1^{(m)}$, the reverse is possible too.

If the PTI is 3, the wCQI is transmitted along with the wideband $i_2$, and the sCQI is fed back along with the subband $i_2$ at another timing. At this time, the $i_1^{(n)}$ and $i_1^{(m)}$ are not transmitted, and the $i_2$ and CQI calculated under the assumption of $i_1^{(n)}$ and $i_1^{(m)}$ are reported lastly in the case that the PTI is 0, 1, or 2 is reported. The period and offset of the PTI and RI are identical with those in the case that the PTI is 0. The period of sCQI is $N_{pd}$ subframes, and the offset is $N_{OFFSET,CQI}$. The wCQI and $i_2$ are fed back at the period of $H \cdot N_{pd}$ with the offset of $N_{OFFSET,CQI}$ and H is defined as in the case of LTE-A 8Tx.

Figure 49:
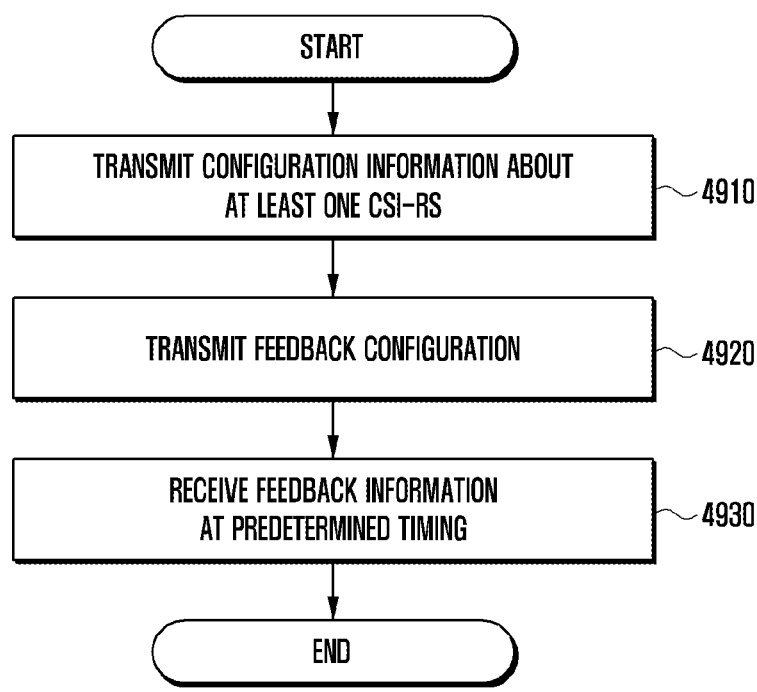
FIG. 49 is a flowchart illustrating the operation order of the base station according to an embodiment of the present invention.

FIG. 49 is a flowchart illustrating the operation order of an eNB according to an embodiment of the present invention.

Referring to FIG. 49, the eNB sends the UE the configuration information of at least one CSI-RS at step 4910. Next, the eNB sends the UE the feedback configuration information based on the CSI-RS at step 4920. Here, the feedback configuration according to embodiment 5-1 of the present invention may include all or some of the RRC information as shown in tables 4 or 5.

Next, the eNB receives feedback information from the UE for use in determining the channel state between the UE and the eNB at step 4930.

Embodiment 5-2: Codebook Design and Feedback Configuration and Generation/Report in 16-Tx Antenna Situation FIG. 50 shows four methods of arranging 16 antennas 1-dimensionally or 2-dimensionally.

A description is made hereinafter of the rank-1 codebook design methods for four antenna arrangement modes as illustrated in FIG. 50.

It is easy to analogize the codebook of equation 13 for the 16Tx-mode 1 and 16Tx-mode 2 in which the antennas are arranged 1-dimensionally and the codebook of equation 14a for the 16Tx-mode 3 and 16Tx-mode 4 in which the antennas are arranged 2-dimensionally in the same way as embodiment 1.

$$C_{16Tx-1} = \qquad \text{[Equation 13]}$$

$$\left\{ \begin{array}{l} [[1, q^n, \ldots, q^{7n}], e^{j\phi}[1, q^n, \ldots, q^{7n}]]^T \mid \\ n = 0, 1, \ldots, Q_1 - 1, \phi \in \left\{ \begin{array}{l} 0, 2\pi/Q_2, 2 \cdot 2\pi/Q_2, \\ \ldots, (Q_2 - 1) \cdot 2\pi/Q_2 \end{array} \right\} \end{array} \right\},$$

where $q = e^{j2\pi/Q_1}$ $$C_{16Tx-2} = \qquad \text{[Equation 14a]}$$

$$\left\{ \begin{array}{l} [[1, \ldots, q^{3n}], e^{j\phi}[1, \ldots, q^{3n}]], \\ p^m[1, \ldots, q^{3n}], e^{j\phi}[1, \ldots, q^{3n}]]^T \mid \\ n = 0, 1, \ldots, Q_3 - 1, m = 0, 1, \ldots, Q_4 - 1, \\ \phi \in \{0, 2\pi/Q_5, 2 \cdot 2\pi/Q_5, \ldots, (Q_5 - 1) \cdot 2\pi/Q_5\} \end{array} \right\}$$

where $q = e^{j2\pi/Q_3}$, $p = e^{j2\pi/Q_4}$

Since the codebook equations 13 and 14 for 16 Tx antenna arrangement have the same parameters as the codebook equations 10 and 12 for 8 Tx antenna arrangement according to embodiment 5-1, embodiment 5-2 considering the 16 Tx antenna arrangement follows FIGS. 48 and 49 illustrating the operations of the UE and eNB according to the first embodiment.

In equation 14a, the code book is designed in consideration of the phase difference between the antennas in one direction, i.e. vertical or horizontal direction, the phase difference between to two antenna groups different in polarity, and the phase difference between the antennas in the other direction. Meanwhile, it is obvious that the phase difference to be considered may change depending on the antenna port indexing scheme of the eNB. For example, it may also be possible to induce a codebook like equation 14b in consideration of the phase difference between the antennas in one direction, the phase difference between the antennas in the other direction, and the phase difference between to two antenna groups different in polarity.

$$C'_{16Tx-2} = \qquad \text{[Equation 14b]}$$

$$\left\{ \begin{array}{l} \left[ \begin{array}{l} [[1, \ldots, q^{3n}], p^m[1, \ldots, q^{3n}]], \\ e^{j\phi}[[1, \ldots, q^{3n}], p^m[1, \ldots, q^{3n}]] \end{array} \right]^T \mid \\ n = 0, 1, \ldots, Q_3 - 1, m = 0, 1, \ldots, Q_4 - 1, \\ \phi \in \left\{ 0, \frac{2\pi}{Q_5}, 2\frac{2\pi}{Q_5}, \ldots, (Q_5 - 1)\frac{2\pi}{Q_5} \right\} \end{array} \right\}$$

Where $q = e^{j2\pi/Q_3}$ and $p = e^{j2\pi/Q_4}$.

Although the direction in which 4 antenna ports are arranged is considered first in equation 14b, it may also be possible to design the codebook in consideration of the direction in which 2 antenna ports are arranged first. In this case, the code book is induced as equation 14c.

$$C''_{16Tx-2} = \qquad \text{[Equation 14c]}$$

$$\left\{ \begin{array}{l} \left[ \begin{array}{l} [[1, q^n], p^m[1, q^n], p^{2m}[1, q^n], p^{2m}[1, q^n]], \\ e^{j\phi}[[1, q^n], p^m[1, q^n], p^{2m}[1, q^n], p^{3m}[1, q^n]] \end{array} \right]^T \mid \\ n = 0, 1, \ldots, Q_3 - 1, m = 0, 1, \ldots, Q_4 - 1, \phi \in \\ \left\{ 0, \frac{2\pi}{Q_5}, 2\frac{2\pi}{Q_5}, \ldots, (Q_5 - 1)\frac{2\pi}{Q_5} \right\} \end{array} \right\}$$

where $q = e^{j2\pi/Q_5}$ and $p = e^{j2\pi/Q_4}$

Embodiment 5-2 differs from embodiment 5-1 in that the codebook is derived by equations 13 and 14 and the UE is allocated one 16-port CSI-RS, two 8-port CSI-RSs, or four 4-port CSI-RSs for a total 16 antenna ports to measure the channels of the 16 ports.

In addition, if the two 8-CSI-RS ports represent the 16 antenna ports, the UE operates based on the codebook corresponding to the 16Tx-mode 3 and 16Tx-mode 4 under the assumption of the 2-dimensional antenna arrangements.

Figure 51:
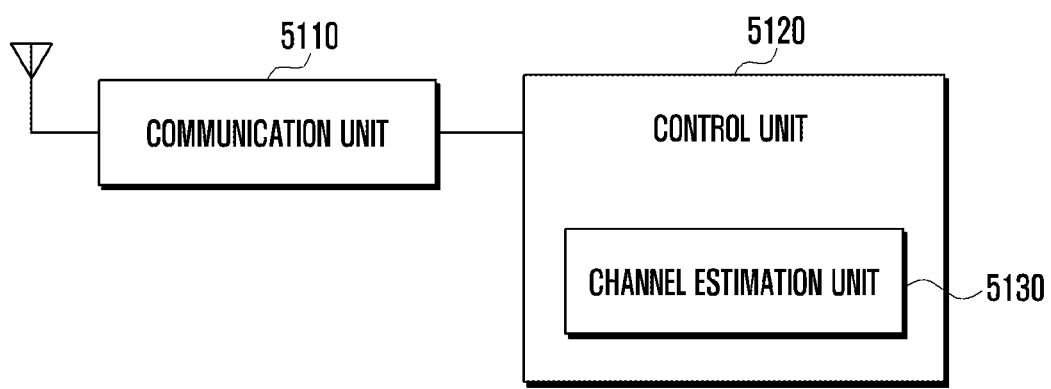
FIG. 51 is a block diagram illustrating a configuration of the terminal according to an embodiment of the present invention.

FIG. 51 is a block diagram illustrating a configuration of the terminal according to embodiments of the present invention.

Referring to FIG. 51, the UE includes a communication unit 5110 and a control unit 5120.

The communication unit 5110 is responsible for the function of transmitting and receiving data to and from outside (e.g. eNB). Here, the communication unit 5110 may transmit the feedback information for FD-MIMO technology to the eNB under the control of the control unit 5120.

The control unit 5120 controls the states and operations of all components of the UE. In detail, the control unit 5120 generates the feedback information for FD-MIMO according to the information received from the eNB. The control unit 5120 also controls the communication unit 5110 to feed back the generated channel information according to the timing information provided by the eNB. For this purpose, the control unit 5120 may include a channel estimator 5130.

The channel estimator 5130 determines the feedback information based on the CSI-RS and feedback allocation information received from the eNB and estimates the channel based on the received CSI-RS.

Although FIG. 51 is directed to an exemplary case of the UE including the communication unit 5110 and the control unit 5120, the UE, without limitation thereto, may include various components depending on the functionalities of the UE. For example, the UE may further include a display unit for displaying the current state of the UE, an input unit for receiving a function execution signal input by the user, and a storage unit for storing data generated in the UE. Although the control unit 5120 and the channel estimator 5130 are depicted as separated blocks, the configuration is not limited thereto. For example, the function of the channel estimator 5130 may be executed by the control unit 5120.

In this case, the control unit 5120 may control the communication unit 5110 to receive the configuration information for at least one reference signal from the eNB. The control unit 5120 may also control the communication unit 5110 to receive the feedback configuration information for use in measuring the at least one reference signal and generating the feedback information based on the measurement result.

The control unit 5120 measures the at least one reference signal received by the communication unit 5110 and generates feedback information according to the feedback configuration information. The control unit 5120 also controls the communication unit 5110 to transmit the generated feedback information at the feedback timing determined according to the feedback configuration information.

Figure 52:
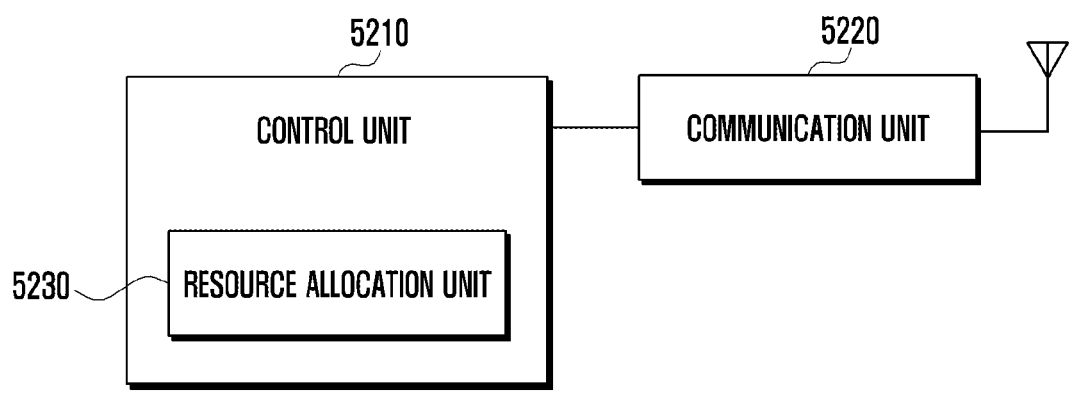
FIG. 52 is a block diagram illustrating a configuration of the base station according to an embodiment of the present invention.

FIG. 52 is a block diagram illustrating a configuration of an eNB according to an embodiment of the present invention. Referring to FIG. 52, the eNB includes a control unit 5210 and a communication unit 5220.

The control unit 5210 controls the states and operations of all of the components of the eNB. In detail, the control unit 5210 allocates CSI-RS resource for channel estimation to the UE and notifies the UE of the feedback resource and feedback timing. For this purpose, the control unit 5210 may further include a resource allocation unit 5230.

The resource allocation unit 5230 maps the CSI-RS to the resource for use at the UE in estimating the channels of a plurality of antennas and transmits the CSI-RS using the corresponding resource. The resource allocation unit 1530 also determines the feedback configuration and feedback timings such that the feedback information transmitted by plural UEs does not collide, and receives and interprets the feedback information at the configured timings.

The communication unit 5220 is responsible for the function of transmitting and receiving data, reference signals, and feedback information to and from the UE. Here, the communication unit 5220 transmits the CSI-RS to the UE on the allocated resource and receives the feedback on the channel information from the UE under the control of the control unit 5210.

Although the drawing is directed to the case where the control unit 5210 and the resource allocation unit 5230 are depicted as separate blocks, the configuration is not limited thereto. For example, the functions of the resource allocation unit 5230 may be performed by the control unit 5210.

In this case, the control unit 5210 may control the communication 5220 to transmit the configuration information of the at least one reference signal to the UE. The control unit 5210 may also control the communication unit 5220 to transmit to the UE the feedback configuration information for use in generating the feedback information based on the measurement result.

The control unit 5210 may also control the communication unit 5220 to transmit the at least one reference signal to the UE and receive the feedback information transmitted by the UE at the feedback timing determined according to the feedback configuration information.

Sixth Embodiment

The sixth embodiment relates to a wireless mobile communication system and, in particular, to a method for a terminal to measure Channel State Information (CSI) and transmit the channel station information to a base station to report the measurement result in a wireless communication system adopting a multiple access scheme using multi-carrier such as Orthogonal Frequency Division Multiple Access (OFDMA).

For radio communication between the UE and the eNB, the UE has to report channel state between the UE and the eNB to the eNB.

If the feedback channel capacity is infinite, the UE can notify the eNB of the UE-preferred precoding matrix perfectly. However, since the number of bits which the UE can use for feedback is limited in the real world, the current standard specifies that the UE notifies the eNB of a codebook index using the PMI in order for the eNB to acquire the quantized channel information The LTE/LTE-A Release 12 standard supports 8-bit PMI for the eNB with 8 antennas. The 8-bit PMI may consist of two sub-PMIs $i_2$ and $i_2$ of 4 bits each. This means that for the eNB that has 8 antennas the UE may report one of $2^8=256$ kinds of precoding matrices to the eNB. Since the quantization error occurring when quantizing the real channel with the codebook restricted in size is one of the significant elements restricting the system throughput, it is necessary to reflect the real channel environment carefully in designing the codebook design.

Figure 53:
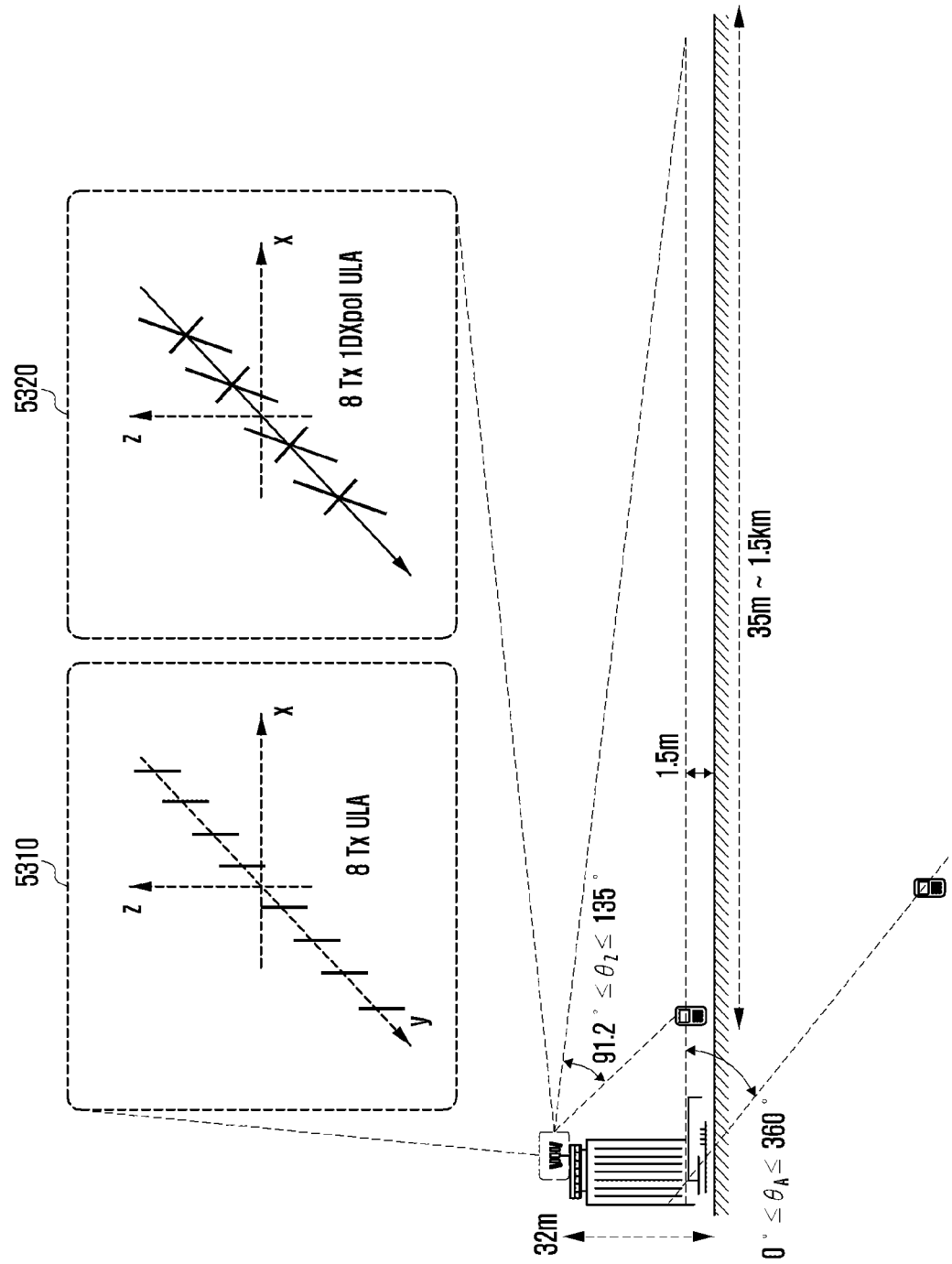
FIG. 53 is a diagram illustrating an antenna array structure for the case of 8 Tx antennas in Release 12 and cell deployment according to the 3GPP TR 25.996 2D channel model (UMA)

FIG. 53 is a diagram illustrating a system with 8 transmit antennas assumed in the LTE/LTE-A Release 12 standard.

In FIG. 53, the height of the eNB and the minimum and maximum distances between the UE and the eNB follow a scenario predefined in the 3GPP standard.

In parts 5310 and 5320 of FIG. 53, each antenna means a logical antenna port, and one antenna port may be made up of a plurality of physical antenna elements.

In FIG. 53, the horizontal angle of the UE is not restricted in association with the eNB antenna arrangement ($0°≤θ≤360°$) while the vertical angle changes little. This is because the current systems use the antenna port configured in the form of a passive antenna array made up of the antenna elements arranged in the vertical direction to provide a beam pattern fixed in the vertical direction. The systems also support the dynamic beamforming or dynamic precoding in the horizontal direction by arranging the antenna ports in the horizontal direction. Such an antenna arrangement may form a co-polarization (Upol) Uniform Linear Array (ULA) as denoted by reference number 5310 or cross-polarization (Xpol) ULA depending on whether the polarized antenna is used as denoted by reference number 5320 in FIG. 53.

Since the ULA deployed in the horizontal direction is difficult to distinguish between the vertical direction channel components as denoted by reference number 5310, the LTE/LTE-A Release 12 or earlier standards use the 2-Dimensional Spatial Channel Model (2D SCM) and the codebook indicated by the PMI which is designed to quantize the 2D channel efficiently.

Meanwhile, as metropolitan and residence areas are crowded with skyscrapers and high rise apartment buildings, there are many discussions on the introduction of the vertical direction dynamic precoding.

As a result, the 3GPP standard specifies 3D SCM and 2-dimensional antenna array-based FD-MIMO system.

Figure 54:
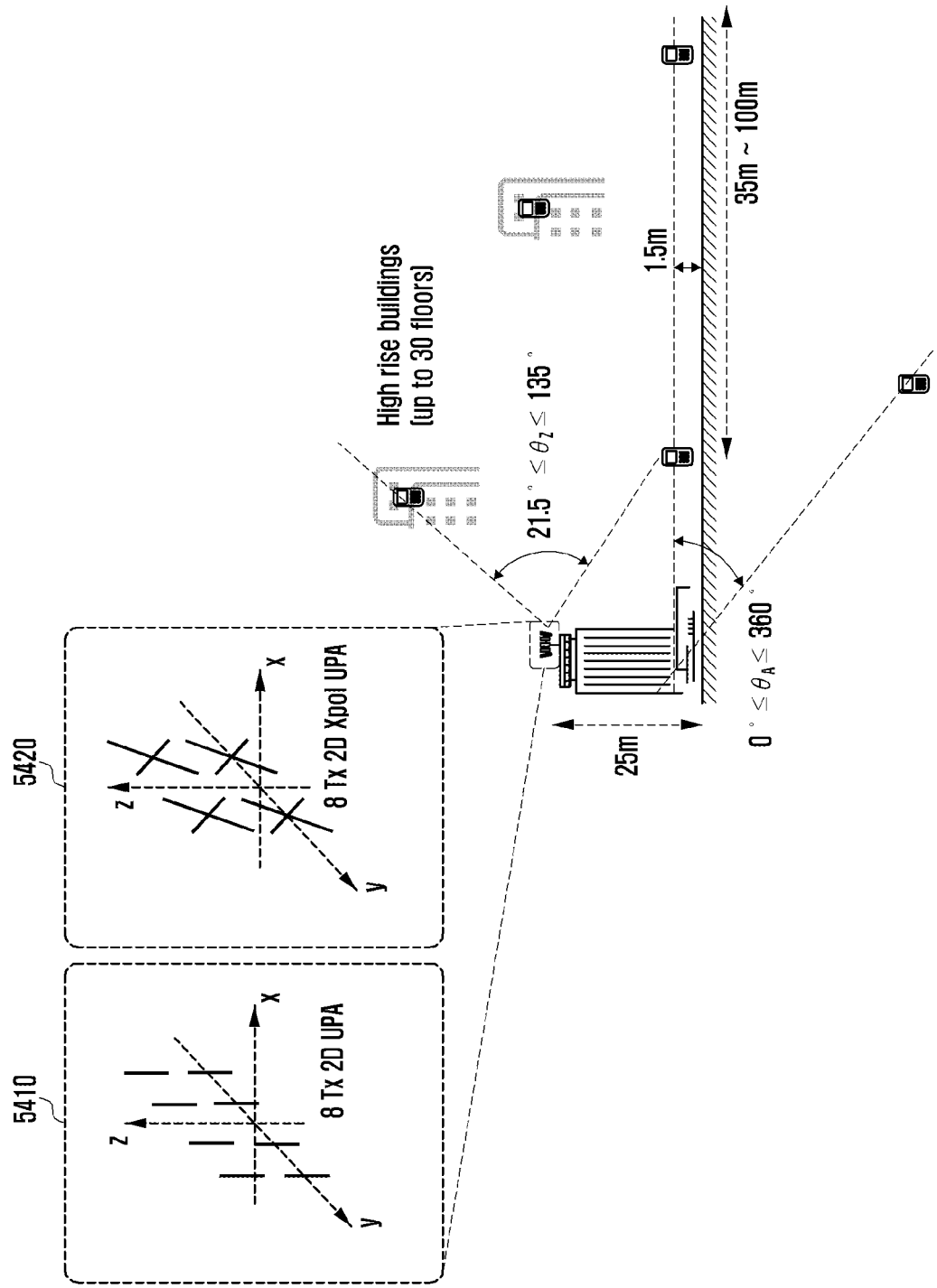
FIG. 54 is a diagram illustrating an FD MIMO antenna array structure for the case of 8 Tx antennas and cell deployment according to 3GPP TR 36.873 3D channel model (3D-Uma-H)

FIG. 54 is a diagram illustrating a situation in which the eNB antenna at the height of 25 m supports a UE at the height of 1.5 m in the main service scenario to be assumed in the next standardization, e.g. LTE/LTE-A Release 13.

In FIG. 54, the height of the eNB, the minimum and maximum distance between the UE and the eNB, and the maximum height of the UE follow the 3D-UMa-H scenario of the 3GPP standard.

In FIG. 54, each antenna means a logical antenna port, and one antenna port may be made up of a plurality of physical antenna elements. Since the current codebook is designed for the main purpose of dynamic precoding in the horizontal direction as described, if the vertical position difference between UEs is large as shown in FIG. 54, its performance may be restricted.

Meanwhile, the FD-MIMO system adopting the technique proposed in the present invention considers the 2-dimensional antenna port array in the vertical and the horizontal directions as shown in FIG. 54. Thus, unlike the legacy system supporting only the fixed vertical direction beam pattern, the FD-MIMO system is capable of coping efficiently with the vertical height difference between UEs.

Assuming 8 eNB antennas, the FD-MIMO antenna array may be configured in the form of Upol Uniform Planar Array (UPA) as denoted by reference number 5410 or Xpol UPA as denoted by reference number 5420 in FIG. 54.

With the increase of demand on the vertical direction dynamic precoding, there are many discussions on the FD-MIMO comprised of UPA antenna ports.

An embodiment of the present invention proposes an 8 Tx codebook appropriate for Xpol UPA which is modified and improved from the legacy 8 Tx codebook optimized for Xpol ULA structure. In detail, an embodiment of the present invention provides a method and apparatus of generating the channel state information for performing efficient data transmission/reception and sharing the generated channel state information in the FD-MIMO system based on LTE-A.

Also, an embodiment of the present invention provides a method and apparatus of generating channel state information with the rank 3 or 4 for high efficiency data transmission/reception and sharing the channel state information in the FD-MIMO system.

An embodiment of the present invention proposes methods of configuring codebook and feedback and generating/reporting the feedback for 3 or 4 situations designed in consideration of 1-dimensionally or 2-dimensionally arranged linear array (Upol) or cross array (Xpol) antennas in the FD-MIMO system.

Here, the co-polarization antenna array (Upol) is characterized in that all antennas are arranged linearly in the same direction, while the cross polarization antenna array (Xpol) is characterized in that the two antenna groups are arranged at the angles of +45 and −45 degrees to the Y axis in the positive direction.

In an embodiment of the present invention, the antennas arranged at the angles of +45 and −45 degrees to the Y axis in the positive direction are referred to hereinafter as H-pol antenna and V-pol antenna, respectively.

this time, the channel of n clusters between the H-pol antenna array of the eNB and the H-pol antenna of the UE is expressed as equation 15.

$$[h_{1,h_1} \quad h_{1,h_2} \quad \ldots \quad h_{1,h_S}]_n(t) = \qquad \text{[Equation 15]}$$

$$\sqrt{\rho_n} \sum_{m=1}^{M} \exp(j\Phi_{nm}^{(h,h)}) \exp(jk\|v\|\cos(\theta_{n,m,AoA} - \theta_v)) \times [$$

$$1 \quad e^{jkd\sin\theta_{n,m,AoD}} \quad \ldots \quad e^{jk(S-1)d\sin\theta_{n,m,AoD}}]$$

In equation 15, $\rho_n$ denotes the total gain of the $n^{th}$ cluster which includes antenna gain and pathloss, $\Phi_{n,m}^{(h,h)}$ denotes the phase offset between the H-pol eNB antenna and the H-pol UE antenna on the $m^{th}$ subpath belonging to the $n^{th}$ cluster, $k=2\pi/\lambda$ denotes the wave number, $\|v\|$ denotes the velocity of the UE, $\theta_v$ denotes the moving direction of the UE, $\theta_{n,m,AoA}$ denotes the angle of arrival at the UE, d denotes the distance between eNB antenna ports, and $\theta_{n,m,AoD}$ denotes the angle of departure at the eNB.

Meanwhile, the channel between the V-pol antenna array of the eNB and the H-pol antenna is expressed as equation 16.

$$[h_{1,v_1} \quad h_{1,v_2} \quad \ldots \quad h_{1,v_S}]_n(t) = \qquad \text{[Equation 16]}$$

$$\sqrt{\rho_n} \sum_{m=1}^{M} \exp(j\Phi_{nm}^{(v,h)}) \exp(jk\|v\|\cos(\theta_{n,m,AoA} - \theta_v)) \times [$$

$$1 \quad e^{jkd\sin\theta_{n,m,AoD}} \quad \ldots \quad e^{jk(S-1)d\sin\theta_{n,m,AoD}}]$$

In equation 16, $\Phi_{nm}^{(v,h)}$ denotes the phase offset between the V-pol eNB antenna and the H-pol UE antenna. In equations 15 and 16, the channel difference between the H-pol antenna group and the V-pol antenna group is determined by $\varphi = \Phi_{nm}^{(h,h)} - \Phi_{nm}^{(v,h)}$.

From the above result, it is possible to know that the beamforming vector maximizing the Signal to Noise Ratio (SNR) of the Upol ULA is represented by equation 17 if the channel has a dominant propagation path $\theta_{n,m,AoD}$.

$$[1 e^{jkd \sin \theta_{n,m,AoD}} e^{jkd \sin \theta_{n,m,AoD}} \ldots e^{jk(S-1)d \sin \theta_{n,m,AoD}}]^H \quad \text{[Equation 17]}$$

If the channel has a dominant propagation path $\theta_{n,m,AoD}$, the beamforming vector maximizing the SNR of the X-pol ULA is represented by equation 18.

$$[[1 \quad e^{jkd\sin\theta_{n,m,AoD}} \quad e^{jk2d\sin\theta_{n,m,AoD}} \quad \ldots \quad e^{jk(S-1)d\sin\theta_{n,m,AoD}}], \qquad \text{[Equation 18]}$$

$$e^{j\varphi}[1 \quad e^{jkd\sin\theta_{n,m,AoD}} \quad e^{jk2d\sin\theta_{n,m,AoD}} \quad \ldots \quad e^{jk(S-1)d\sin\theta_{n,m,AoD}}]]^H$$

The codebook and feedback design appropriate for an MIMO system can be obtained through contemplation on how the instant channel value from the transmitter with multiple antennas to the receiver with one antenna is formed.

Figure 55:
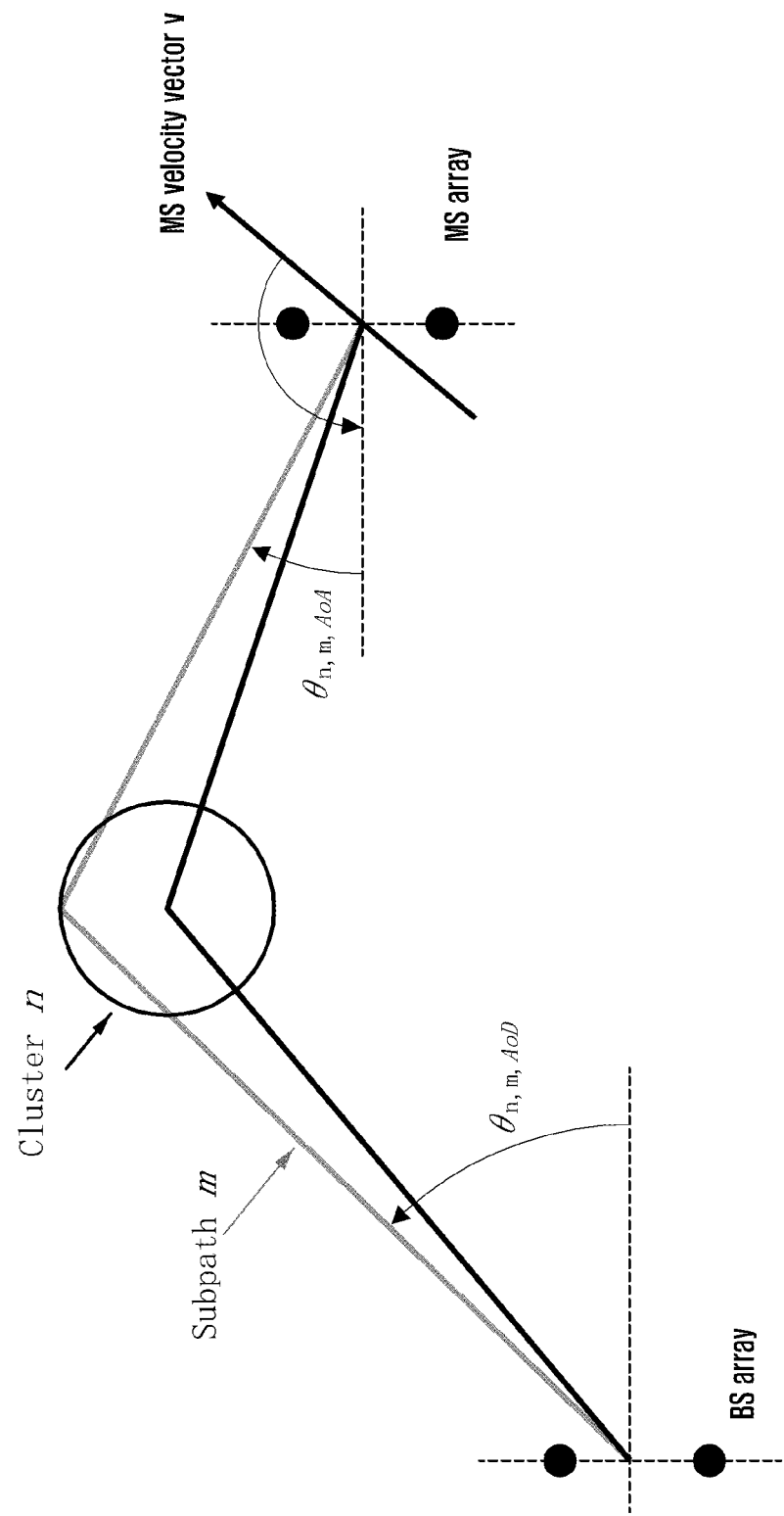
FIG. 55 is a diagram illustrating 3GPP TR 25.996 2D channel model angle parameter.

FIG. 55 is a diagram illustrating the 2D SCM provided in the 3GPP standard.

Suppose that the eNB has the X-pol ULA comprised of $S=M_T/2$ H-pol antenna ports and the same number of V-poll antennas ports in the environment as shown in FIG. 55. At Equation 18 shows that the beam maximizing the SNR can be formed by adjusting the co-phasing term $e^{j\varphi}$ based on equation 17 because the geographical locations of the H-pol antenna group and the V-pol antenna group are identical with each other in the case of the X-pol ULA.

Based on the above facts, the channel information of the 8 Tx system is designed to be fed back with two kinds of PMI for $W_1$ and $W_2$ in LTE/LTE-A Release 12. The $W_1$ denotes the beam group comprised of a plurality of beamforming vectors for long-term CSI feedback corresponding to a wideband PMI (wPMI) and is indicated by the index $i_1$.

In the LTE/LTE-A Release 12 8 Tx system, $i_1$ has a range of $i_1 \in \{0,1,\ldots,15\}$ for rank 1-2 and $i_1 \in \{0,1,2,3\}$ for ranks 3-4. $W_1$ can be expressed as follows per rank.

$$W_1 = \begin{bmatrix} X_{i1} & 0 \\ 0 & X_{i1} \end{bmatrix}, \quad \text{[Equation 19]}$$

$$x_n = [\, v_{2n} \quad v_{2n+1} \quad v_{2n+2} \quad v_{2n+3} \,], \text{ for rank 1-2}$$

$$W_1 = \begin{bmatrix} X_{i1} & 0 \\ 0 & X_{i1} \end{bmatrix}, \quad \text{[Equation 20]}$$

$$x_n = [\, v_{8n} \quad v_{8n+2} \quad v_{8n+4} \quad v_{8n+6} \quad v_{8n+8} \quad v_{8n+10} \quad v_{8n+12} \quad v_{8n+14} \,],$$

for rank 3-4

In equations 19 and 20, $v_n = [1 \; e^{j2\pi n/Q} \; e^{j2\pi \cdot 2n/Q} \; e^{j2\pi \cdot 3n/Q}]^T$ and $Q=32$.

It is obvious that each element of $v_n$ (e.g. $e^{j2\pi n/Q}$) in equations 19 and 20 has a format to quantize each element of equation 17 (e.g. $e^{jkd \sin \theta_{n,m,AoD}}$) evenly. That is, $v_n$ has a format of dividing the reference phase $0 \le kd \sin \theta_{n,m,AoD} < 2\pi$ of equation 17 into Q sections equally.

Thus, Q may be considered as the resolution of the DFT vector $v_n$ forming $X_n$. The UE may find the index corresponding to $W_1$ including the DFT vector having a value most proximate to the estimated channel per rank based on equations 19 and 20 and reports the index to the eNB.

The $W_2$ selects a beam from the beam group for short-term CSI feedback corresponding to a subband PMI (sPMI) and adjusts co-phasing. The range of the index for indicating $W_2$ is $i_2 \in \{0,1,\ldots,15\}$ for rank 1-4 and $i_1 \in \{0,1,2,3\}$ for rank 4 in the LTE/LTE-A Release 12 8 Tx system. For rank 1, $W_2$ can be expressed as equation 21, $$W_2^{(1)} = \frac{1}{\sqrt{P}} \begin{bmatrix} e_i \\ e^{j\varphi} e_i \end{bmatrix} \quad \text{[Equation 21]}$$

where P=8 denotes a normalization constant and $e_1$ denotes a 4×1 vector of which the $i^{th}$ element is 1 and the other elements are 0, $i \in \{1, 2, 3, 4\}$, and $e^{j\varphi} \in \{1, j, -1, -j\}$. Equation 7 is designed to select a beam and a co-phasing factor in the rank 1 environment. For Rank 2, $W_2$ can be expressed as equation 22, $$W_2^{(2)} = \frac{1}{\sqrt{4}} \begin{bmatrix} e_i & e_j \\ e^{j\varphi} e_i & -e^{j\varphi} e_j \end{bmatrix} \quad \text{[Equation 22]}$$

$((i, j) \in \{(1, 1), (2, 2), (3, 3), (4, 4),$ $(1, 2), (2, 3), (1, 4), (2, 4)\}, e^{j\varphi} \in \{1, j\}).$ Equation 22 is designed to select two beams identical with or different from each other and a co-phasing factor in the rank 2 environment. In order for the estimated channels $W=W_1 W_2^{(2)}$ to be always orthogonal, the co-phasing factor phase difference between the first and second column vectors of $W_2$ are set to 180°. For Rank 4, $W_2$ can be expressed as equation 23, $$W_2^{(4)} = \frac{1}{\sqrt{32}} \begin{bmatrix} e_i & e_j & e_i & e_j \\ e^{j\varphi} e_i & e^{j\varphi} e_j & -e^{j\varphi} e_i & -e^{j\varphi} e_j \end{bmatrix} \quad \text{[Equation 23]}$$

$((i, j) \in \{(1, 5), (2, 6), (3, 7), (4, 8)\}, e^{j\varphi} \in \{1, j\})$

In equation 23, (i, j) is designed to select two different orthogonal vectors in the beam group of equation 23.

The channel $W=W_1 W_2^{(4)}$ estimated in this way is always an orthogonal matrix.

For rank 3, three column vectors are selected from equation 23 to form $W_2^{(3)}$. In the LTE/LTE-A Release 12 8 Tx system, two types of $W_2^{(3)}$ are used as follows.

$$W_2^{(3)} = \begin{bmatrix} e_i & e_j & e_k \\ e_i & -e_j & -e_k \end{bmatrix}, \quad \text{[Equation 24]}$$

$((i, j, k) \in \{(1, 1, 5), (5, 1, 5), (2, 2, 6),$
$(6, 2, 6), (3, 3, 7), (7, 3, 7), (4, 4, 8), (8, 4, 8)\})$ $$\tilde{W}_2^{(3)} = \begin{bmatrix} e_i & e_j & e_k \\ e_i & e_i & -e_k \end{bmatrix}, \quad \text{[Equation 25]}$$

$((i, j, k) \in \{(1, 5, 5), (5, 1, 1), (2, 6, 6),$
$(6, 2, 2), (3, 7, 7), (7, 3, 3), (4, 8, 8), (8, 4, 4)\})$

In equations 24 and 25, (i, j, k) is a combination for the estimated channels $W=W_1 W_2^{(3)}$ to form an orthogonal matrix.

The UE may find (i, j) and $e^{j\varphi}$ which describe the subband channel state best based on quations 21 to 25. For Rank 3, (I, j, k) may be used.

Next, the UE reports the index $i_2$ of $W_2$ corresponding thereto.

Finally, the eNB estimates the UE-preferred precoding matrix based on the received $i_1$ and $i_2$.

$$W = W_1 W_2$$

Meanwhile, the DFT vector for supporting the 8 Tx Xpol UPA aligned as shown in FIG. 56 should be formed to be different from the examples of equation 19 or 20.

Assuming that the dominant path exists at the angles of $\theta_A$ in the horizontal direction and $\theta_Z$ in the vertical direction in relation to the broad side of the array, the phase difference at the antennas 5610, 5620, 5630, and 5640 in relation to the antenna 5610 of FIG. 564 can be expressed as follows.

$$[1 e^{jkd_h \sin \theta_A} e^{jkd_v \sin \theta_Z} e^{jk(d_h \sin \theta_A + d_v \sin \theta_Z)}] \quad \text{[Equation 26]}$$

Accordingly, assuming that the resolutions of $Q_1$ in the horizontal direction and $Q_2$ in the vertical direction ($Q_1$ and $Q_2$ may be set differently depending to the angle spread (AS) and the number of feedbacks.), the DFT vector can be used to represent the phase differences among the H-pol antenna array 5610, 5620, 5630, and 5640 of FIG. 56 as follows.

$$v_{n,m} = [\, 1 \quad e^{j2\pi n/Q_1} \quad e^{j2\pi n/Q_2} \quad e^{j2\pi/\left(\frac{n}{Q_1}+\frac{m}{Q_2}\right)} \,], \quad \text{[Equation 27]}$$

$n \in \{1, \ldots, Q_1 - 1\},$ $m \in \{1, \ldots, Q_2 - 1\}$

At this time, the antenna positions representing the elements of equation 27 are shown in FIG. 56.

Equation 27 is conceived to report the information on the horizontal index n and the vertical index m describing the channel state best to the eNB explicitly or implicitly when the UE receives the information on $Q_1$ and $Q_2$ from the eNB explicitly or implicitly.

The eNB and the UE have to share the information on whether DFT vector which the UE has used to generate PMI is based on $v_n$ of equations 19 and 20 or $V_{n,m}$ of equation 27 in order to exchange correct channel information. In order for the eNB and the UE to share the DFT vector type, the eNB may designate the DFT vector to be used by the UE or the UE may report the type of the DFT vector it has used to the eNB.

If the DFT vector for generating the PMI is $v_{n,m}$, the UE has to report to the eNB the horizontal beam group information index $i_{1h}$ and the vertical direction beam group information $i_{1v}$, the horizontal beam selection and co-phasing information index $i_{2h}$, and the horizontal beam selection and co-phasing information index $i_{2v}$. Although $i_{1h}$, $i_{1v}$, $i_{2h}$, and $i_{2v}$ are expressed separately for explanatory convenience, they can be combined to indicate the vertical and horizontal information in the form of $i_1$ and $i_2$ in the real implementation.

$i_{1h}$ and $i_{2h}$ give the information as follows explicitly or implicitly.

$Q_1$: Resolution of horizontal direction DFT vector
N: Number of horizontal direction beam groups
$S_1$: Number of beams included in one horizontal direction beam group
$\Delta_1$: Interval between beams in horizontal direction beam group $i_{1v}$ and $i_{2v}$ give the information as follows explicitly or implicitly.

$Q_2$: Resolution of vertical direction DFT vector
M: Number of vertical direction beam groups
$S_2$: Number of beams included in one vertical direction beam group
$\Delta_2$: Interval between beams in vertical direction beam group Based on the above parameters, the index n of the DFT vector $v_{n,m}$ belonging to the $i_{1h}^{th}$ horizontal direction beam group can be expressed as equation 28.

$$n \in \left\{ \frac{Q_1}{N} i_{1h}, \frac{Q_1}{N} i_{1h} + \Delta_1, \right. \quad \text{[Equation 28]}$$
$$\left. \frac{Q_1}{N} i_{1h} + 2\Delta_1, \ldots, \frac{Q_1}{N} i_{1h} + (S_1 - 1)\Delta_1 \right\}$$

For example, because of $n \in \{2i_{1h}, 2i_{1h}+1, 2i_{1h}+2, 2i_{1h}+3\}$ in the case of $Q_1=8$, N=4, $S_1=4$, and $\Delta_1=1$, the four horizontal direction beam groups of $n \in \{0,1,2,3\}$, $n \in \{2,3,4,5\}$, $n \in \{4,5,6,7\}$, and $n \in \{6,7,0,1\}$ are formed. In the same manner, the index m of the DFT vector $v_{n,m}$ belonging to the $i_{1v}$ vertical direction beam group can be expressed as follows.

$$m \in \left\{ \frac{Q_2}{M} i_{1v}, \frac{Q_2}{M} i_{1v} + \Delta_2, \right. \quad \text{[Equation 29]}$$
$$\left. \frac{Q_2}{M} i_{1v} + 2\Delta_2, \ldots, \frac{Q_2}{M} i_{1v} + (S_2 - 1)\Delta_2 \right\}$$

For example, because of $m \in \{4i_{1v}, 4i_{1v}+2, 4i_{1v}+4, 4i_{1h}+6\}$ in the case of $Q_2=32$, M=8, $S_2=4$, and $\Delta_2=2$, the eight vertical beam groups of $m \in \{0,2,4,6\}$, $m \in \{4,6,8,10\}$, $m \in \{8,10,12,14\}$, $m \in \{12,14,16,18\}$, $m \in \{16,18,20,22\}$, $m \in \{20,22,24,26\}$, and $m \in \{24,26,28,30\}$, $m \in \{28,30,0,2\}$ are formed.

Figure 57:
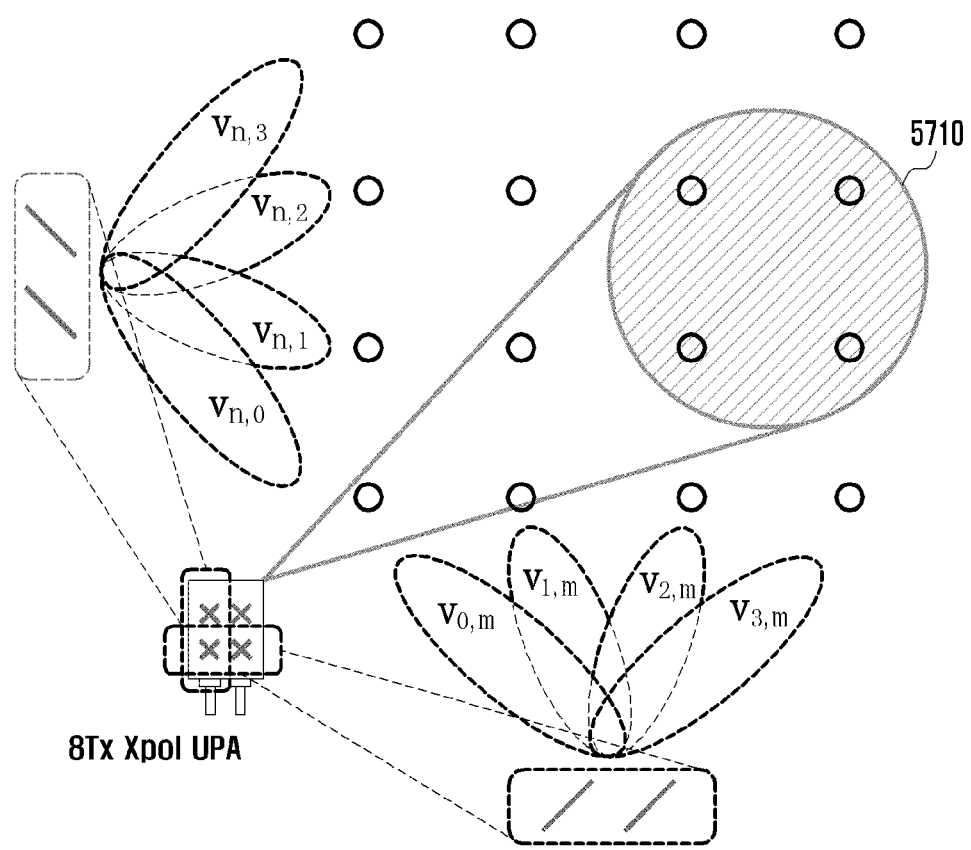
FIG. 57 is a diagram illustrating exemplary beam grouping and beam selection based on FD MIMO DFT beamforming vector for the case of 8 Tx antennas.

Assuming $Q_1=Q_2=4$ for explanatory convenience, $v_{n,m}$ can represent 16 directions as combinations of horizontal and vertical directions as shown in FIG. 57. Assuming N=M=4, $S_1=S_2=2$, and $\Delta_1=\Delta_2=1$, it is possible to form the beam groups of beams formed in both the horizontal and vertical directions as shown in FIG. 57. In FIG. 57, reference number 5710 denotes a beam group formed when $i_{1h}=2$ and $i_{1v}=1$.

The parameters for equations 28 and 29 may be set to values variable according to the environment or predetermined values as the legacy codebooks used in the standard of Release 12 or earlier.

As shown in equations 21 and 22, it is possible to select a beam in a given beam group without any restriction for rank 1 and rank 2 transmissions. Particularly in equation 22, the phase difference between co-phasing factors makes it possible to generate an orthogonal matrix regardless of beam selection.

In the case of rank 3 and rank 4 code books, it is impossible to guarantee orthogonality among all column vectors only with the phase difference between co-phasing factors. Thus in the case of rank 3-4 codebook, it is required to generate the beam groups so as to make it possible to select the DFT vectors orthogonal in one beam group. The index n of the DFT vector $v_{n,m}$ belonging to the $i_{1h}^{th}$ beam group in the horizontal direction which fulfils the above condition (formed with the pairs of orthogonal DFT vectors) can be expressed as follows.

$$n \in \left\{ \frac{Q_1}{2N} i_{1h}, \frac{Q_1}{2N} i_{1h} + \Delta_1, \ldots, \right. \quad \text{[Equation 30]}$$
$$\frac{Q_1}{2N} i_{1h} + \left(\frac{S_1}{2} - 1\right)\Delta_1, \frac{Q_1}{2N} i_{1h} + \frac{Q_1}{2},$$
$$\left. \frac{Q_1}{2N} i_{1h} + \frac{Q_1}{2} + \Delta_1, \ldots, \frac{Q_1}{2N} i_{1h} + \frac{Q_1}{2} + \left(\frac{S_1}{2} - 1\right)\Delta_1 \right\}$$

For example, because of $n \in \{2i_{1h}, 2i_{1h}+1, 2i_{1h}+8, 2i_{1h}+9\}$ in the case of $Q_1=16$, N=4, $S_1=4$, and $\Delta_1=1$, four horizontal direction beam groups of $n \in \{0,1,8,9\}$, $n \in \{2,3,10,11\}$, $n \in \{4,5,12,13\}$, and $n \in \{6,7,14,15\}$ are formed. As aimed above, the four beam groups are formed with two pairs of horizontal direction orthogonal vector indices. In the same manner (formed with pairs of orthogonal DFT vectors), the index m of the DFT vector $v_{n,m}$ belonging to the $i_{1v}^{th}$ horizontal direction beam group can be expressed as follows.

$$m \in \left\{ \frac{Q_2}{2M} i_{1v}, \frac{Q_2}{2M} i_{1v} + \Delta_2, \ldots, \right. \quad \text{[Equation 31]}$$
$$\frac{Q_2}{2M} i_{1v} + \left(\frac{S_2}{2} - 1\right)\Delta_2, \frac{Q_2}{2M} i_{1v} + \frac{Q_2}{2},$$
$$\left. \frac{Q_2}{2M} i_{1v} + \frac{Q_2}{2} + \Delta_2, \ldots, \frac{Q_2}{2M} i_{1v} + \frac{Q_2}{2} + \left(\frac{S_2}{2} - 1\right)\Delta_2 \right\}$$

The simplest method for configuring the rank 3-4 codebook is to form a beam group made up of n and m fulfilling equations 30 and 31 simultaneously.

Even in the case where only one of n and m in equation 27 fulfils equation 30 or 31, it is possible to form the beam group made up of the orthogonal vector pairs for generating the rank 3-4 codebook. This means that it is possible to configure a beam group for rank 3-4 codebook by selecting beam pairs orthogonal in the horizontal direction, in the vertical direction, or in both the horizontal and vertical directions.

Among the factors for configuring the beam group, the vertical direction zenith spread of departure angles (ZSD) and azimuth spread of departure angles (ASD) are most important.

Figure 58:
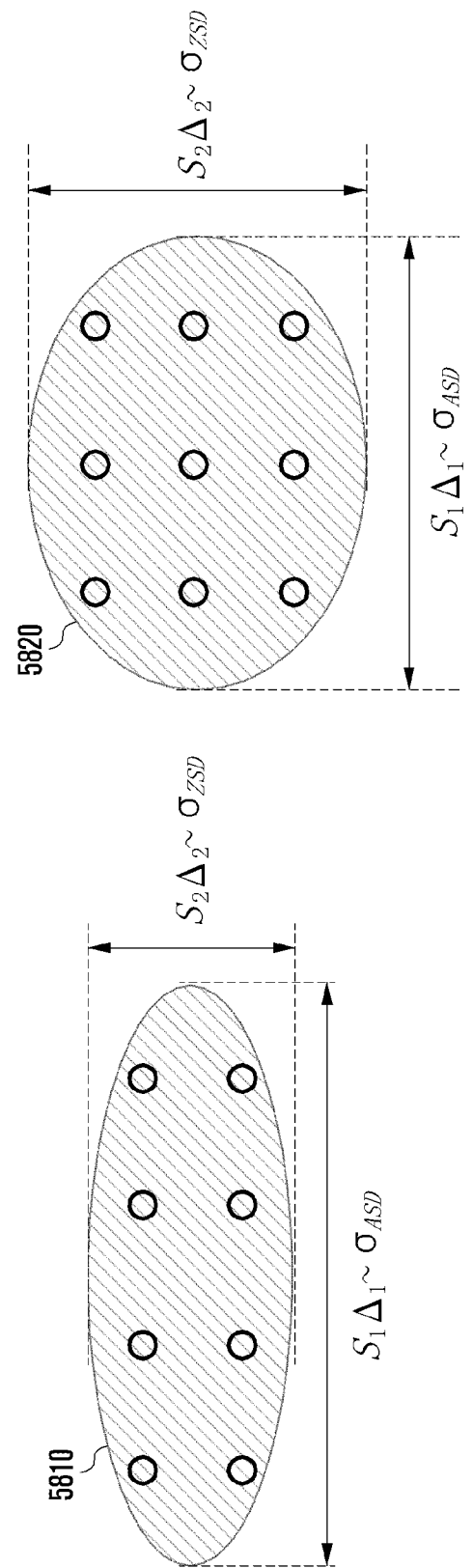
FIG. 58 is a diagram illustrating exemplary beam groupings according to ASD and ZSD.

FIG. 58 is a diagram illustrating exemplary $W_1$ configuration methods according to various channel conditions.

In FIG. 58, $S_1\Delta_1$ denotes the horizontal direction beam group size according to $\sigma_{ASD}$. Here, $\sigma_{ASD}$ denotes the variance of ASD, and $\sigma_{ZSD}$ denotes the variance of ZSD.

In FIG. 58, reference number 5810 denotes the condition of $\sigma_{ZSD} \gg \sigma_{ASD}$ or $\sigma_{ZSD} \ll \sigma_{ASD}$. For example, if $\sigma_{ZSD} \ll \sigma_{ASD}$, the dominant path is likely to change more in the horizontal direction than in the vertical direction. Thus it is advantageous to perform unbalanced beam grouping as denoted by reference number 5810 of FIG. 58 to generate wPMI in terms of improvement of the sPMI selection accuracy.

Also, if the rank 3-4 codebook is generated under the situation of $\sigma_{ZSD} \ll \sigma_{ASD}$, this means that the high probability of selecting an orthogonal beam pair in the horizontal direction; thus, it is possible to generate the horizontal direction beam group based on equation 30. Afterward, equation 29 or 31 can be used selectively for generating a vertical direction beam group depending on the situation.

Otherwise if $\sigma_{ZSD} \approx \sigma_{ASD}$, the dominant path is likely to change in the horizontal and vertical direction evenly. Thus it is advantageous to perform the balanced beam grouping as denoted by reference number 5820 of FIG. 58 in selecting sPMI. Particularly in this case, the probability of selecting the orthogonal beam pair for generating the rank 3-4 codebook is equal in horizontal and vertical directions and the horizontal and vertical direction beam groups should be generated by equations 30 and 31.

In order to generate the rank 3-4 codebook efficiently, it is necessary to maximize the SNR by describing the channel state accurately per rank and subband in $W_2$.

As shown in equation 23, $W_2$ selects two orthogonal $W_1$ column vectors in generating the rank 4 PIM.

FIG. 59 is a diagram illustrating a method for selecting two beams in a beam group made up of 4 beams.

The beam selection can be performed in various ways according to various factors such as the size of beam group ($S_1\Delta_1$, $S_2\Delta_2$) and vertical and horizontal resolutions ($Q_1$, $Q_2$). Since $i_2$ is not large enough to represent the number of all cases in general, it is necessary to perform sampling on (i, j) appropriate to the situation.

In the case of rank 2 codebook, the number of cases of valid orthogonal dominant path is 1 or 2; thus, it is preferable to put weight to the selection methods denoted by reference numbers 5910 and 5920 of FIG. 59.

In the case of rank 4 codebook, however, two orthogonal beams should be selected through $W_2^{(4)}$; thus, it is preferable to put weight to the selection method denoted by reference number 5930 of FIG. 59. In the case of $W_2^{(3)}$ for rank 2 codebook, it is necessary to include a function of selecting 3 of 4 column vectors of $W_2^{(4)}$ as shown in equations 24 and 25.

Embodiment 6-1

Embodiment 6-1 of the present invention shows a detailed example of generating a rank 3-4 codebook using equation 30 in the horizontal direction and equation 29 in the vertical direction.

In embodiment 6-1, the following codebook design parameters are used.

$(Q_1=16, N=2, S_1=8, \Delta_1=1), (Q_2=8, M=4, S_2=2, \Delta_2=1)$ [Equation 32]

Equation 32 is conceived to form a beam group including horizontally orthogonal beams for the rank 3-4 codebook under the condition of $\sigma_{ZSD} < \sigma_{ASD}$. From equations 32 and 30, it is known that the $i_{1h}\{0,1\}^{th}$ horizontal direction beam group includes the beams of $v_{n,m}$ fulfilling the following condition in embodiment 6-1.

$$n \in \left\{ \begin{array}{l} 4i_{1h}, 4i_{1h}+1, 4i_{1h}+2, 4i_{1h}+3, \\ 4i_{1h}+8, 4i_{1h}+9, 4i_{1h}+10, 4i_{1h}+11 \end{array} \right\}$$ [Equation 33]

From equations 32 and 29, it is known that the $i_{1v} \in \{0, 1, 2, 3\}^{th}$ vertical direction beam group includes the beams of $v_{n,m}$ fulfilling the following condition in embodiment 6-1.

$m \in \{2i_{1v}, 2i_{1v}+1\}$ [Equation 34]

Figure 60:
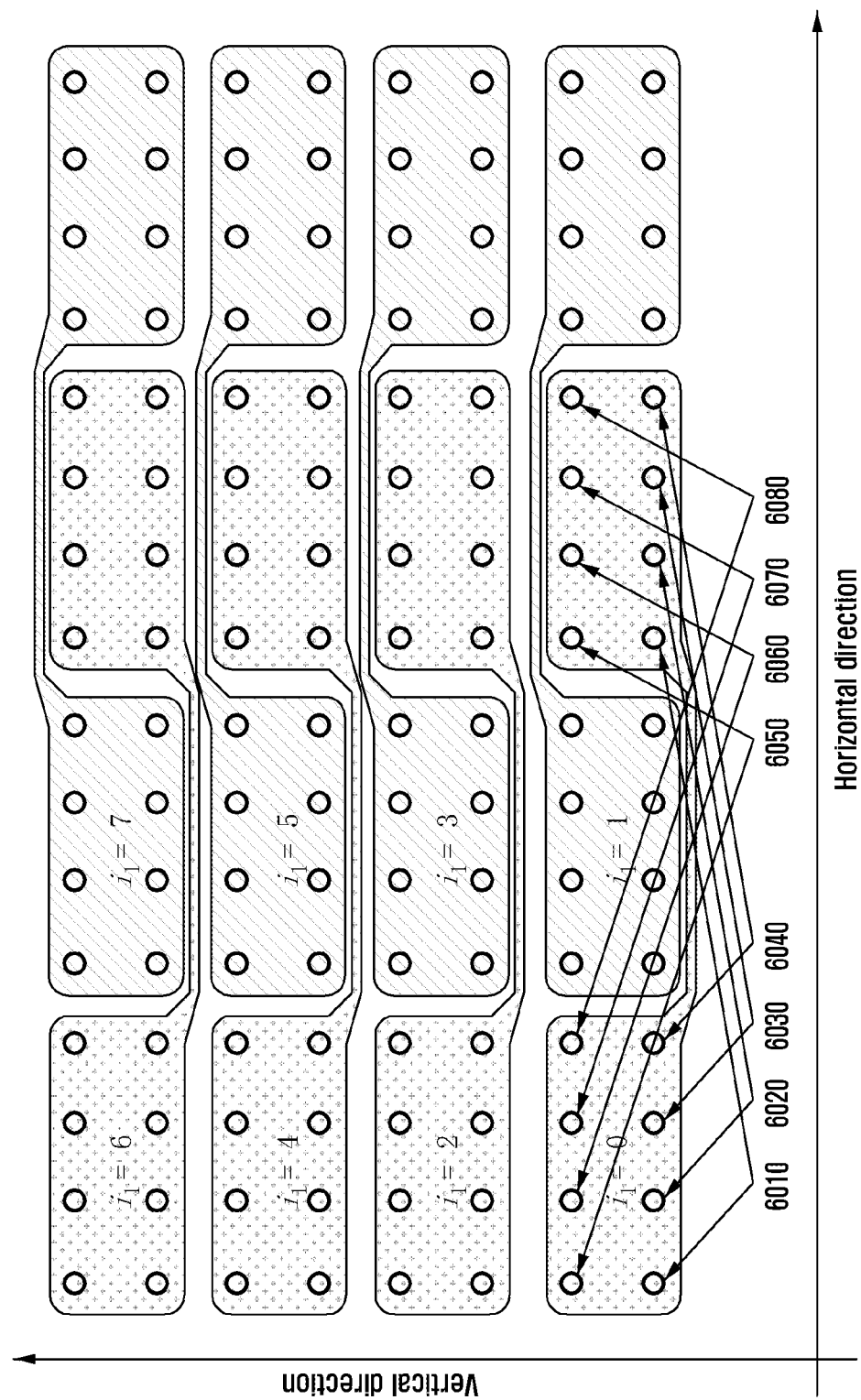
FIG. 60 is a diagram illustrating beam grouping and beam selection in embodiment 1.

FIG. 60 is a diagram illustrating the relative positions of the beam groups generated by equations 33 and 34.

Each beam group may be indicated explicitly by $i_{1h}$, $i_{1v}$ or implicitly by a combined vertical•horizontal indicator $i_1$ having the relationship as follows.

$i_{1h} = i_1 \bmod N, i_{1v} = \lfloor i_1/N \rfloor$ [Equation 35]

Using equations 33 and 34 and the DFT vectors of equation 23, the $i_1 \in \{0,1, \ldots, 7\}^{th}$ beam group can be expressed as follows.

$$X_{i_1} = \left\{ \begin{array}{l} v_{4n,2m}, v_{4n+1,2m}+v_{4m+2,2m}, v_{4n+3,2m}, \\ v_{4n+8,2m}, v_{4n+9,2m}, v_{4m+10,2m}, v_{4m+11,2m}, \\ v_{4n,m+1}, v_{4n+1,2m+1}, v_{4n+2,2m+1}, v_{4n+3,2m+1}, \\ v_{4n,8,2m+1}, v_{4n+9,2m+1}, v_{4n+10,2m+1}, v_{4n+11,2m+1} \end{array} \right\}$$ [Equation 36]

Here, $n = i_1 \bmod N$ and $m = \lfloor i_1/N \rfloor$. Equation 36 is conceived for the UE to report the index of a beam group which is capable of securing beam pairs orthogonal in the horizontal direction under the situation of $\sigma_{ZSD} < \sigma_{ASD}$. $X_{i_1}$ can be configured in various formats by changing the parameters of equation 32 appropriately to the situation according to the above-described methods.

In the case that the UE reports the rank 4 PMI, the UE has to select two orthogonal beams with equation 23 to describe the rank 4 channels as described above.

There are 16 orthogonal beam pairs (i,j) selectable in the beam group form by equation 36.

$$(i,j) \in \left\{ \begin{array}{l} (1, 5), (2, 6), (3, 7), (4, 8), (9, 13), \\ (10, 14), (11, 15), (12, 16), \\ (1, 13), (2, 14), (3, 15), (4, 16), \\ (5, 9), (6, 10), (7, 11), (8, 12) \end{array} \right\}$$ [Equation 37]

In this embodiment, the pairs of which the vertical direction beam components are identical with each other in equation 37 are selected under the assumption that 3 bits can be allocated for selecting (i, j). The beam pairs having the same vertical direction beam components are denoted by reference numbers 6010, 6020, 6030, 6040, 6050, 6060, 6070, and 6080. As a consequence, the beam selection set used in this embodiment is expressed as follows.

$(i,j) \in \{(1,5),(2,6),(3,7),(4,8),(9,13),(10,14),(11,15),(12,16)\}$ [Equation 38]

In embodiment 6-1, 1 bit is allocated for selecting co-phasing factor for rank 4 codebook. The rank 4 codebook of embodiment 1 can be generated by substituting equation 36 to equation 20 and equation 38 to equation 23.

Table 6 is an example of rank 4 $i_1$ and $i_2$ PMI-codebook mapping table conceived in this embodiment.

In table 6, $\varphi_z = e^{j2\pi z/Q_z}$, $z \in \{0,1\}$ denotes the co-phasing factor, and $Q_z=4$ denotes the co-phasing resolution. Table 6 is conceived to express the above-described beam group and beam selection method implicitly.

If the UE selects $i_1$ according to table 6, a beam group in the form of equation 36 is selected. If the UE selects $i_2$ according to table 6, one of the (i,j) pairs included in equation 38 and one of the co-phasing factors $\varphi_z \in \{1, j\}$ are selected. If the UE transmits the selected $i_1$ and $i_2$ to the eNB, the eNB can check the UE-preferred rank-4 precoding matrix based thereon. In table 6, $\sigma = \text{rank} \times M_T = 32$ is a constant for normalization.

TABLE 6

Rank 4 codebook - PMI mapping table of embodiment 6-1

| $i_1$ | $i_2$ 0 | 1 | 2 | 3 |
|---|---|---|---|---|
| 0-7 | $W^{(4)}_{(4n,2m),(4n+8,2m),0}$ | $W^{(4)}_{(4n,2m),(4n+8,2m),1}$ | $W^{(4)}_{(4n+1,2m),(4n+9,2m),0}$ | $W^{(4)}_{(4n+1,2m),(4n+9,2m),1}$ |

| $i_1$ | $i_2$ 4 | 5 | 6 | 7 |
|---|---|---|---|---|
| 0-7 | $W^{(2)}_{(4n+2,2m),(4n+10,2m),0}$ | $W^{(2)}_{(4n+2,2m),(4n+10,2m),1}$ | $W^{(2)}_{(4n+3,2m),(4n+11,2m),0}$ | $W^{(2)}_{(4n+3,2m),(4n+11,2m),1}$ |

| $i_1$ | $i_2$ 8 | 9 | 10 | 11 |
|---|---|---|---|---|
| 0-7 | $W^{(2)}_{(4n,2m+1),(4n+8,2m+1),0}$ | $W^{(2)}_{(4n,2m+1),(4n+8,2m+1),1}$ | $W^{(2)}_{(4n+1,2m+1),(4n+9,2m+1),0}$ | $W^{(2)}_{(4n+1,2m+1),(4n+9,2m+1),1}$ |

| $i_1$ | $i_2$ 12 | 13 | 14 | 15 |
|---|---|---|---|---|
| 0-7 | $W^{(2)}_{(4n+2,2m+1),(4n+10,2m+1),0}$ | $W^{(2)}_{(4n+2,2m+1),(4n+10,2m+1),1}$ | $W^{(2)}_{(4n+3,2m+1),(4n+11,2m+1),0}$ | $W^{(2)}_{(4n+3,2m+1),(4n+11,2m+1),1}$ | where $n = i_1 \bmod N$, $m = \lfloor i_1/N \rfloor$, $$W^{(4)}_{(n,m),(n',m'),z} = \frac{1}{\sqrt{\sigma}} \begin{bmatrix} v_{n,m} & v_{n',m'} & v_{n,m} & v_{n',m'} \\ \varphi_z v_{n,m} & \varphi_z v_{n',m'} & -\varphi_z v_{n,m} & -\varphi_z v_{n',m'} \end{bmatrix}$$

The rank-3 codebook of embodiment 6-1 can be built by selecting 3 of 4 column vectors of the rank-4 codebook of embodiment 6-11. Based on equations 38 and 24, it is possible to generate 16 beam selection pairs as follows.

$(i, j, k) \in$ [Equation 39]

$$\left\{ \begin{array}{l} (1, 1, 5), (5, 1, 5), (2, 2, 6), (6, 2, 6), \\ (3, 3, 7), (7, 3, 7), (4, 4, 8), (8, 4, 8), \\ (9, 9, 13), (13, 9, 13), (10, 10, 14), (14, 10, 14), \\ (11, 11, 15), (15, 11, 15), (12, 12, 16), (16, 12, 16) \end{array} \right\}$$

Based on equations 38 and 25, it is possible to generate additional 16 beam selection pairs as follows.

$(i, j, k) \in$ [Equation 40]

$$\left\{ \begin{array}{l} (1, 5, 5), (5, 1, 1), (2, 6, 6), (6, 2, 2), \\ (3, 7, 7), (7, 3, 3), (4, 8, 8), (8, 4, 4), \\ (9, 13, 13), (13, 9, 9), (10, 14, 14), (14, 10, 10), \\ (11, 15, 15), (15, 11, 11), (12, 16, 16), (16, 12, 12) \end{array} \right\}$$

Based on equations 24, 25, 39, and 40, the rank-3 codebook of embodiment 6-1 can be expressed as shown in table 7.

TABLE 7

Rank 3 codebook - PMI mapping table of embodiment 6-1

| $i_1$ | $i_2$ 0 | 1 |
|---|---|---|
| 0-7 | $W^{(3)}_{(4n,2m),(4n,2m),(4n+8,2m)}$ | $W^{(3)}_{(4n+8,2m),(4n,2m),(4n+8,2m)}$ |

| $i_1$ | $i_2$ 2 | 3 |
|---|---|---|
| 0-7 | $W^{(3)}_{(4n+1,2m),(4n+1,2m),(4n+9,2m)}$ | $W^{(3)}_{(4n+9,2m),(4n+1,2m),(4n+9,2m)}$ |

| $i_1$ | $i_2$ 4 | 5 |
|---|---|---|
| 0-7 | $W^{(3)}_{(4n+2,2m),(4n+2,2m),(4n+10,2m)}$ | $W^{(3)}_{(4n+10,2m),(4n+2,2m),(4n+10,2m)}$ |

| $i_1$ | $i_2$ 6 | 7 |
|---|---|---|
| 0-7 | $W^{(3)}_{(4n+3,2m),(4n+3,2m),(4n+11,2m)}$ | $W^{(3)}_{(4n+11,2m),(4n+3,2m),(4n+11,2m)}$ |

TABLE 7-continued

Rank 3 codebook - PMI mapping table of embodiment 6-1

| $i_1$ | $i_2$ | |
|---|---|---|
| | 8 | 9 |
| 0-7 | $W^{(3)}_{(4n,2m+1),(4n,2m+1),(4n+8,2m+1)}$ | $W^{(3)}_{(4n+8,2m+1),(4n,2m+1),(4n+8,2m+1)}$ |

| $i_1$ | $i_2$ | |
|---|---|---|
| | 10 | 11 |
| 0-7 | $W^{(3)}_{(4n+1,2m+1),(4n+1,2m+1),(4n+9,2m+1)}$ | $W^{(3)}_{(4n+9,2m+1),(4n+1,2m+1),(4n+9,2m+1)}$ |

| $i_1$ | $i_2$ | |
|---|---|---|
| | 12 | 13 |
| 0-7 | $W^{(3)}_{(4n+2,2m+1),(4n+2,2m+1),(4n+10,2m+1)}$ | $W^{(3)}_{(4n+10,2m+1),(4n+2,2m+1),(4n+10,2m+1)}$ |

| $i_1$ | $i_2$ | |
|---|---|---|
| | 14 | 15 |
| 0-7 | $W^{(3)}_{(4n+3,2m+1),(4n+3,2m+1),(4n+11,2m+1)}$ | $W^{(3)}_{(4n+11,2m+1),(4n+3,2m+1),(4n+11,2m+1)}$ |

| $i_1$ | $i_2$ | |
|---|---|---|
| | 16 | 17 |
| 0-7 | $\tilde{W}^{(3)}_{(4n,2m),(4n+8,2m),(4n+8,2m)}$ | $\tilde{W}^{(3)}_{(4n+8,2m),(4n,2m),(4n,2m)}$ |

| $i_1$ | $i_2$ | |
|---|---|---|
| | 18 | 19 |
| 0-7 | $\tilde{W}^{(3)}_{(4n+1,2m),(4n+9,2m),(4n+9,2m)}$ | $\tilde{W}^{(3)}_{(4n+9,2m),(4n+1,2m),(4n+1,2m)}$ |

| $i_1$ | $i_2$ | |
|---|---|---|
| | 20 | 21 |
| 0-7 | $\tilde{W}^{(3)}_{(4n+2,2m),(4n+10,2m),(4n+10,2m)}$ | $\tilde{W}^{(3)}_{(4n+10,2m),(4n+2,2m),(4n+2,2m)}$ |

| $i_1$ | $i_2$ | |
|---|---|---|
| | 22 | 23 |
| 0-7 | $\tilde{W}^{(3)}_{(4n+3,2m),(4n+11,2m),(4n+11,2m)}$ | $\tilde{W}^{(3)}_{(4n+11,2m),(4n+2,2m),(4n+2,2m)}$ |

| $i_1$ | $i_2$ | |
|---|---|---|
| | 24 | 25 |
| 0-7 | $\tilde{W}^{(3)}_{(4n,2m+1),(4n+8,2m+1),(4n+8,2m+1)}$ | $\tilde{W}^{(3)}_{(4n+8,2m+1),(4n,2m+1),(4n,2m+1)}$ |

| $i_1$ | $i_2$ | |
|---|---|---|
| | 26 | 27 |
| 0-7 | $\tilde{W}^{(3)}_{(4n+1,2m+1),(4n+9,2m+1),(4n+9,2m+1)}$ | $\tilde{W}^{(3)}_{(4n+9,2m+1),(4n+1,2m+1),(4n+1,2m+1)}$ |

| $i_1$ | $i_2$ | |
|---|---|---|
| | 28 | 29 |
| 0-7 | $\tilde{W}^{(3)}_{(4n+2,2m+1),(4n+10,2m+1),(4n+10,2m+1)}$ | $\tilde{W}^{(3)}_{(4n+10,2m+1),(4n+2,2m+1),(4n+2,2m+1)}$ |

| $i_1$ | $i_2$ | |
|---|---|---|
| | 30 | 31 |
| 0-7 | $\tilde{W}^{(3)}_{(4n+3,2m+1),(4n+11,2m+1),(4n+11,2m+1)}$ | $\tilde{W}^{(3)}_{(4n+11,2m+1),(4n+3,2m+1),(4n+3,2m+1)}$ | where n = $i_1$ mod N, m = $\lfloor i_1/N \rfloor$, $$W^{(3)}_{(n,m)(n',m'),(n'',m'')} = \frac{1}{\sqrt{24}} \begin{bmatrix} V_{n,m} & V_{n',m'} & V_{n'',m''} \\ V_{n,m} & -V_{n',m'} & -V_{n'',m''} \end{bmatrix},$$

$$\tilde{W}^{(3)}_{(n,m)(n',m'),(n'',m'')} = \frac{1}{\sqrt{24}} \begin{bmatrix} V_{n,m} & V_{n',m'} & V_{n'',m''} \\ V_{n,m} & V_{n',m'} & -V_{n'',m''} \end{bmatrix}$$

Embodiment 6-2

Embodiment 6-2 of the present invention is directed to an exemplary case of generating rank 3-4 codebook using equation 30 in the horizontal direction and equation 31 in the vertical direction. In embodiment 6-2, the following codebook design parameters are used.

$$(Q_1=4, N=2, S_1=2, \Delta_1=1), (Q_2=4, M=2, S_2=2, \Delta_2=1) \qquad [\text{Equation 41}]$$

Equation 41 is conceived to generate a beam group including horizontal direction orthogonal beams and vertical direction orthogonal beams for rank 3-4 codebook under the condition of $\sigma_{ZSD} \approx \sigma_{ASD}$. According to equations 41 and 30, it is known that the $i_{1h} \in \{0,1\}^{th}$ beam group in the horizontal direction includes the beams $v_{n,m}$ fulfilling the following condition in embodiment 6-2.

$$n \in \{i_{1h}, i_{1h}+2\} \qquad [\text{Equation 42}]$$

According to equations 41 and 31, it is known that the $i_{1v} \in \{0,1\}^{th}$ beam group in the vertical direction includes the beams $v_{n,m}$ fulfilling the following condition in embodiment 6-2.

$$m \in \{i_{1v}, i_{1v}+2\} \qquad [\text{Equation 43}]$$

Figure 61:
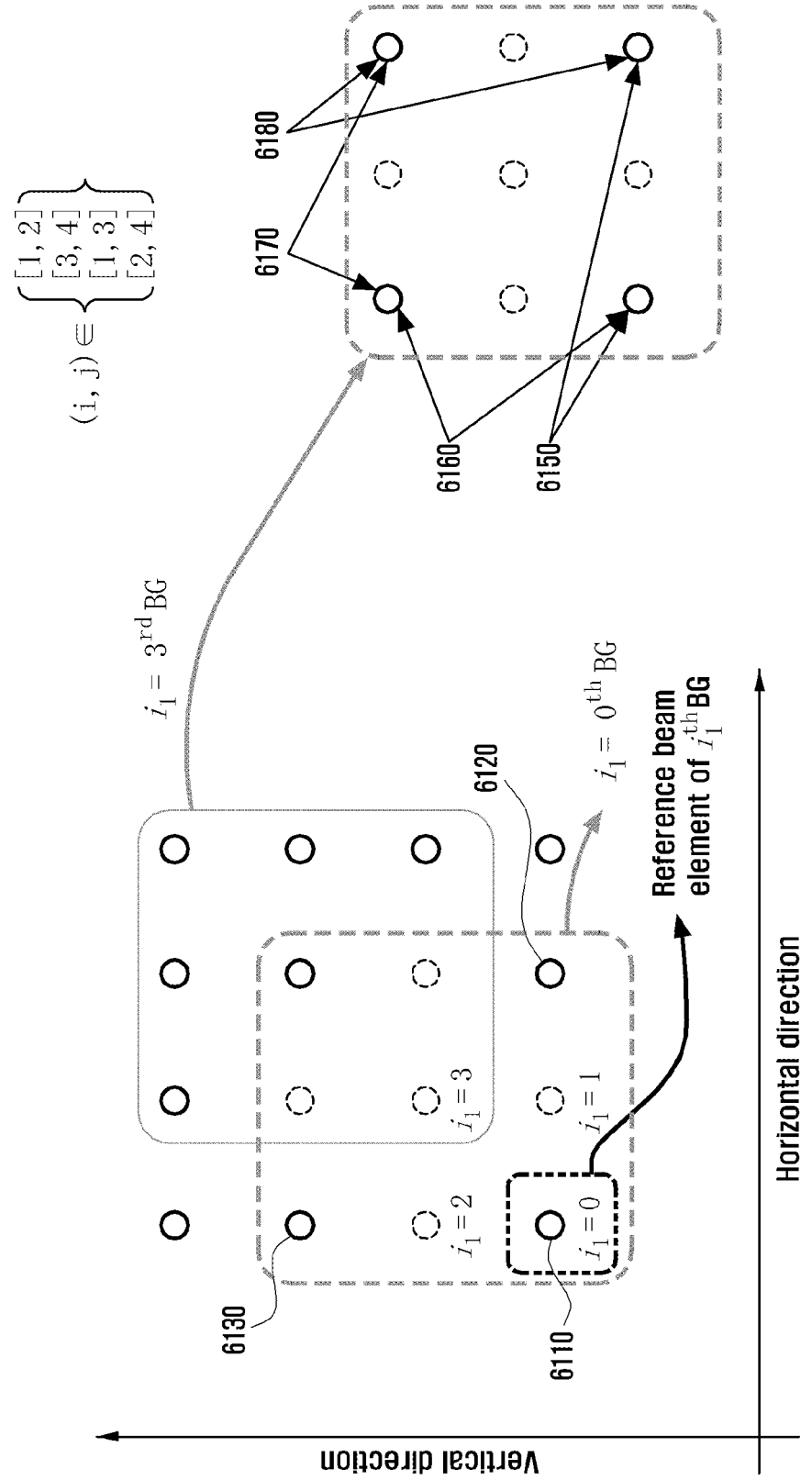
FIG. 61 is a diagram illustrating beam grouping and beam selection in embodiment 2.

FIG. 61 is a diagram illustrating the relative positions of the beam groups formed by equations 42 and 43.

Each beam group may be indicated by $i_{1h}$, $i_{1v}$ explicitly or by a horizontal•vertical combination indicator $i_1 \in \{0,1,2,3\}$ having the following relationship implicitly.

$$i_{1h} = i_1 \bmod N, i_{1v} = \lfloor i_1/N \rfloor \qquad [\text{Equation 44}]$$

The $i_1 \in \{0,1,2,3\}^{th}$ beam group can be expressed as follows using equations 42 and 43 and the DFT vector of equation 23.

$$X_{i_1} = \{v_{n,m}, v_{(n+2),m}, V_{n,(m+2)}, v_{(n+2),(m+2)}\} \qquad [\text{Equation 45}]$$

Here, $n = i_1 \bmod N$ and $m = \lfloor i_1/N \rfloor$. The elements of equation 45 represent the beams positioned as denoted by reference numbers 6110, 6120, 6130, and 6140 of FIG. 61.

Equation 45 is conceived in order for the UE to report the index of the beam group capable of securing the orthogonal beam pairs in the horizontal and vertical directions to the eNB under the condition of $\sigma_{ZSD} \approx \sigma_{ASD}$. $X_{i_1}$ can be configured according to the above-described method by modifying the parameters of equation 41 appropriately in adaptation to the situation.

In the case that the UE reports the rank 4 PMI to the eNB, the UE has to select two orthogonal beams as described with reference to equation 23 in order to described the rank 4 channels.

Meanwhile, all column vectors of equation 45 are orthogonal to each other such that there are 6 beam pairs selectable from the beam group formed by equation 45 as follows.

$$(i,j) \in \{(1,2),(2,3),(3,4),(1,3),(2,4),(1,4)\} \qquad [\text{Equation 46}]$$

In this embodiment, the beam pairs as denoted by reference numbers 6150, 6160, 6170, and 6180 of FIG. 61 are considered under the assumption that 2 bits are allocated for selecting (i, j). As a consequence, the beam selection pair set used in this embodiment is expressed as follows.

$(i,j) \in \{(1,2),(3,4),(1,3),(2,4)\}$  [Equation 47]

In embodiment 6-2, 1 bit is allocated for selecting the co-phasing factor for the rank 4 codebook. The rank 4 code book of embodiment 6-2 can be generated by substituting equation 45 to equation 20 and equation 47 to equation 23.

Table 8 is an example of rank 4 $i_1$ and $i_2$ PMI-codebook mapping table conceived in this embodiment. In table 8, $\varphi_z = e^{j2\pi z/Q_z}$, $z \in \{0,1\}$ is the co-phasing factor, and $Q_z=4$ is the co-phasing resolution. Table 8 is conceived to express the above-described beam group and beam selection method implicitly. If the UE selects $i_1$ according to table 8, a beam group in the form of equation 45 is selected. If the UE selects $i_2$ according to table 8, one of (i, j) pairs included in equation 47 and one of co-phasing factors $\varphi_z \in \{1, j\}$ are selected. Afterward, if the UE transmits the selected $i_1$ and $i_2$ to the eNB, the eNB can check the UE-preferred rank 4 precoding matrix based thereon.

TABLE 8

Rank 4 codebook - PMI mapping table of embodiment 6-2

| $i_1$ | $i_2$ | | | |
|---|---|---|---|---|
| | 0 | 1 | 2 | 3 |
| 0-3 | $W^{(4)}_{(n,m),(n+2,m),0}$ | $W^{(4)}_{(n,m)(n+2,m),1}$ | $W^{(4)}_{(n,m+2),(n+2,m+2),0}$ | $W^{(4)}_{(n,m+2),(n+2,m+2),1}$ |

TABLE 8-continued

Rank 4 codebook - PMI mapping table of embodiment 6-2

| $i_1$ | $i_2$ | | | |
|---|---|---|---|---|
| | 4 | 5 | 6 | 7 |
| 0-3 | $W^{(4)}_{(n,m),(n,m+2),0}$ | $W^{(4)}_{(n,m),(n,m+2),1}$ | $W^{(4)}_{(n+2,m),(n+2,m+2),0}$ | $W^{(4)}_{(n+2,m),(n+2,m+2),1}$ | where $n = i_1 \bmod N$, $m = \lfloor i_1/N \rfloor$, $$W^{(4)}_{(n,m),(n',m'),z} = \frac{1}{\sqrt{32}} \begin{bmatrix} V_{n,m} & V_{n',m'} & V_{n,m} & V_{n',m'} \\ \varphi_z V_{n,m} & \varphi_z V_{n',m'} & -\varphi_z V_{n,m} & -\varphi_z V_{n',m'} \end{bmatrix}$$

The rank 3 codebook can be built by selecting 3 of 4 columns of the rank 4 codebook of embodiment 6-2. Based on equations 47 and 24, it is possible to generate 8 beam selection pairs as follows.

$(i,j,k) \in \{(1,1,2),(2,1,2),(3,3,4),(4,3,4),(1,1,3),(3,1,3),$
$(2,2,4),(4,2,4)\}$  [Equation 48]

Based on equations 47 and 25, it is possible to generate 8 additional beam selection pairs as follows.

$(i,j,k) \in \{(1,2,2),(2,1,1),(3,4,4),(4,3,3),(1,3,3),(3,1,1),$
$(2,4,4),(4,2,2)\}$  [Equation 49]

Based on equations 24, 25, 48, and 49, the rank 3 codebook of embodiment 6-2 can be expressed as table 9.

TABLE 9

Rank 3 codebook - PMI mapping table of embodiment 6-2

| $i_1$ | $i_2$ | | | |
|---|---|---|---|---|
| | 0 | 1 | 2 | 3 |
| 0-3 | $W^{(3)}_{(n,m),(n,m),(n+2,m)}$ | $W^{(3)}_{(n+2,m),(n,m),(n+2,m)}$ | $\tilde{W}^{(3)}_{(n,m),(n+2,m),(n+2,m)}$ | $\tilde{W}^{(3)}_{(n+2,m),(n,m),(n,m)}$ |

| $i_1$ | $i_2$ | | | |
|---|---|---|---|---|
| | 4 | 5 | 6 | 7 |
| 0-3 | $W^{(3)}_{(n,m+2),(n,m+2),(n+2,m+2)}$ | $W^{(3)}_{(n+2,m+2),(n,m+2),(n+2,m+2)}$ | $\tilde{W}^{(3)}_{(n,m+2),(n+2,m+2),(n+2,m+2)}$ | $\tilde{W}^{(3)}_{(n+2,m+2),(n,m+2),(n,m+2)}$ |

| $i_1$ | $i_2$ | | | |
|---|---|---|---|---|
| | 8 | 9 | 10 | 11 |
| 0-3 | $W^{(3)}_{(n,m),(n,m),(n,m+2)}$ | $W^{(3)}_{(n,m+2),(n,m),(n,m+2)}$ | $\tilde{W}^{(3)}_{(n,m),(n,m+2),(n,m+2)}$ | $\tilde{W}^{(3)}_{(n,m+2),(n,m),(n,m)}$ |

| $i_1$ | $i_2$ | | | |
|---|---|---|---|---|
| | 12 | 13 | 14 | 15 |
| 0-3 | $W^{(3)}_{(n+2,m),(n+2,m),(n+2,m+2)}$ | $W^{(3)}_{(n+2,m+2),(n+2,m),(n+2,m+2)}$ | $W^{(3)}_{(n+2,m),(n+2,m+2),(n+2,m+2)}$ | $W^{(3)}_{(n+2,m+2),(n+2,m),(n+2,m)}$ | where $n = i_1 \bmod N$, $m = \lfloor i_1/N \rfloor$, $$W^{(3)}_{(n,m),(n',m'),(n'',m'')} = \frac{1}{\sqrt{24}} \begin{bmatrix} v_{n,m} & v_{n',m'} & v_{n'',m''} \\ v_{n,m} & -v_{n',m'} & -v_{n'',m''} \end{bmatrix}, \tilde{W}^{(3)}_{(n,m),(n',m'),(n'',m'')}$$

$$\frac{1}{\sqrt{24}} \begin{bmatrix} v_{n,m} & v_{n',m'} & v_{n'',m''} \\ v_{n,m} & v_{n',m'} & -v_{n'',m''} \end{bmatrix}$$

Embodiment 6-3

Embodiment 6-3 of the present invention is directed to an exemplary case of generating a rank 3-4 codebook using equation 30 in the horizontal direction and equation 29 in the vertical direction. In embodiment 6-3, the following codebook design parameters are used.

$$(Q_1=8, N=1, S_1=8, \Delta_1=1), (Q_2=4, M=4, S_2=1, \Delta_2=1) \quad \text{[Equation 50]}$$

Equation 50 is conceived to generate a beam group including horizontal direction orthogonal beams for the rank 3-4 codebook under the condition of $\sigma_{ZSD} < \sigma_{ASD}$. From equations 50 and 30, it is known that the $i_{1h} \in \{0\}^{th}$ horizontal direction beam group includes the beams $v_{n,m}$ fulfilling the following condition in embodiment 6-3.

$$n \in \{i_{1h}, i_{1h}+1, i_{1h}+2, i_{1h}+3, i_{1h}+4, i_{1h}+5, i_{1h}+6, i_{1h}+7\} \quad \text{[Equation 51]}$$

From equations 50 and 29, it is known that the $i_{1v} \in \{0, 1, 2, 3\}^{th}$ vertical direction beam group includes the beams $v_{n,m}$ fulfilling the following condition in embodiment 6-3.

$$m \in \{i_{1v}\} \quad \text{[Equation 52]}$$

Figure 62:
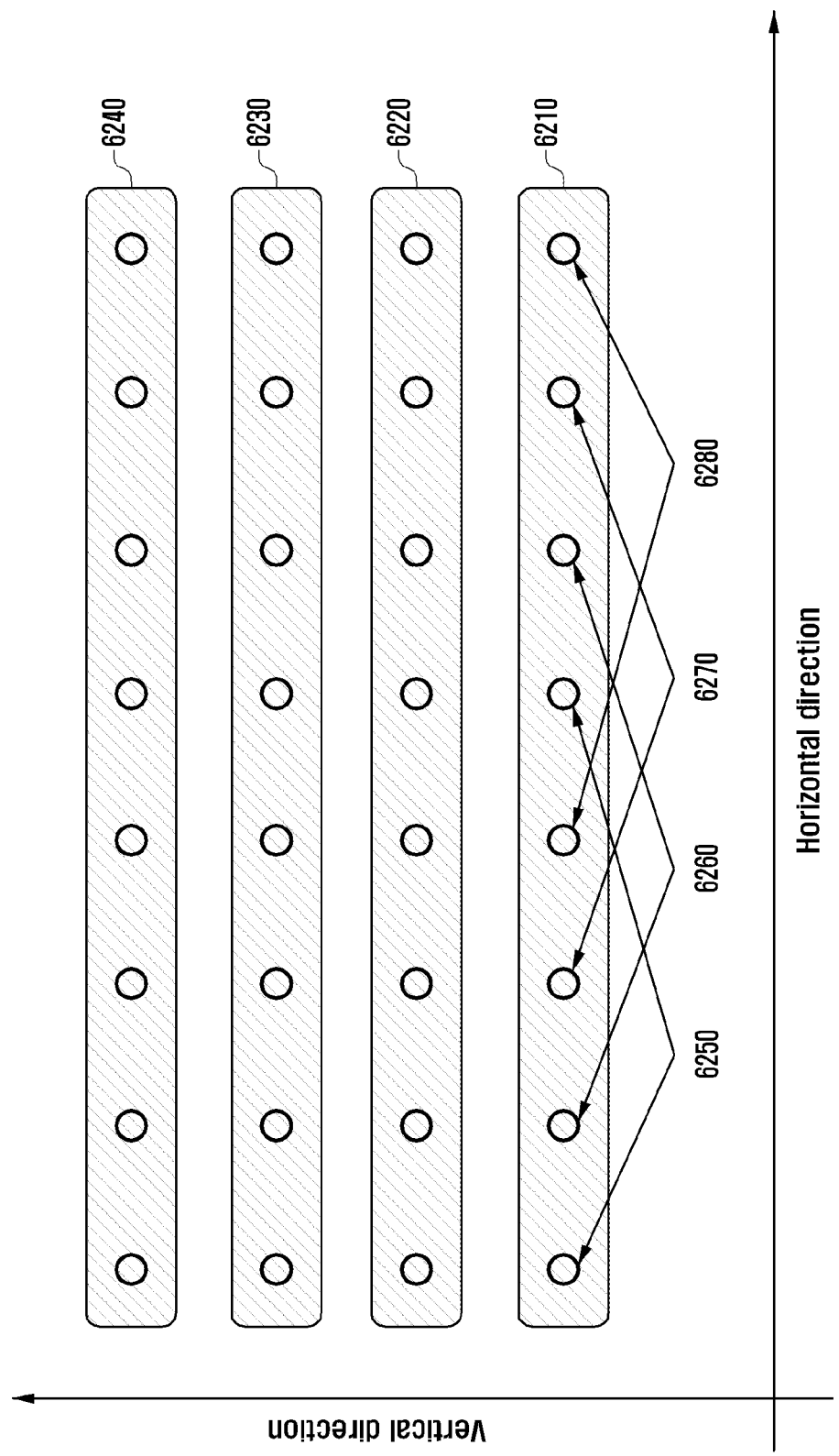
FIG. 62 is a diagram illustrating beam grouping and beam selection in embodiment 3.

FIG. 62 shows the relative positions of the beam groups generated by equations 51 and 52. Each beam group may be indicated explicitly by $i_{1h}$, $i_{1v}$ or implicitly by a horizontal•vertical direction combination indicator $i_1 \in \{0,1,2,3\}$ having the following relationship.

$$i_{1h} = i_1 \bmod N, i_{1v} = \lfloor i_1/N \rfloor \quad \text{[Equation 53]}$$

The $i_1 \in \{0,1,2,3\}^{th}$ beam group can be expressed as follows using equations 51 and 52 and the DFT vector of equation 23.

$$X_{i_1} = \{v_{0,m}, v_{1,m}, v_{2,m}, v_{3,m}, v_{4,m}, v_{5,m}, v_{6,m}, v_{7,m}\} \quad \text{[Equation 54]}$$

Here, $m = \lfloor i_1/N \rfloor$. Equation 54 represents the beam groups denoted by reference numbers 6210, 6220, 6230, and 6240 in FIG. 62 for $i_1 \in \{0,1,2,3\}$.

Equation 54 is conceived in order for the UE to report the index of the beam group capable of securing the horizontal direction orthogonal beam pairs under the condition of $\sigma_{ZSD} < \sigma_{ASD}$. $X_{i_1}$ can be configured in various formats according to the above-described method by modifying the parameters of equation 50 appropriately in adaptation to the situation.

In the case that the UE reports the rank 4 PMI to the eNB, the UE has to select two orthogonal beams using equation 23 to describe the rank 4 channels as described above.

There are 4 orthogonal beam pairs (i,j) selectable in the beam group formed by equation 54.

$$(i,j) \in \{(1,5),(2,6),(3,7),(4,8)\} \quad \text{[Equation 55]}$$

In embodiment 6-3, 1 bit is allocated for co-phasing factor selection for the rank 4 codebook. The rank 4 codebook of embodiment 6-3 can be generated by substituting equation 54 to equation 20 and equation 55 to equation 23.

Table 10 is an exemplary rank 4 $i_1$ and $i_2$ PMI-codebook mapping table conceived in this embodiment. In table 10, $\varphi_z = e^{j2\pi z/Q_z}, z \in \{0,1\}$ denotes the co-phasing factor, and $Q_z = 4$ denotes the co-phasing resolution. Table 10 is conceived to express the above-described beam group and beam selection method implicitly. If the UE selects $i_1$ according to table 10, a beam group in the form of equation 54 is selected. If the UE selects $i_2$ according to table 10, one of the (i, j) pairs included in equation 55 and one of the co-phasing factors $\varphi_z \in \{1, j\}$ are selected. If the UE transmits the selected $i_1$ and $i_2$ to the eNB, the eNB can check the UE-preferred rank-4 precoding matrix based thereon.

TABLE 10

Rank 4 codebook - PMI mapping table of embodiment 6-3

| | $i_2$ | | | |
|---|---|---|---|---|
| $i_1$ | 0 | 1 | 2 | 3 |
| 0-3 | $W^{(4)}_{(0,i_1),(4,i_1),0}$ | $W^{(4)}_{(0,i_1),(4,i_1),1}$ | $W^{(4)}_{(1,i_1),(5,i_1),0}$ | $W^{(4)}_{(1,i_1),(5,i_1),1}$ |
| | $i_2$ | | | |
| $i_1$ | 4 | 5 | 6 | 7 |
| 0-3 | $W^{(4)}_{(2,i_1),(6,i_1),0}$ | $W^{(4)}_{(2,i_1),(6,i_1),1}$ | $W^{(4)}_{(3,i_1),(8,i_1),0}$ | $W^{(4)}_{(3,i_1),(7,i_1),1}$ |

$$W^{(4)}_{(n,m),(n',m'),z} = \frac{1}{\sqrt{32}} \begin{bmatrix} V_{n,m} & V_{n',m'} & V_{n,m} & V_{n',m'} \\ \varphi_z V_{n,m} & \varphi_z V_{n',m'} & -\varphi_z V_{n,m} & -\varphi_z V_{n',m'} \end{bmatrix}$$

The rank-3 codebook of embodiment 6-3 can be built by selecting 3 of 4 column vectors of the rank-4 codebook of embodiment 6-3. Based on equations 55 and 24, it is possible to generate 8 beam selection pairs as follows.

$$(i,j,k) \in \{(1,1,5),(5,1,5),(2,2,6),(6,2,6),(3,3,7),(7,3,7), (4,4,8),(8,4,8)\} \quad \text{[Equation 56]}$$

Based on equations 56 and 25, it is possible to generate additional 8 beam selection pairs as follows.

$$(i,j,k) \in \{(1,1,5),(5,1,1),(2,2,6),(6,2,2),(3,3,7),(7,3,3), (4,4,8),(8,4,4)\} \quad \text{[Equation 57]}$$

Based on equations 24, 25, 56, and 57, the rank-3 codebook of embodiment 6-3 can be expressed as shown in table 11.

TABLE 11

Rank 3 codebook - PMI mapping table of embodiment 6-3

| | $i_2$ | | | |
|---|---|---|---|---|
| $i_1$ | 0 | 1 | 2 | 3 |
| 0-3 | $W^{(3)}_{(0,i_1),(0,i_1),(4,i_1)}$ | $W^{(3)}_{(4,i_1),(0,i_1),(4,i_1)}$ | $\tilde{W}^{(3)}_{(0,i_1),(4,i_1),(4,i_1)}$ | $\tilde{W}^{(3)}_{(4,i_1),(0,i_1),(0,i_1)}$ |
| | $i_2$ | | | |
| $i_1$ | 4 | 5 | 6 | 7 |
| 0-3 | $W^{(3)}_{(1,i_1),(1,i_1),(5,i_1)}$ | $W^{(3)}_{(5,i_1),(1,i_1),(5,i_1)}$ | $\tilde{W}^{(3)}_{(1,i_1),(5,i_1),(5,i_1)}$ | $\tilde{W}^{(3)}_{(5,i_1),(1,i_1),(1,i_1)}$ |

TABLE 11-continued

Rank 3 codebook - PMI mapping table of embodiment 6-3

| $i_1$ | $i_2$ | | | |
|---|---|---|---|---|
| | 8 | 9 | 10 | 11 |
| 0-3 | $W^{(3)}_{(2,i_1),(2,i_1),(6,i_1)}$ | $W^{(3)}_{(6,i_1),(2,i_1),(6,i_1)}$ | $\tilde{W}^{(3)}_{(2,i_1),(6,i_1),(6,i_1)}$ | $\tilde{W}^{(3)}_{(6,i_1),(2,i_1),(2,i_1)}$ |

| $i_1$ | $i_2$ | | | |
|---|---|---|---|---|
| | 12 | 13 | 14 | 15 |
| 0-3 | $W^{(3)}_{(3,i_1),(3,i_1),(7,i_1)}$ | $W^{(3)}_{(7,i_1),(3,i_1),(7,i_1)}$ | $\tilde{W}^{(3)}_{(3,i_1),(7,i_1),(7,i_1)}$ | $\tilde{W}^{(3)}_{(7,i_1),(3,i_1),(3,i_1)}$ |

$$W^{(3)}_{(n,m),(n',m'),(n'',m'')} = \frac{1}{\sqrt{24}} \begin{bmatrix} V_{n,m} & V_{n',m'} & V_{n'',m''} \\ V_{n,m} & -V_{n',m'} & -V_{n'',m''} \end{bmatrix},$$

$$\tilde{W}^{(3)}_{(n,m),(n',m'),(n'',m'')} = \frac{1}{\sqrt{24}} \begin{bmatrix} V_{n,m} & V_{n',m'} & V_{n'',m''} \\ V_{n,m} & V_{n',m'} & -V_{n'',m''} \end{bmatrix}$$

Embodiment 6-4

Embodiment 6-4 of the present invention is directed to an exemplary case of generating a rank 3-4 codebook using equation 30 in the horizontal direction and equation 29 in the vertical direction. Embodiment 6-4 is characterized in that the vertical beam groups are overlapped. In embodiment 6-4, the following codebook design parameters are used.

$$(Q_1=4, N=1, S_1=4, \Delta_1=1), (Q_2=4, M=4, S_2=2, \Delta_2=1) \quad \text{[Equation 58]}$$

Equation 58 is conceived to generate the beam groups including a plurality of beams orthogonal in the horizontal directions and the beam groups including a plurality of beams orthogonal in the vertical direction for rank 3-4 codebook under the condition of $\sigma_{ZSD} < \sigma_{ASD}$. From equations 58 and 30, it is known that the $i_{1h} \in \{0\}^{th}$ horizontal beam group includes the beams $v_{n,m}$ fulfilling the following conditions in embodiment 6-4.

$$n \in \{i_{1h}, i_{1h}+1, i_{1h}+2, i_{1h}+3\} \quad \text{[Equation 59]}$$

From equations 58 and 29, it is known that the $i_{1v} \in \{0,1,2,3\}^{th}$ vertical direction beam group includes the beams $v_{n,m}$ fulfilling the following condition in embodiment 6-4.

$$m \in \{i_{1v}, i_{1v}+1\} \quad \text{[Equation 60]}$$

Each beam group may be indicated explicitly by $i_{1h}$, $i_{1v}$ or implicitly by a horizontal•vertical direction combination indicator $i_1 \in \{0,1,2,3\}$ having the following relationship.

$$i_{1h}=i_1 \bmod N, i_{1v}=\lfloor i_1/N \rfloor \quad \text{[Equation 61]}$$

Figure 63:
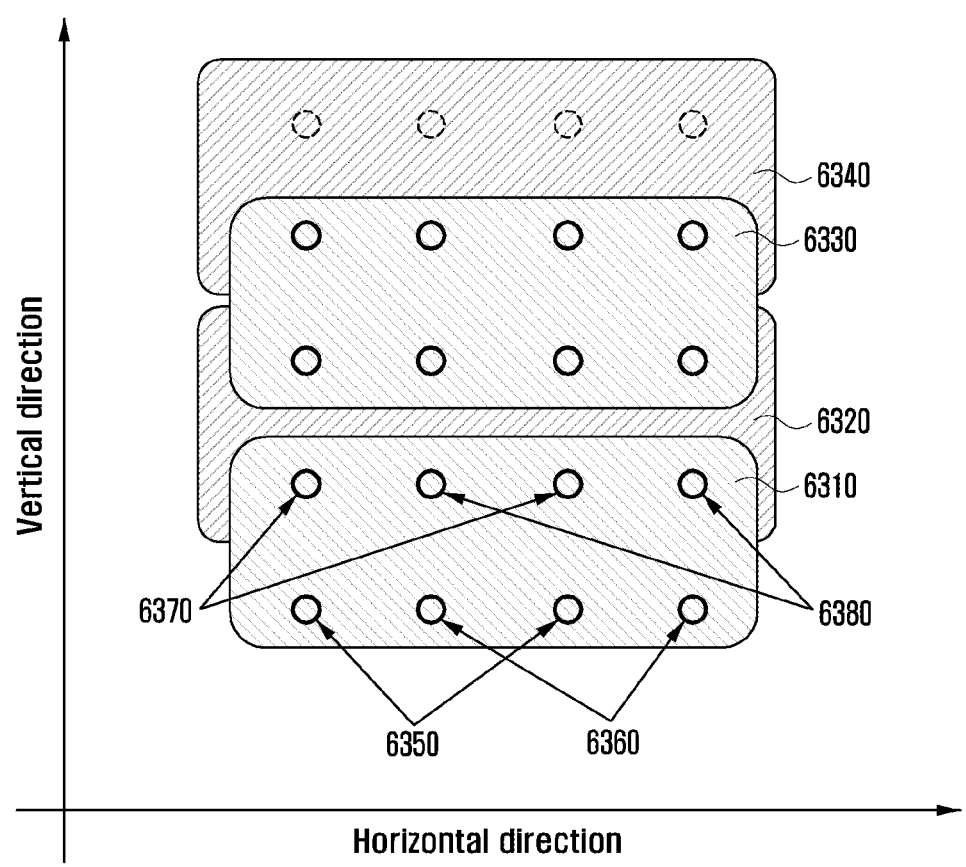
FIG. 63 is a diagram illustrating beam grouping and beam selection in equation 4.

FIG. 63 is a diagram illustrating the relative positions and beam configuration of the beam groups indicated by equations 59 and 60 or equation 61.

Using equations 59 and 60 and the DFT vectors of equation 23, the $i_1 \in \{0,1,2,3\}^{th}$ beam group can be expressed as follows.

$$X_{i_1} = \{v_{0,i_1}, v_{1,i_1}, v_{2,i_1}, v_{3,i_1}, v_{0,i_1+1}, v_{1,i_1+1}, v_{2,i_1+1}, v_{3,i_1+1}\} \quad \text{[Equation 62]}$$

Equation 62 represents the beam groups denoted by reference numbers 6310, 6320, 6330, and 6340 in FIG. 63 for $i_1 \in \{0,1,2,3\}$. Equation 62 is conceived in order for the UE to report the index of the beam group capable of securing the horizontal direction orthogonal beam pairs under the condition of $\sigma_{ZSD} < \sigma_{ASD}$. Equation 62 is also conceived in order for the UE to report the index of the beam group including vertical direction beam candidates to the eNB. $X_{i_1}$ can be configured in various formats according to the above-described method by modifying the parameters of equation 58 appropriately in adaptation to the situation.

In the case that the UE reports the rank 4 PMI to the eNB, the UE has to select two orthogonal beams using equation 23 to describe the rank 4 channels as described above. There are 4 orthogonal beam pairs (i, j) selectable in the beam group formed by equation 62.

$$(i,j) \in \{(1,3),(2,4),(5,7),(6,8)\} \quad \text{[Equation 63]}$$

In embodiment 6-4, 1 bit is allocated for co-phasing factor selection for the rank 4 codebook. The rank 4 codebook of embodiment 6-4 can be generated by substituting equation 62 to equation 20 and equation 53 to equation 23.

Table 12 is an exemplary rank 4 $i_1$ and $i_2$ PMI-codebook mapping table conceived in this embodiment. In table 12, $\varphi_z = e^{j2\pi z/Q_z}$, $z \in \{0,1\}$ denotes the co-phasing factor, and $Q_z=4$ denotes the co-phasing resolution. Table 12 is conceived to express the above-described beam group and beam selection method implicitly. If the UE selects $i_1$ according to table 12, a beam group in the form of equation 62 is selected. If the UE selects $i_2$ according to table 5, one of the (i, j) pairs included in equation 63 and one of the co-phasing factors $\varphi \in \{1,j\}$ are selected. If the UE transmits the selected $i_1$ and $i_2$ to the eNB, the eNB can check the UE-preferred rank-4 precoding matrix based thereon.

TABLE 12

Rank 4 codebook - PMI mapping table of embodiment 6-4

| $i_1$ | $i_2$ | | | |
|---|---|---|---|---|
| | 0 | 1 | 2 | 3 |
| 0-3 | $W_{(0,i_1),(2,i_1),0}^{(4)}$ | $W_{(0,i_1),(2,i_1),1}^{(4)}$ | $W_{(1,i_1),(3,i_1),0}^{(4)}$ | $W_{(1,i_1),(3,i_1),1}^{(4)}$ |
| | $i_2$ | | | |
| | 4 | 5 | 6 | 7 |
| 0-3 | $W_{(0,i_2+1),(2,i_2+1)}^{(4)}$ | $W_{(0,i_1+1),(2,i_2+1)}^{(4)}$ | $W_{(1,i_1+1),(3,i_2+1)}^{(4)}$ | $W_{(1,i_2+1),(3,i_2+1)}^{(4)}$ |

$$W_{(n,m),(n',m'),z}^{(4)} = \frac{1}{\sqrt{32}} \begin{bmatrix} V_{n,m} & V_{n',m'} & V_{n,m} & V_{n',m'} \\ \varphi_z V_{n,m} & \varphi_z V_{n',m'} & -\varphi_z V_{n,m} & -\varphi_z V_{n',m'} \end{bmatrix}$$

The rank-3 codebook of embodiment 6-4 can be built by selecting 3 of 4 column vectors of the rank-4 codebook of embodiment 6-4. Based on equations 63 and 24, it is possible to generate 8 beam selection pairs as follows.

$(i,j,k) \in \{(1,1,3),(3,1,3),(2,2,4),(4,2,4),(5,5,7),(7,5,7),$
$(6,6,8),(8,6,8)\}$ [Equation 64]

Based on equations 63 and 25, it is possible to generate additional 8 beam selection pairs as follows.

$(i,j,k) \in \{(1,3,3),(3,1,1),(2,4,4),(4,2,2),(5,7,7),(7,5,5),$
$(6,8,8),(8,6,6)\}$ [Equation 65]

Based on equations 24, 25, 64, and 65, the rank-3 codebook of embodiment 6-4 can be expressed as shown in table 13.

UE. The codebook-PMI mapping information may be shared in such a way of storing it in the storage devices of the eNB and the UE in advance or transmitting it from the eNB to the UE. The codebook-PMI mapping information may be shared in the form of formula or a table or predetermined values.

Figure 64:
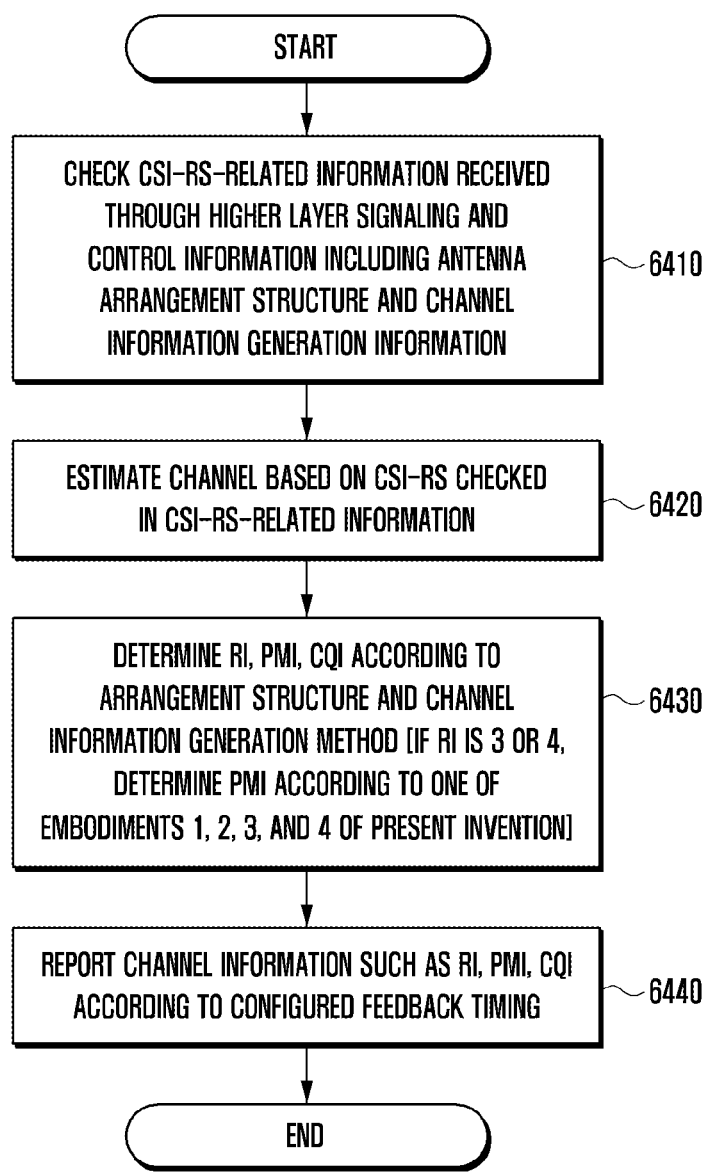
FIG. 64 is a flowchart illustrating operation order of the UE according to an embodiment of the present invention.

A description is made of the channel information generation and feedback method of the UE according to an embodiment of the present invention with reference to FIG. 64.

Referring to FIG. 64, the UE receives the control information including CSI-RS information, antenna array structure, and channel information generation method from the

TABLE 13

Rank 3 codebook - PMI mapping table of embodiment 6-4

| $i_1$ | $i_2$ | | | |
|---|---|---|---|---|
| | 0 | 1 | 2 | 3 |
| 0-3 | $W_{(0,i_1),(0,i_1),(2,i_1)}^{(3)}$ | $W_{(2,i_1),(0,i_1),(2,i_1)}^{(3)}$ | $\tilde{W}_{(0,i_1),(2,i_1),(2,i_1)}^{(3)}$ | $\tilde{W}_{(2,i_1),(0,i_1),(0,i_1)}^{(3)}$ |
| | $i_2$ | | | |
| | 4 | 5 | 6 | 7 |
| 0-3 | $W_{(1,i_1),(1,i_1),(3,i_1)}^{(3)}$ | $W_{(3,i_1),(1,i_1),(3,i_1)}^{(3)}$ | $\tilde{W}_{(1,i_1),(3,i_1),(3,i_1)}^{(3)}$ | $\tilde{W}_{(3,i_1),(1,i_1),(1,i_1)}^{(3)}$ |
| | $i_2$ | | | |
| | 8 | 9 | 10 | 11 |
| 0-3 | $W_{(0,i_1+1),(0,i_1+1),(2,i_1+1)}^{(3)}$ | $W_{(2,i_1+1),(0,i_1+1),(2,i_1+1)}^{(3)}$ | $\tilde{W}_{(0,i_1+1),(2,i_1+1),(2,i_1+1)}^{(3)}$ | $\tilde{W}_{(2,i_1+1),(0,i_1+1),(0,i_1+1)}^{(3)}$ |
| | $i_2$ | | | |
| | 12 | 13 | 14 | 15 |
| 0-3 | $W_{(1,i_1+1),(1,i_1+1),(3,i_1+1)}^{(3)}$ | $W_{(3,i_1+1),(1,i_1+1),(3,i_1+1)}^{(3)}$ | $W_{(1,i_1+1),(3,i_1+1),(3,i_1+1)}^{(3)}$ | $W_{(3,i_1+1),(1,i_1+1),(1,i_1+1)}^{(3)}$ |

$$W_{(n,m),(n',m'),(n'',m'')}^{(3)} = \frac{1}{\sqrt{24}} \begin{bmatrix} v_{n,m} & v_{n',m'} & v_{n'',m''} \\ v_{n,m} & -v_{n',m'} & -v_{n'',m''} \end{bmatrix}$$

$$\tilde{W}_{(n,m),(n',m'),(n'',m'')}^{(3)} = \frac{1}{\sqrt{24}} \begin{bmatrix} v_{n,m} & v_{n',m'} & v_{n'',m''} \\ v_{n,m} & v_{n',m'} & -v_{n'',m''} \end{bmatrix}$$

In embodiments 6-1, 6-2, 6-3, and 6-4, the eNB and the UE have to share the codebook-PMI mapping information as shown in tables 6 to 13 in order for the eNB to acquire the channel information based on the PMI transmitted by the eNB through higher layer signaling at step 6410. Here, the channel information generation method means the codebook-PMI mapping information such as table 6, table 7, and table 8.

The UE may determine whether the antenna array structure of the eNB is the ULA structure as shown in FIG. 53 (to use the 8 Tx codebook for release 12) or the UPA structure as shown in FIG. 54 (to use one of the codebooks proposed in the present invention) based on the information received from the eNB.

At step 6420, the UE estimates the channel between the eNB and the UE with the CSI-RS received based on the CSI-RS information acquired at step 6410.

The UE generates RI, PMI, and CQI based on the channel estimated at step 6420 and the channel information generation method received at step 6410. In particular, the eNB may instruct the UE to refer to the codebook-PMI mapping information such as tables 6 to 13 when it generates the PMI for the case of rank=3 or 4.

Afterward, the UE may determine RI based on the generated PMI and CQI. Finally, the UE feeds back the channel information including RI, PMI, and CQI at the feedback timings indicated from the eNB.

Figure 65:
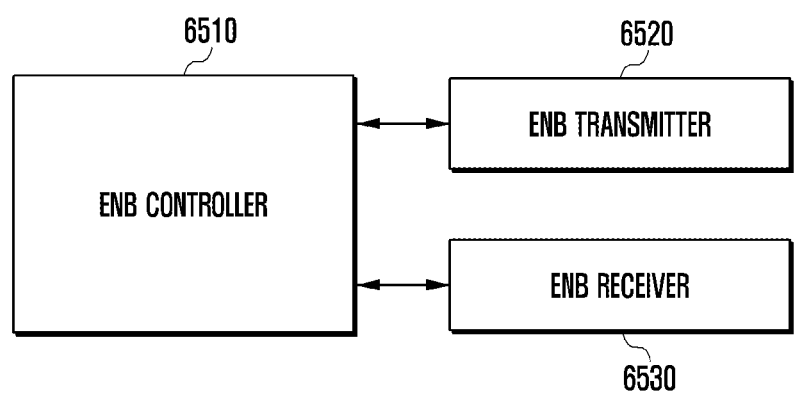
FIG. 65 is a block diagram illustrating an internal structure of the eNB according to an embodiment of the present invention.

FIG. 65 is a diagram illustrating a configuration of the eNB for supporting the channel information generation and feedback method proposed in the present invention.

As shown in FIG. 65, the eNB transmitter 6520 transmits data, reference signals, and feedback information to the UE.

In detail, the transmitter 6520 may transmit a high layer signal to the UE to notify of the eNB antenna array structure or channel information generation method. At this time, the eNB may use a predetermined single codebook or one of various kinds of codebook which is selected by the eNB controller 6510 depending on the situation and determine the information to be selected and method for sharing the selected information with the UE.

The eNB receiver 6530 may receive the channel state information such as ASD and ZSD for supporting the operation of the controller 6510 or the channel information such as RI, PMI, and CQI reported by the UE. The controller 6510 controls the data transmission to the UE based on the channel state information such as RI, PMI, and CQI acquired by the receiver 6530.

Figure 66:
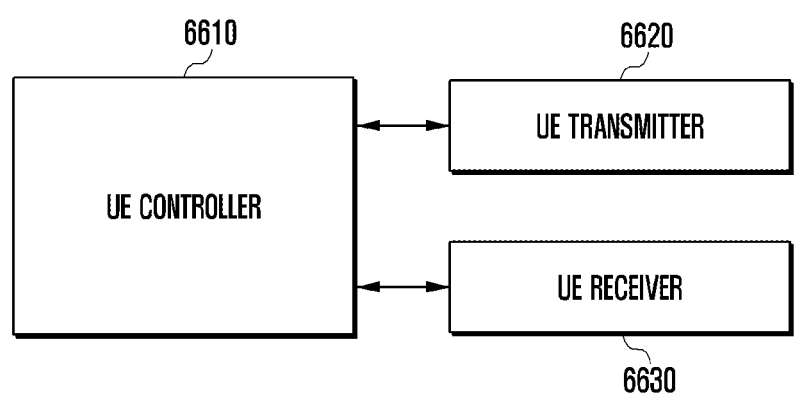
FIG. 66 is a block diagram illustrating an internal structure of the UE according to an embodiment of the present invention.

FIG. 66 is a diagram illustrating a configuration of the UE for supporting the channel information generation and feedback method proposed in the present invention.

In FIG. 66, the UE receiver 6630 receives feedback information including CSI-RS information, antenna arrangement structure, and channel information generation method, and reference signals from the eNB.

The UE controller 6610 estimates channels based on the reference signals and feedback information received by the receiver 6630 and generates RI, PMI, and CQI according to the channel information generation method.

The controller 6610 may include a storage device for storing values detected by a computer in association with a plurality of channel information generation methods. The controller 6610 may report the channel information generation capability of the UE in response to the request from the eNB. Here, the channel information generation capability of the UE may denote the type of the channel information generation method which is stored in the UE or the indication on whether the UE supports the channel information generation method indicated by the eNB. The UE transmitter 6620 may transmit the channel information generated by the UE to the eNB or transmit the information on the channel information generation capability of the UE to the eNB.

Seventh Embodiment

The seventh embodiment of the present invention relates to a wireless mobile communication system and, in particular, to a method for a terminal to measure Channel State Information (CSI) and transmit the channel station information to a base station to report the measurement result in a wireless communication system adopting a multiple access scheme using multi-carrier such as Orthogonal Frequency Division Multiple Access (OFDMA).

In more detail, the seventh embodiment of the present invention proposes a method and apparatus for generating channel state information for efficient data transmission/reception and sharing the generated channel state information in an LTE-A-based FD-MIMO system. The seventh embodiment of the present invention proposes a method and apparatus for generating and sharing channel state information with rank 2 or higher to perform high efficiency data transmission/reception in the FD-MIMO system.

The characteristics and descriptions of the sixth embodiment of the present invention which have been made with reference to FIGS. 53 to 55 may be applicable to the seventh embodiment without modification. Thus the detailed description of the overlapped part is omitted herein.

The seventh embodiment of the present invention proposes methods of configuring codebook and feedback and generating/reporting the feedback for rank 2 situation designed in consideration of 1-dimensionally or 2-dimensionally arranged linear array (Upol) or cross array (Xpol) antennas in the FD-MIMO system.

Here, the linear antenna array (Upol) is characterized in that all antennas are arranged linearly in the same direction, while the cross antenna array (Xpol) is characterized in that the two antenna groups are arranged at the angles of +45 and −45 degrees to the Y axis in the positive direction. In the present invention, the antennas arranged at the angles of +45 and −45 degrees to the Y axis in the positive direction are referred to hereinafter as H-pol antenna and V-pol antenna, respectively.

The codebook and feedback design appropriate for an MIMO system can be obtained through contemplation on how the instant channel value from the transmitter with multiple antennas to the receiver with one antenna is formed. The description thereof is made in the sixth embodiment with reference to FIG. 55. FIG. 55 is a diagram illustrating the aforementioned 2D SCM specified in the 3GPP standard.

Suppose that the eNB has the X-pol ULA comprised of $S=M_T/2$ H-pol antenna ports and the same number of V-pol antennas ports in the environment as shown in FIG. 55. At this time, the channel of n clusters between the H-pol antenna array of the eNB and the H-pol antenna of the UE is expressed as equation 66.

$$[h_{1,h_1} \quad h_{1,h_2} \quad \ldots \quad h_{1,h_S}]_n(t) = \quad \text{[Equation 66]}$$

$$\sqrt{\rho_n} \sum_{m=1}^{M} \exp(j\Phi_{nm}^{(h,h)})\exp(jk\|v\|\cos(\theta_{n,m,AoA} - \theta_v)) \times [$$

$$1 \quad e^{jkd\sin\theta_{n,m,AoD}} \ldots \quad e^{jk(S-1)d\sin\theta_{n,m,AoD}}]$$

In equation 66, $\rho_n$ denotes the total gain of the $n^{th}$ cluster which includes antenna gain and pathloss, $\Phi_{nm}^{(h,h)}$ denotes the phase offset between the H-pol eNB antenna and the H-pol UE antenna on the $m^{th}$ subpath belonging to the $n^{th}$ cluster, $k=2\pi/\lambda$ denotes the wave number, $\|v\|$ denotes the velocity of the UE, $\theta_v$ denotes the moving direction of the UE, $\theta_{n,m,AoA}$ denotes the angle of arrival at the UE, d denotes the distance between eNB antenna ports, and $\theta_{n,m,AoD}$ denotes the angle of departure at the eNB.

Meanwhile, the channel between the V-pol antenna array of the eNB and the H-pol antenna is expressed as equation 67.

$$[h_{1,v_1} \ h_{1,v_2} \ \ldots \ h_{1,v_S}]_n(t) = \quad \text{[Equation 67]}$$

$$\sqrt{\rho_n} \sum_{m=1}^{M} \exp(j\Phi_{nm}^{(v,h)})\exp(jk\|v\|\cos(\theta_{n,m,AoA} - \theta_v)) \times [$$

$$1 \ e^{jkd\sin\theta_{n,m,AoD}} \ \ldots \ e^{jk(S-1)d\sin\theta_{n,m,AoD}}]$$

In equation 67, $\Phi_{nm}^{(v,h)}$ denotes the phase offset between the V-pol eNB antenna and the H-pol UE antenna. In equations 66 and 67, the channel difference between the H-pol antenna group and the V-pol antenna group is determined by $\varphi = \Phi_{nm}^{(h,h)} - \Phi_{nm}^{(v,h)}$.

From the above result, it is possible to know that the beamforming vector maximizing the Signal to Noise Ratio (SNR) of the Upol ULA is represented by equation 68 if the channel has a dominant propagation path $\theta_{n,m,AoD}$.

$$[1 e^{jkd\sin\theta_{n,m,AoD}} e^{jk2d\sin\theta_{n,m,AoD}} \ldots e^{jk(S-1)d\sin\theta_{n,m,AoD}}]^H \quad \text{[Equation 68]}$$

If the channel has a dominant propagation path $\theta_{n,m,AoD}$, the beamforming vector maximizing the SNR of the X-pol ULA is represented by equation 69.

$$[[1 \ e^{jkd\sin\theta_{n,m,AoD}} \ e^{jk2d\sin\theta_{n,m,AoD}} \ \ldots \ e^{jk(S-1)d\sin\theta_{n,m,AoD}}],$$
$$e^{j\varphi}[1 \ e^{jkd\sin\theta_{n,m,AoD}} \ e^{jk2d\sin\theta_{n,m,AoD}} \ \ldots \ e^{jk(S-1)d\sin\theta_{n,m,AoD}}]] \quad \text{[Equation 69]}$$

Equation 69 shows that the beam maximizing the SNR can be formed by adjusting the co-phasing term $e^{j\varphi}$ based on equation 68 because the geographical locations of the H-pol antenna group and the V-pol antenna group are identical with each other in the case of the X-pol ULA.

Based on the above facts, the channel information of the 8 Tx system is designed to be fed back with two kinds of PMI for $W_1$ and $W_2$ in LTE/LTE-A Release 12. The $W_1$ denotes the beam group comprised of a plurality of beamforming vectors for long-term CSI feedback corresponding to a wideband PMI (wPMI) and is indicated by an index of $i_1 \in \{0,1,\ldots,15\}$.

$$W_1 = \begin{bmatrix} X_{i1} & 0 \\ 0 & X_{i1} \end{bmatrix}, X_n = [v_{2n} \ v_{2n+1} \ v_{2n+2} \ v_{2n+3}] \quad \text{[Equation 70]}$$

Here, $v_n = [1 \ e^{j2\pi n/Q} \ e^{j2\pi \cdot 2n/Q} \ e^{j2\pi \cdot 3n/Q}]^T$ and $Q=32$.

It is obvious that each element of $v_n$ (e.g. $e^{j2\pi n/Q}$) in equation 70 has the format to quantize each element of equation 68 (e.g. $e^{jkd\sin\theta_{n,m,AoD}}$).

That is, $v_n$ has a format of dividing the reference phase $0 \le kd\sin\theta_{n,m,AoD} \le 2\pi$ of equation 68 into Q sections equally. Thus, Q may be considered as the resolution of the DFT vector $v_n$ forming $X_n$. The UE may find the index corresponding to $W_1$ including the DFT vector having a value most proximate to the estimated channel based on equation 70 and reports the index to the eNB.

The $W_2$ selects a beam from the beam group for short-term CSI feedback corresponding to a subband PMI (sPMI) and adjusts co-phasing. The $W_2$ is indicated by an index of $i_2 \in \{0,1,\ldots,15\}$. The $W_2$ can be expressed by, for rank-1, $$W_2 = \frac{1}{\sqrt{2}}\begin{bmatrix} e_i \\ e^{j\varphi}e_i \end{bmatrix} \quad \text{[Equation 71]}$$

(4×1 vector in which $e_i$ is the $i^{th}$ element of 1 and the other elements are 0, $\in \{1,2,3,4\}$, $e^{j\varphi} \in \{1, j, -1, -j\}$) and, for rank-2, $$W_2 = \frac{1}{\sqrt{2}}\begin{bmatrix} e_i & e_j \\ e^{j\varphi}e_i & -e^{j\varphi}e_j \end{bmatrix} \quad \text{[Equation 72]}$$

$((i, j) \in \{(1, 1), (2, 2), (3, 3), (4, 4),$
$(1, 2), (2, 3), (1, 4), (2, 4)\}, e^{j\varphi} \in \{1, j\})$.

The UE can find (i,j) and $e_{j\varphi}$ expressing the subband channel state best based on equation 71 or 72 according to the predetermined $W_1$ and rank. Afterward, the UE reports the $W_2$ index corresponding thereto to the eNB.

Finally, the eNB estimates the UE-preferred precoding matrix based on the received $i_1$ and $i_2$ as follows.

$$W = W_1 W_2$$

Figure 67:
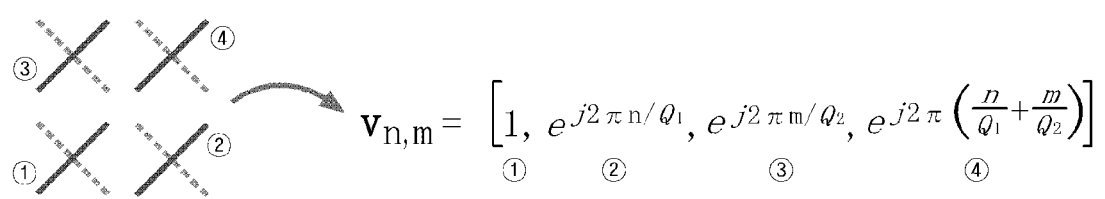
FIG. 67 is a diagram illustrating FD MIMO antenna structure for 8 Tx antennas and DFT beamforming vector therefor.

Meanwhile, in the case of the 8 Tx Xpol UPA deployed as shown in FIG. 67, it is necessary to define the DFT vector

[Equation 69]

different from the example of equation 70. Assuming that a dominant path exists at the angle of $\theta_A$ in the horizontal direction and $\theta_Z$ in the vertical direction in view of the broad side of the array, the phase offset of the antenna at position ① of FIG. 67 can be expressed as follows.

$$[1 e^{jkd_h\sin\theta_A} e^{jkd_v\sin\theta_Z} e^{jk(d_h\sin\theta_A + d_v\sin\theta_Z)}] \quad \text{[Equation 73]}$$

Accordingly, assuming that the resolutions of $Q_1$ in the horizontal direction and $Q_2$ in the vertical direction ($Q_1$ and $Q_2$ can be set differently according to various factors such as angle spread (AS) and number of feedback bits) are used, the DFT vector as follows can be used.

$$v_{n,m} = [1 \ e^{j2\pi n/Q_1} \ e^{j2\pi m/Q_2} \ e^{j2\pi/\left(\frac{n}{Q_1}+\frac{m}{Q_2}\right)}], \quad \text{[Equation 74]}$$

$n \in \{1, \ldots, Q_1 - 1\},$ $m \in \{1, \ldots, Q_2 - 1\}$

At this time, the antennas representing the elements of equation 74 are positioned as shown in FIG. 67. Equation 74 has been conceived to report information on the horizontal direction index n and vertical direction index m describing the channel state best in the case that the UE receives the information on $Q_1$ and $Q_2$ explicitly or implicitly.

The eNB and UE have to share the information indicating whether the DFT vector used by the UE in generating PMI is derived from $v_n$ of equation 70 or $v_{n,m}$ of equation 74 in order to exchange correct channel information. In order to share the DFT vector type between the eNB and the UE, the eNB may designate the DFT vector to be used by the UE or the UE may report the type of the DFT vector it has used.

Figure 68:
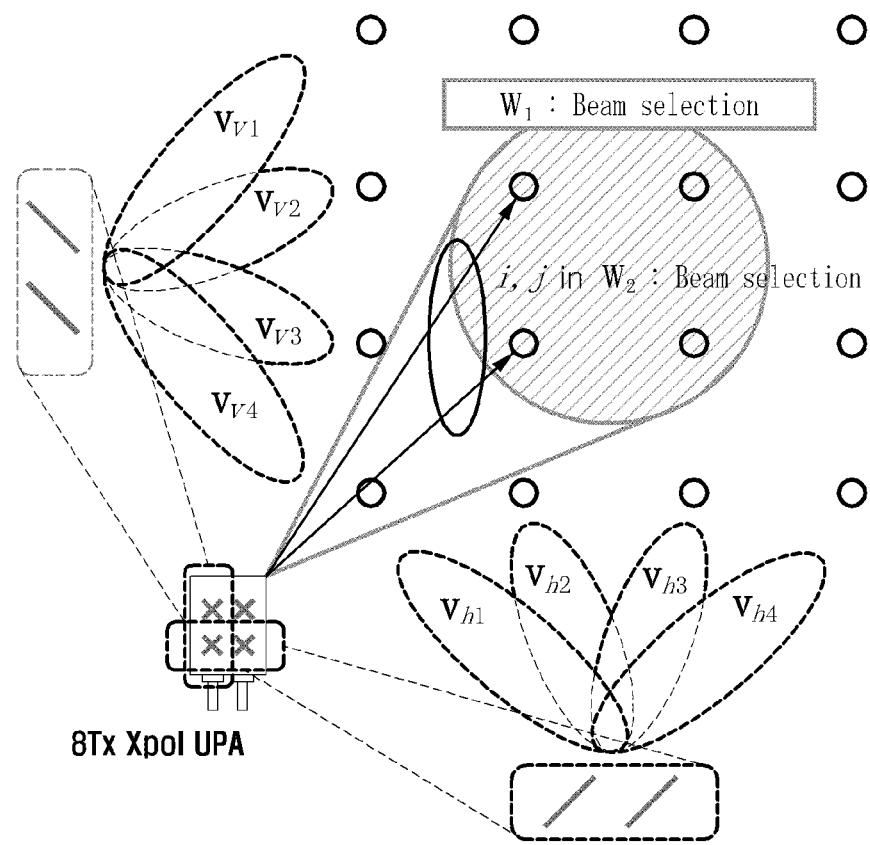
FIG. 68 is a diagram illustrating exemplary beam grouping and beam selection based on FD MIMO DFT beamforming vector for the case of 8 Tx antennas.

Assuming $Q_1=Q_2=4$ for explanatory convenience, $v_{n,m}$ may represent 16 different horizontal and vertical directions as shown in FIG. 68. Since the DFT vector for configuring $X_n$ is changed in equation 70, the method for configuring $W_1$ and $W_2$ should be changed.

For example, it may be possible to consider the beam group configuration and beam selection method in the form of including both the horizontal and vertical directions as shown in FIG. 68.

When configuring a beam group, the most important factors are vertical direction AS (ZSD) and horizontal direction AS (ASD). As shown in equations 71 and 72, $W_2$ expresses the sPMI by selecting one or more $W_1$ column vectors. It is necessary for $W_1$ to form the beam group according to the ZSD and ASD such that $W_2$ selects sPMI efficiently.

FIG. 69 shows an exemplary $W_1$ forming method in various situations. In FIG. 69, T denotes the horizontal beam group size according to $\sigma_{ASD}$, and X denotes the vertical beam group size according to $\sigma_{ZSD}$. Here, $\sigma_{ASD}$ denotes the variance of ASD, and $\sigma_{ZSD}$ denotes the variance of ZSD. If $\sigma_{ZSD} \gg \sigma_{ASD}$ and $\sigma_{ZSD} \ll \sigma_{ASD}$, the dominant path direction of the channel may change significantly in one of vertical and horizontal directions.

Accordingly, it may be advantageous to generate the 2PMI through unbalanced beam group in view of sPMI selection accuracy as shown in the left part of FIG. 69.

Meanwhile, if $\sigma_{ZSD} \approx \sigma_{ASD}$, the dominant path direction of the channel is likely to change evenly in the vertical and horizontal direction. Thus it is advantageous to perform the balanced beam group as shown in the right part of FIG. 69 in terms of selecting the sPMI.

In order to support the rank-2 PMI efficiently, it is necessary to maximize the SNR by describing the per-subband channel state in $W_2$. As shown in equation 72, $W_2$ selects two $W_1$ column vectors identical with or different from each other in generating the rank-2 PMI.

Figure 70:
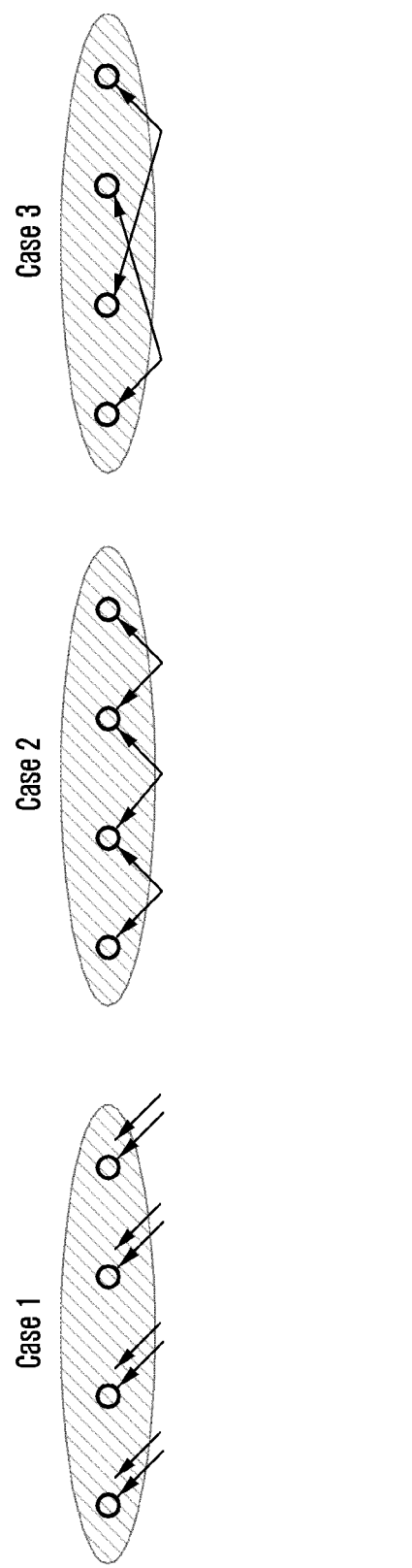
FIG. 70 is a diagram illustrating exemplary beam selection in the selected beam group.

FIG. 70 is a diagram illustrating the methods of selecting two beams in the beam group made up of 4 beams.

There may be various beam selection methods according to various factors such as beam group size (T, X) and the number of beams to select (number of $W_2$ column vectors). Meanwhile, since $i_2$ is not large enough to indicate every number of cases, it is necessary to perform subsampling on (i,j) depending on the situation. For example, if the AS is small, the per-subband channel variation is not large; thus, it is preferable to consider the selection method of case 1 or case 2 in FIG. 70. Otherwise if the AS is large, the per-subband channel variation is large; thus, it is preferable to consider with priority the method of case 3 in FIG. 70.

Embodiment 7-1: Balanced ASD-ZSD Case

Embodiment 7-1 of the present invention considers the balanced ASD-ZSD case. Since the $\sigma_{ZSD} \approx \sigma_{ASD}$ environment is assumed, $T=X=2$ is configured. The total number of feedback bits is 8 which is equal to that of the legacy Release 12 8 Tx codebook subject to $0 \le i_1, i_2 \le 15$. The resolution of the DFT vector is configured as $Q_1=Q_2=4$ and, at this time, the beams and beam groups have the relationship as shown in FIG. 71.

Figure 71:
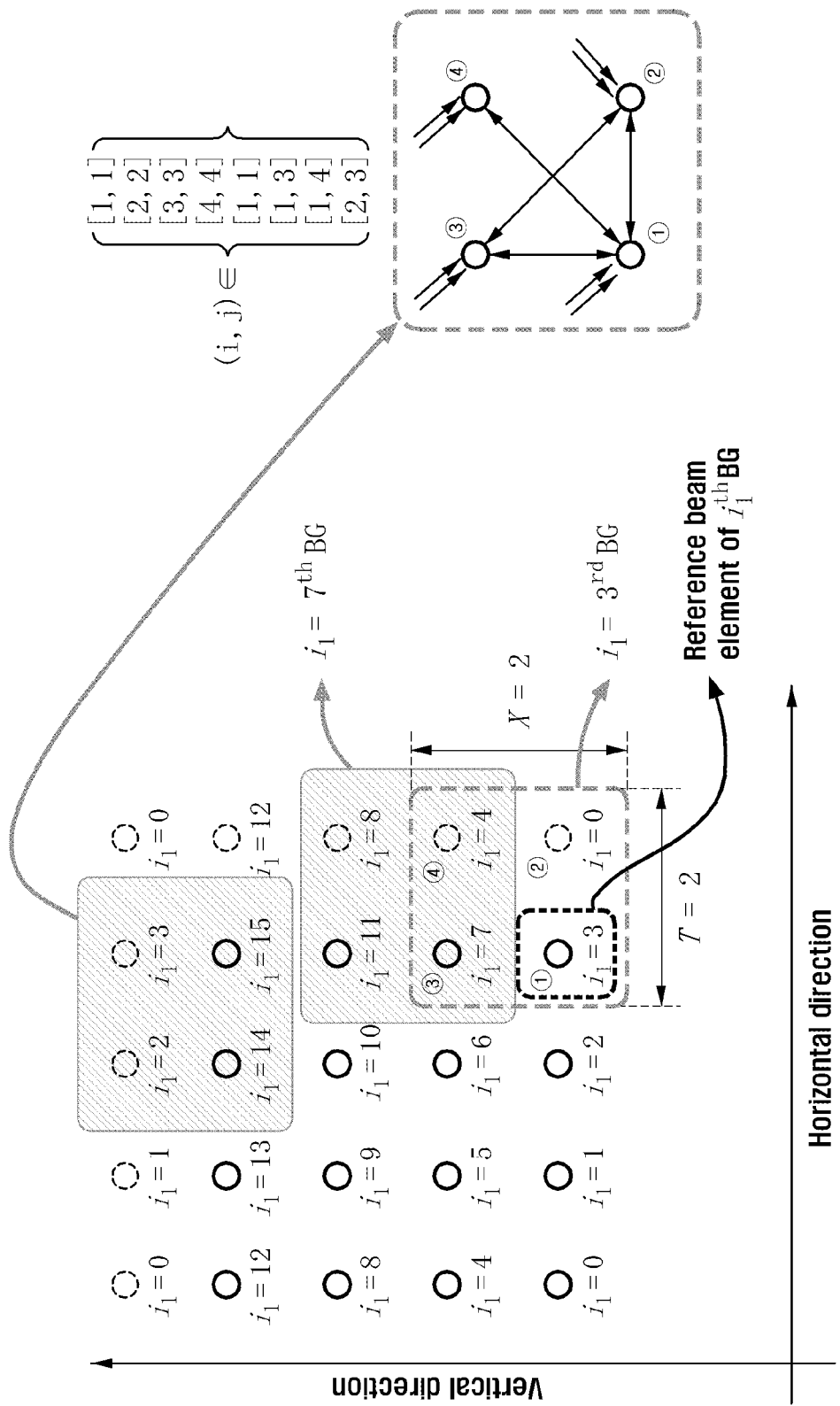
FIG. 71 is a diagram illustrating beam grouping and beam selection in embodiment 1.

In FIG. 71, each beam group is made up of 4 beams, and the reference beam element corresponds to the first column vector, the right side beam of the reference beam corresponds to the second column vector, the left side beam of the reference beam corresponds to the third column vector, and the diagonal beam corresponds to the fourth column vector in $X_{i_1}$ (the position of each beam may change according to the marking). At this time, the $i_1^{th}$ beam group can be expressed using the DFT vector of equation 74 as follows.

$$X_{i_1} = \{v_{n,m}, v_{(n+1),m}, v_{n,(m+1)}, v_{(n+1),(m+1)}\} \quad \text{[Equation 75]}$$

Here, $n = i_1 \bmod Q_1$ and $m = \lfloor i_1/Q_1 \rfloor$.

Equation 75 is conceived for the UE to report the beam group representing the section identical in the horizontal and vertical direction in the situation of $\sigma_{ZSD} \approx \sigma_{ASD}$. Since there are 16 kinds of reference beam that can be used in this embodiment as shown in FIG. 71, it is possible to express the beam groups by 4 bits.

In the case of reporting the rank-2 PMI to the eNB, the UE has to select two beams identical with or different from each other in the beam group formed by equation 75 to describe the rank-2 channel. There are 10 cases of selecting two beams identical with or different from each other in the beam group formed by equation 75 as follows.

$$(i,j) \in \{(1,1),(2,2),(3,3),(4,4),(1,2),(2,3),(3,4),(4,1),(1,3),(2,4)\}$$

Meanwhile, in FIG. 71, the $i_1=3^{rd}$ beam group shares some beams with the $i_1=2^{nd}$ beam group, $i_1=7^{th}$ beam group, $i_1=0^{th}$ beam group, and $i_1=15^{th}$ beam group. Accordingly, although part of the beam selection pairs (i,j) is omitted, it is possible to represent the omitted beam selection pairs through other beam groups.

In this embodiment, 3 bits are allocated for (i,j) selection by omitting one pair among the horizontal pairs and vertical pairs respectively except for $(i,j) \in \{(1,4), (2,3)\}$ which cannot be shared with other beam groups and $(i,j) \in \{(1,1), (2,2), (3,3), (4,4)\}$ which represents single dominant path. As a result, the beam selection pair set used in this embodiment is formed as follows.

$$(i,j) \in \{(1,1),(2,2),(3,3),(4,4),(1,2),(2,3),(4,1),(1,3)\} \quad \text{[Equation 76]}$$

By allocating the other 1 bit for co-phasing factor selection and substituting equation 75 to equation 70 and equation 76 to equation 72, it is possible to calculate the codebook for the balanced ASD-ZSD case.

Table 14 exemplifies the $i_1$ and $i_2$ PMI-codebook mapping conceived in this embodiment. In table 14, $\varphi_z = e^{j2\pi z/Q_z}$, $z \in \{0,1\}$ is the co-phasing factor, and $Q_z=4$ is the co-phasing resolution. Table 14 is conceived so as to express the above-described beam group and beam selection method implicitly.

If the UE selects $i_1$ in table 14, the beam group represented by equation 75 is selected. If the UE selects $i_2$ in table 14, one of (i,j) pairs included in equation 76 and one of co-phasing factors $\varphi_z \in \{1, j\}$ are chosen.

TABLE 14

Codebook - PMI mapping table of embodiment 7-1

| $i_1$ | $i_2$ | | | |
|---|---|---|---|---|
| | 0 | 1 | 2 | 3 |
| 0-15 | $W^{(2)}_{(n,m),(n,m),0}$ | $W^{(2)}_{(n,m),(n,m),1}$ | $W^{(2)}_{(n',m),(n',m),0}$ | $W^{(2)}_{(n',m),(n',m),1}$ |
| $i_1$ | $i_2$ | | | |
| | 4 | 5 | 6 | 7 |
| 0-15 | $W^{(2)}_{(n,m'),(n,m'),0}$ | $W^{(2)}_{(n,m'),(n,m'),1}$ | $W^{(2)}_{(n',m'),(n',m'),0}$ | $W^{(2)}_{(n',m'),(n',m'),1}$ |
| $i_1$ | $i_2$ | | | |
| | 8 | 9 | 10 | 11 |
| 0-15 | $W^{(2)}_{(n,m),(n,m'),0}$ | $W^{(2)}_{(n,m),(n,m'),1}$ | $W^{(2)}_{(n,m),(n',m),0}$ | $W^{(2)}_{(n,m),(n',m),1}$ |
| $i_1$ | 12 | 13 | 14 | 15 |
| 0-15 | $W^{(2)}_{(n,m),(n',m'),0}$ | $W^{(2)}_{(n,m),(n',m'),1}$ | $W^{(2)}_{(n',m),(n,m'),0}$ | $W^{(2)}_{(n',m),(n,m'),1}$ | where $n = i_1 \bmod Q_1$, $m = \lfloor i_1 / Q_1 \rfloor$, $W^{(2)}_{\langle n,m \rangle, \langle n',m' \rangle, z} = \frac{1}{4} \begin{bmatrix} v_{n,m} & v_{n',m'} \\ \varphi_z v_{n,m} & -\varphi_z v_{n',m'} \end{bmatrix}$ Embodiment 702: Unbalanced ASD-ZSD Case 1

Embodiment 7-2 of the present invention considers the unbalanced ASD-ZSD case. Since the $\sigma_{ZSD} \ll \sigma_{ASD}$ environment is assumed, T=4 and X=1 are considered. The total number of feedback bits is 8 which is equal to that of the legacy Release 12 8 Tx codebook subject to $0 \le i_1, i_2 \le 15$. The resolution of the DFT vector is configured as $Q_1=8$ and $Q_2=4$ and, at this time, the beams and beam groups have the relationship as shown in FIG. 72 (if $\sigma_{ZSD} \gg \sigma_{ASD}$, T=1, X=4, $Q_1=4$, and $Q_2=8$ can be configured).

Figure 72:
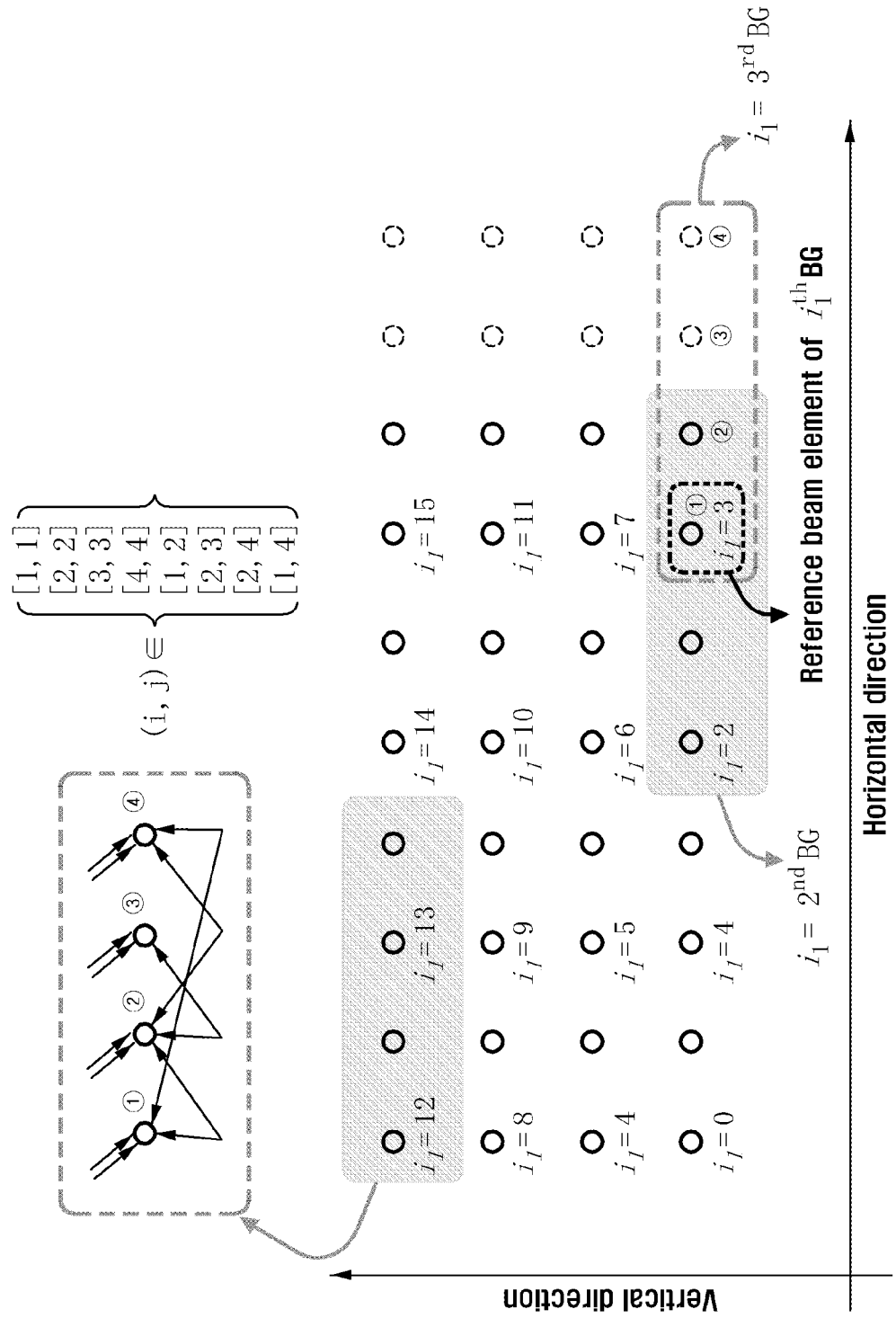
FIG. 72 is a diagram illustrating beam grouping and beam selection in embodiment 2.

In FIG. 72, each beam group is made up of 4 beams, and the reference beam element corresponds to the first column vector, the first right side beam of the reference beam corresponds to the second column vector, the second right side beam of the reference beam corresponds to the third column vector, and the third right side beam corresponds to the fourth column vector in $X_{i_1}$ (the position of each beam may change according to the marking).

At this time, the $i_1^{th}$ beam group can be expressed using the DFT vector of equation 74 as follows:

$$X_{i_1} = \{v_{2n,m}, v_{(2n+1),m}, v_{(2n+2),m}, v_{(2n+3),m}\}$$ [Equation 77]

Here, $n = i_1 \bmod \frac{Q_1}{2}$ and $m = \lfloor 2i_1 / Q_1 \rfloor$.

Since there are 16 kinds of reference beam that can be used in this embodiment as shown in FIG. 72, it is possible to express the beam groups by 4 bits. Like embodiment 7-1, there are 10 cases of selecting two beams identical with or different from each other in the beam group formed by equation 75.

$(i,j) \in \{(1,1),(2,2),(3,3),(4,4),(1,2),(2,3),(3,4),(4,1),(1,3),(2,4)\}$

In FIG. 72, the first and second beams of the beam group $i_1=3$ are identical with the third and fourth beams of the beam group $i_1=2$, and the third and fourth beams of the beam group $i_1=3$ are identical with the first and second beams of the beam group $i_1=0$. This means that a beam group shares part of beams with other neighboring beam groups.

Accordingly, although part of the beam selection pairs (i,j) is omitted, it is possible to represent the omitted beam selection pairs through other beam groups.

In this embodiment, 3 bits are allocated for (i,j) selection by omitting the pair (i,j)=(1,4) that cannot be shared with other beam groups and $(i,j) \in \{(1,1), (2,2), (3,3), (4,4)\}$ which represents single dominant path. As a result, the beam selection pair set used in this embodiment is formed as follows.

$(i,j) \in \{(1,1),(2,2),(3,3),(4,4),(1,2),(2,3),(2,4),(1,4)\}$ [Equation 78]

By allocating the other 1 bit for co-phasing factor selection and substituting equation 77 to equation 70 and equation 78 to equation 72, it is possible to calculate the codebook for the unbalanced ASD-ZSD case.

Table 15 exemplifies the $i_1$ and $i_2$ PMI-codebook mapping conceived in this embodiment.

In table 15, $\varphi_z = e^{j2\pi z/Q_z}$, $z \in \{0,1\}$ is the co-phasing factor, and $Q_z=4$ is the co-phasing resolution. Table 15 is conceived so as to express the above-described beam group and beam selection method implicitly. If the UE selects $i_1$ in table 15, the beam group represented by equation 77 is selected. If the UE selects $i_2$ in table 15, one of (i,j) pairs included in equation 77 and one of co-phasing factors $\varphi_z \in \{1,j\}$ are chosen.

TABLE 15

Codebook - PMI mapping table of embodiment 7-2

| $i_1$ | $i_2$ | | | |
|---|---|---|---|---|
| | 0 | 1 | 2 | 3 |
| 0-15 | $W_{(2n,m),(2n,m),0}^{(2)}$ | $W_{(2n,m),(2n,m),1}^{(2)}$ | $W_{(2n+1,m),(2n+1,m),0}^{(2)}$ | $W_{(2n+1,m),(2n+1,m),1}^{(2)}$ |
| $i_1$ | 4 | 5 | 6 | 7 |
| 0-15 | $W_{(2n+2,m),(2n+2,m),0}^{(2)}$ | $W_{(2n+2,m),(2n+2,m),0}^{(2)}$ | $W_{(2n+3,m),(2n+3,m),0}^{(2)}$ | $W_{(2n+3,m),(2n+3,m),1}^{(2)}$ |
| $i_1$ | 8 | 9 | 10 | 11 |
| 0-15 | $W_{(2n,m),(2n+1,m),0}^{(2)}$ | $W_{(2n,m),(2n+1,m),1}^{(2)}$ | $W_{(2n+1,m),(2n+2,m),0}^{(2)}$ | $W_{(2n+1,m),(2n+2,m),1}^{(2)}$ |
| $i_1$ | 12 | 13 | 14 | 15 |
| 0-15 | $W_{(2n+1,m),(2n+3,m),0}^{(2)}$ | $W_{(2n+1,m),(2n+3,m),1}^{(2)}$ | $W_{(2n,m),(2n+3,m),0}^{(2)}$ | $W_{(2n,m),(2n+3,m),1}^{(2)}$ | where $n = i_1 \mod \frac{Q_1}{2}$, $m = \lfloor 2i_1/Q_1 \rfloor$, $W_{(n,m),(n',m'),z}^{(2)} = \frac{1}{4}\begin{bmatrix} v_{n,m} & v_{n',m'} \\ \varphi_z v_{n,m} & -\varphi_z v_{n',m'} \end{bmatrix}$ Embodiment 7-3: Unbalanced ASD-ZSD Case 2

Embodiment 7-3 of the present invention considers the unbalanced ASD-ZSD case. Unlike embodiment 7-2, both the $\sigma_{ZSD} \ll \sigma_{ASD}$ environment and $\sigma_{ZSD} \gg \sigma_{ASD}$ environment are considered simultaneously. The total number of feedback bits is 8 which is equal to that of the legacy Release 12 8 Tx codebook subject to $0 \le i_1, i_2 \le 15$. The resolution of the DFT vector is configured as $Q_1=4$ and $Q_2=4$ and, at this time, the beams and beam groups have the relationship as shown in FIG. 73.

Figure 73:
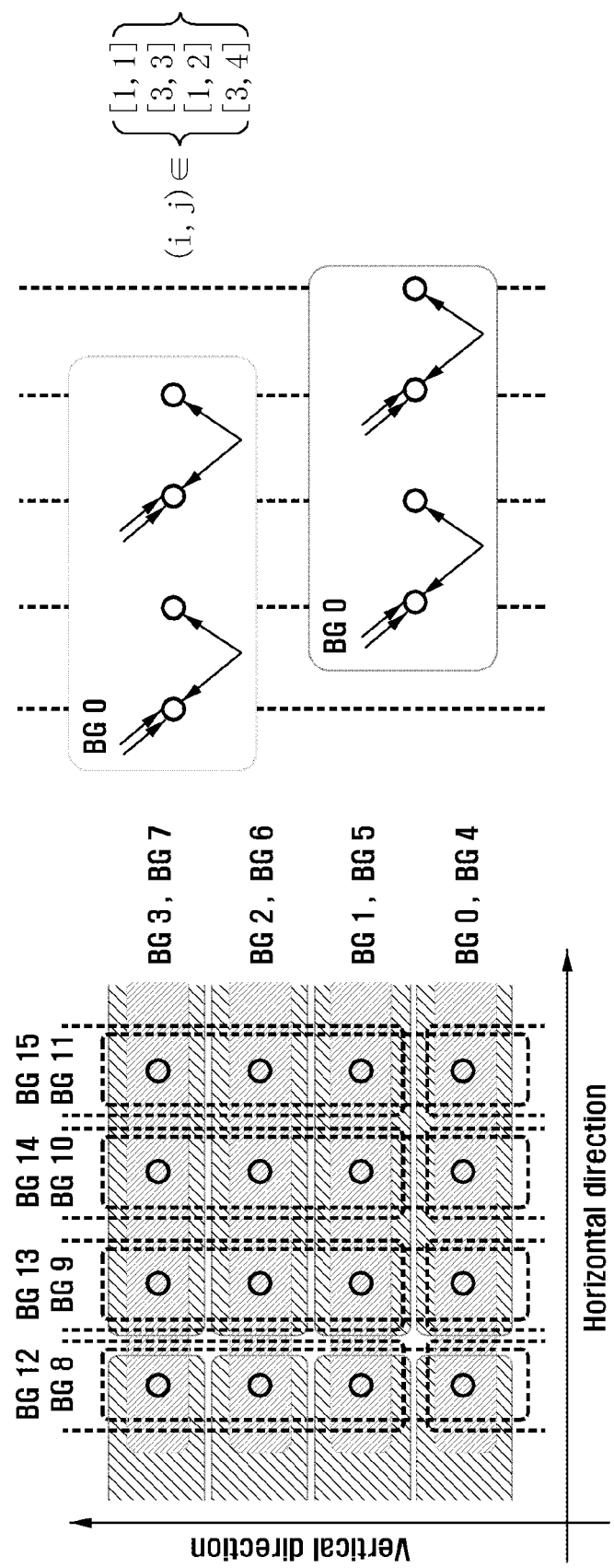
FIG. 73 is a diagram illustrating beam grouping and beam selection in embodiment 3.

In FIG. 73, when $i_1 \in \{0, \ldots, 7\}$, each beam group is made up of 4 beams, and the reference beam corresponds to the first column vector, the first right side beam of the reference beam corresponds to the second column vector, the second right side beam of the reference beam corresponds to the third column vector, and the third right side beam corresponds to the fourth column vector in $X_{i_1}$.

Meanwhile, when $i_1 \in \{8, \ldots, 15\}$, each beam group is made up of 4 beams, and the reference beam corresponds to the first column vector, the first upside beam of the reference beam corresponds to the second column vector, the second upside beam of the reference beam corresponds to the third column vector, and the third upside beam corresponds to the fourth column vector in $X_{i_1}$.

As shown in FIG. 73, each of all beam groups has one beam group pair in the form that its column vectors are cyclically shifted. This aims to reduce the beam pair selection load and increase the co-phasing resolution in $W_2$.

The beam groups depicted in FIG. 73 can be expressed using the DFT vector of equation 74 as follows.

$$X_{i_1} = \begin{cases} \text{diag}\{1, e^{j\frac{\pi}{2}\lfloor\frac{i_1}{4}\rfloor}, 1, e^{j\frac{\pi}{2}\lfloor\frac{i_1}{4}\rfloor}\} \cdot \\ [v_{0,m}, v_{1,m}, v_{2,m}, v_{3,m}], \quad \text{for } 0 \le i_1 \le 7 \\ \text{diag}\{1, 1, e^{j\frac{\pi}{2}\lfloor\frac{i_1-8}{4}\rfloor}, e^{j\frac{\pi}{2}\lfloor\frac{i_1-8}{4}\rfloor}\} \cdot \\ [v_{n,0}, v_{n,1}, v_{n,2}, v_{n,3}], \quad \text{for } 0 \le i_1 \le 15 \end{cases}$$ [Equation 79]

Here, $n = i_1 \mod 4$ and $m = i_1 \mod 4$. In equation 79, $$\text{diag}\{1, e^{j\frac{\pi}{2}\lfloor\frac{i_1}{4}\rfloor}, 1, e^{j\frac{\pi}{2}\lfloor\frac{i_1}{4}\rfloor}\}$$

shifts the beam group by 1 column cyclically to the right subject to $4 \le i_1 \le 7$. In equation 79, $$\text{diag}\{1, 1, e^{j\frac{\pi}{2}\lfloor\frac{i_1-8}{4}\rfloor}, e^{j\frac{\pi}{2}\lfloor\frac{i_1-8}{4}\rfloor}\}$$

shifts the beam groups by 1 column cyclically to the right subject to $12 \le i_1 \le 15$.

Figure 74:
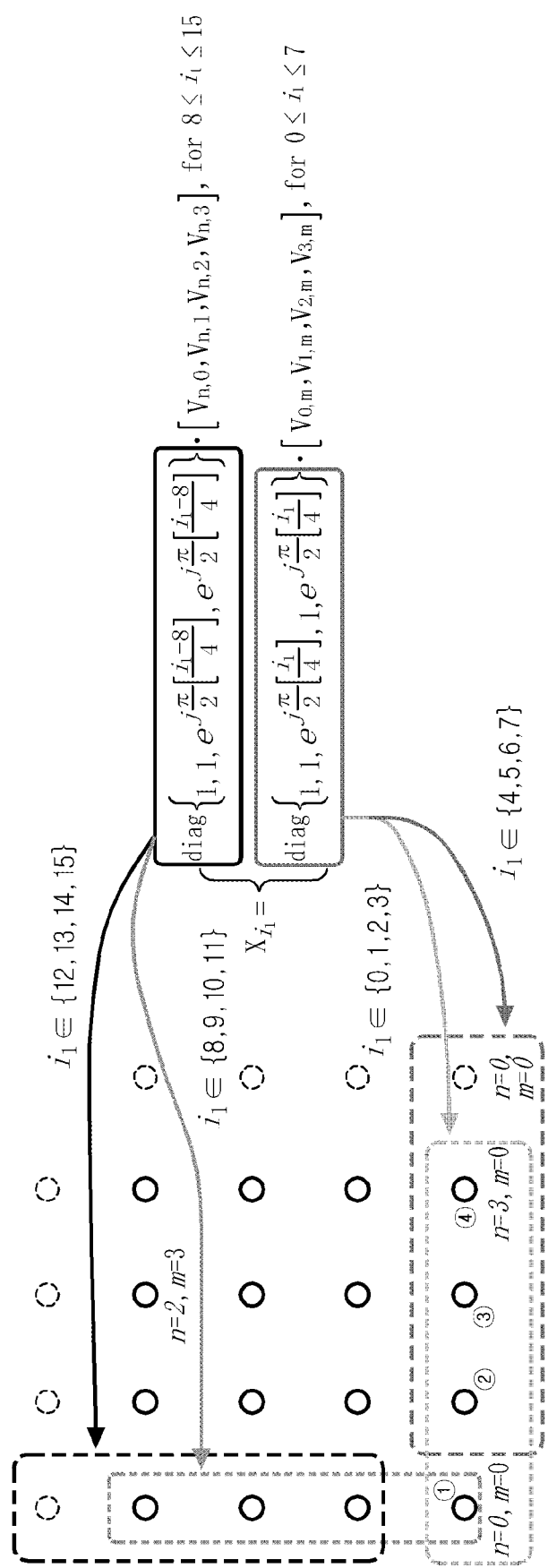
FIG. 74 is a diagram illustrating exemplary beam grouping detail in equation 3.

FIG. 74 shows the operation thereof in detail.

Using the above beam group structure, it is possible to reduce the beam pair selection load in $W_2$. For example, since the $0^{th}$ and $4^{th}$ beam groups have a cyclically-shifted relationship as shown in FIG. 73, in the case of using the above beam group structure, it is possible for the four beam selection pairs of:

$$(i,j) \in \{(1,1),(3,3),(1,2),(3,4)\}$$ [Equation 80]

to represent all (i, i) pairs and (i, i+1) pairs from the overall view.

In the embodiment, since only 2 bits of the 4-bit $i_2$ are allocated for (i,j) pair selection, it is possible to allocate the other 2 bits for co-phasing factor selection.

Table 16 is the $i_1$ and $i_2$ PMI mapping table for codebook of this embodiment. In table 16, $\varphi_z = e^{j2\pi z/Q_z}$ denotes the co-phasing factor, and $Q_z=8$ denotes the co-phasing resolution.

Table 16 exemplifies the $i_1$ and $i_2$ PMI-codebook mapping conceived in this embodiment. In table 16, $\varphi_z = e^{j2\pi z/Q_z}$, $z \in \{0,1,2,3\}$ is the co-phasing factor, and $Q_z=8$ is the co-phasing resolution. Table 16 is conceived to express the above described beam group and beam selection method implicitly.

If the UE selects $i_1$ in table 16, a beam group represented by equation 79 is selected. If the UE selects $i_2$ in table 16, one of (i,j) pairs included in equation 80 and one of co-phasing factors $\varphi_z$ $$\in \{1, e^{j\frac{\pi}{4}}, j, e^{j\frac{3\pi}{4}}\}$$

are chosen.

TABLE 16

Codebook - PMI mapping table of embodiment 7-3

|   |   | $i_2$ | | | |
|---|---|---|---|---|---|
|   |   | 0 | 1 | 2 | 3 |
| $i_1$ | 0-7 | $\Lambda_H \cdot W^{(2)}_{(0,m),(0,m),0}$ | $\Lambda_H \cdot W^{(2)}_{(0,m),(0,m),1}$ | $\Lambda_H \cdot W^{(2)}_{(0,m),(0,m),2}$ | $\Lambda_H \cdot W^{(2)}_{(0,m),(0,m),3}$ |
|   | 8-15 | $\Lambda_V \cdot W^{(2)}_{(n,0),(n,0),0}$ | $\Lambda_V \cdot W^{(2)}_{(n,0),(n,0),1}$ | $\Lambda_V \cdot W^{(2)}_{(n,0),(n,0),2}$ | $\Lambda_V \cdot W^{(2)}_{(n,0),(n,0),3}$ |
|   |   | $i_2$ | | | |
|   |   | 4 | 5 | 6 | 7 |
| $i_1$ | 0-7 | $\Lambda_H \cdot W^{(2)}_{(3,m),(3,m),0}$ | $\Lambda_H \cdot W^{(2)}_{(3,m),(3,m),1}$ | $\Lambda_H \cdot W^{(2)}_{(3,m),(3,m),2}$ | $\Lambda_H \cdot W^{(2)}_{(3,m),(3,m),3}$ |
|   | 8-15 | $\Lambda_V \cdot W^{(2)}_{(n,3),(n,3),0}$ | $\Lambda_V \cdot W^{(2)}_{(n,3),(n,3),1}$ | $\Lambda_V \cdot W^{(2)}_{(n,3),(n,3),2}$ | $\Lambda_V \cdot W^{(2)}_{(n,3),(n,3),3}$ |
|   |   | $i_2$ | | | |
|   |   | 8 | 9 | 10 | 11 |
| $i_1$ | 0-7 | $\Lambda_H \cdot W^{(2)}_{(0,m),(1,m),0}$ | $\Lambda_H \cdot W^{(2)}_{(0,m),(1,m),1}$ | $\Lambda_H \cdot W^{(2)}_{(0,m),(1,m),2}$ | $\Lambda_H \cdot W^{(2)}_{(0,m),(1,m),3}$ |
|   | 8-15 | $\Lambda_V \cdot W^{(2)}_{(n,0),(n,1),0}$ | $\Lambda_V \cdot W^{(2)}_{(n,0),(n,1),1}$ | $\Lambda_V \cdot W^{(2)}_{(n,0),(n,1),2}$ | $\Lambda_V \cdot W^{(2)}_{(n,0),(n,1),3}$ |
|   |   | $i_2$ | | | |
|   |   | 12 | 13 | 14 | 15 |
| $i_1$ | 0-7 | $\Lambda_H \cdot W^{(2)}_{(2,m),(3,m),0}$ | $\Lambda_H \cdot W^{(2)}_{(2,m),(3,m),1}$ | $\Lambda_H \cdot W^{(2)}_{(2,m),(3,m),2}$ | $\Lambda_H \cdot W^{(2)}_{(2,m),(3,m),3}$ |
|   | 8-15 | $\Lambda_V \cdot W^{(2)}_{(n,2),(n,3),0}$ | $\Lambda_V \cdot W^{(2)}_{(n,2),(n,3),1}$ | $\Lambda_V \cdot W^{(2)}_{(n,2),(n,3),2}$ | $\Lambda_V \cdot W^{(2)}_{(n,2),(n,3),3}$ |

$$\Lambda_H = \begin{bmatrix} \text{diag}\left\{1, e^{j\frac{\pi}{2}\lfloor\frac{i_1}{4}\rfloor}, 1, e^{j\frac{\pi}{2}\lfloor\frac{i_1}{4}\rfloor}\right\} & 0 \\ 0 & \text{diag}\left\{1, e^{j\frac{\pi}{2}\lfloor\frac{i_1}{4}\rfloor}, 1, e^{j\frac{\pi}{2}\lfloor\frac{i_1}{4}\rfloor}\right\} \end{bmatrix},$$

$$\Lambda_V = \begin{bmatrix} \text{diag}\left\{1, 1, e^{j\frac{\pi}{2}\lfloor\frac{i_1-8}{4}\rfloor}, e^{j\frac{\pi}{2}\lfloor\frac{i_1-8}{4}\rfloor}\right\} & 0 \\ 0 & \text{diag}\left\{1, 1, e^{j\frac{\pi}{2}\lfloor\frac{i_1-8}{4}\rfloor}, e^{j\frac{\pi}{2}\lfloor\frac{i_1-8}{4}\rfloor}\right\} \end{bmatrix},$$

$$W^{(2)}_{(n,m),(n',m'),z} = \frac{1}{4}\begin{bmatrix} v_{n,m} & v_{n',m'} \\ \varphi_z v_{n,m} & -\varphi_z v_{n',m'} \end{bmatrix}$$

In embodiments 7-1 to 7-3, the eNB and the UE have to share the codebook-PMI mapping information as shown in tables 14 to 16 in order for the eNB to acquire the channel information based on the PMI transmitted by the UE. The codebook-PMI mapping information may be shared in such a way of storing it in the storage devices of the eNB and the UE in advance or transmitting it from the eNB to the UE. The codebook-PMI mapping information may be shared in the form of a formula or a table or predetermined values.

Figure 75:
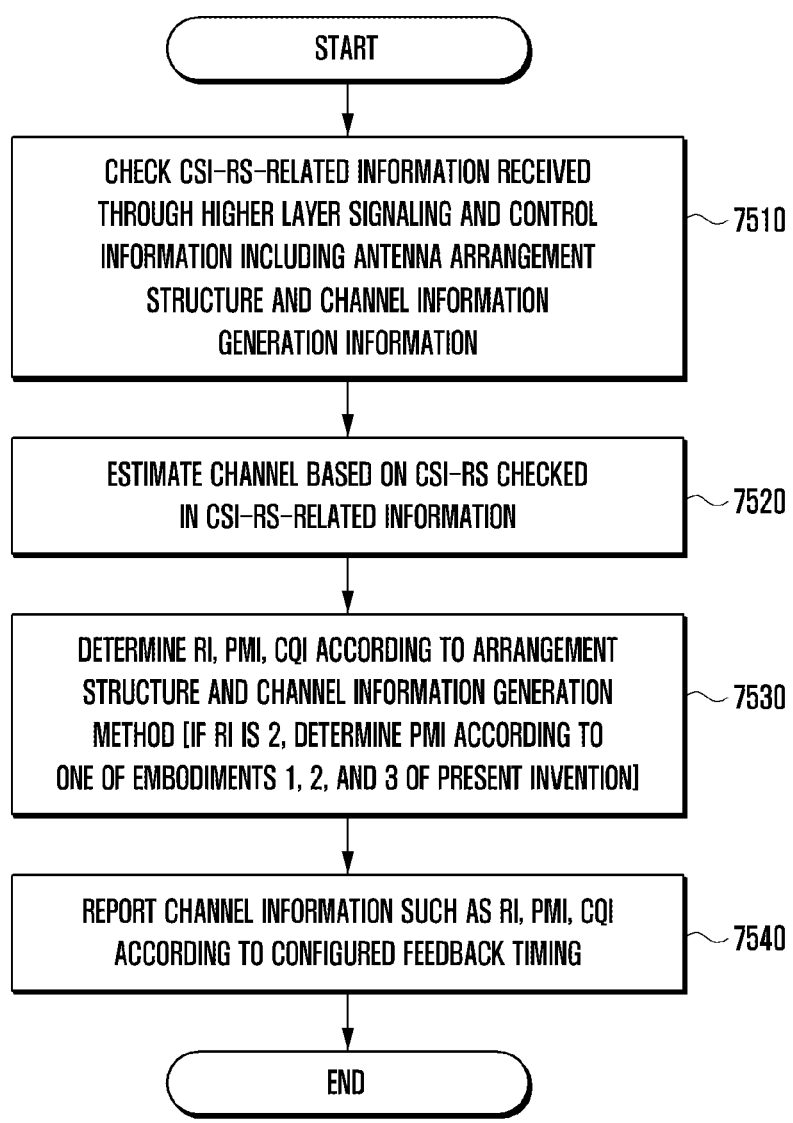
FIG. 75 is a flowchart illustrating operation order of the UE according to an embodiment of the present invention.

A description is made of the channel information generation and feedback method of the UE according to the seventh embodiment of the present invention with reference to FIG. 75.

Referring to FIG. 75, the UE receives the control information including CSI-RS information, antenna array structure, and channel information generation method from the eNB through higher layer signaling at step 7510. Here, the channel information generation method means the codebook-PMI mapping information such as table 14, table 15, and table 16.

The UE may determine whether the antenna array structure of the eNB is the ULA structure as shown in FIG. 53 (to use the 8 Tx codebook for release 12) or the UPA structure as shown in FIG. 54 (to use one of the codebooks proposed in the present invention) based on the information received from the eNB.

At step 7520, the UE estimates the channel between the eNB and the UE with the CSI-RS received based on the CSI-RS information acquired at step 7510. The UE generates RI, PMI, and CQI based on the channel estimated at step 7520 and the channel information generation method received at step 7510. Particularly, the eNB may instruct the UE to refer to the codebook-PMI mapping information such as table 14, table 15, and table 16 when it generates the PMI for the case of rank=2.

Afterward, the UE may determine RI based on the generated PMI and CQI at step 7530.

Finally, the UE feeds back the channel information including RI, PMI, and CQI at the feedback timings indicated from the eNB at step 7540.

Figure 76:
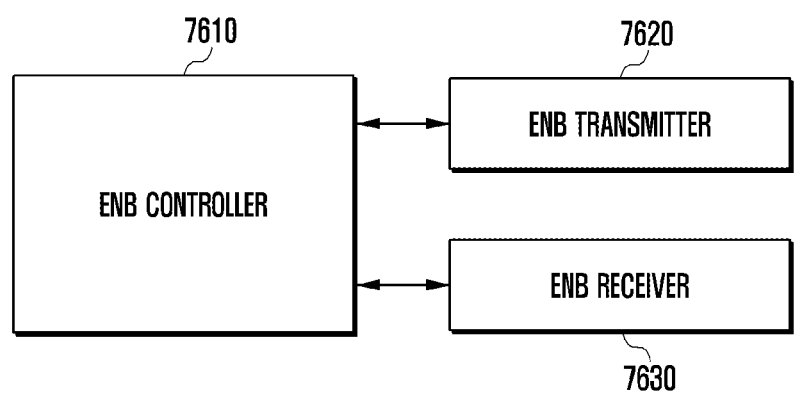
FIG. 76 is a block diagram illustrating an internal structure of the eNB according to an embodiment of the present invention.

FIG. 76 is a diagram illustrating a configuration of the eNB for supporting the channel information generation and feedback method proposed in the present invention.

In FIG. 76, the eNB transmitter 7620 transmits data, reference signals, and feedback information to the UE. In detail, the transmitter 7620 may transmit a high layer signal to the UE to notify of the eNB antenna array structure or channel information generation method.

At this time, the eNB may use a predetermined single codebook or one of various kinds of codebooks which is selected depending on the situation and determine the information to be selected by the eNB controller 7610 and method for sharing the selected information with the UE.

The eNB receiver 7630 may receive the channel state information such as ASD and ZSD for supporting the operation of the controller 7610 or the channel information such as RI, PMI, and CQI reported by the UE. The controller 7610 controls the data transmission to the UE based on the channel state information such as RI, PMI, and CQI acquired by the receiver 7630.

Figure 77:
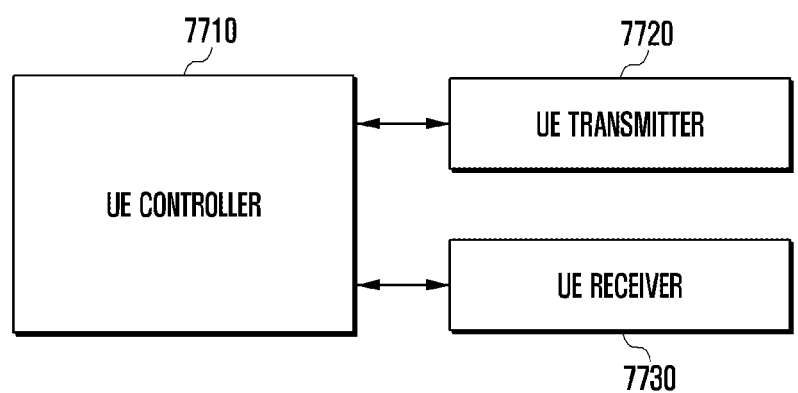
FIG. 77 is a block diagram illustrating an internal structure of the UE according to an embodiment of the present invention.

FIG. 77 is a diagram illustrating a configuration of the UE for supporting the channel information generation and feedback method proposed in the present invention.

In FIG. 77, the UE receiver 7730 receives feedback information CSI-RS information, antenna arrangement structure, and channel information generation method, and reference signals from the eNB.

The UE controller 7710 estimates channels based on the reference signals and feedback information received by the receiver 7730 and generates RI, PMI, and CQI according to the channel information generation method. The controller 7710 may include a storage device for storing values detected by a computer in association with a plurality of channel information generation methods.

The controller 7710 may report the channel information generation capability of the UE in response to the request from the eNB. Here, the channel information generation capability of the UE may denote the type of the channel information generation method which is stored in the UE or the indication on whether the UE supports the channel information generation method indicated by the eNB.

The UE transmitter 7720 may transmit the channel information generated by the UE to the eNB or transmit the information on the channel information generation capability of the UE to the eNB.

According to an embodiment of the present invention, a method for transmitting a synchronization signal and a discovery signal in a D2D communication system. The signal transmission method of the present invention is advantageous in terms of facilitating D2D communication between eNBs which are not synchronized.

Also, the signal transmission method of the present invention is advantageous in terms of transmitting uplink feedback of the PCell and SCell while reducing resource waste.

Although various embodiments of the present disclosure have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A discovery signal transmission method of a terminal in a wireless communication system supporting Device to Device (D2D) communication, the method comprising: receiving information regarding a D2D discovery resource pool from a base station, selecting a resource from the D2D discovery resource pool for transmitting a discovery signal by the terminal, determining whether the selected resource is overlapped in time with a resource configured for transmitting a D2D synchronization signal by the terminal, and when a D2D synchronization signal transmission is configured to the terminal and the selected resource is overlapped with the resource configured for transmitting the D2D synchronization signal transmission, skipping transmission of the D2D discovery signal and transmitting the D2D synchronization signal in the selected resource.

2. The method of claim 1, further comprising:
transmitting, in case that the selected resource is not overlapped with the D2D synchronization signal transmission resource, the D2D discovery signal in the selected resource.

3. The method of claim 1, further comprising:
determining whether a signal for configuring the D2D synchronization transmission is received from the base station on a higher layer signaling; and
determining whether the D2D synchronization signal transmission is configured based on a result of the signal reception determination.

4. The method of claim 1, further comprising:
receiving information on a signal strength threshold from the base station;
measuring received signal strength of a cell-specific reference signal transmitted by the base station; and
identifying that the D2D synchronization signal transmission is configured in a case that the received signal strength of the cell-specific reference signal is below the signal strength threshold.

5. A terminal for transmitting a discovery signal in a wireless communication system supporting Device to Device (D2D) communication, the terminal comprising: a transceiver to transmit and receive signals to and from a base station or another terminal; and a controller configured to control to: receive, from the base station via the transceiver, information regarding a D2D discovery resource pool; select a resource from the D2D discovery resource pool for transmitting the discovery signal from the terminal; determine whether the selected resource is overlapped in time with a resource configured for transmitting a D2D synchronization signal from the terminal; and when a D2D synchronization signal transmission is configured to the terminal and the selected resource is overlapped with the resource configured for transmitting the D2D synchronization signal transmission, skipping transmission of the D2D discovery signal and transmitting the D2D synchronization signal in the selected resource.

6. The terminal of claim 5, wherein the controller is further configured to transmit, in case that the selected resource is not overlapped with the D2D synchronization signal transmission resource, the D2D discovery signal in the selected resource.

7. The terminal of claim 5, wherein the controller is further configured to determine whether a signal for configuring the D2D synchronization transmission is received from the base station on a higher layer signaling and determine whether the D2D synchronization signal transmission is configured based on a result of the signal reception determination.

8. The terminal of claim 5, wherein the controller is further configured to:

receive information on a signal strength threshold from the base station;

measure received signal strength of a cell-specific reference signal transmitted by the base station; and identify that the D2D synchronization signal transmission is configured in a case that based on the received signal strength of the cell-specific reference signal is below the signal strength threshold.

* * * * *